(12) United States Patent
Umeda et al.

(10) Patent No.: US 11,150,451 B2
(45) Date of Patent: Oct. 19, 2021

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventors: Takeshi Umeda, Fujisawa (JP); Tomoki Ito, Kawasaki (JP); Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 106 days.

(21) Appl. No.: 16/334,023

(22) PCT Filed: Oct. 5, 2017

(86) PCT No.: PCT/JP2017/036290
§ 371 (c)(1),
(2) Date: May 1, 2019

(87) PCT Pub. No.: WO2018/066649
PCT Pub. Date: Apr. 12, 2018

(65) Prior Publication Data
US 2019/0271836 A1 Sep. 5, 2019

(30) Foreign Application Priority Data

Oct. 7, 2016 (JP) .............. JP2016-198641

(51) Int. Cl.
*G02B 15/20* (2006.01)
*G02B 27/64* (2006.01)
*G02B 13/18* (2006.01)

(52) U.S. Cl.
CPC ............. *G02B 15/20* (2013.01); *G02B 13/18* (2013.01); *G02B 27/646* (2013.01)

(58) Field of Classification Search
CPC ........ G02B 15/14; G02B 15/16; G02B 15/20; G02B 15/22; G02B 15/28; G02B 15/145;
(Continued)

(56) References Cited

U.S. PATENT DOCUMENTS 6,031,669 A 2/2000 Ohtake
8,730,584 B2 * 5/2014 Ito .................... G02B 15/173
359/676
(Continued)

FOREIGN PATENT DOCUMENTS

CN 105137695 A 12/2015
JP H08-122640 A 5/1996
(Continued)

OTHER PUBLICATIONS

Partial Supplementary European Search Report dated May 4, 2020, in European Patent Application No. 17858485.0.
(Continued)

*Primary Examiner* — Mustak Choudhury
(74) *Attorney, Agent, or Firm* — SGPatents PLLC

(57) ABSTRACT

A zoom optical system (ZL) comprises a first negative lens group (G2) having a negative refractive power; and a second negative lens group (G4) disposed closer to an image than the first negative lens group (G2), wherein a distance between the first negative lens group (G2) and the second negative lens group (G4) changes during zooming, at least part of the first negative lens group (G2) is movable so as to have a displacement component in a direction perpendicular to an optical axis, at least part of the second negative lens group (G4) is movable along the optical axis during focusing, and the following conditional expression, $$0.50 < fGb/fGa < 2.60$$

is satisfied,
where,
(Continued)

fGa: a focal length of the first negative lens group (G2), and fGb: a focal length of the second negative lens group (G4).

46 Claims, 124 Drawing Sheets

(58) Field of Classification Search
CPC ............... G02B 15/173; G02B 15/177; G02B 15/1431; G02B 15/1461; G02B 15/144105; G02B 13/006; G02B 13/00918; G02B 27/646; G02B 9/14; G02B 9/46; G02B 9/56; G02B 9/60
See application file for complete search history.

(56) References Cited

U.S. PATENT DOCUMENTS

| | | | |
|---|---|---|---|
| 2001/0006432 A1 | 7/2001 | Ohtake | |
| 2003/0137748 A1 | 7/2003 | Mukaiya | |
| 2009/0251795 A1* | 10/2009 | Adachi | G02B 15/142 359/684 |
| 2011/0102905 A1 | 5/2011 | Harada | |
| 2011/0194015 A1 | 8/2011 | Kanetaka | |
| 2013/0120853 A1 | 5/2013 | Hagiwara et al. | |
| 2013/0242171 A1 | 9/2013 | Kurioka et al. | |
| 2014/0347525 A1 | 11/2014 | Obikane | |
| 2016/0349491 A1* | 12/2016 | Suzuki | G02B 15/14 |
| 2017/0184824 A1* | 6/2017 | Bito | G02B 15/14 |
| 2017/0192212 A1 | 7/2017 | Yamamoto | |
| 2017/0254993 A1 | 9/2017 | Suzuki et al. | |

FOREIGN PATENT DOCUMENTS

| | | |
|---|---|---|
| JP | H11-316342 A | 11/1999 |
| JP | 2001-330778 A | 11/2001 |
| JP | 2003-262780 A | 9/2003 |
| JP | 2009-265657 A | 11/2009 |
| JP | 2011-099924 A | 5/2011 |
| JP | 2011-164194 A | 8/2011 |
| JP | 2013-105132 A | 5/2013 |
| JP | 2015-102588 A | 6/2015 |
| JP | 2016-156903 A | 9/2016 |
| JP | 2017-120382 A | 7/2017 |
| WO | WO 2016/017727 A1 | 2/2016 |

OTHER PUBLICATIONS

Extended European Search Report dated Jun. 9, 2020, in European Patent Application No. 17858485.0.

Office Action dated Apr. 7, 2020 in Japanese Patent Application No. 2018-543964.

English translation of International Preliminary Report on Patentability from International Patent Application No. PCT/JP2017/036290, dated Apr. 18, 2019.

International Search Report from International Patent Application No. PCT/JP2017/036290, dated Jan. 9, 2018.

Office Action dated Sep. 27, 2020, in Chinese Patent Application No. 201780061831.1.

Office Action dated Mar. 24, 2021, in Chinese Patent Application No. 201780061831.1.

Office Action dated Jun. 29, 2021, in Japanese Patent Application No. 2020-201722.

* cited by examiner

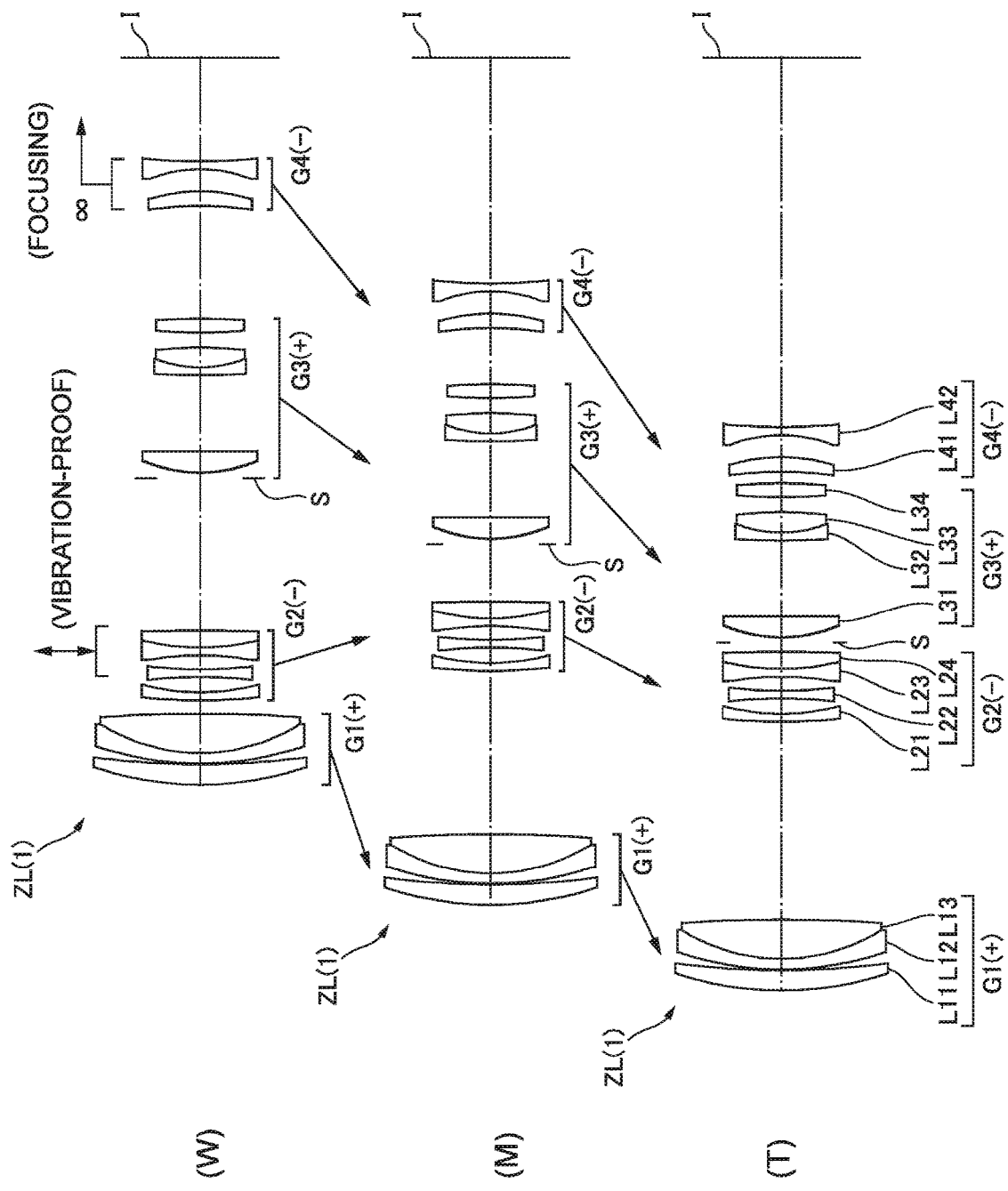

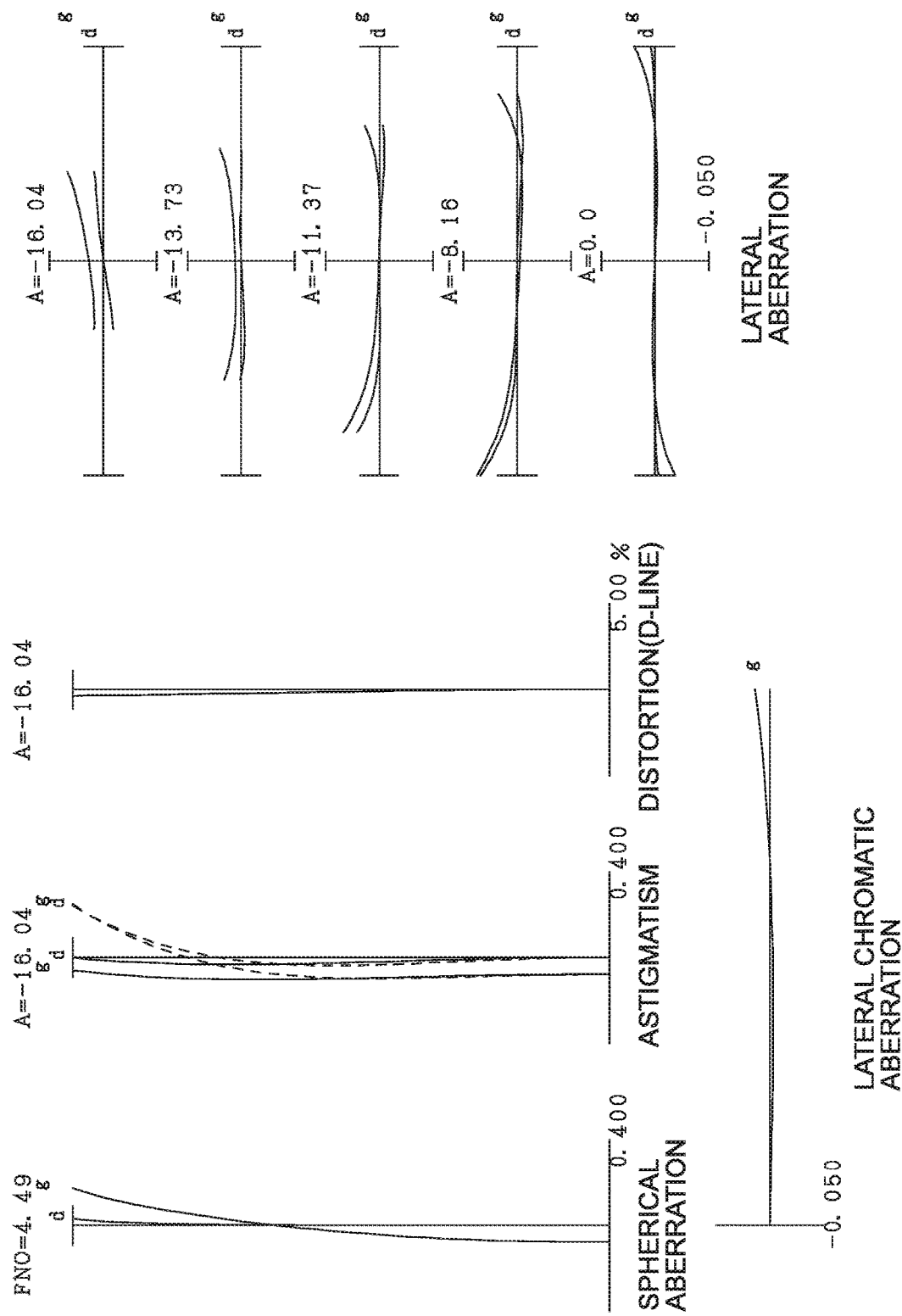

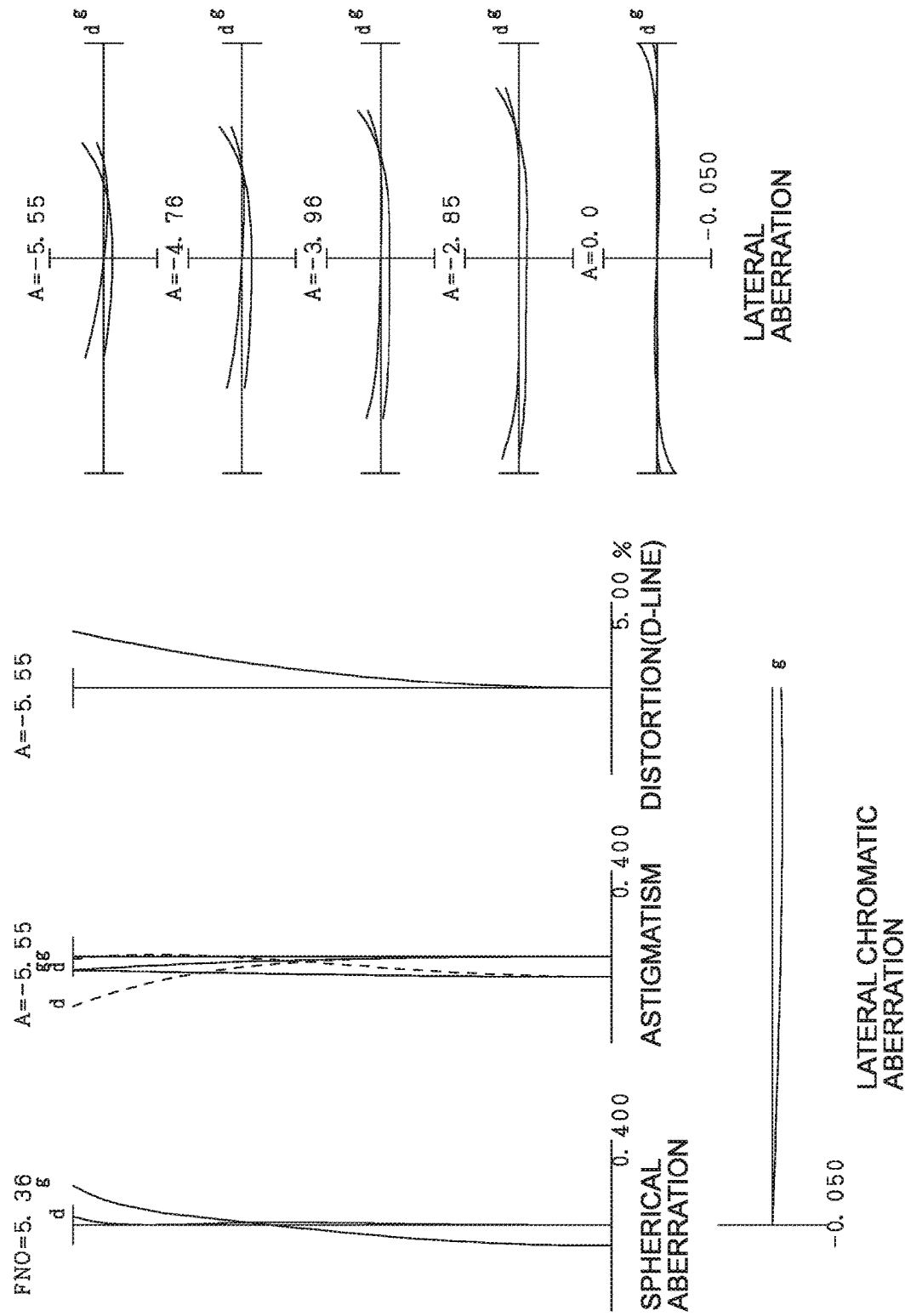

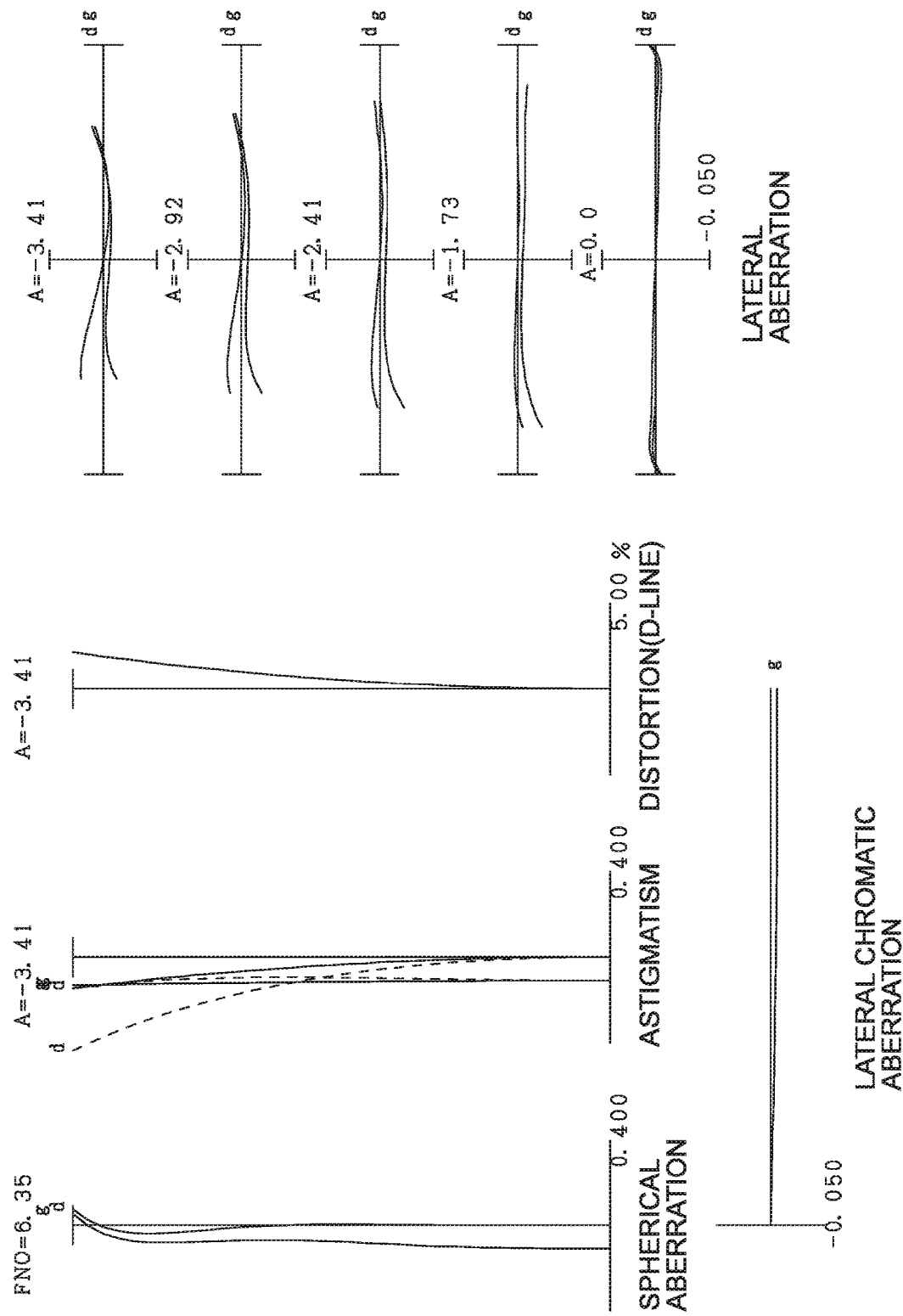

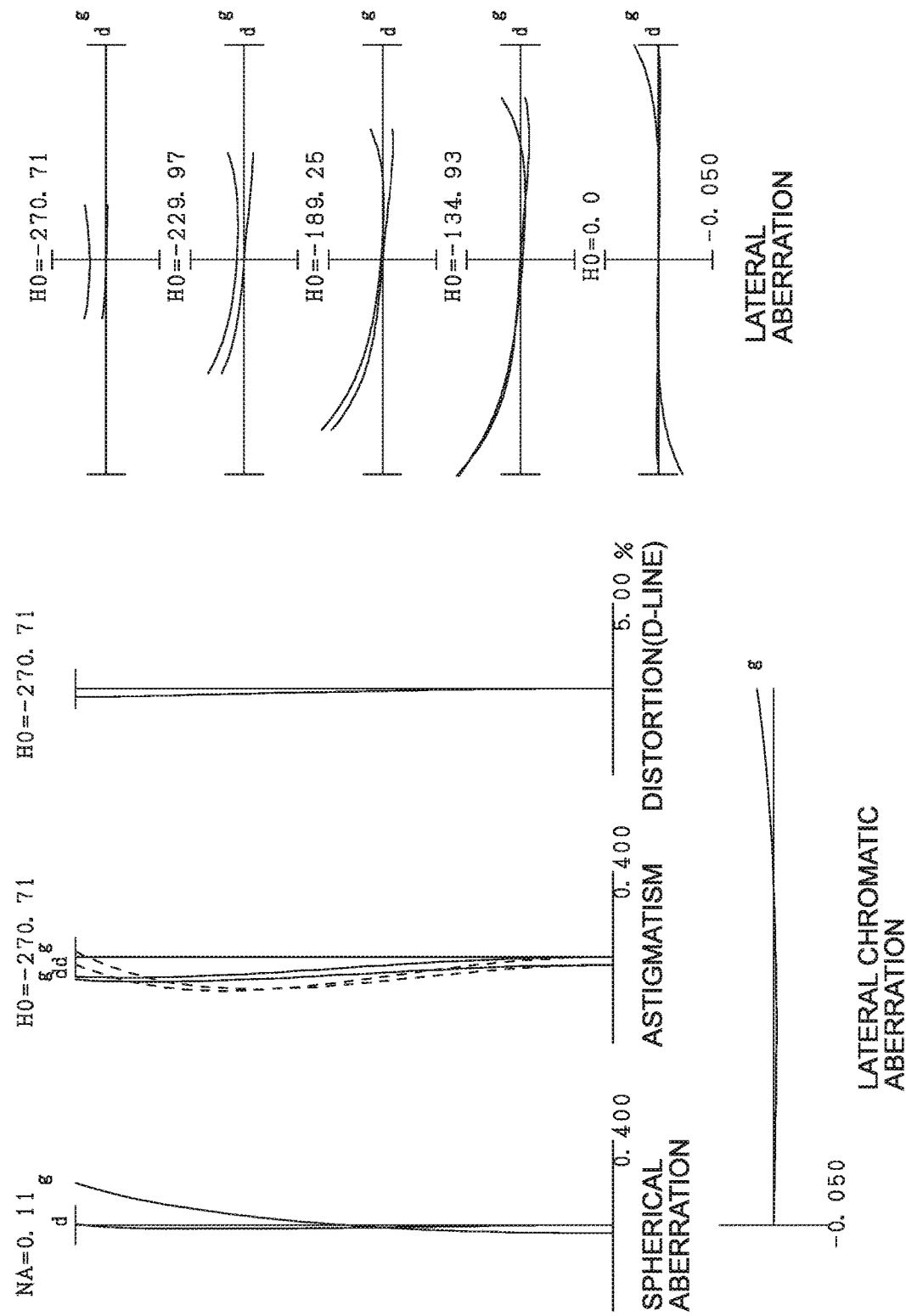

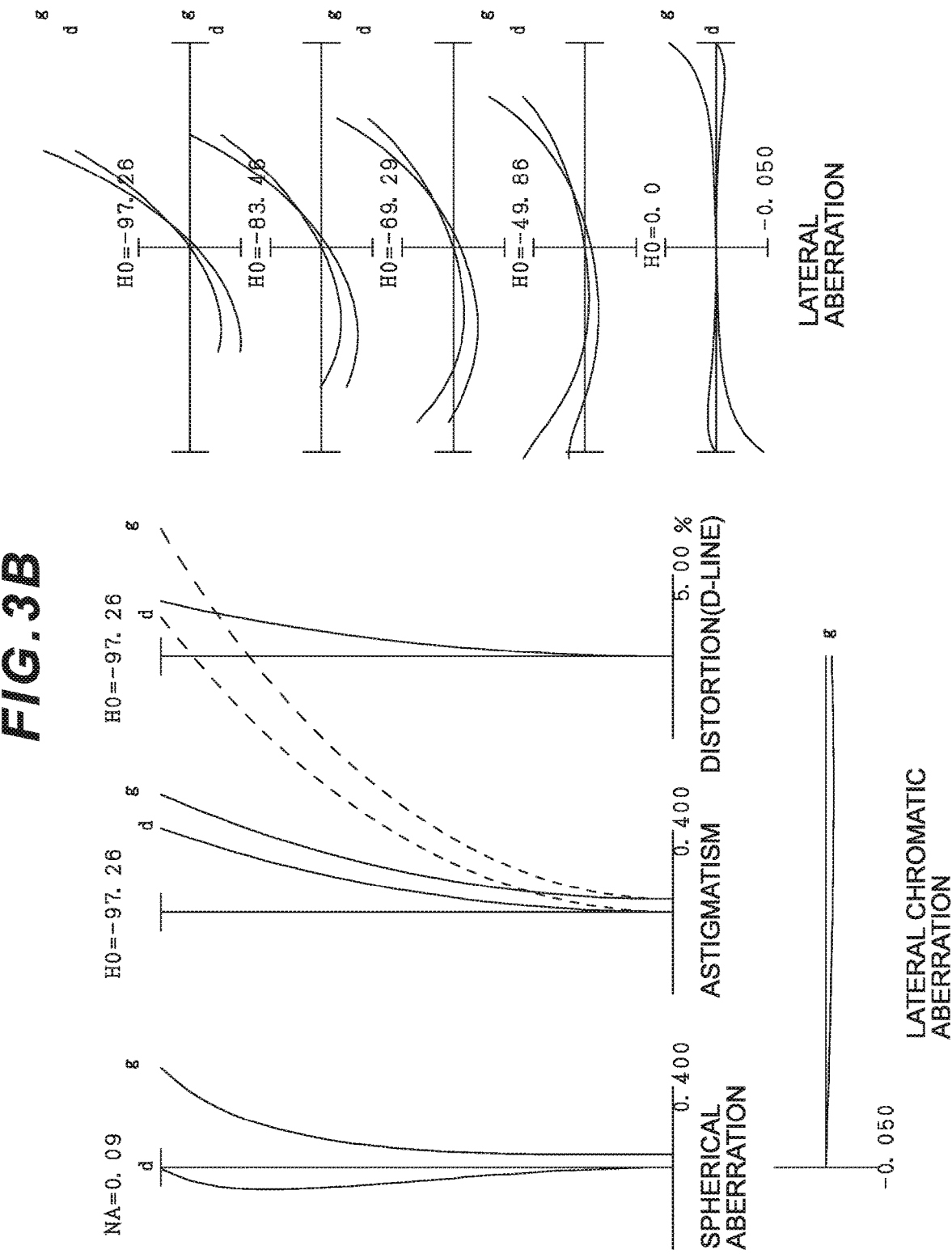

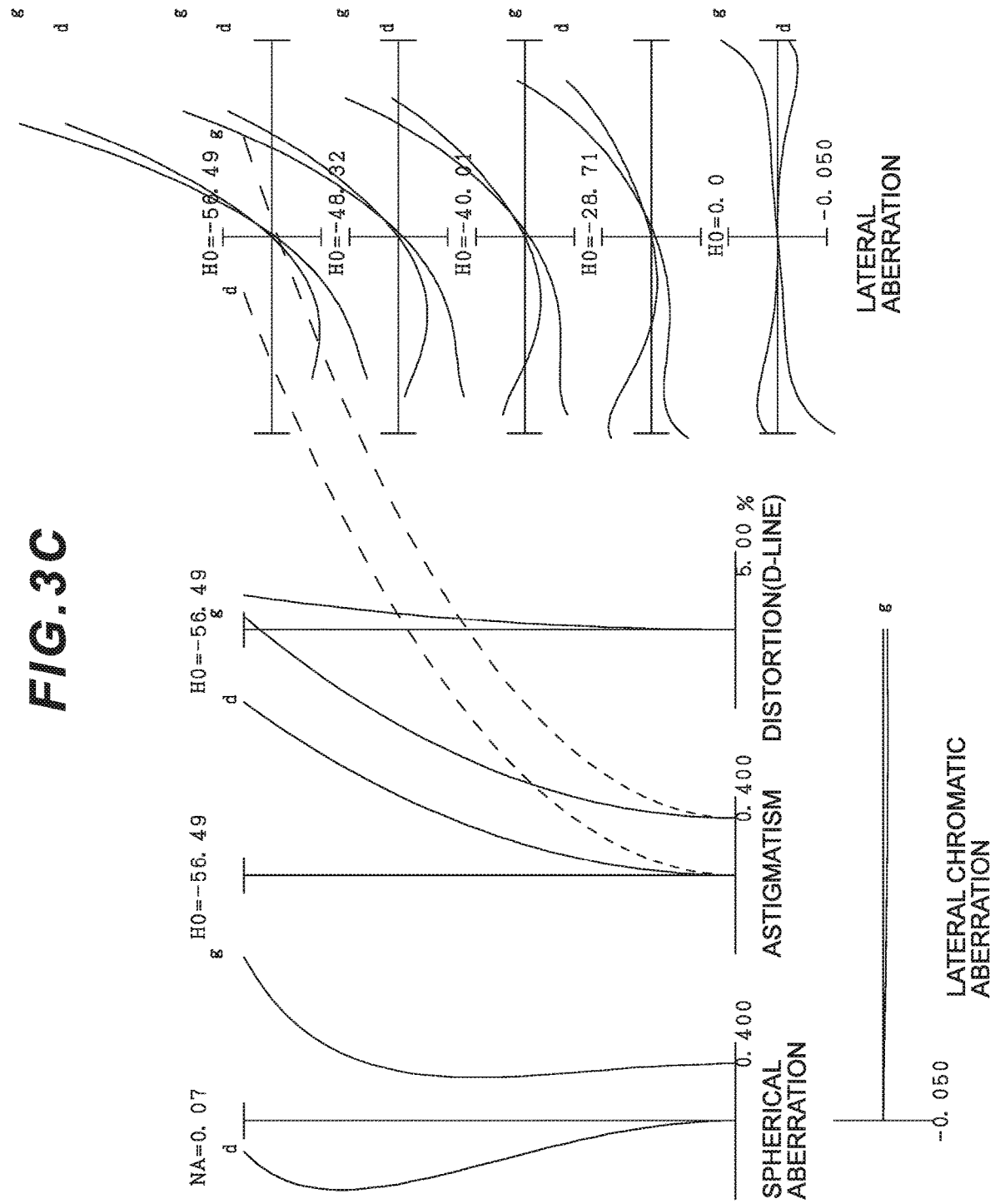

LATERAL ABERRATION

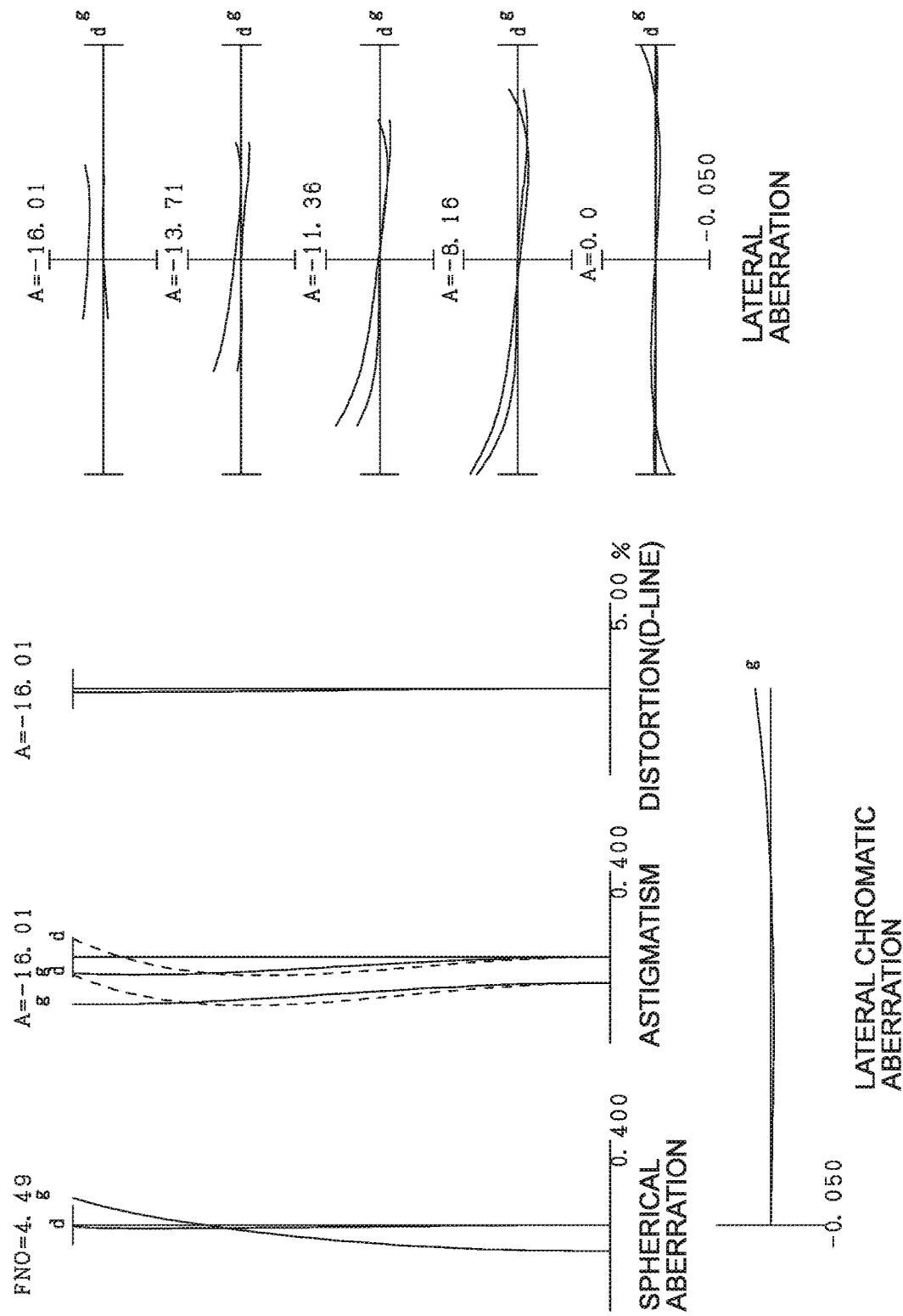

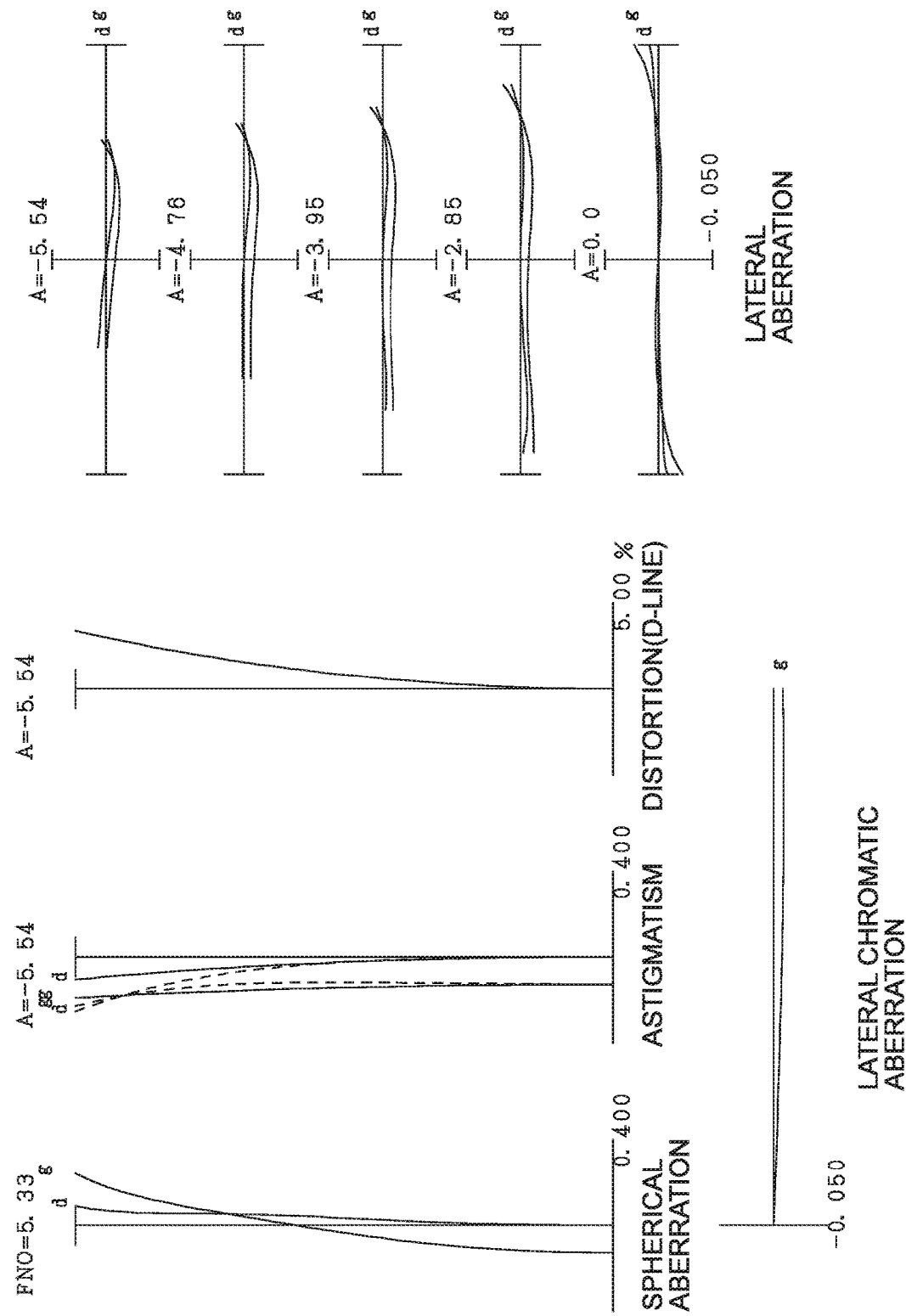

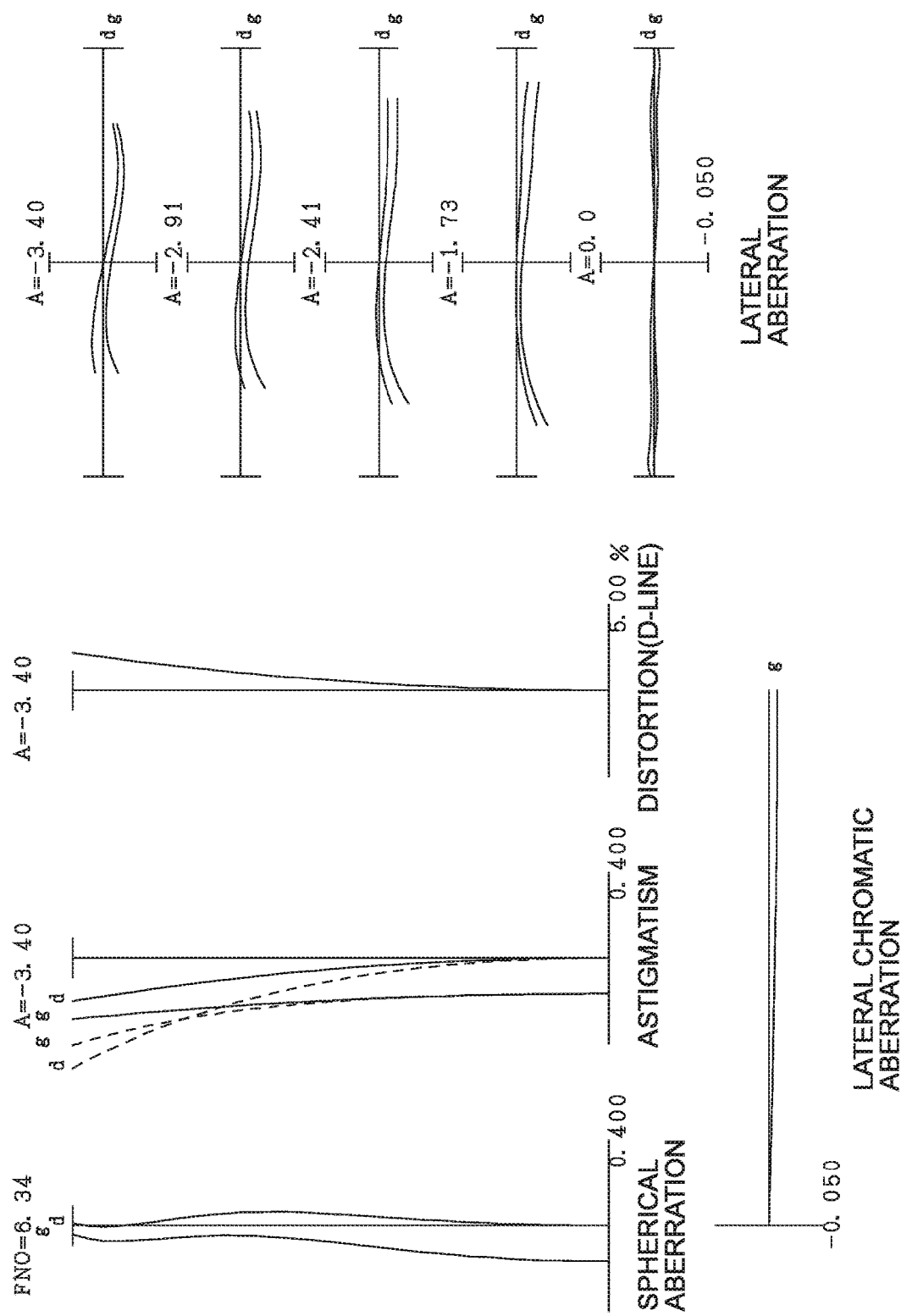

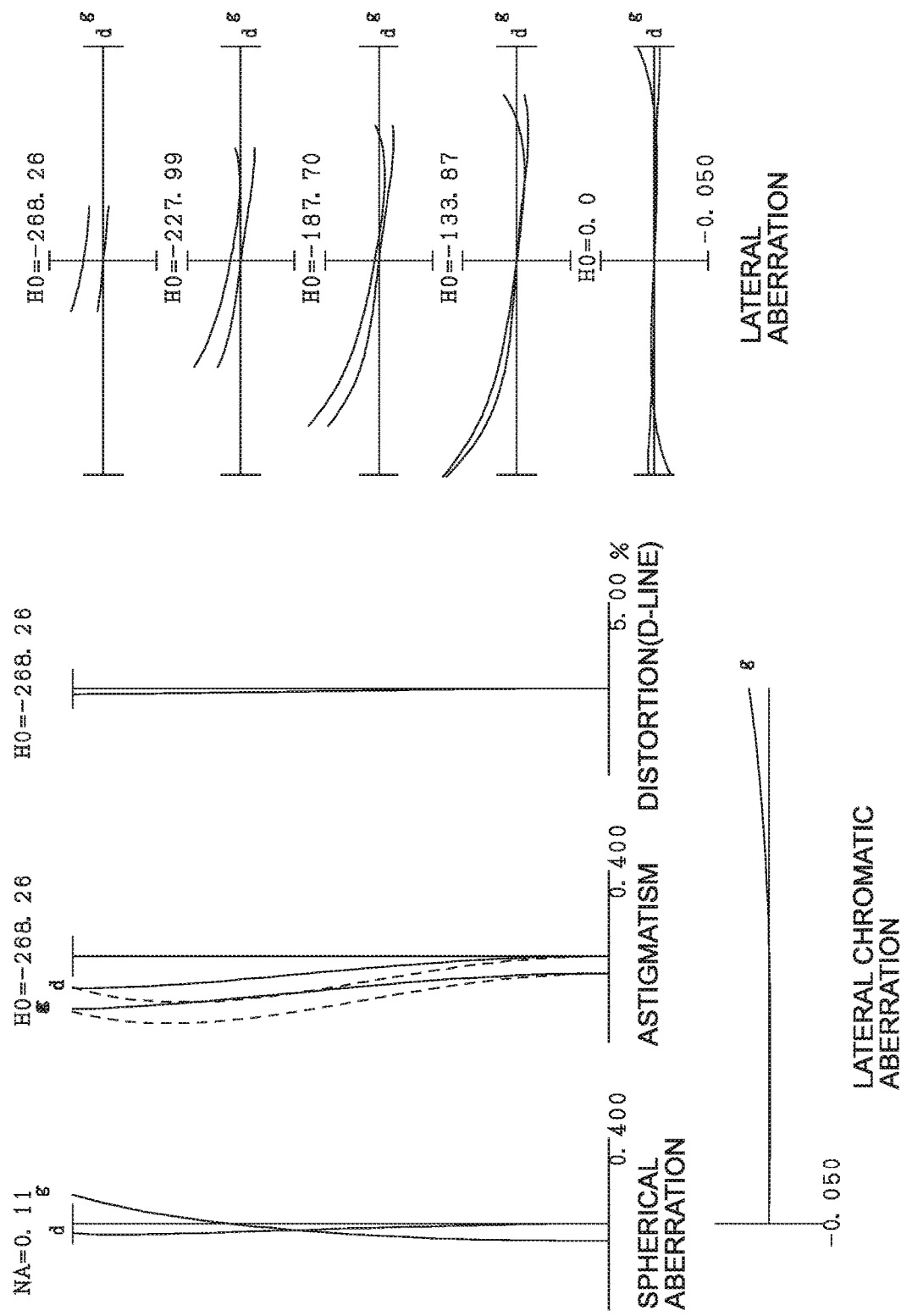

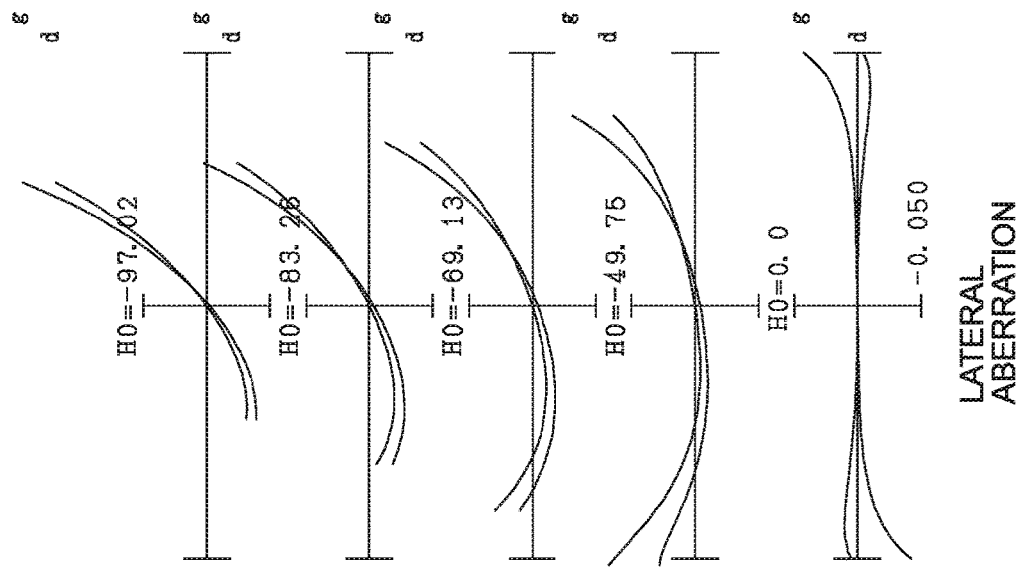
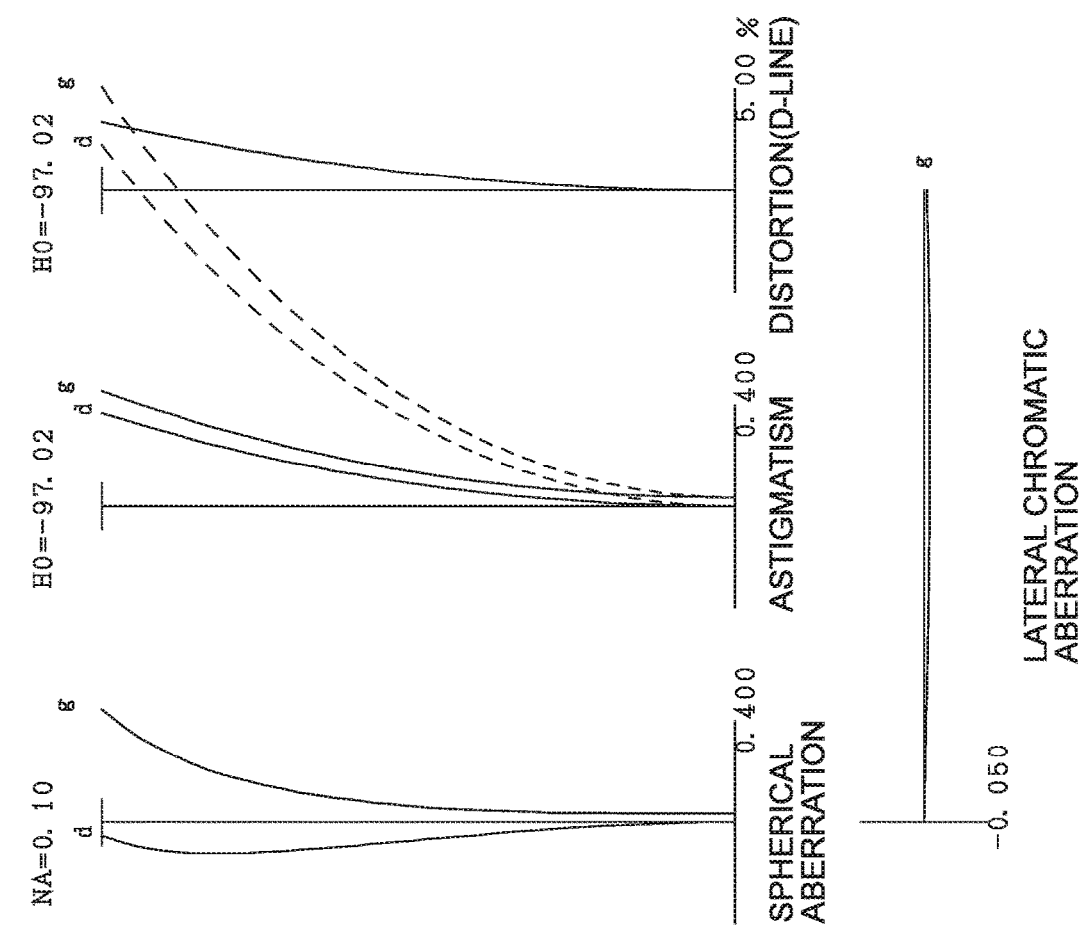
FIG. 7B

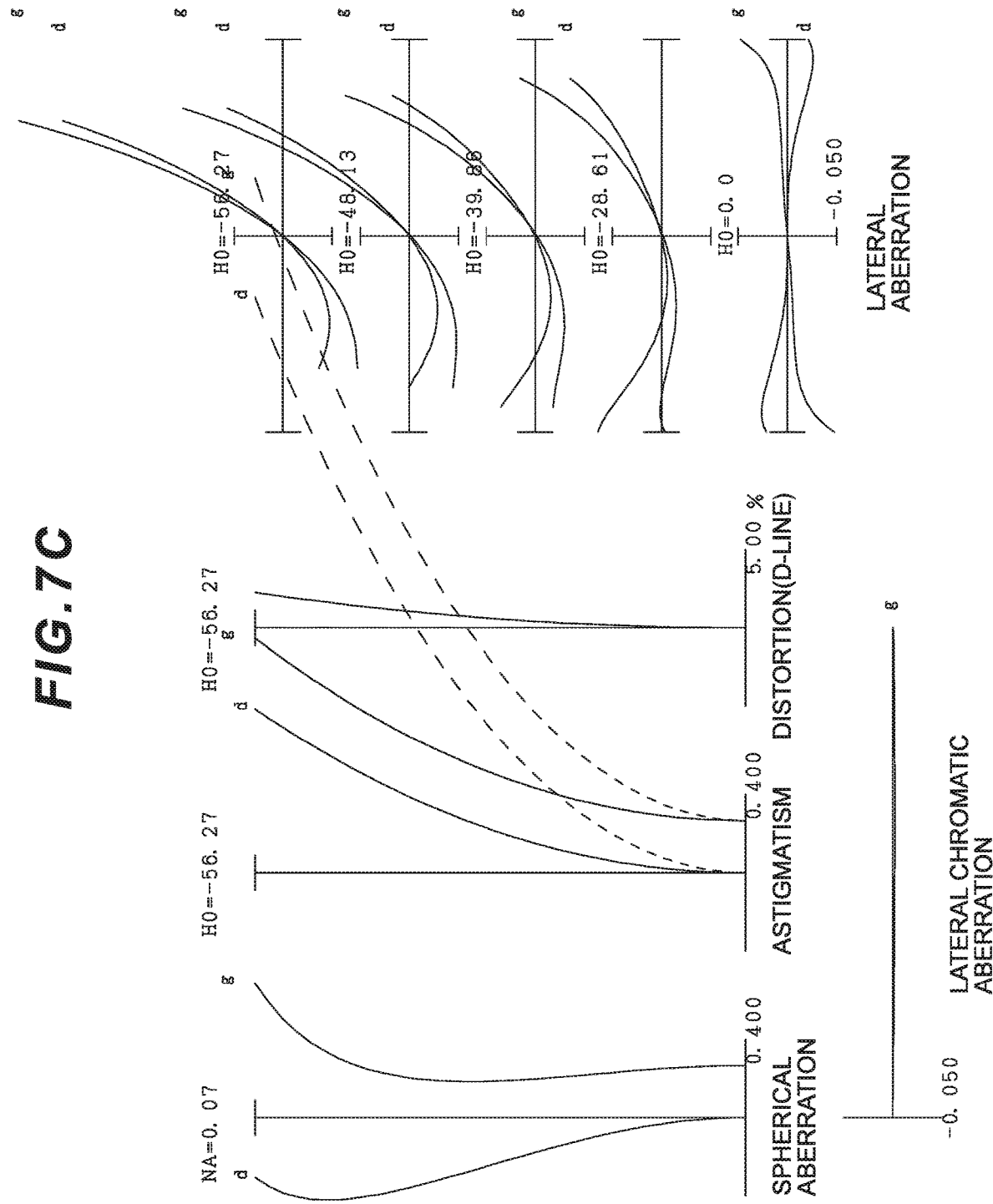

LATERAL ABERRATION

LATERAL
ABERRATION

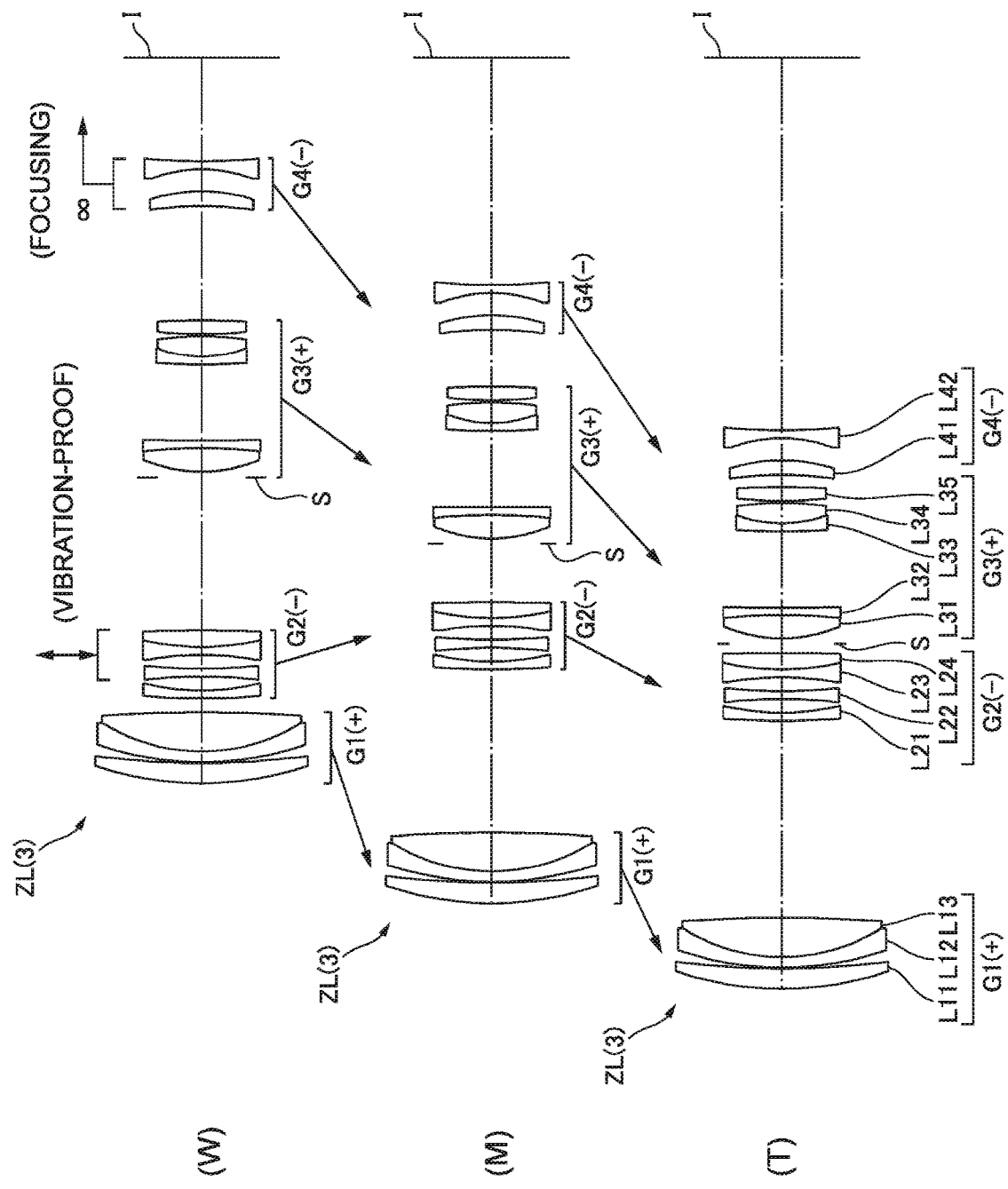

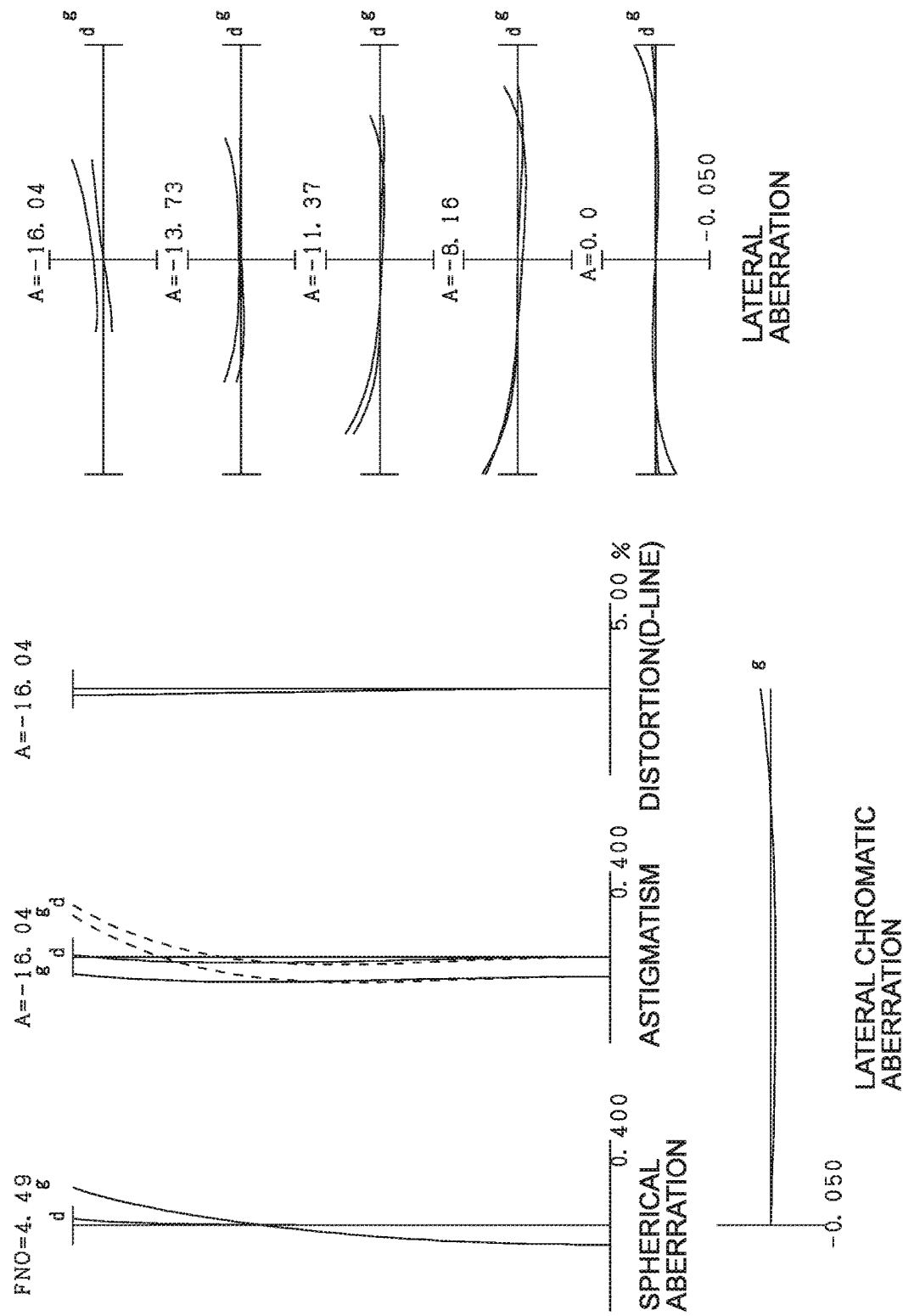

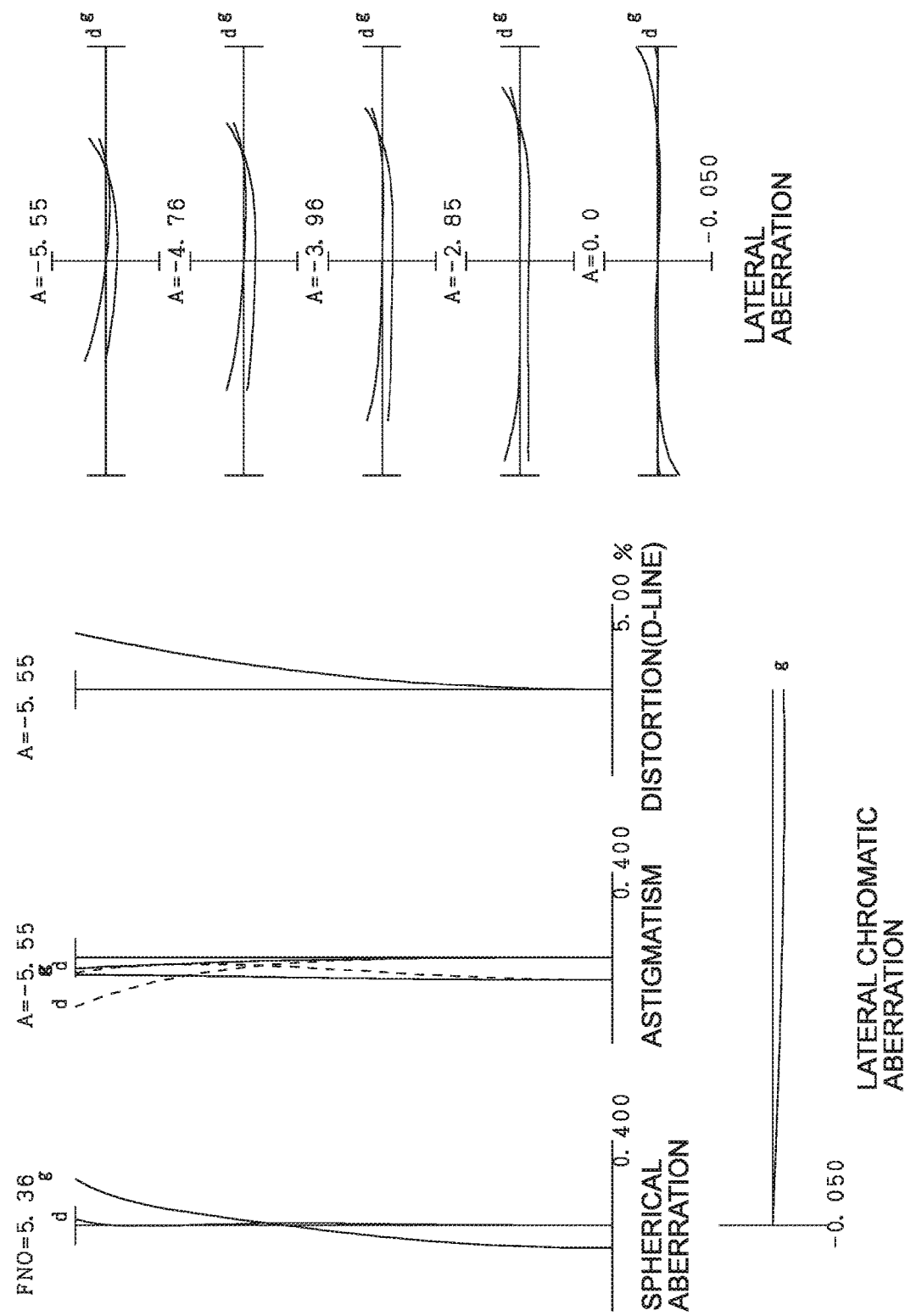

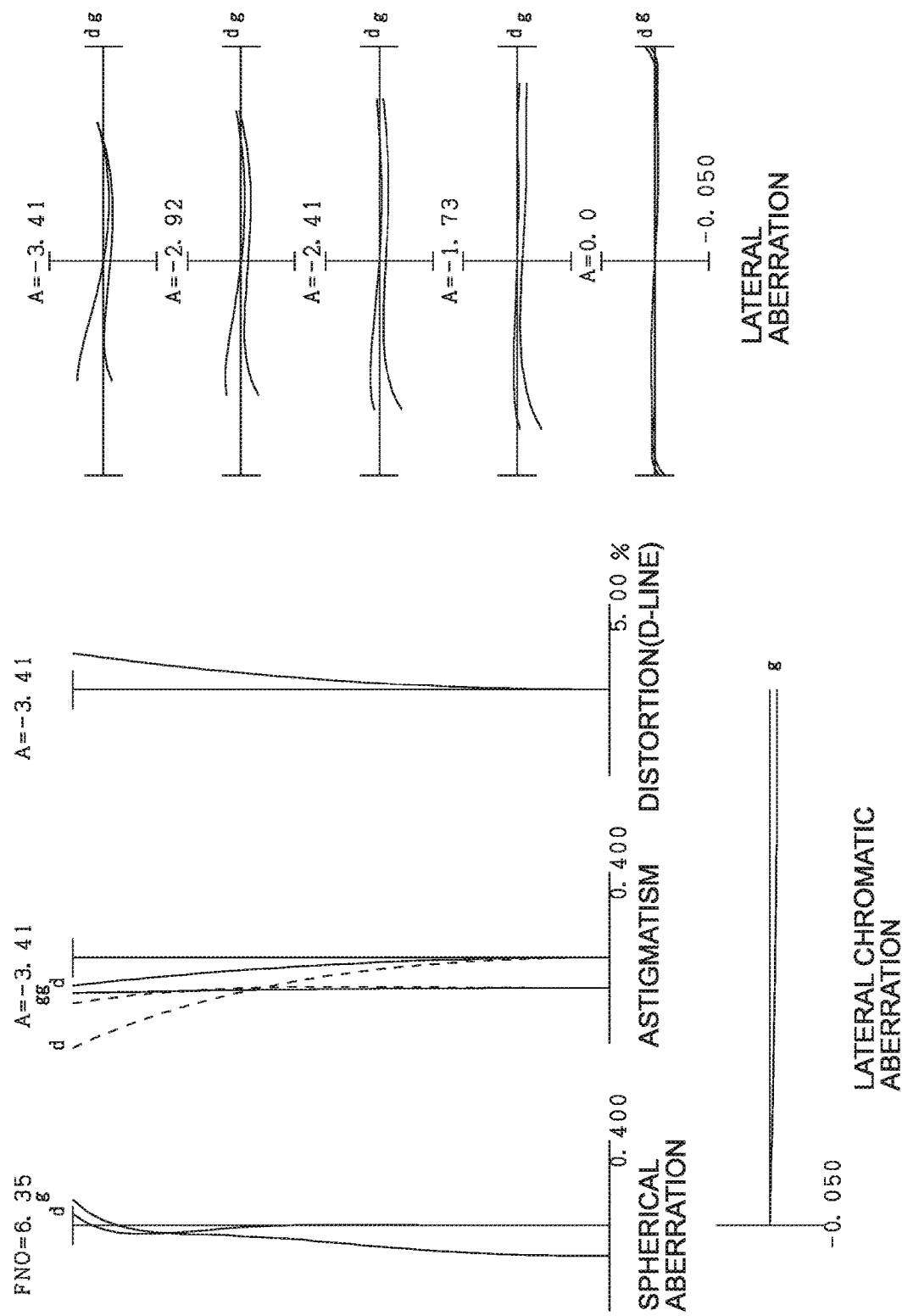

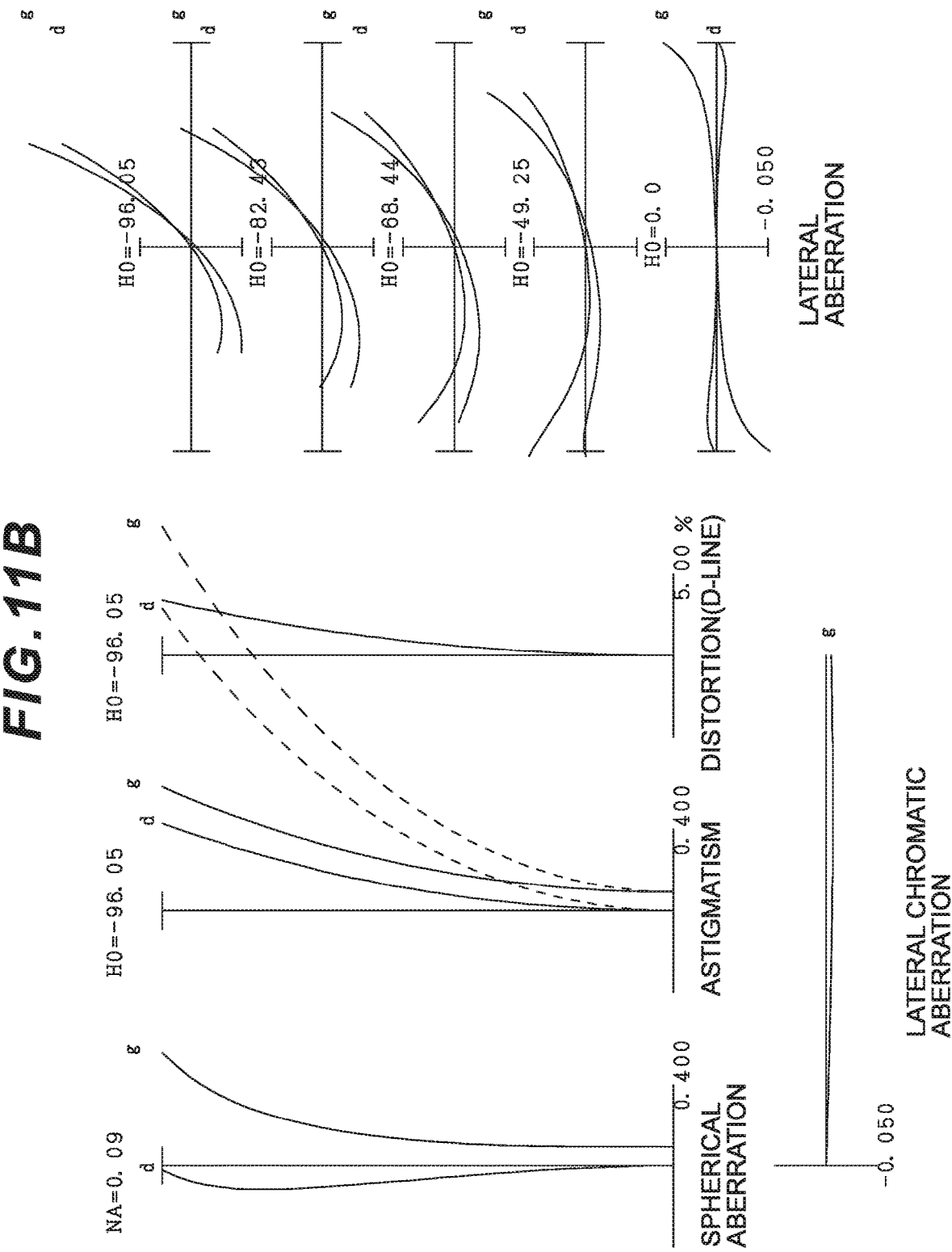

LATERAL ABERRATION

LATERAL ABERRATION

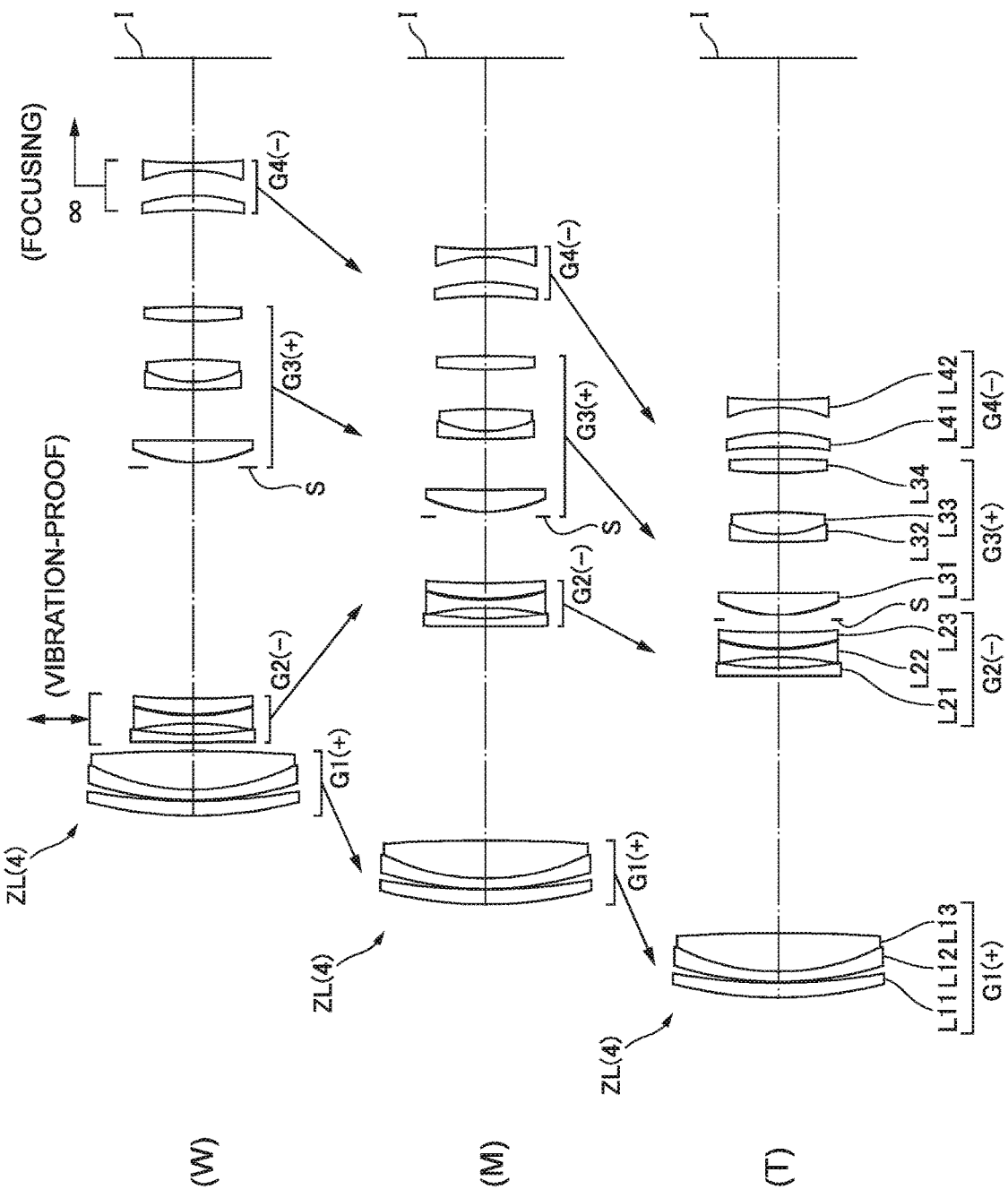

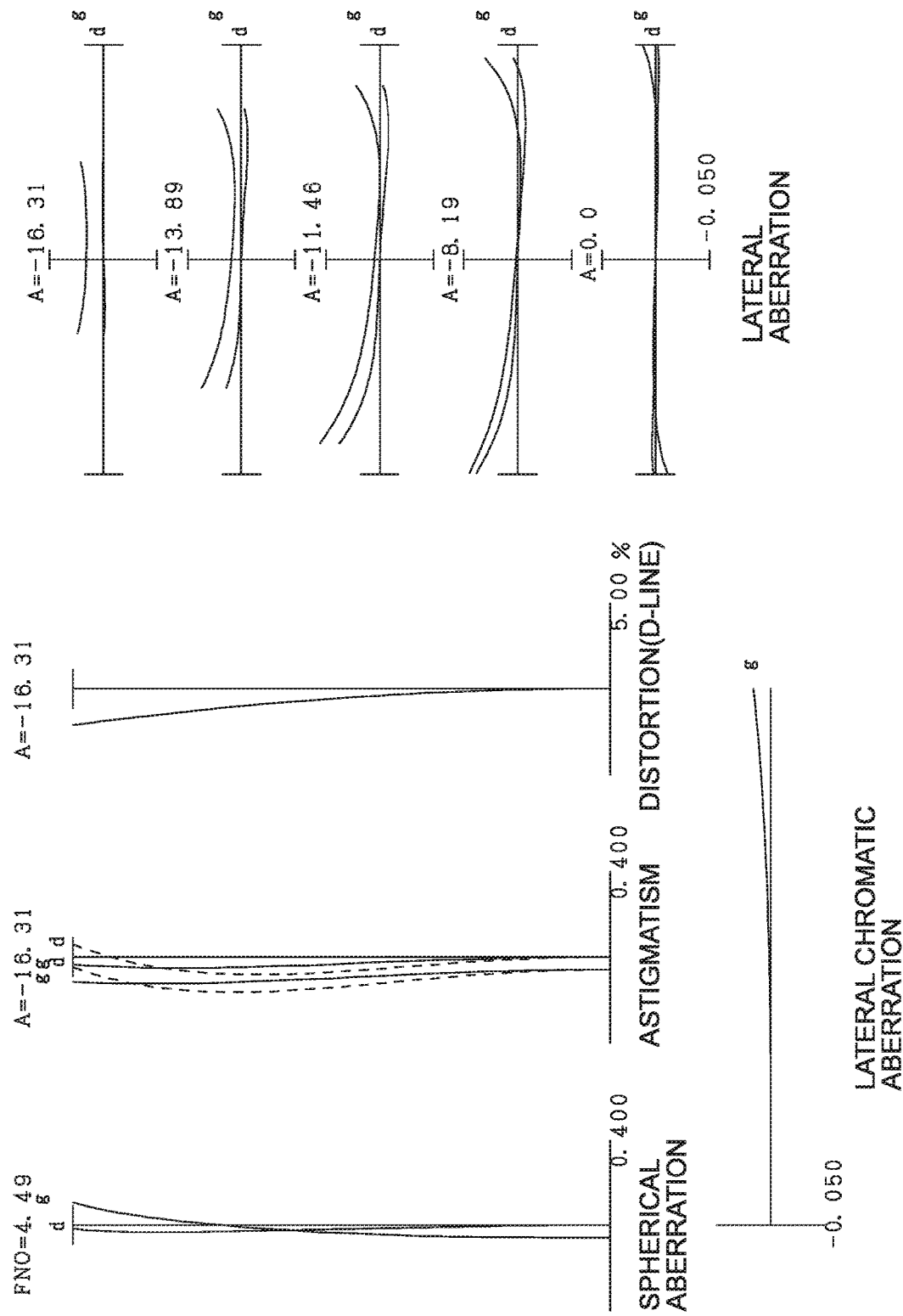

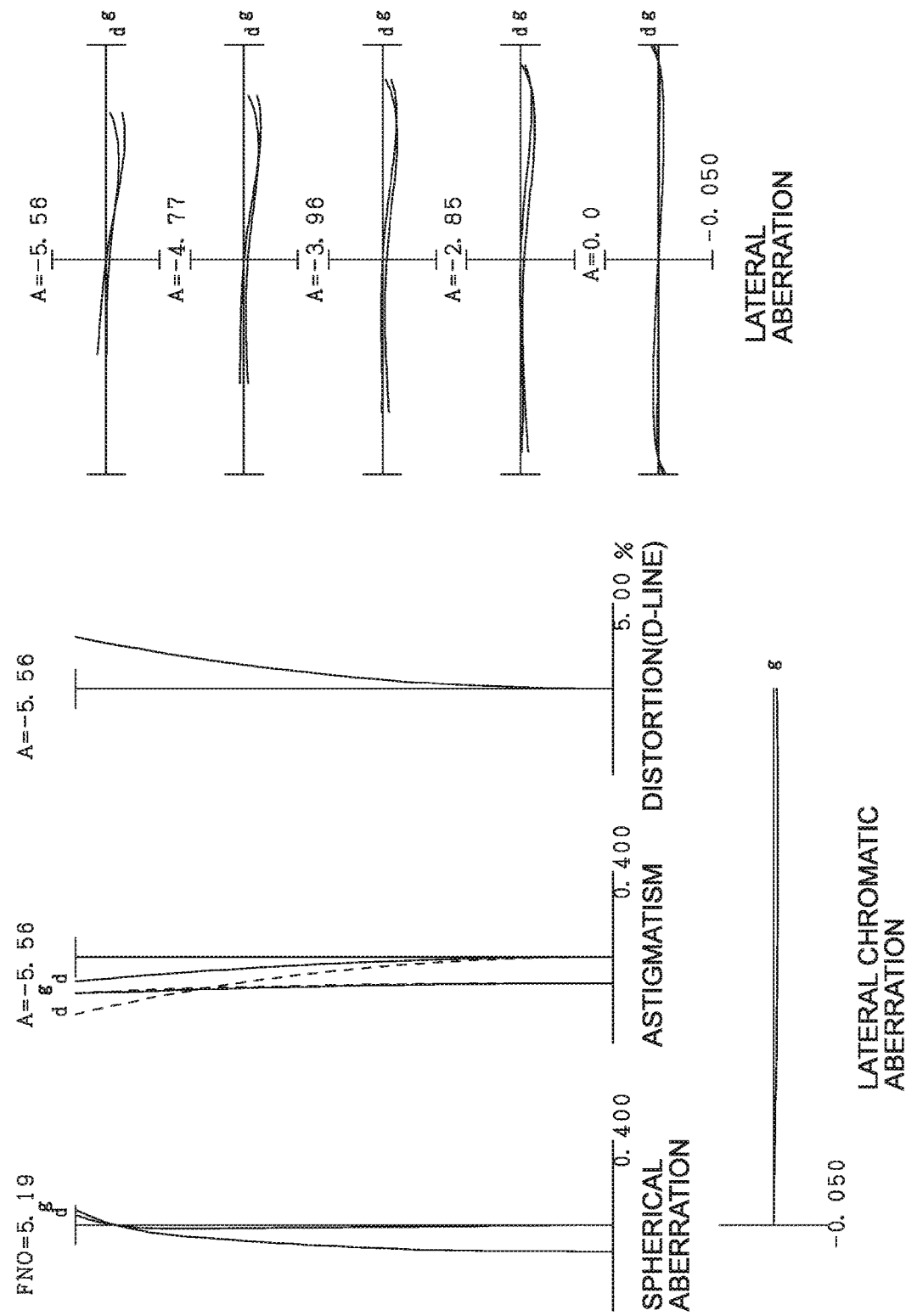

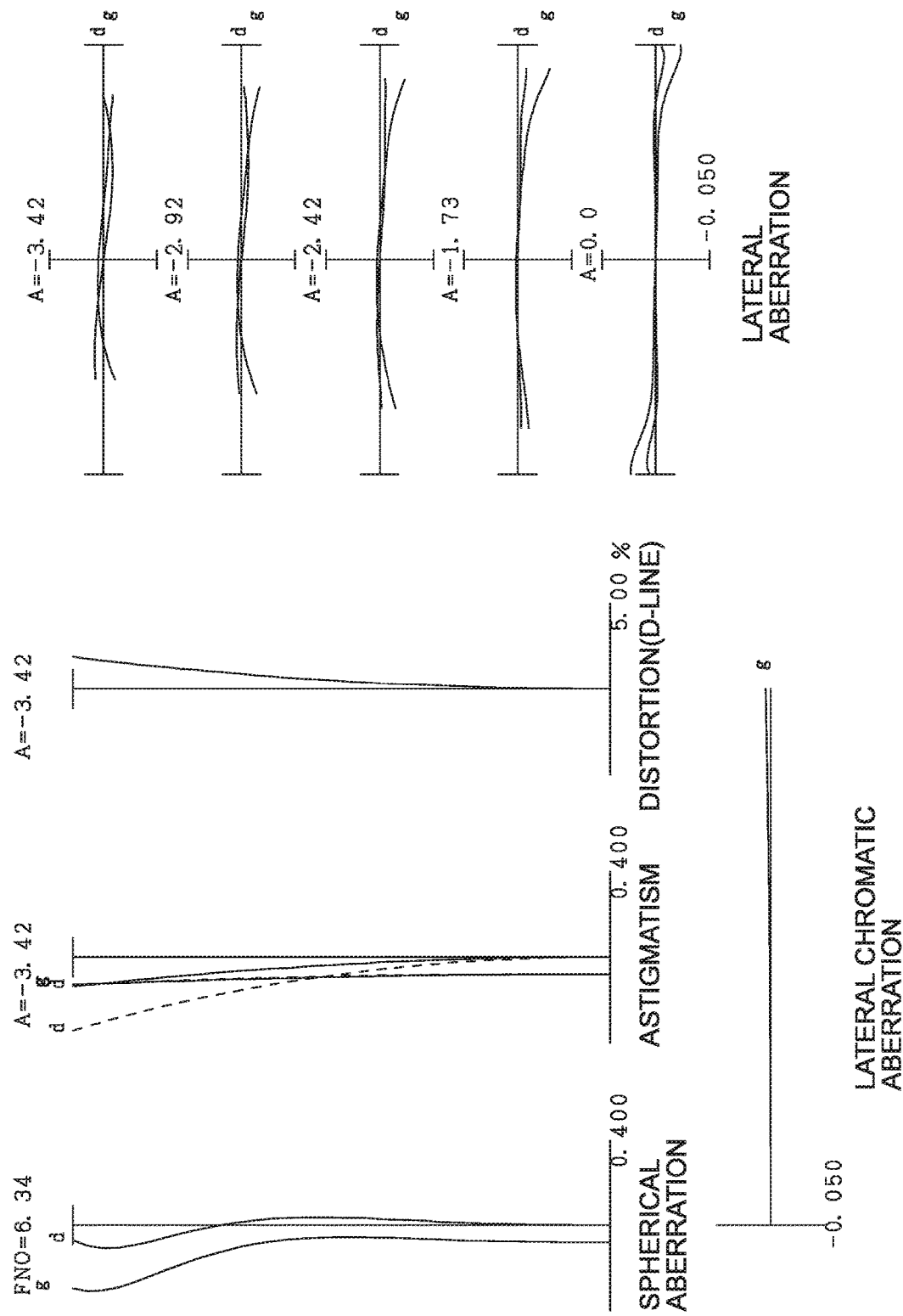

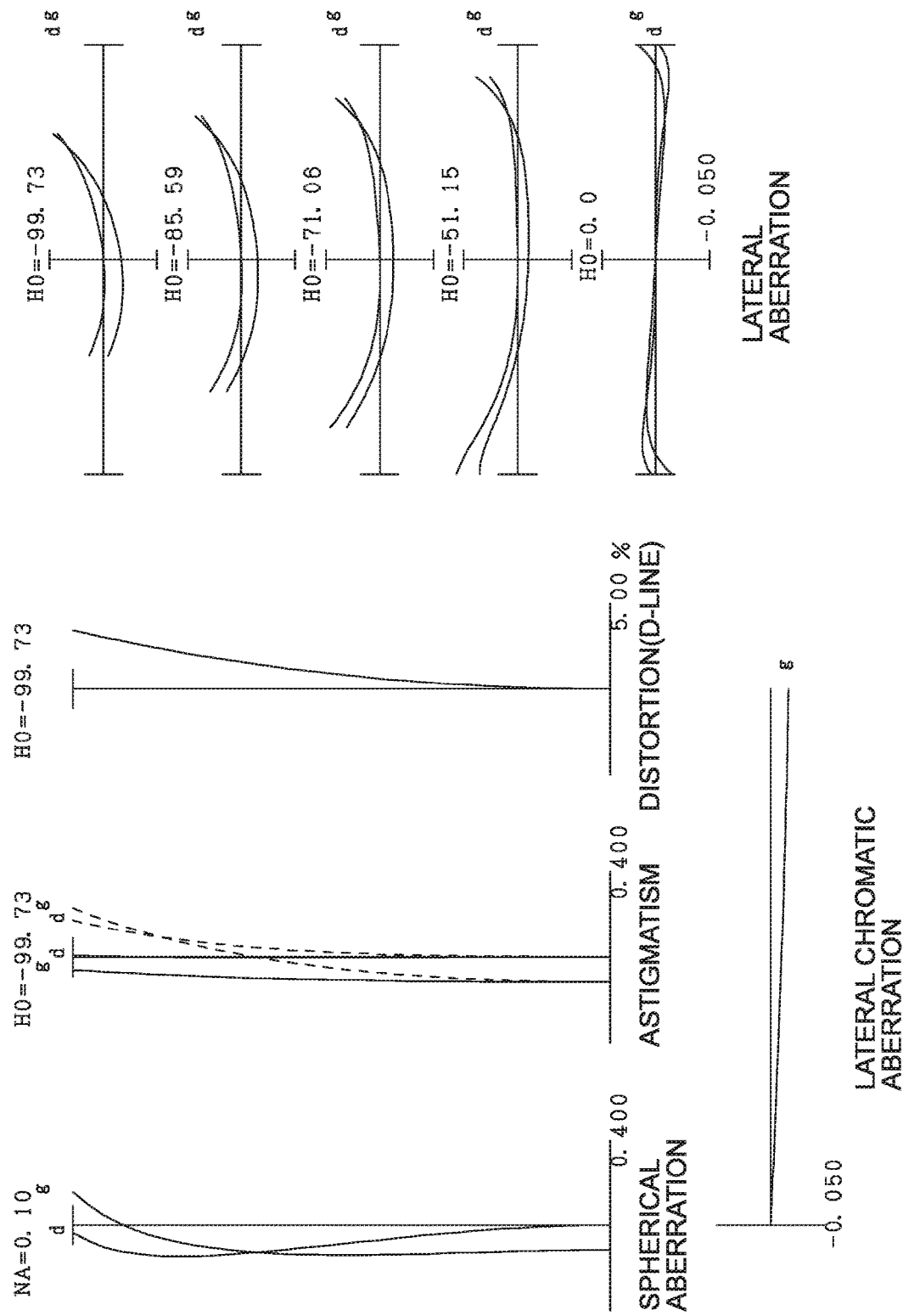

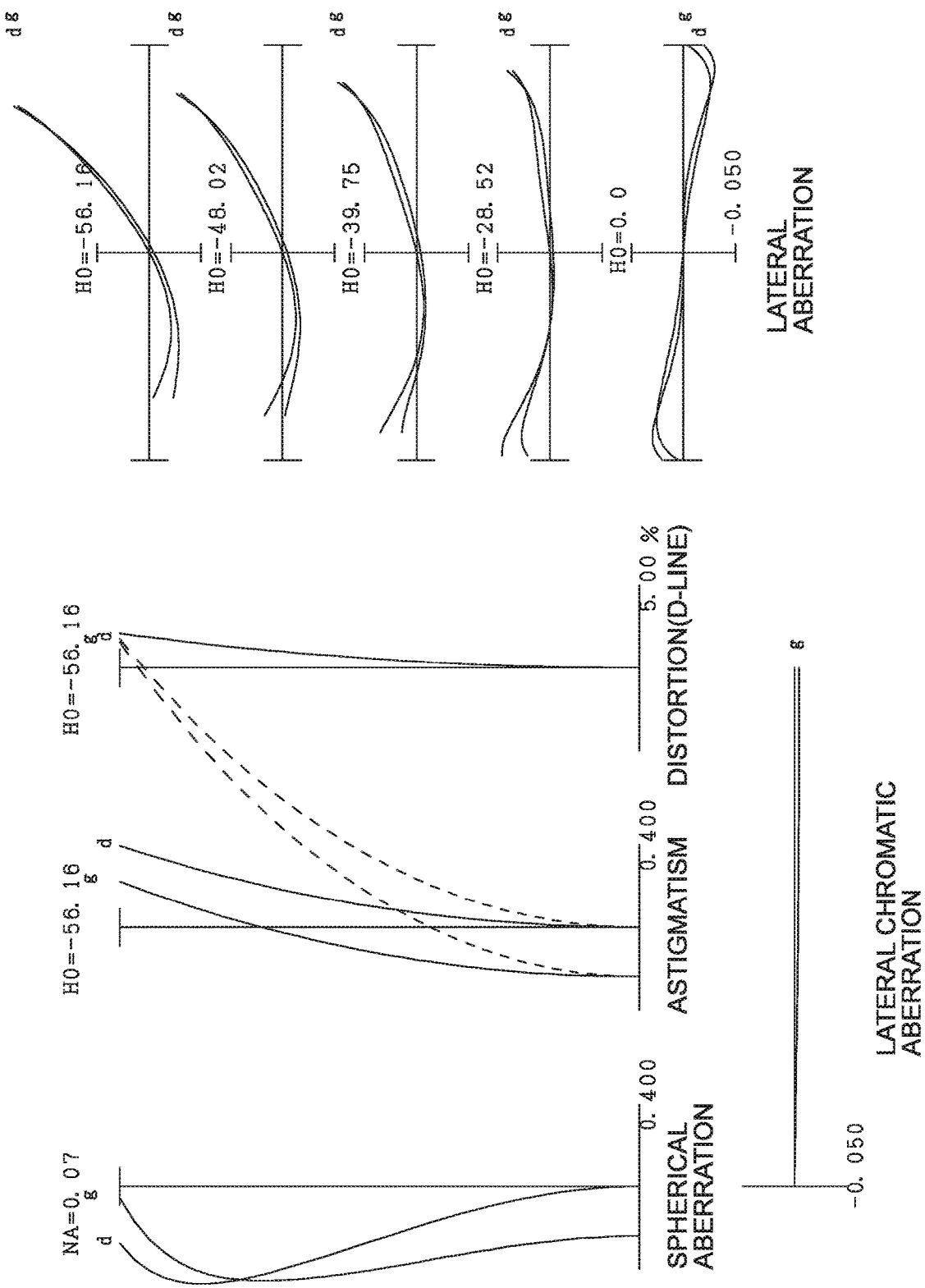

LATERAL ABERRATION

LATERAL ABERRATION

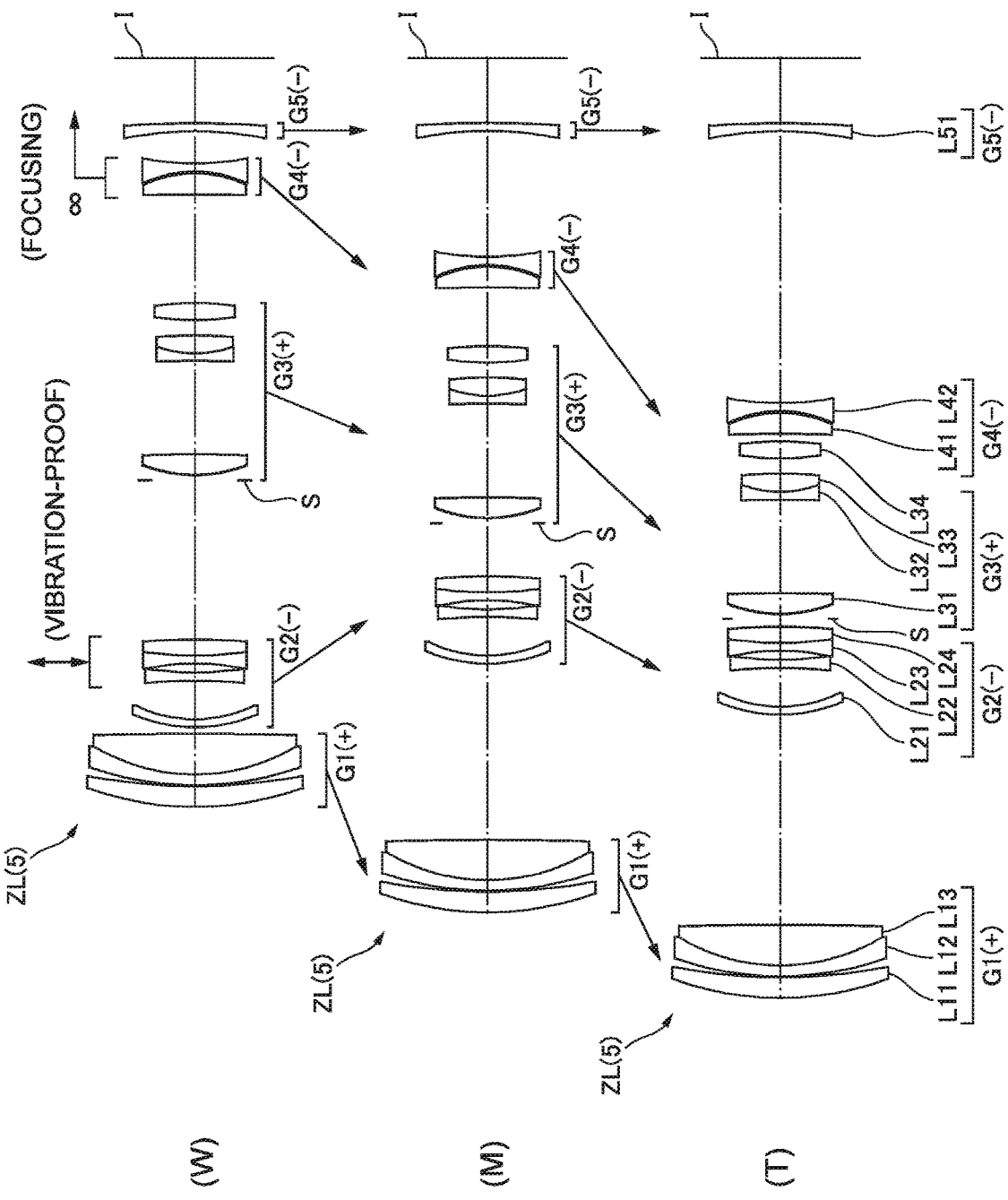

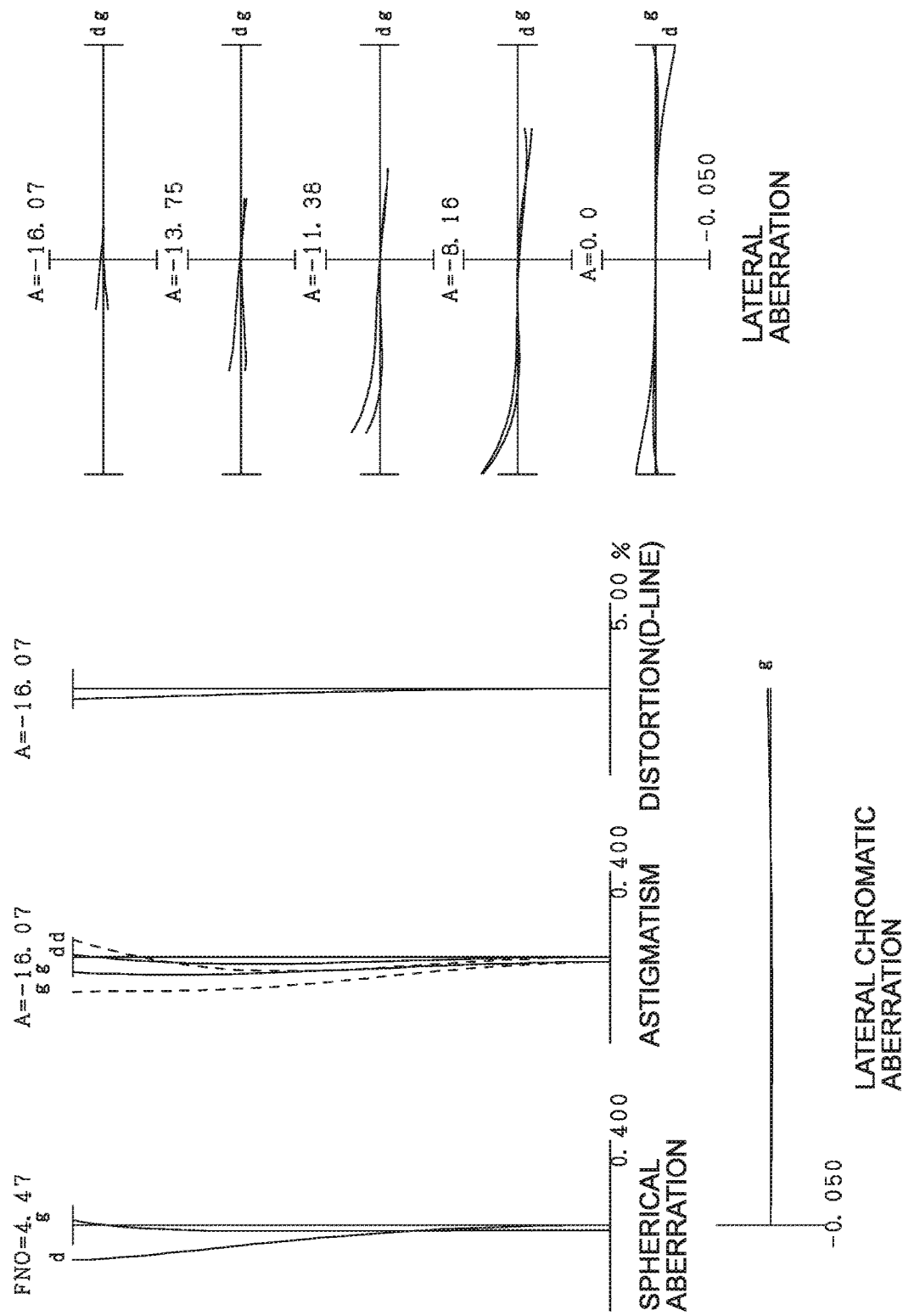

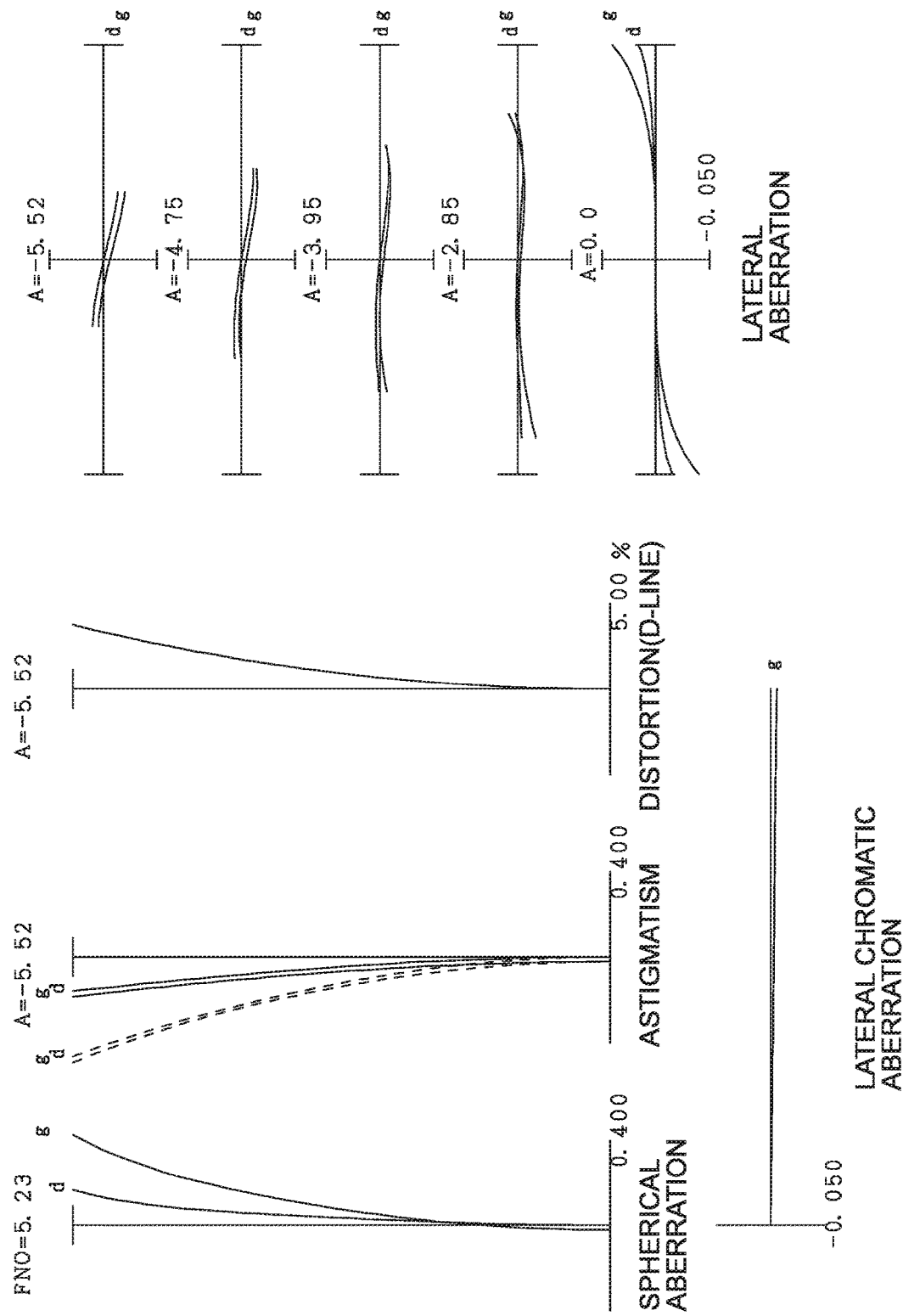

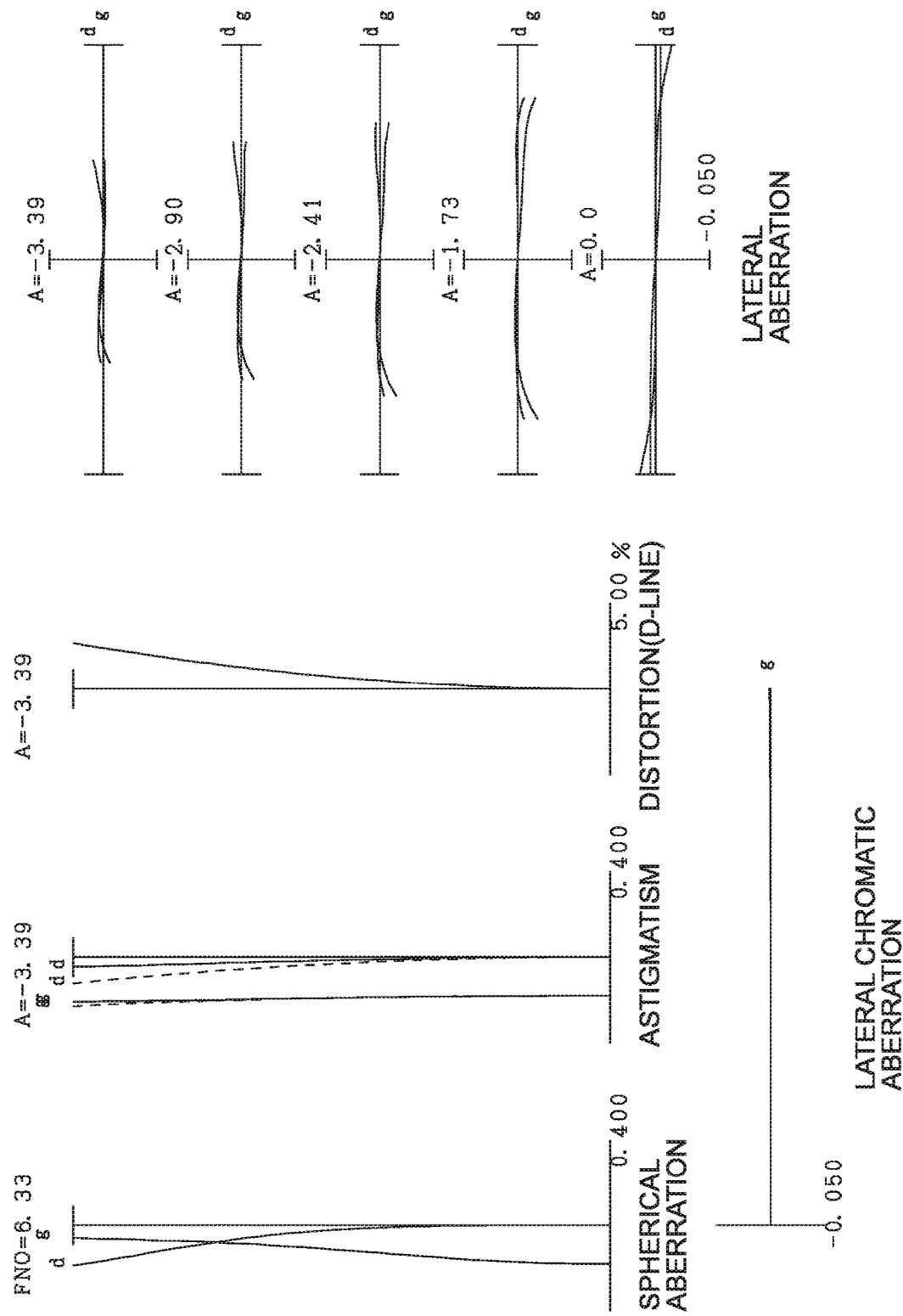

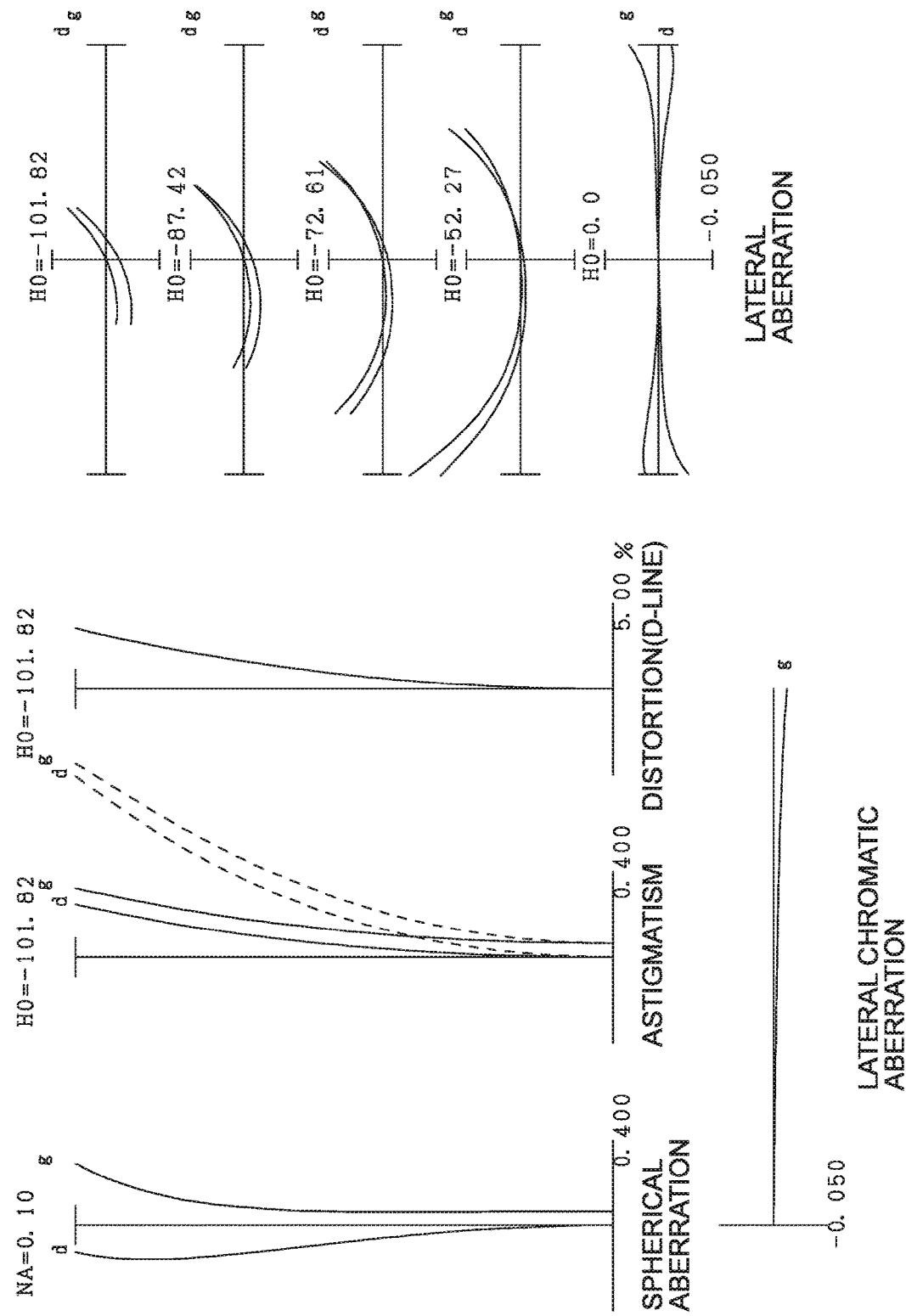

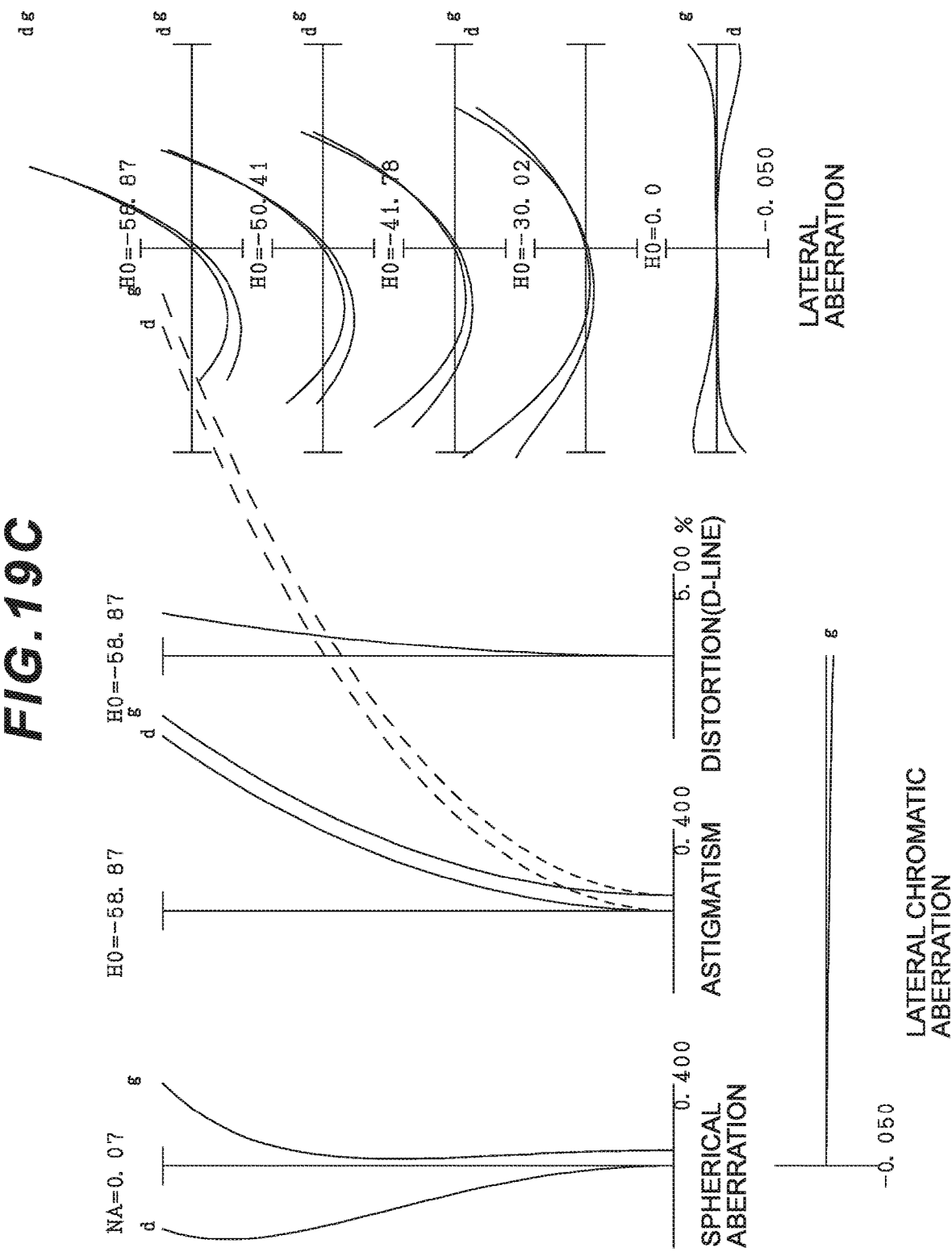

LATERAL ABERRATION

LATERAL ABERRATION

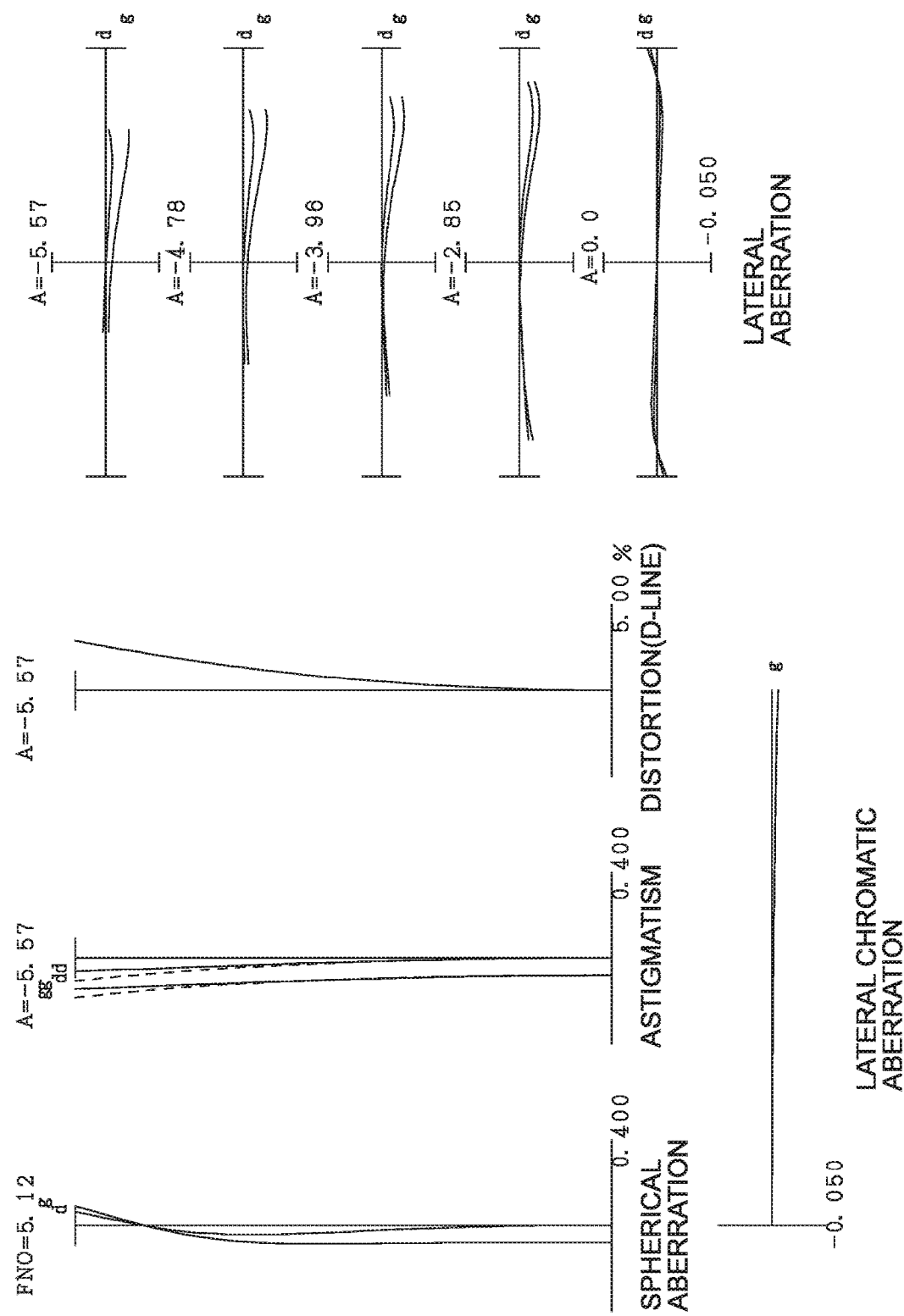

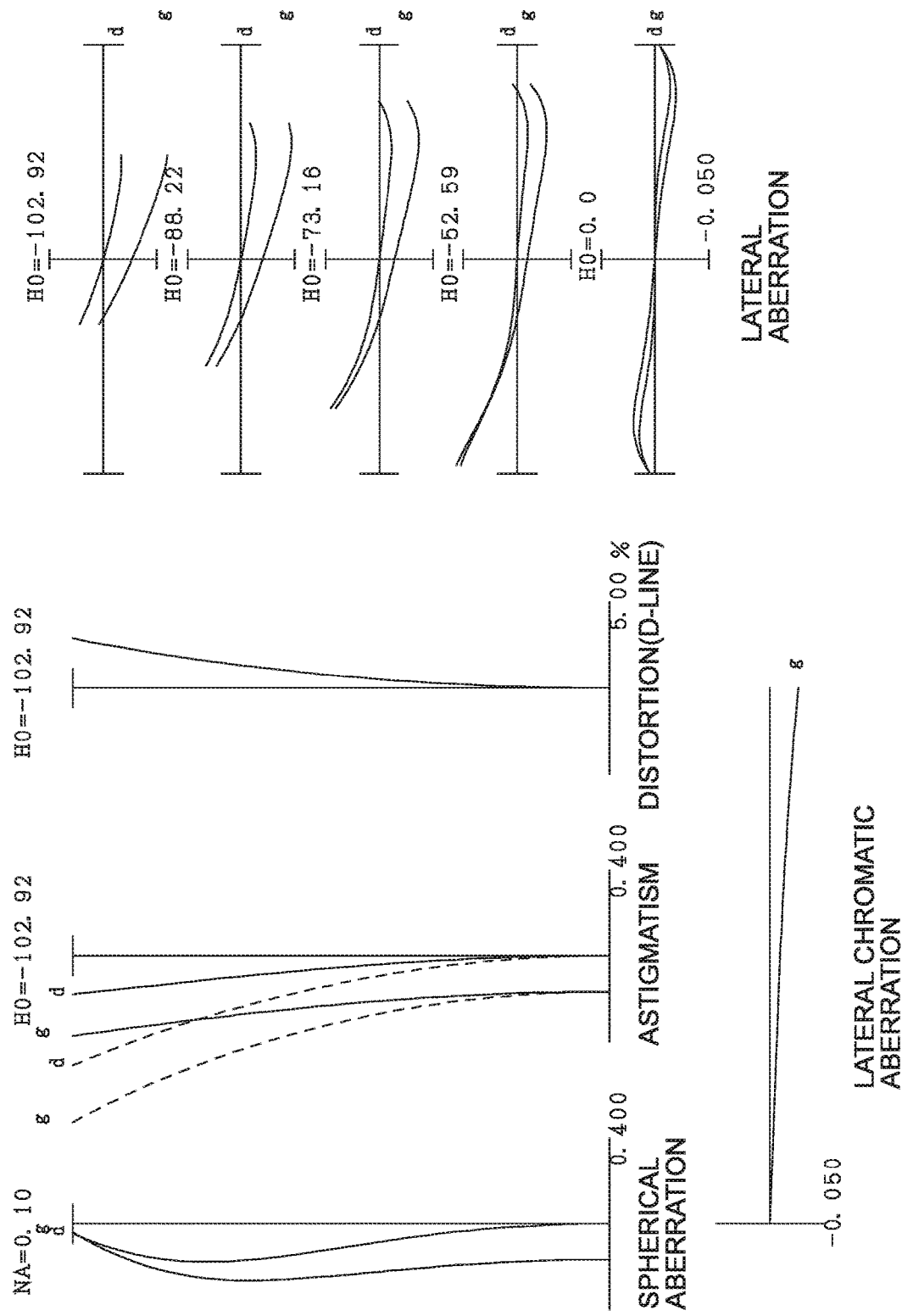

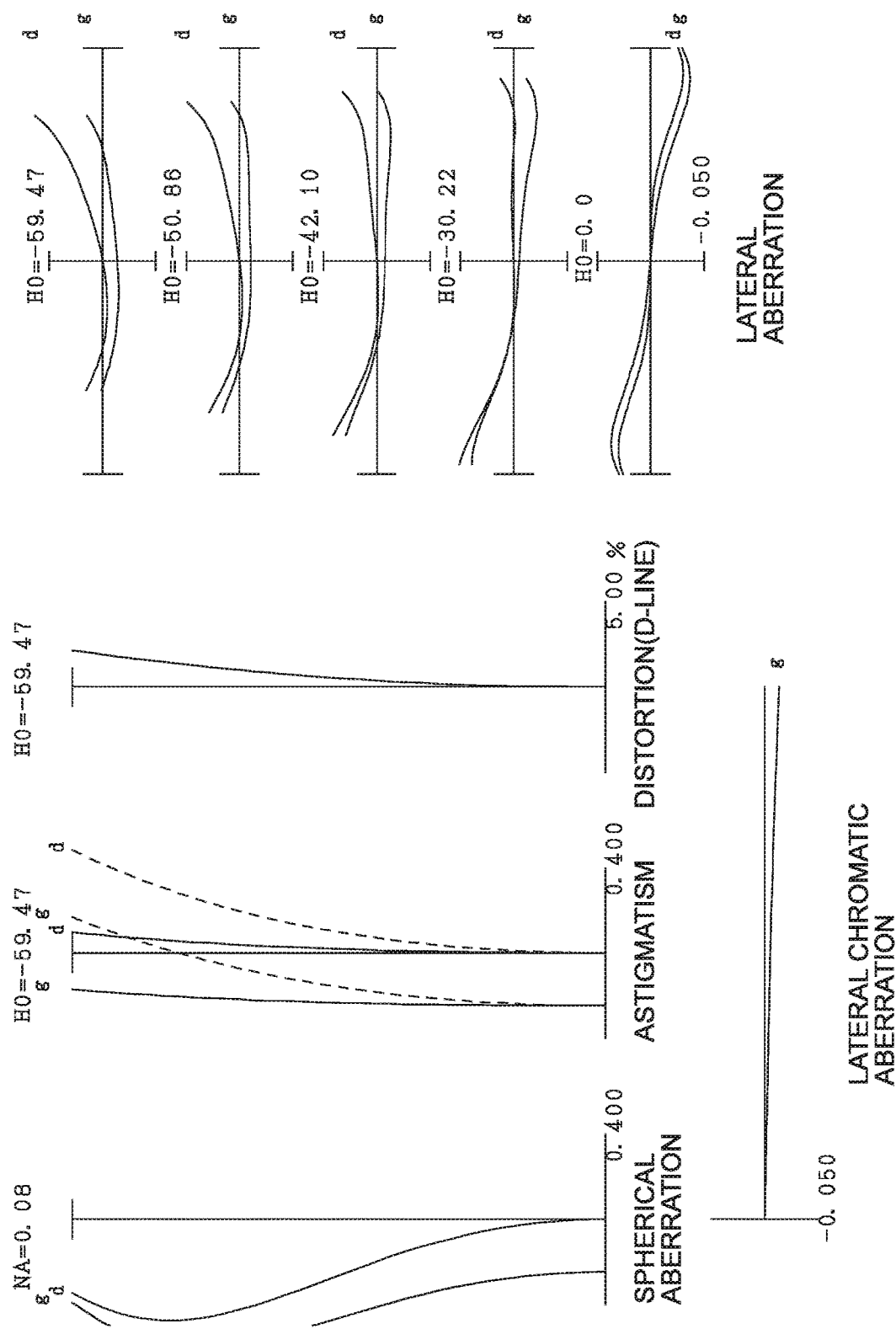

LATERAL ABERRATION

LATERAL ABERRATION

LATERAL ABERRATION

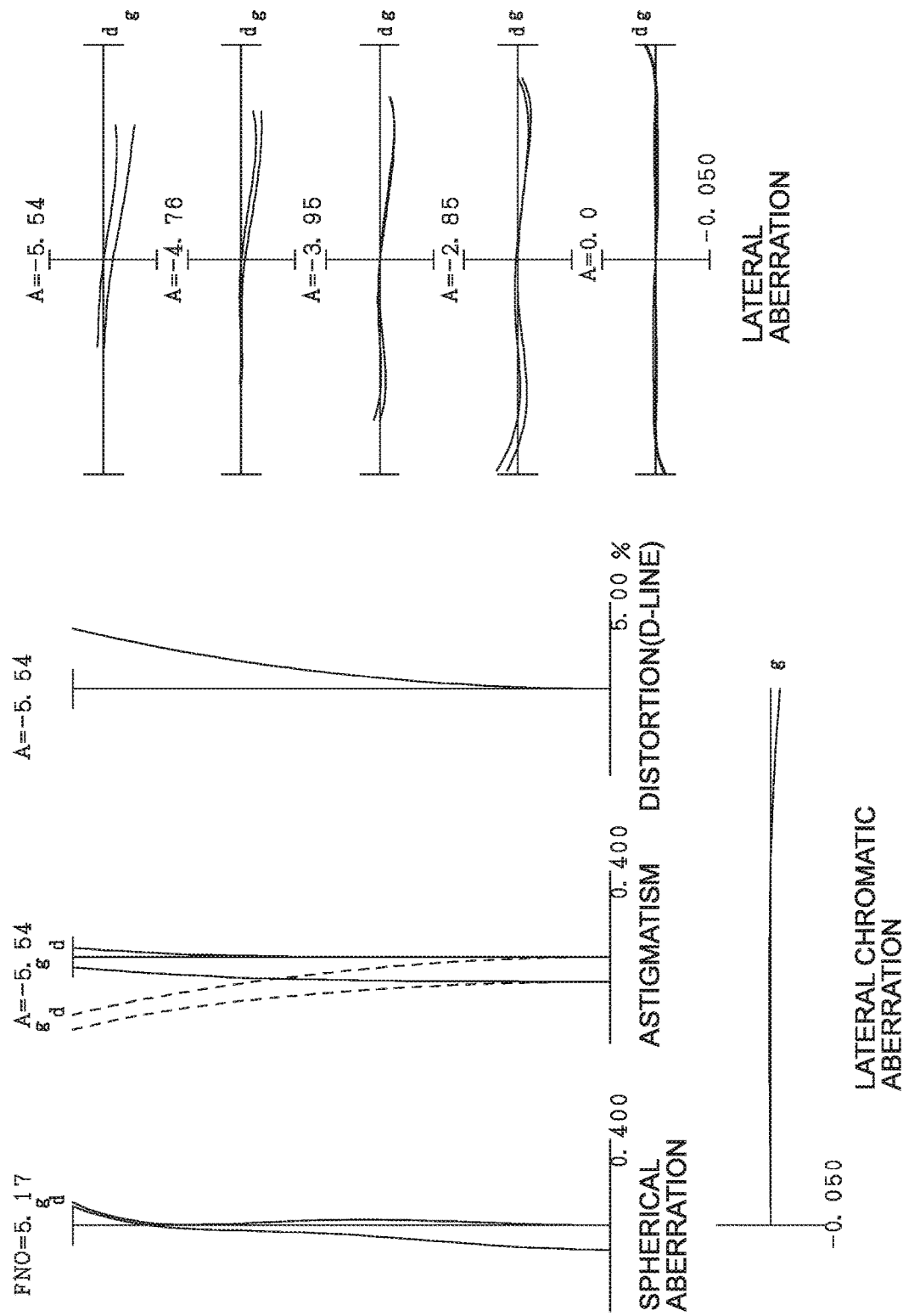

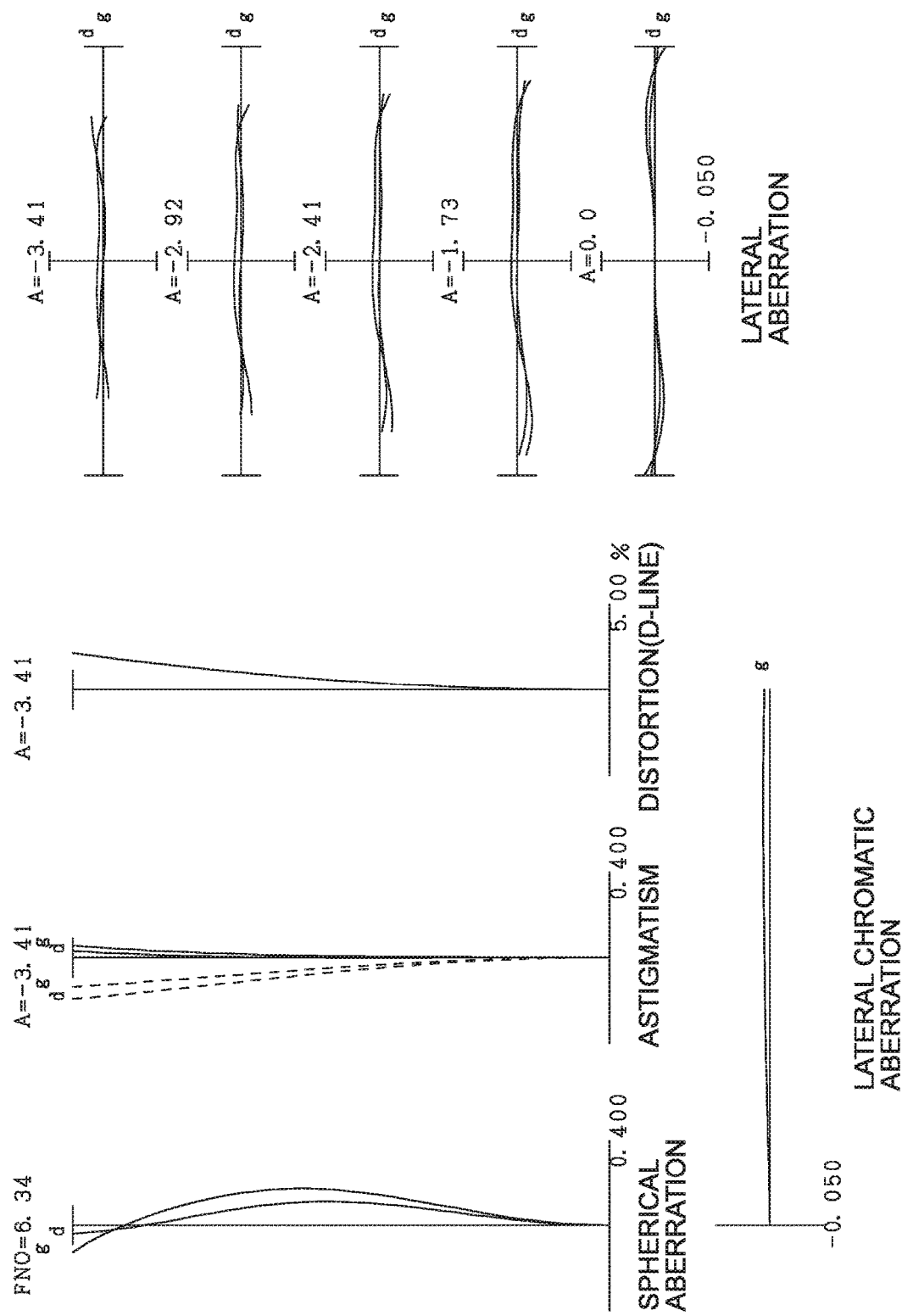

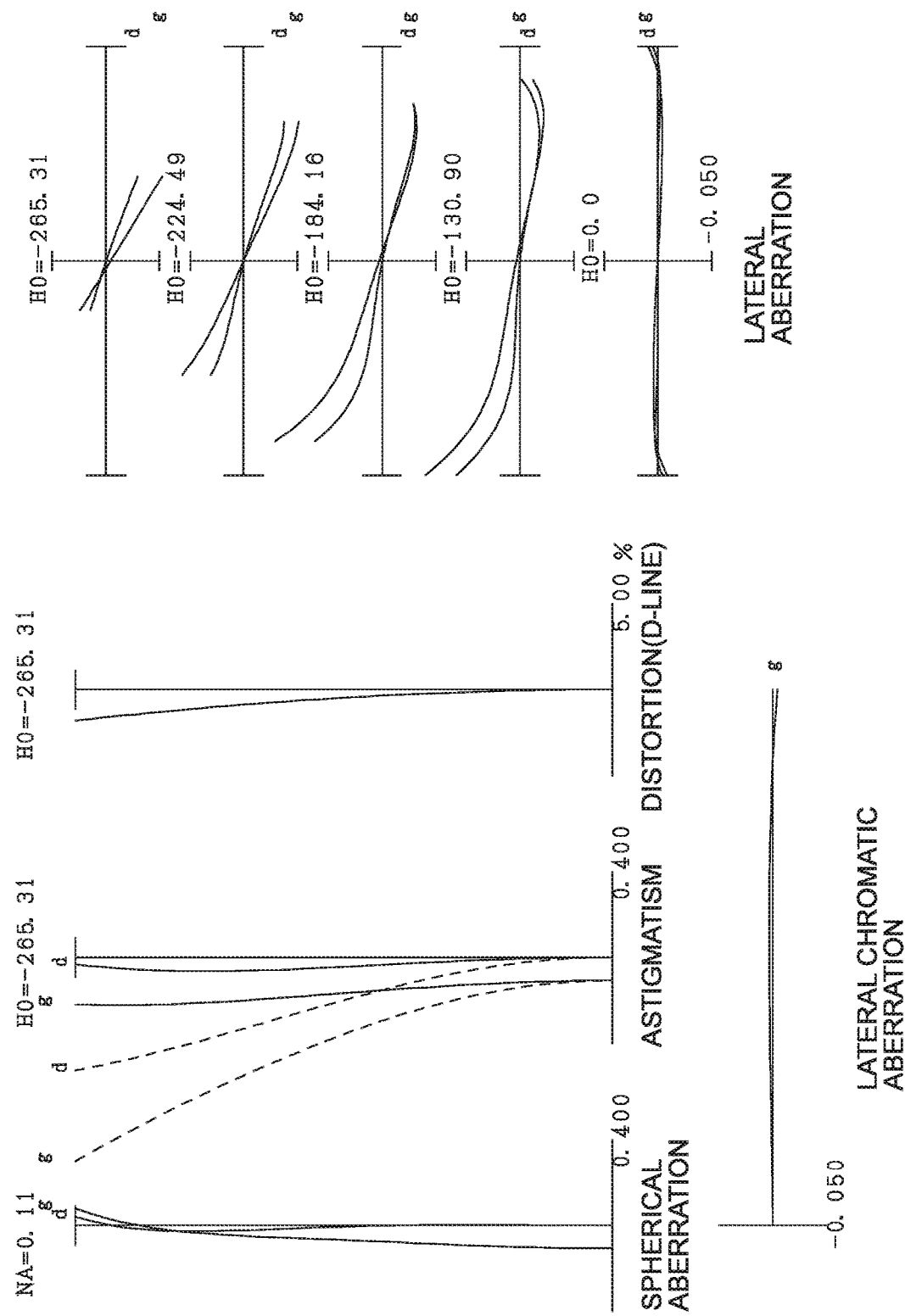

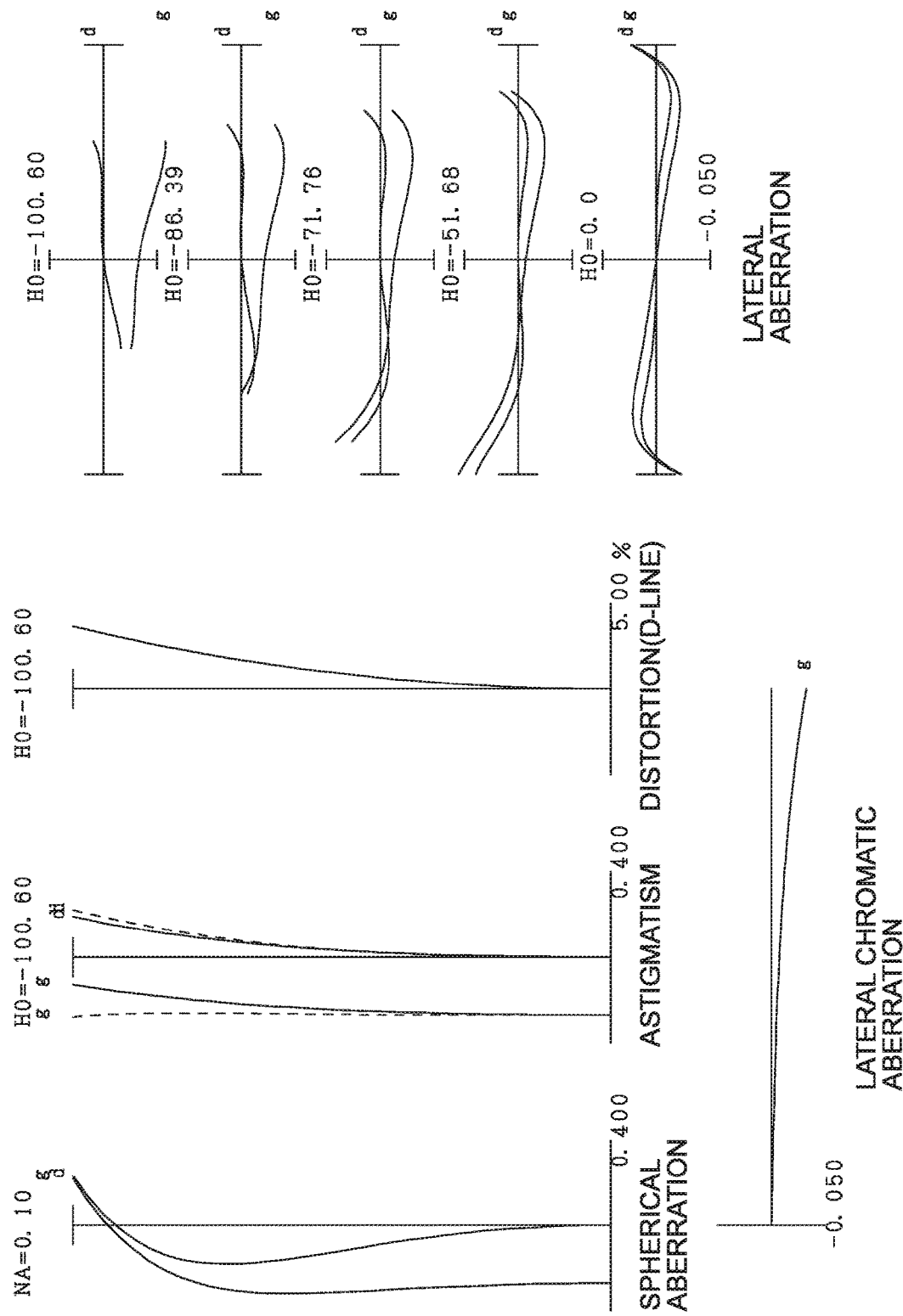

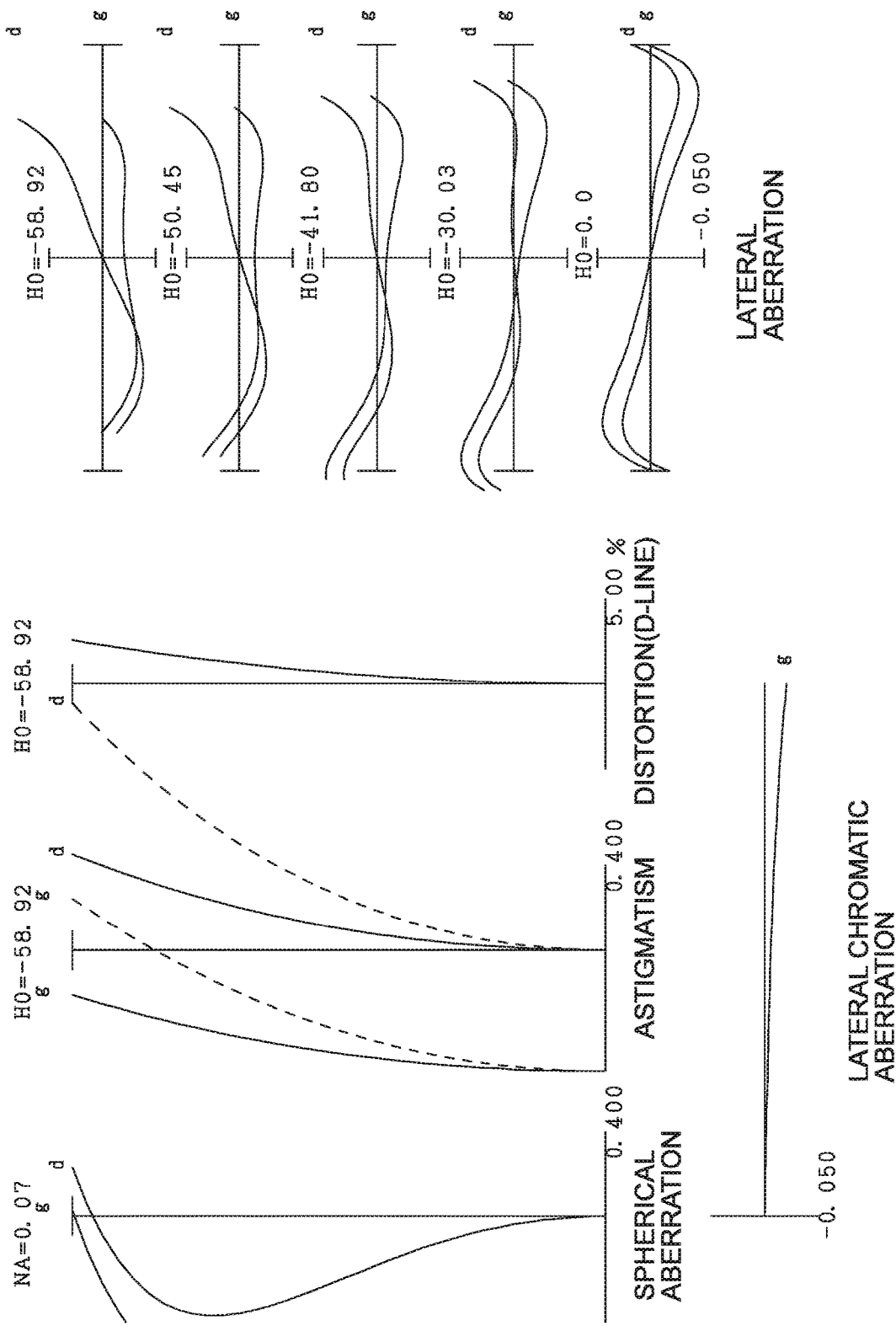

LATERAL ABERRATION

LATERAL
ABERRATION

LATERAL ABERRATION

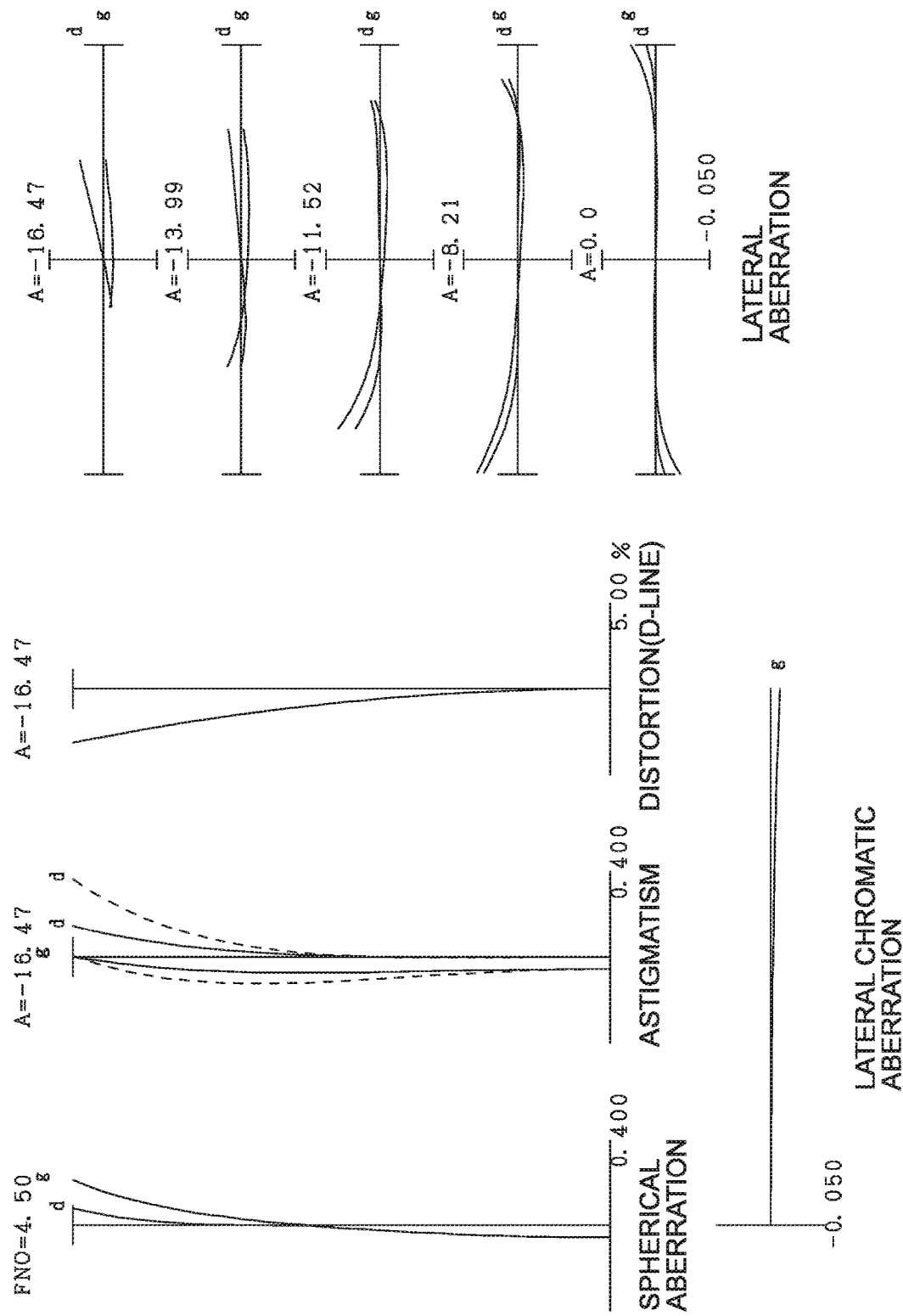

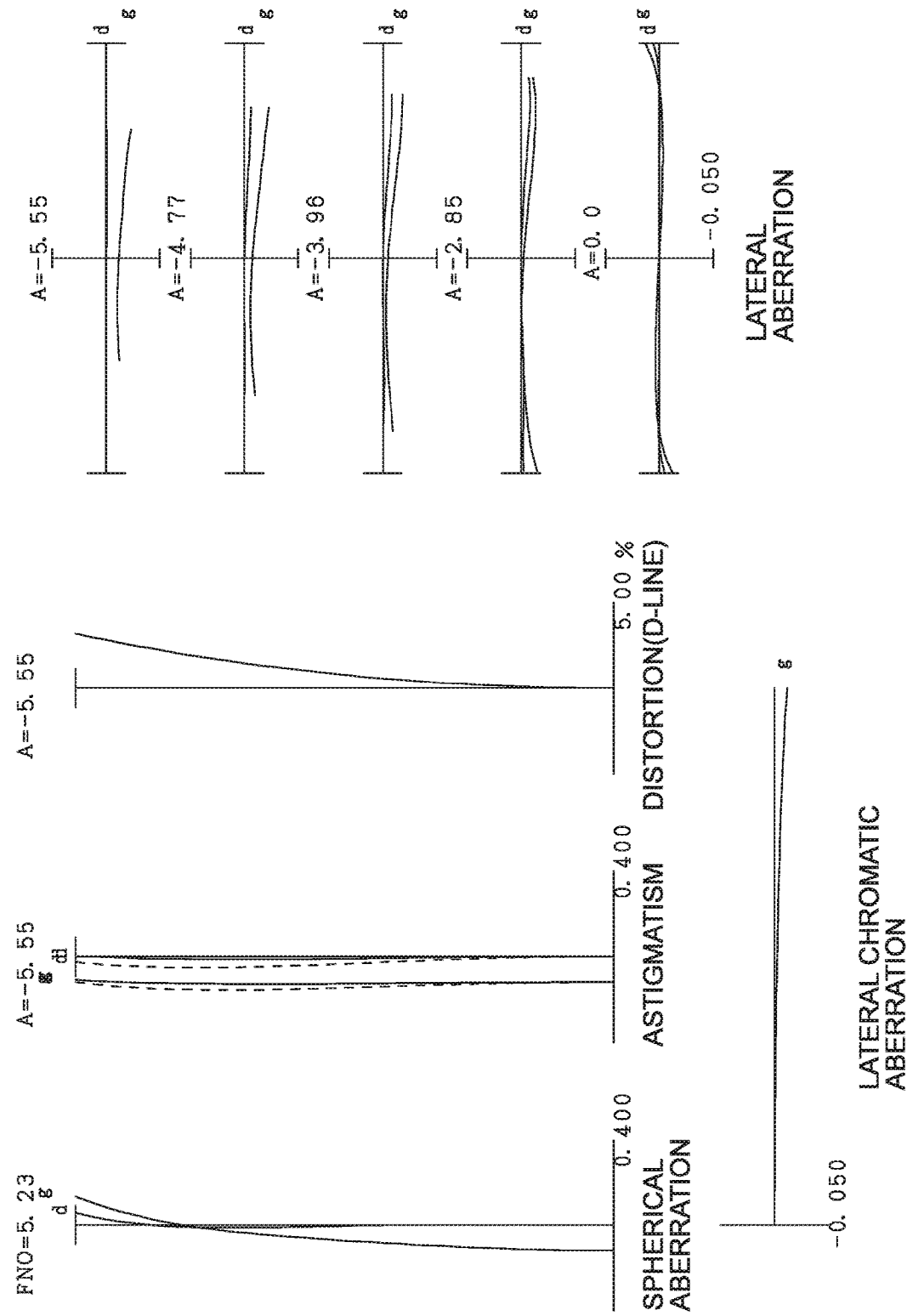

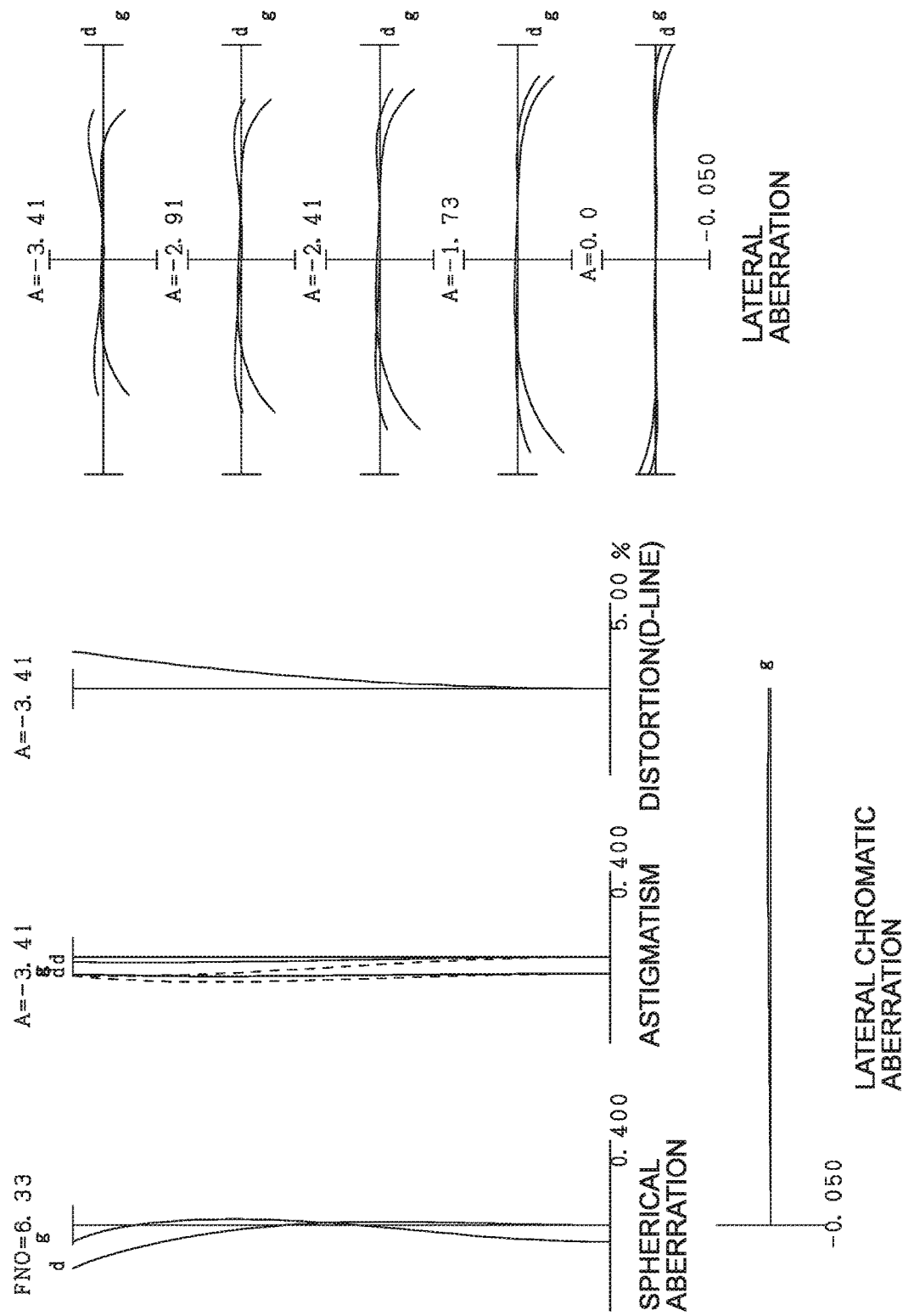

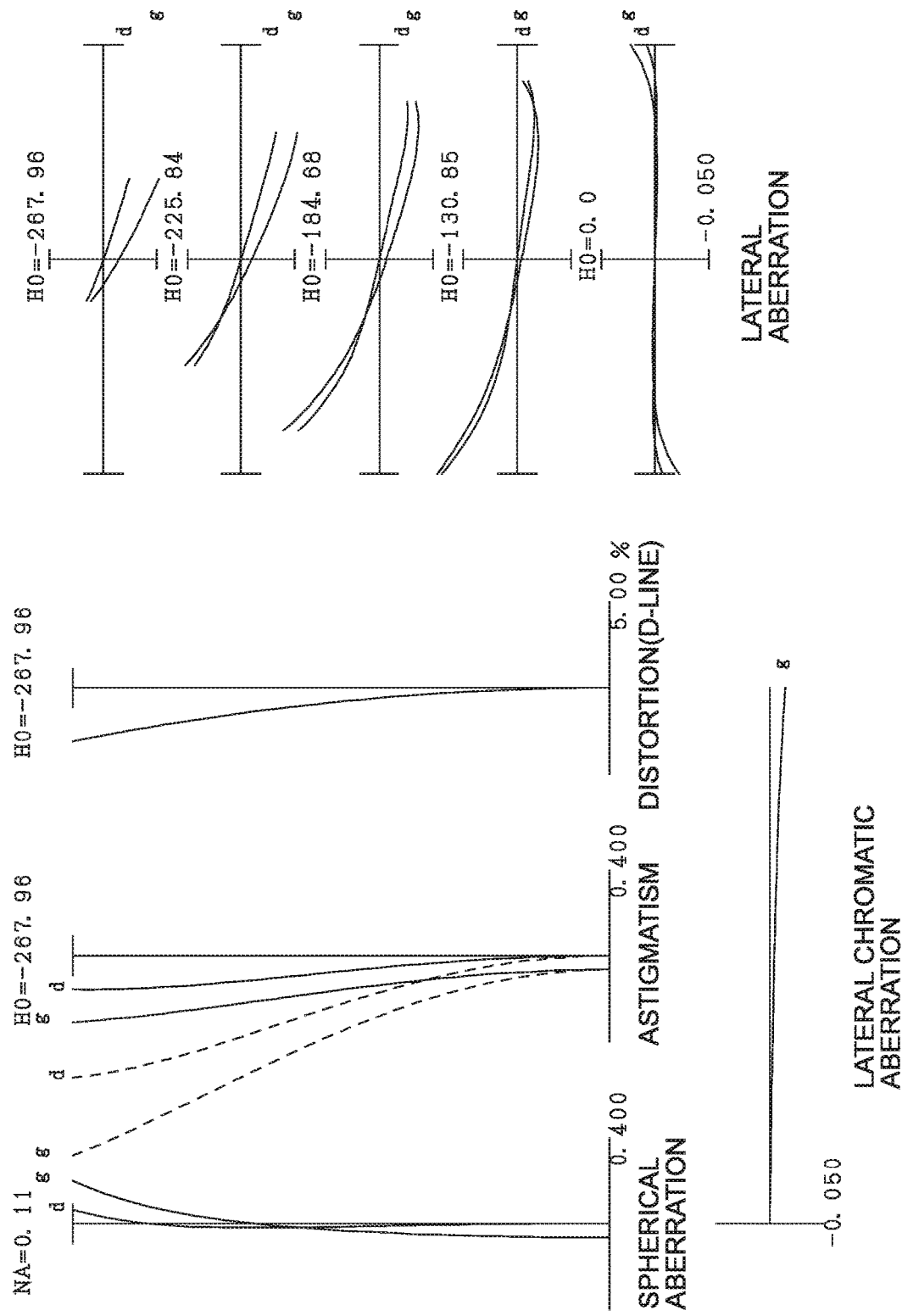

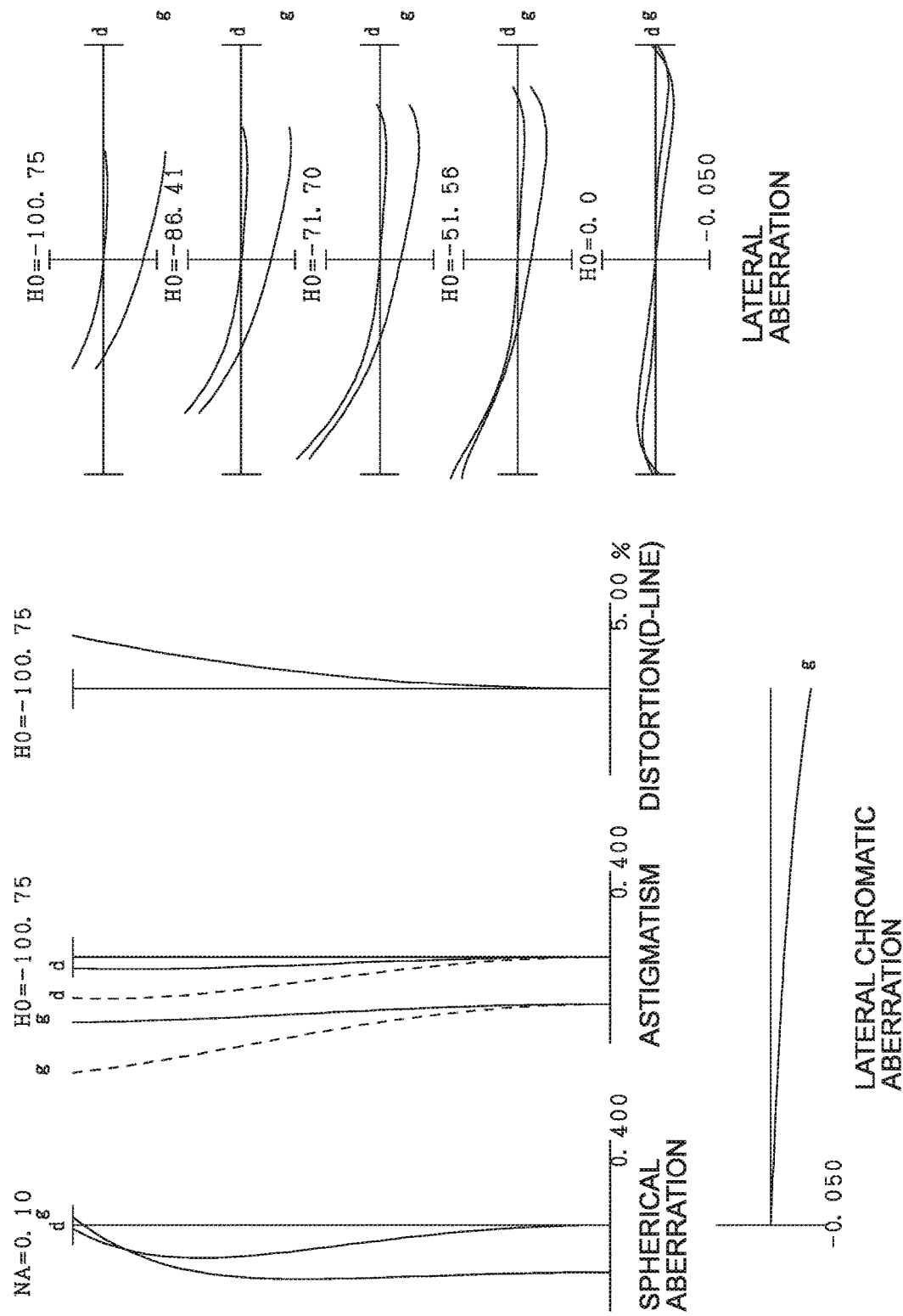

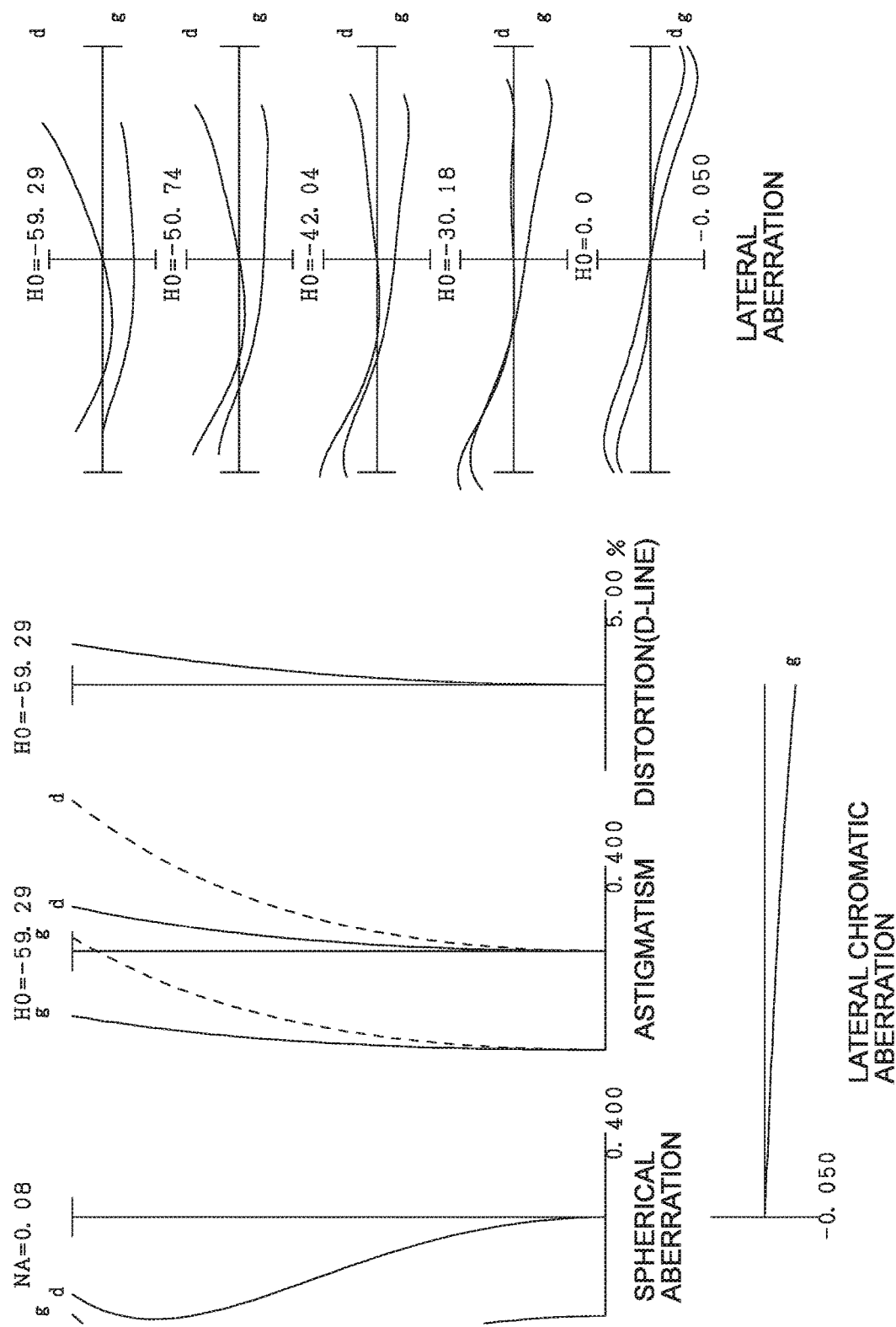

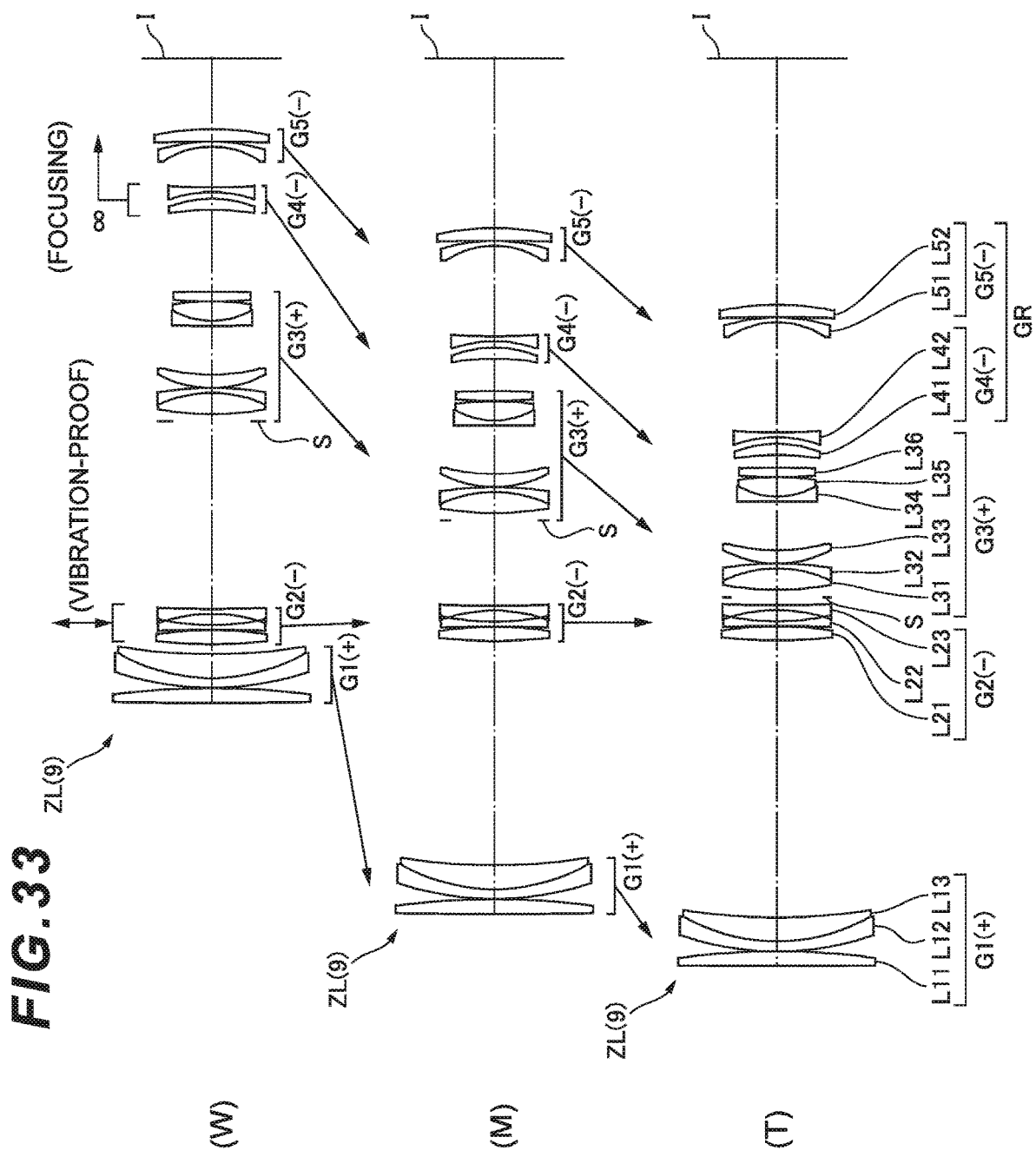

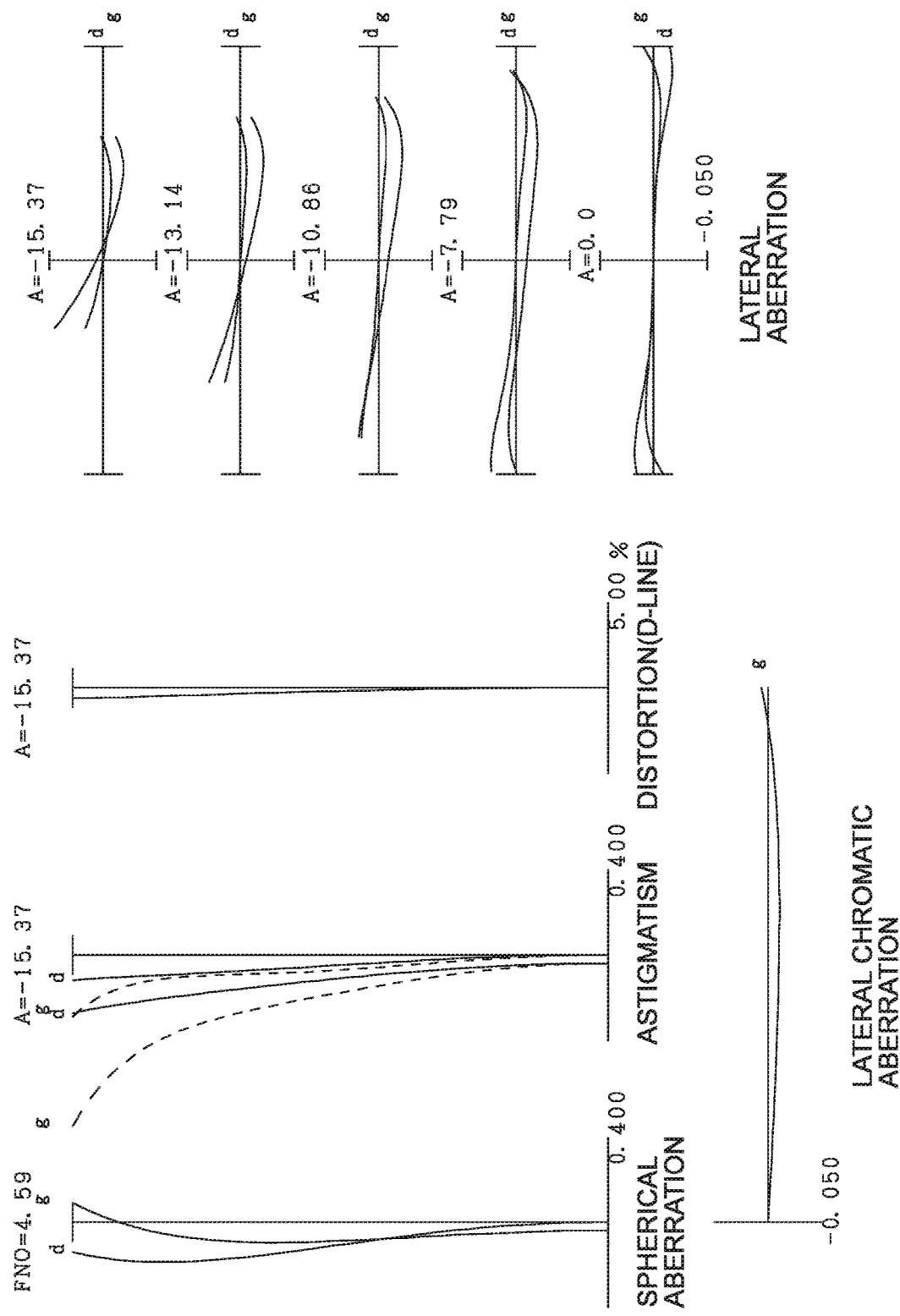

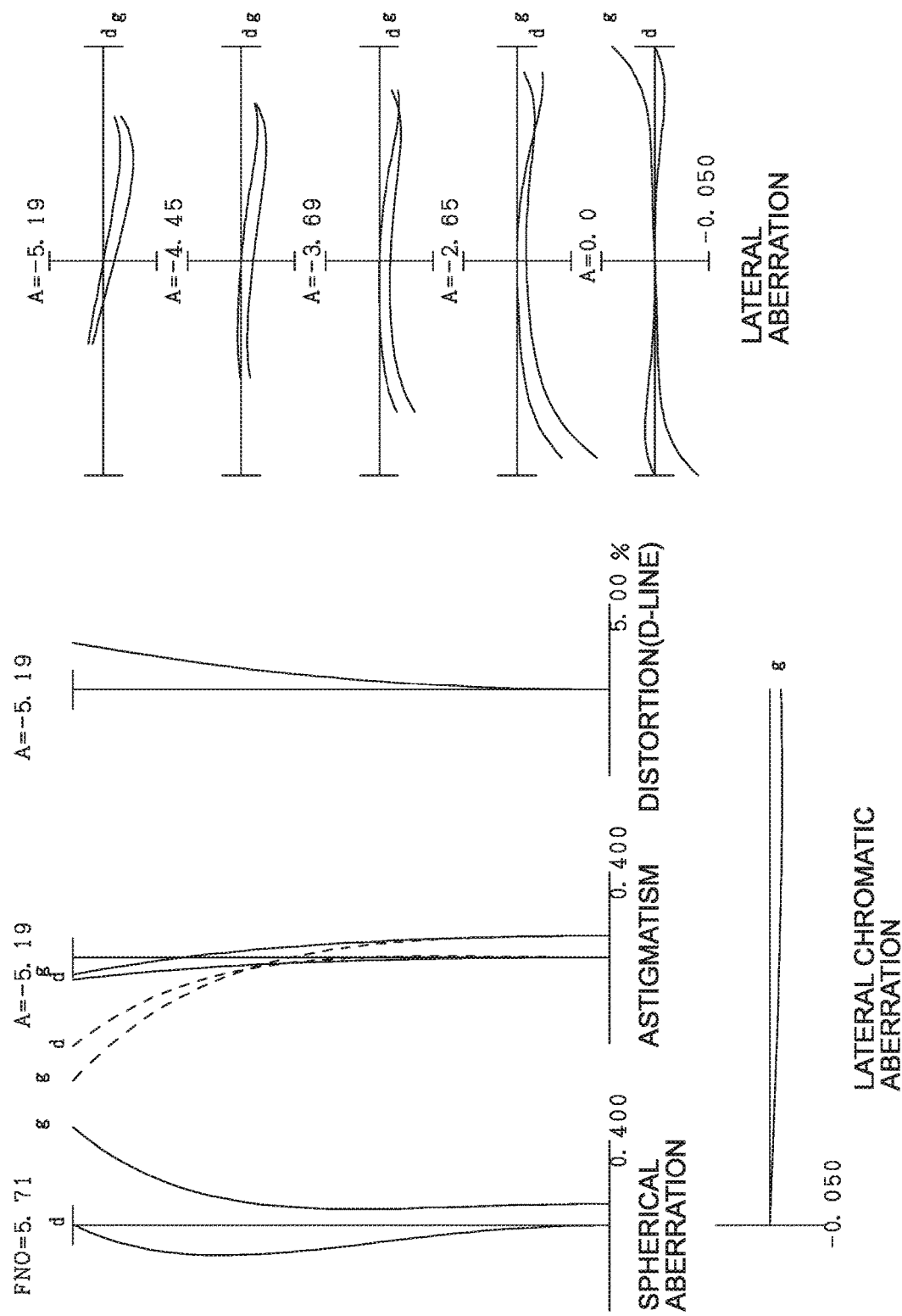

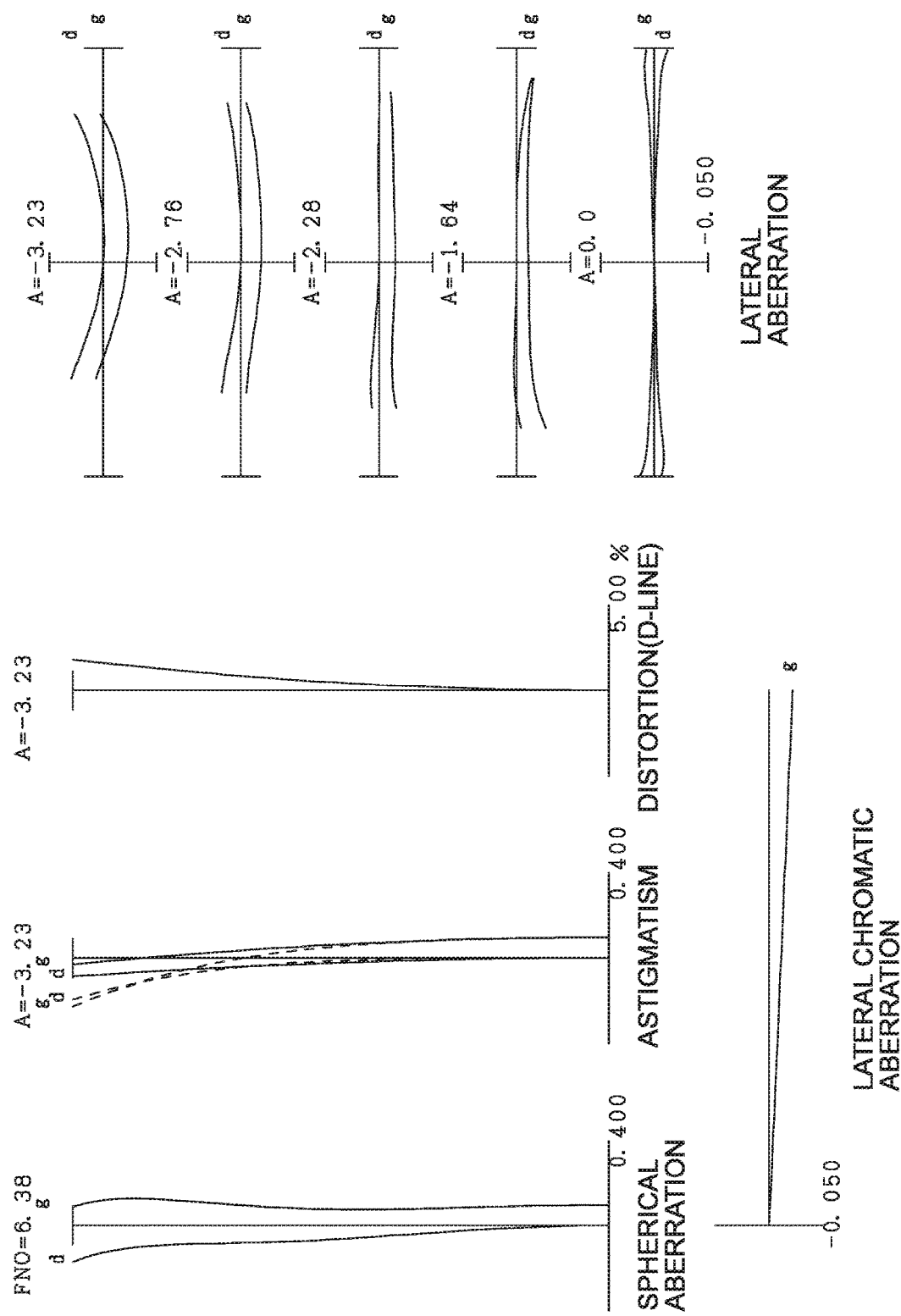

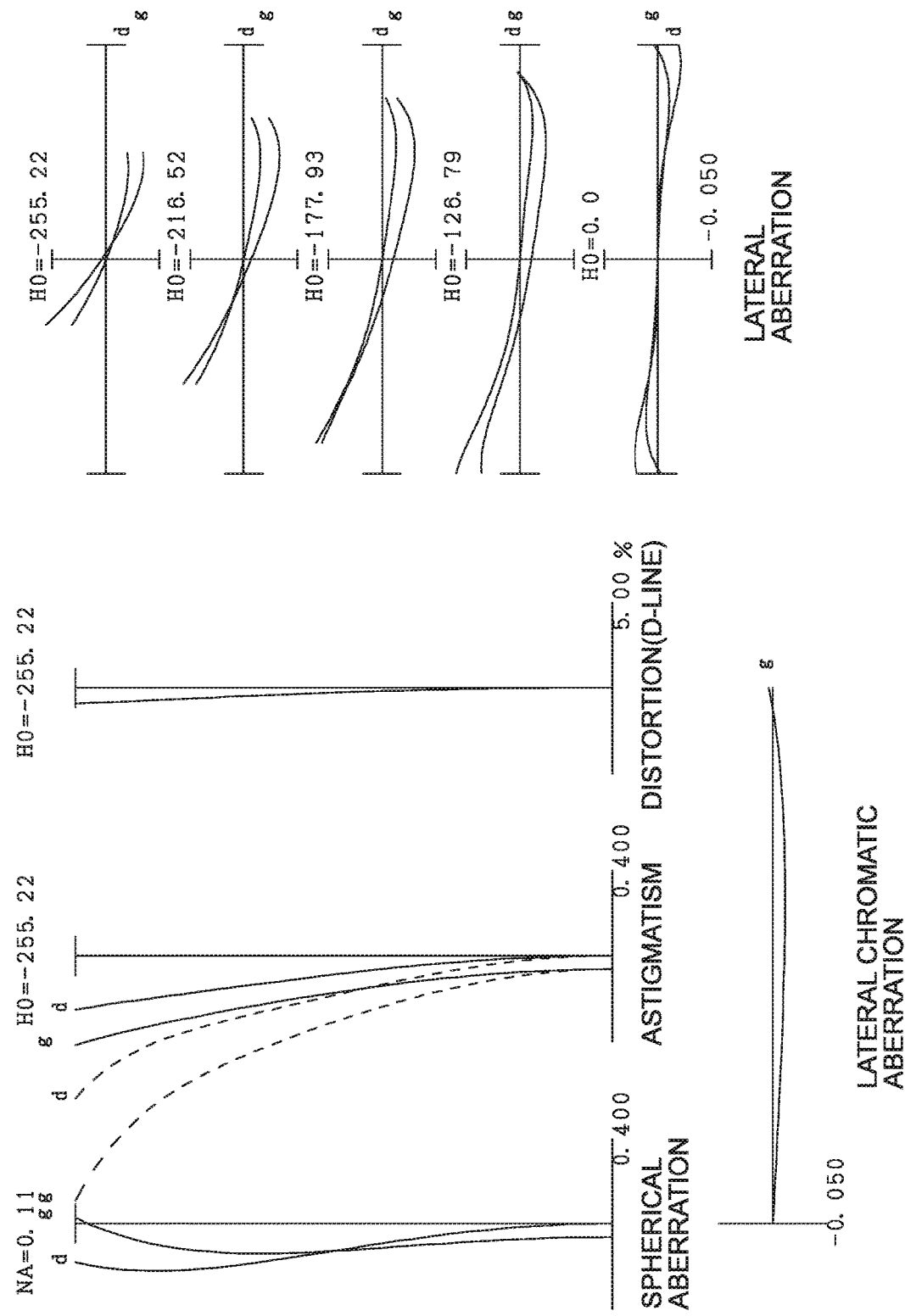

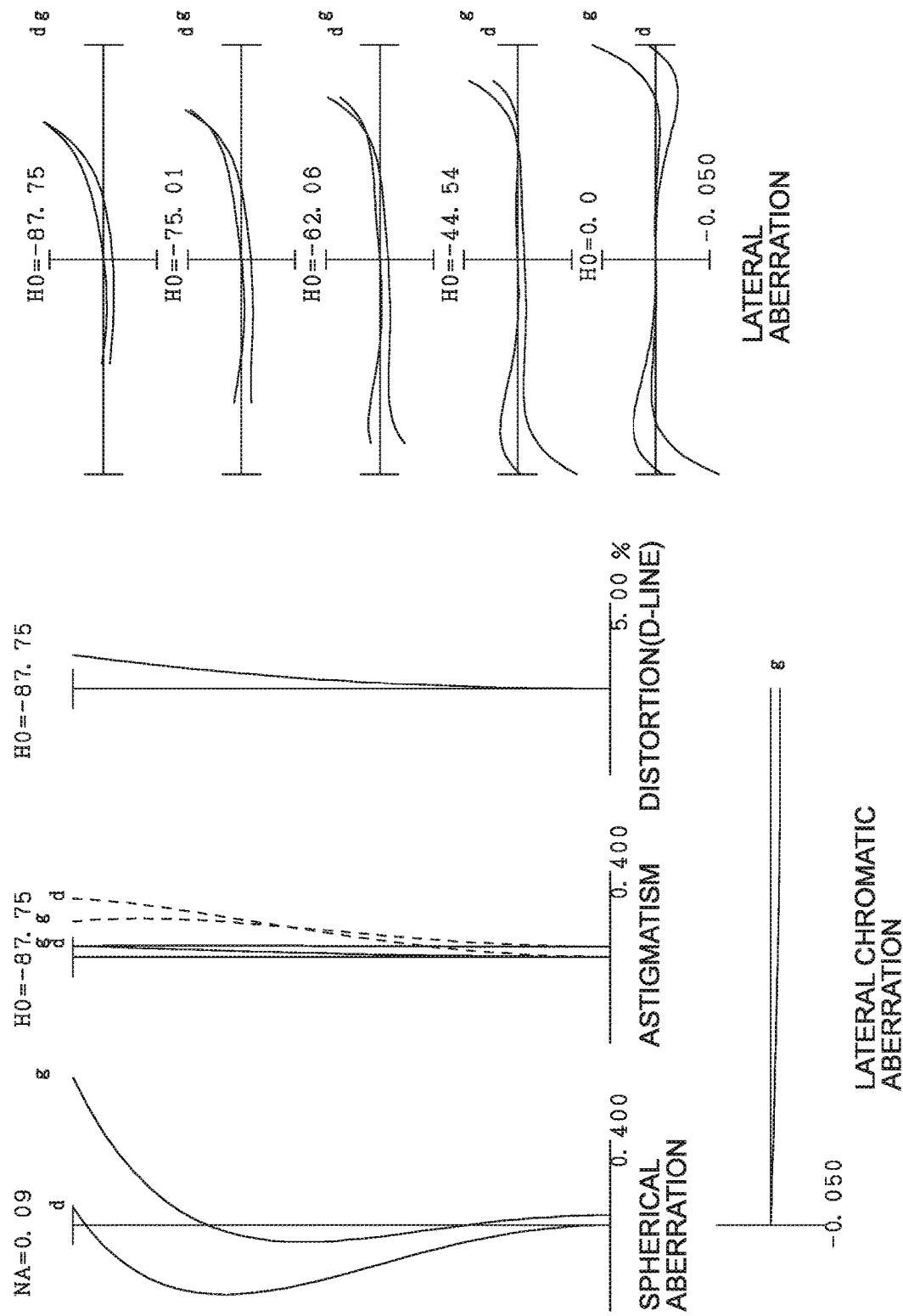

LATERAL ABERRATION

LATERAL ABERRATION

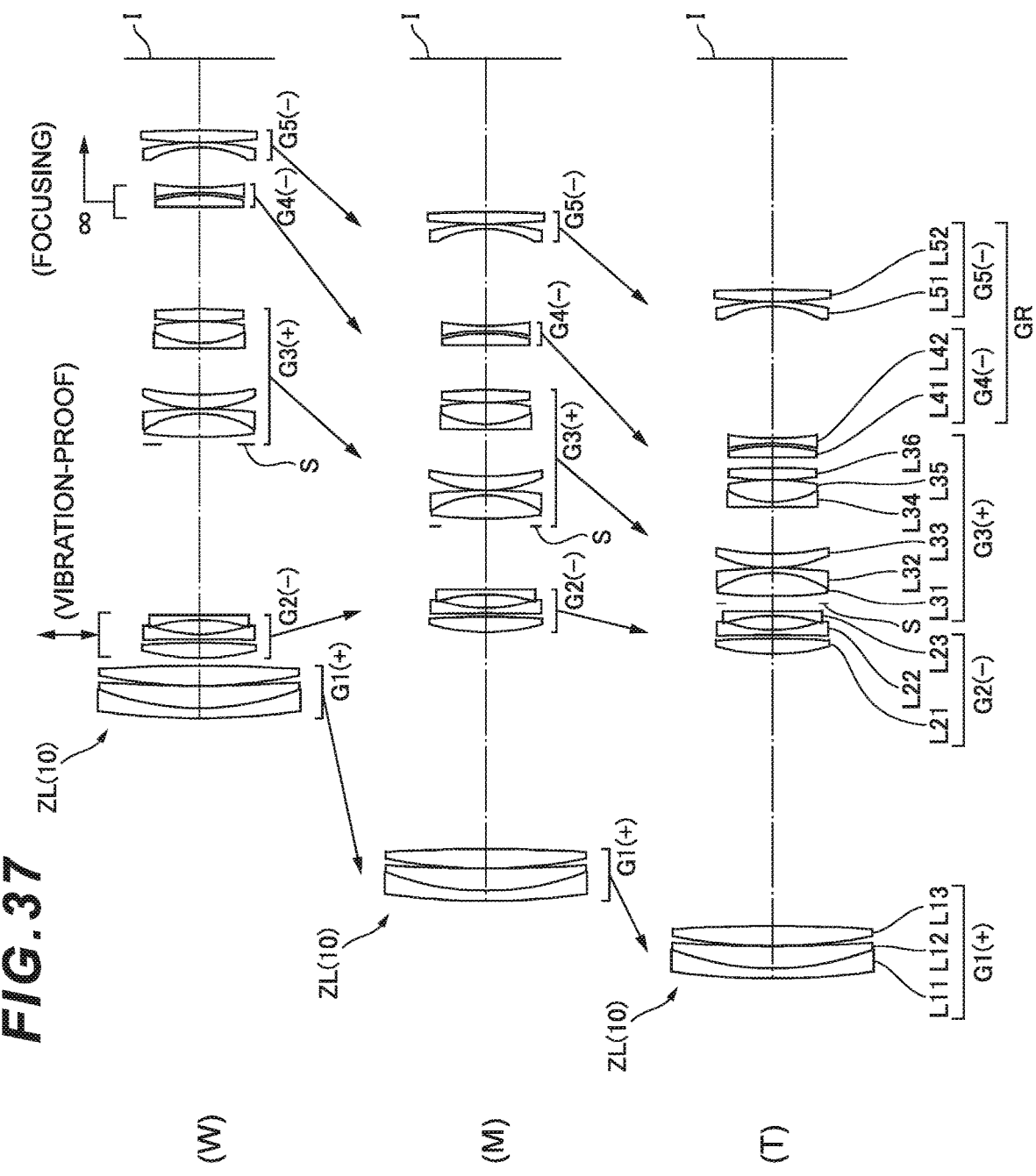

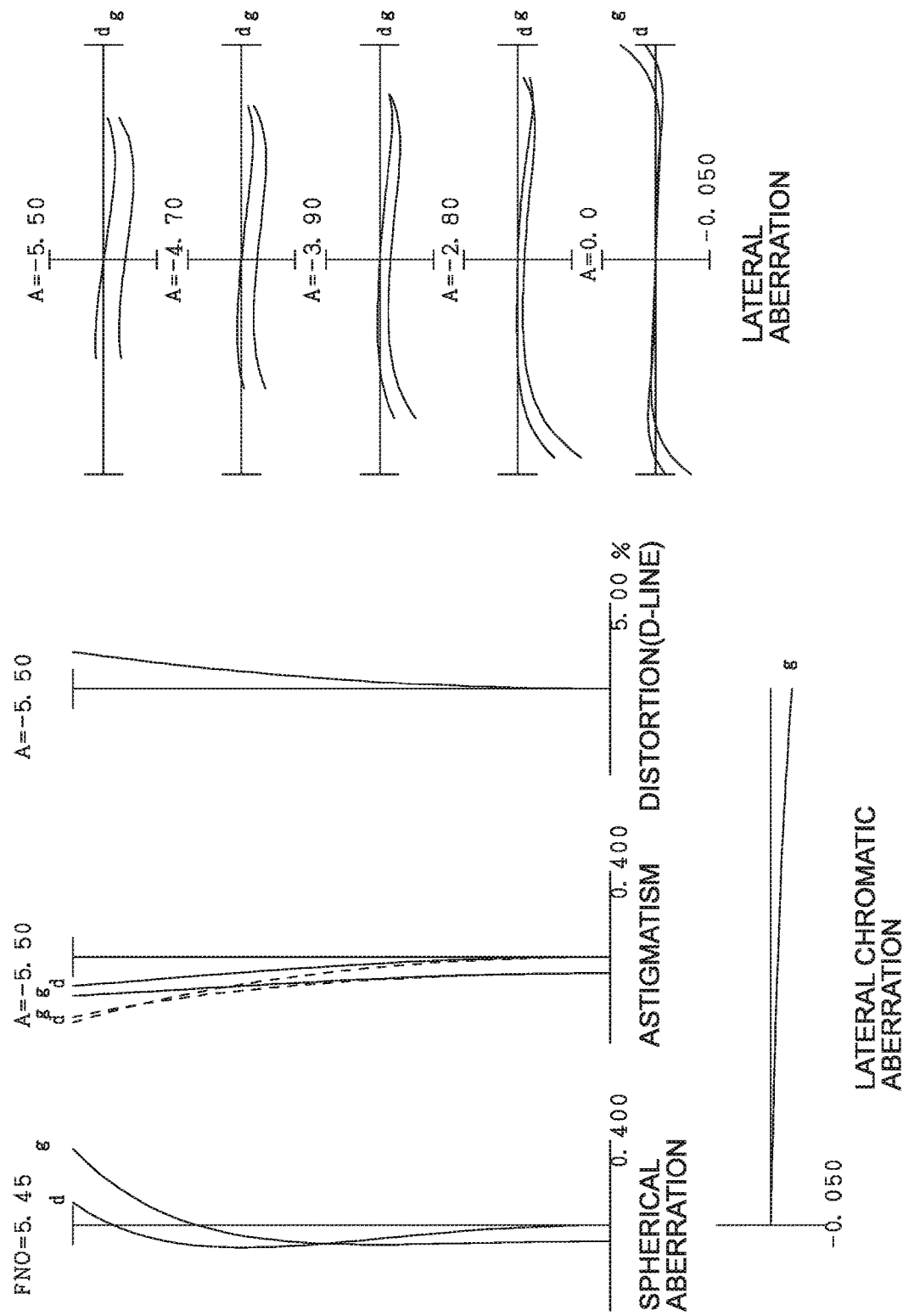

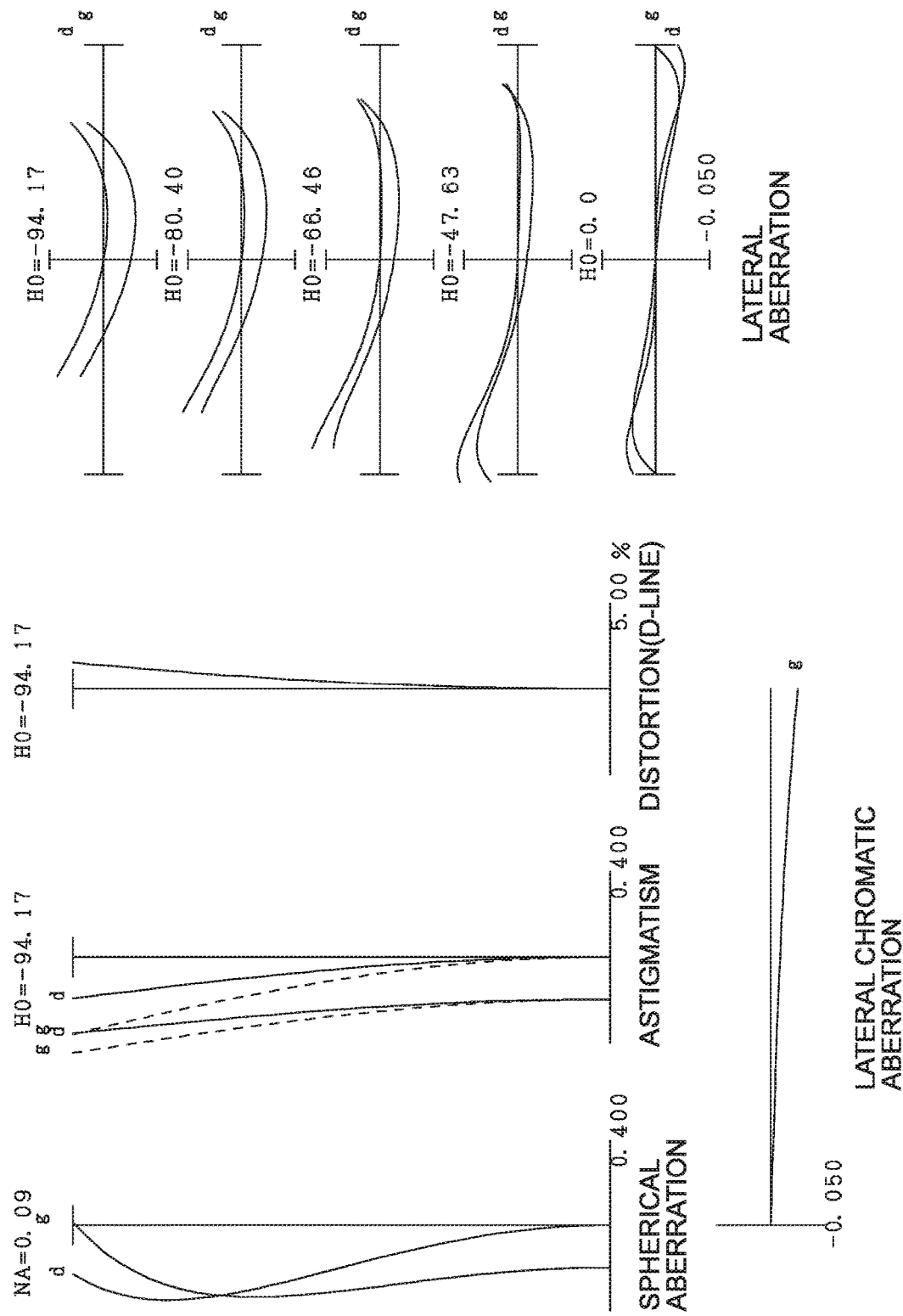

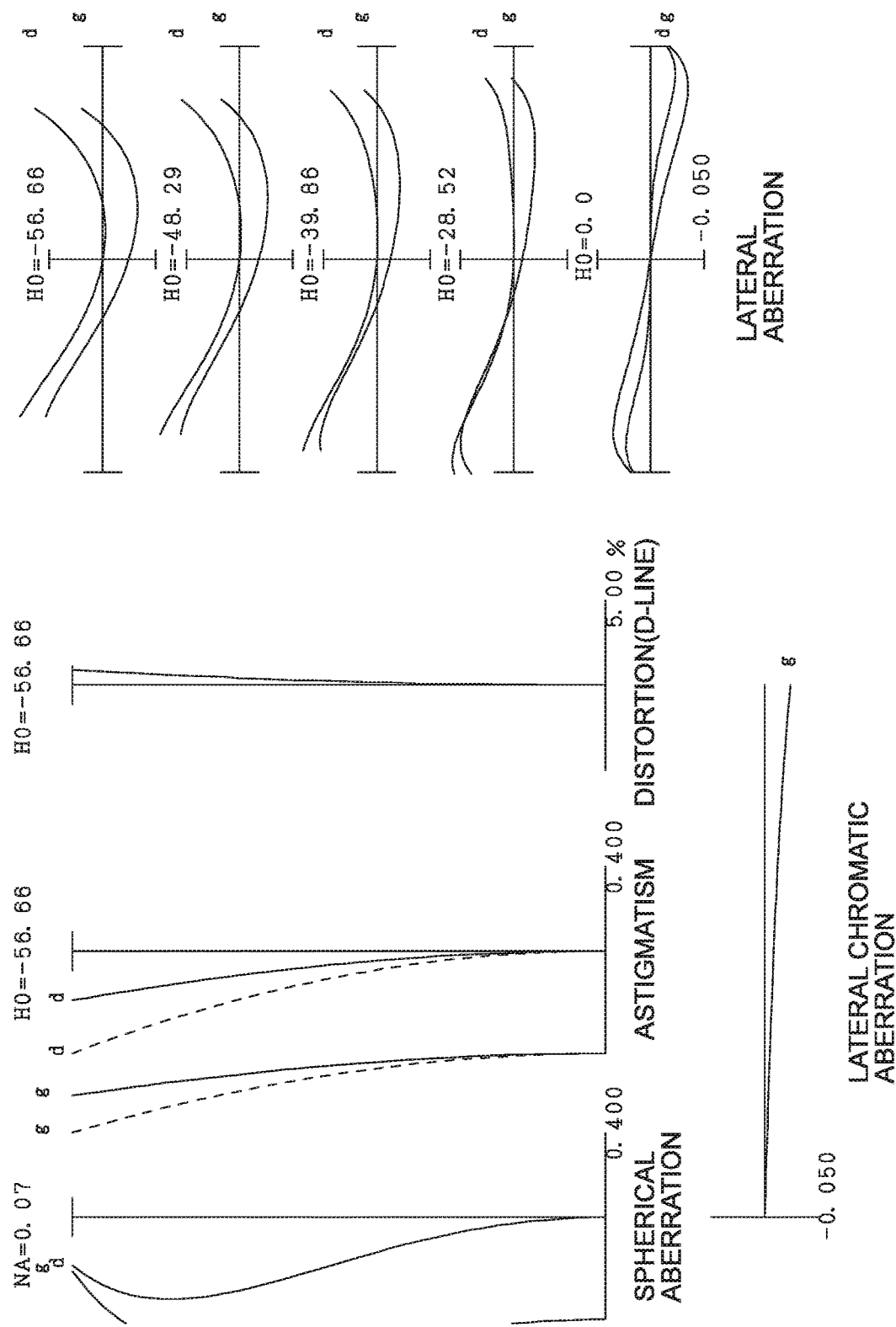

LATERAL ABERRATION

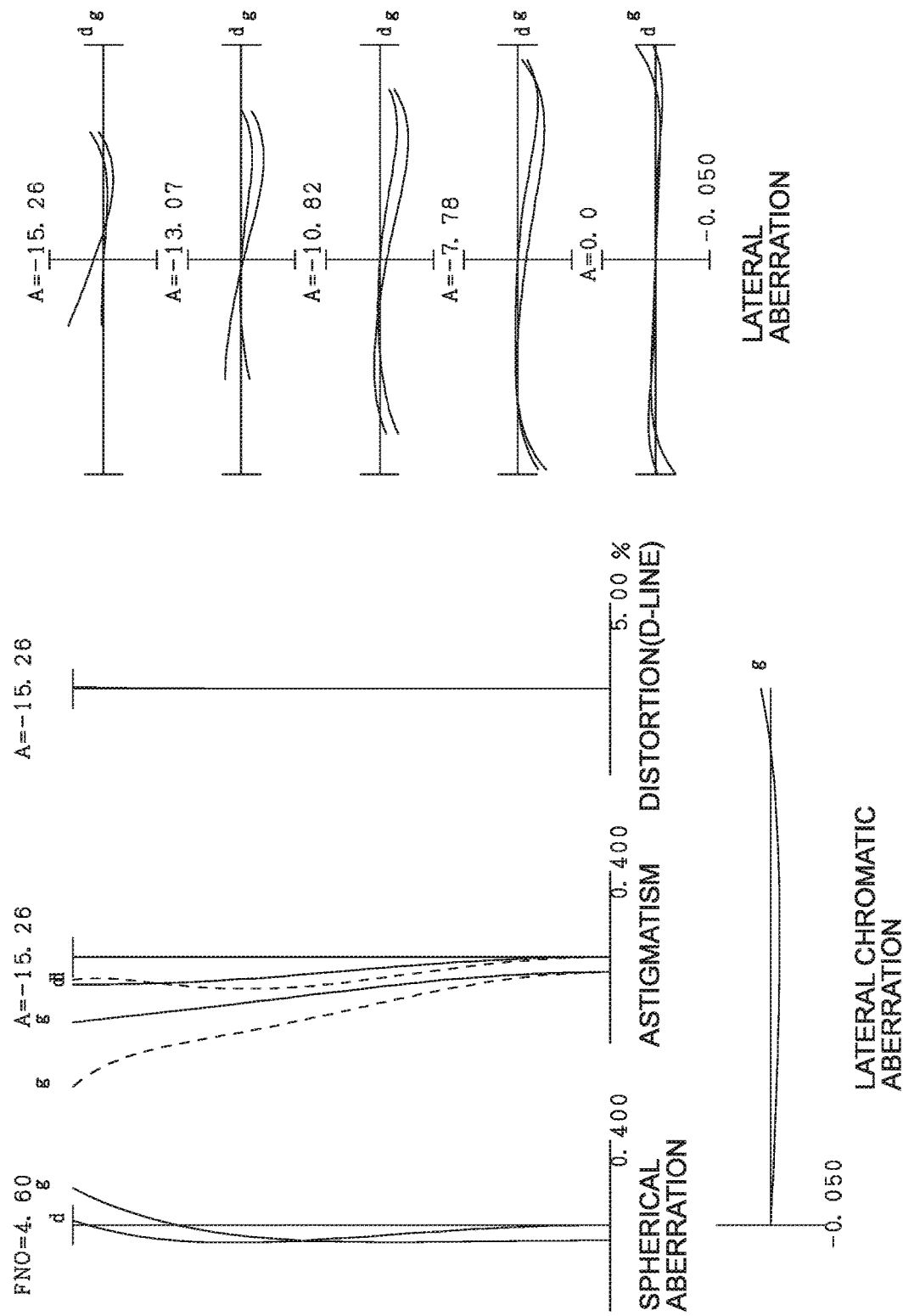

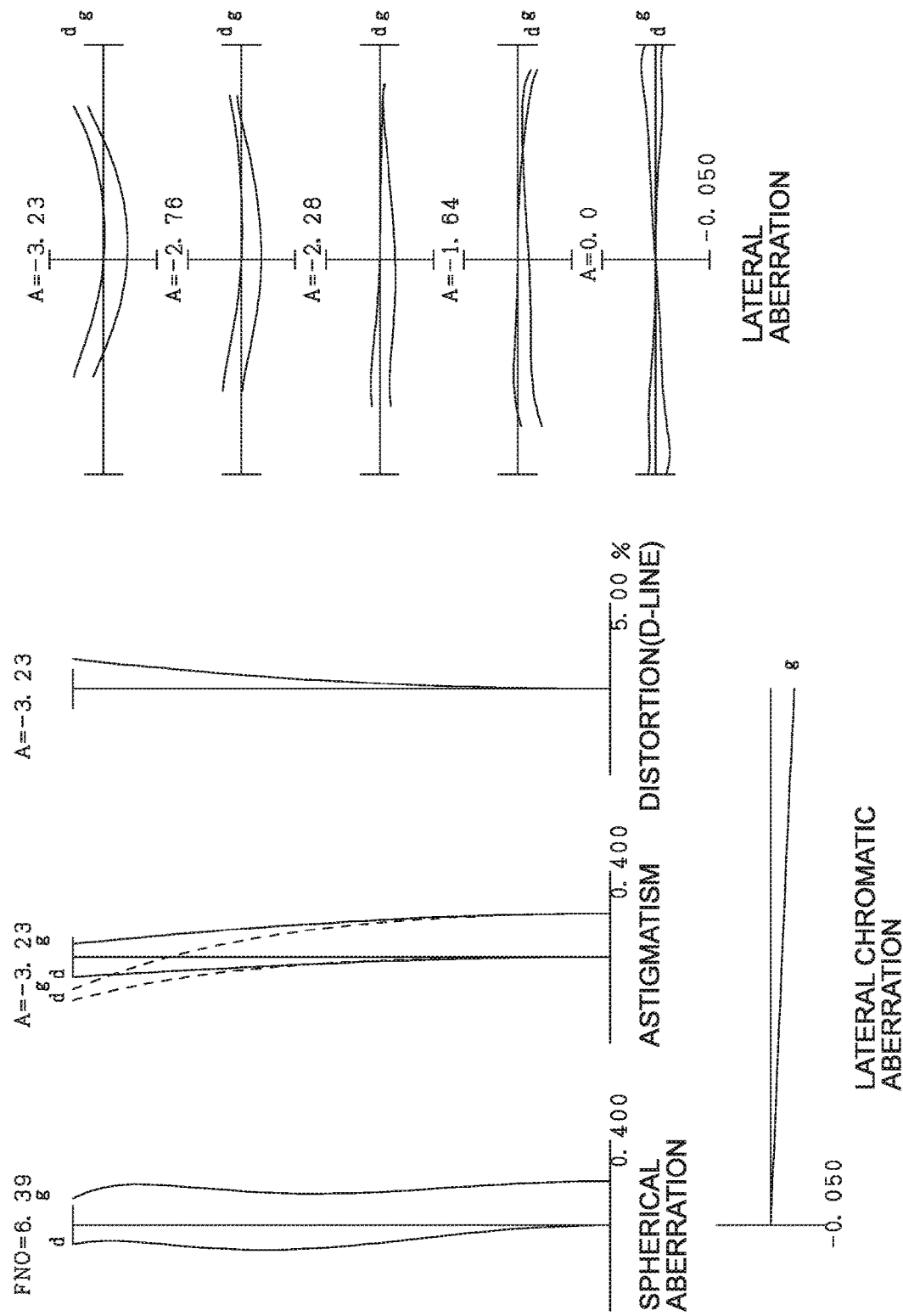

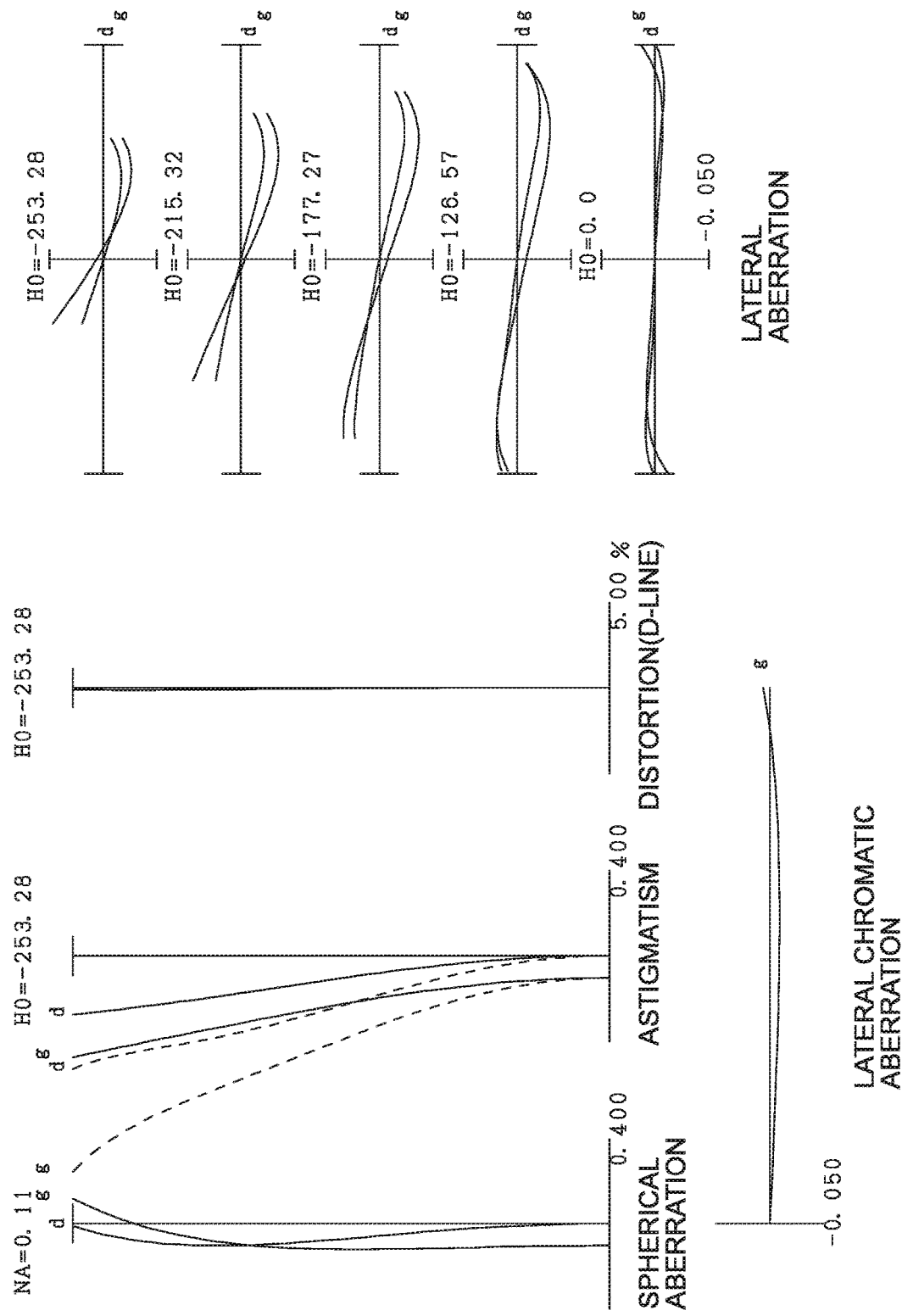

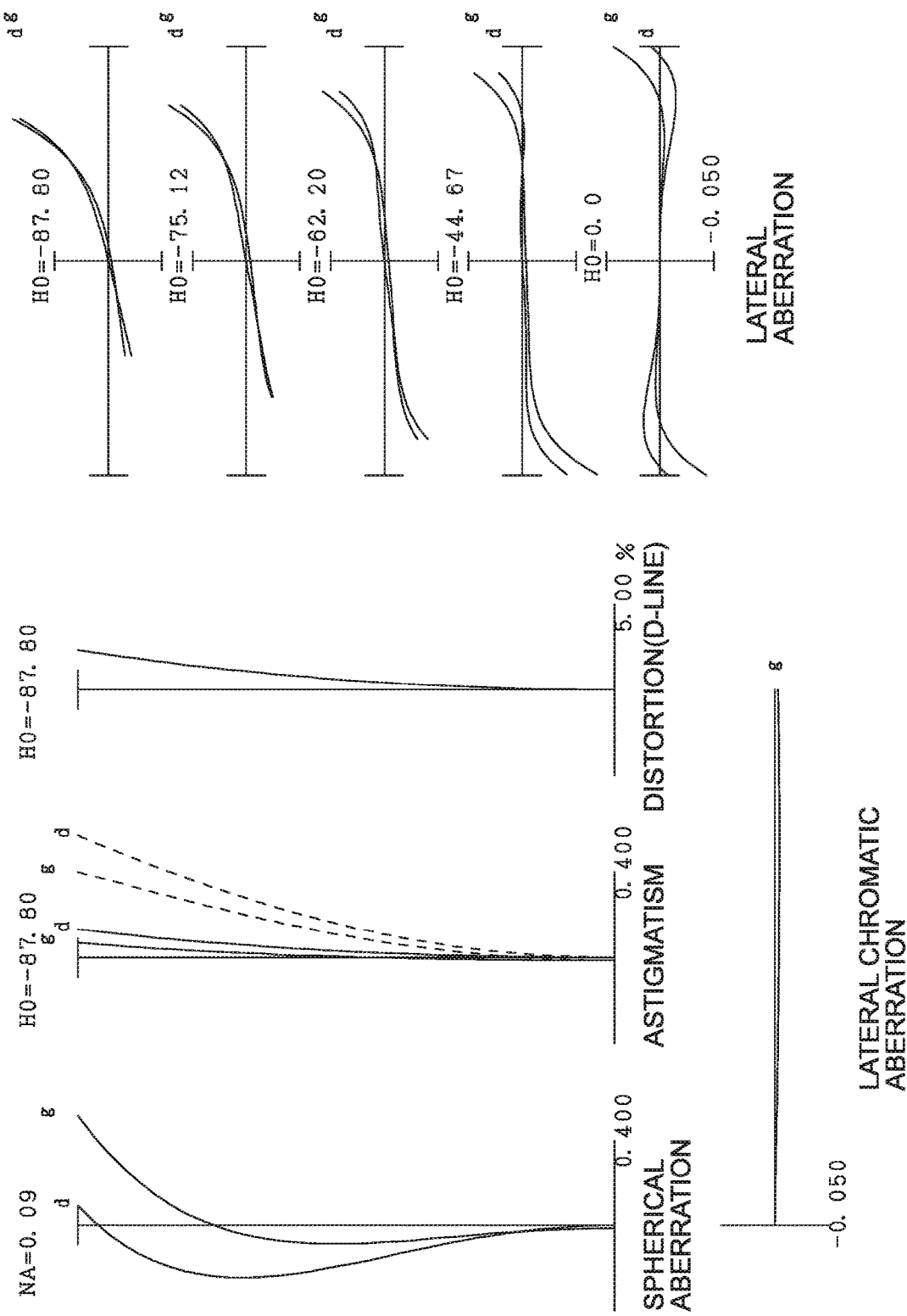

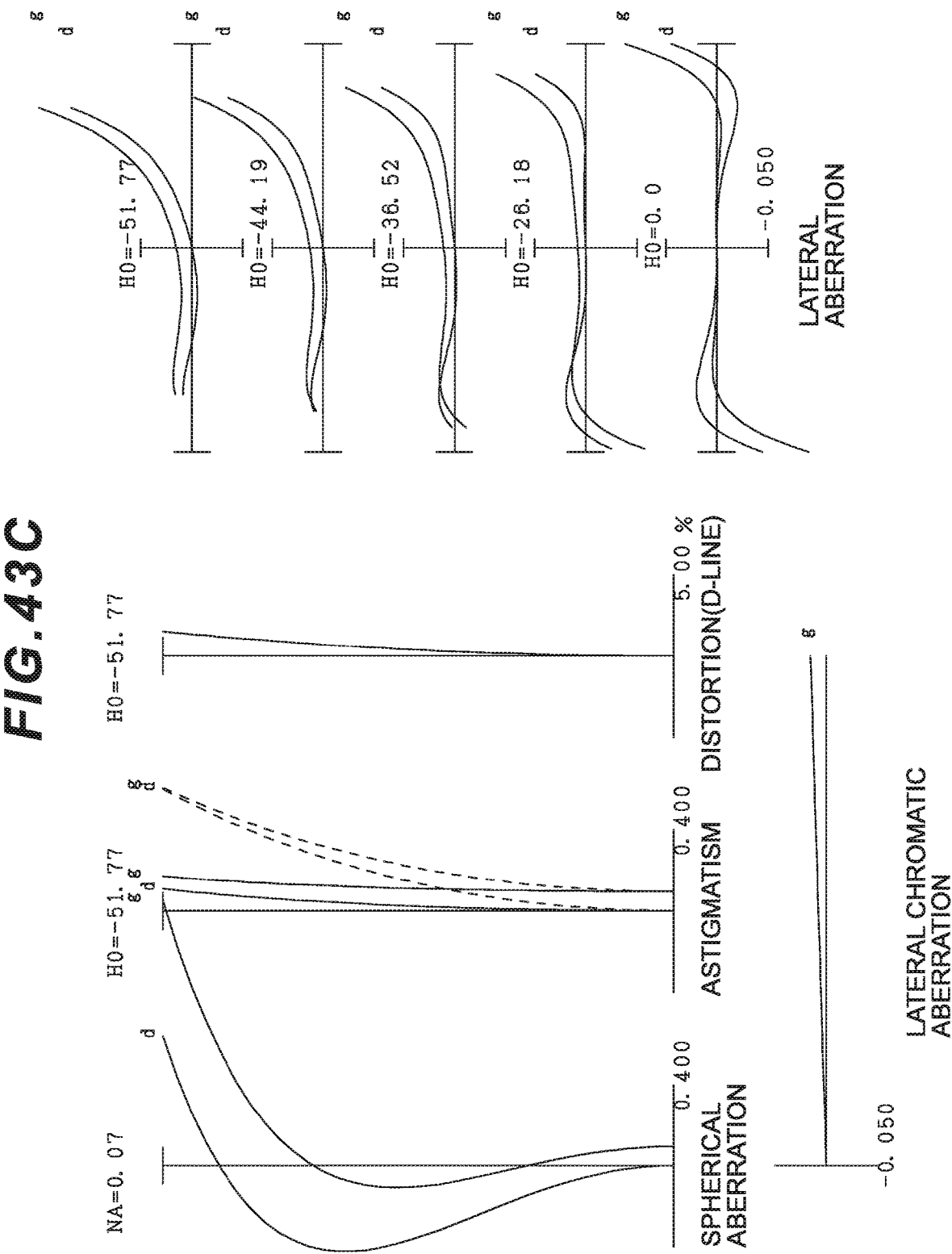

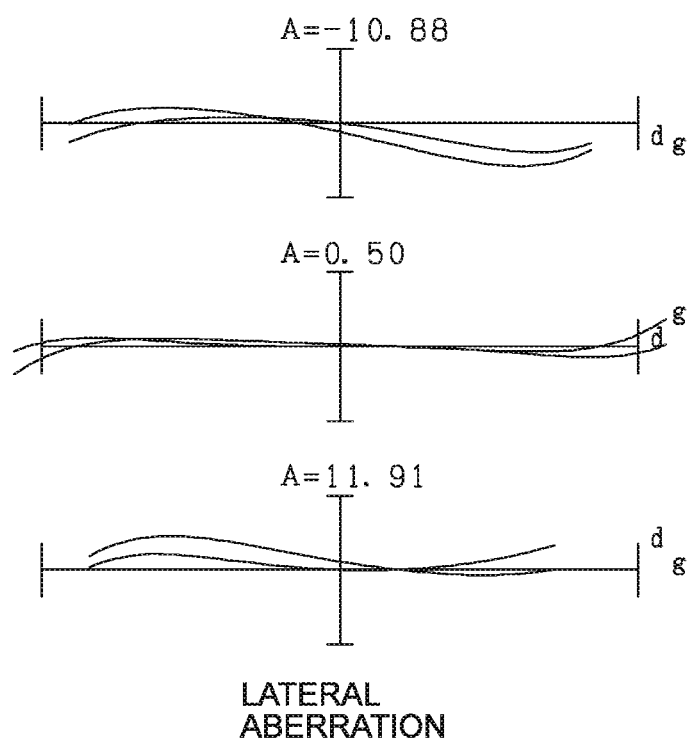

LATERAL ABERRATION

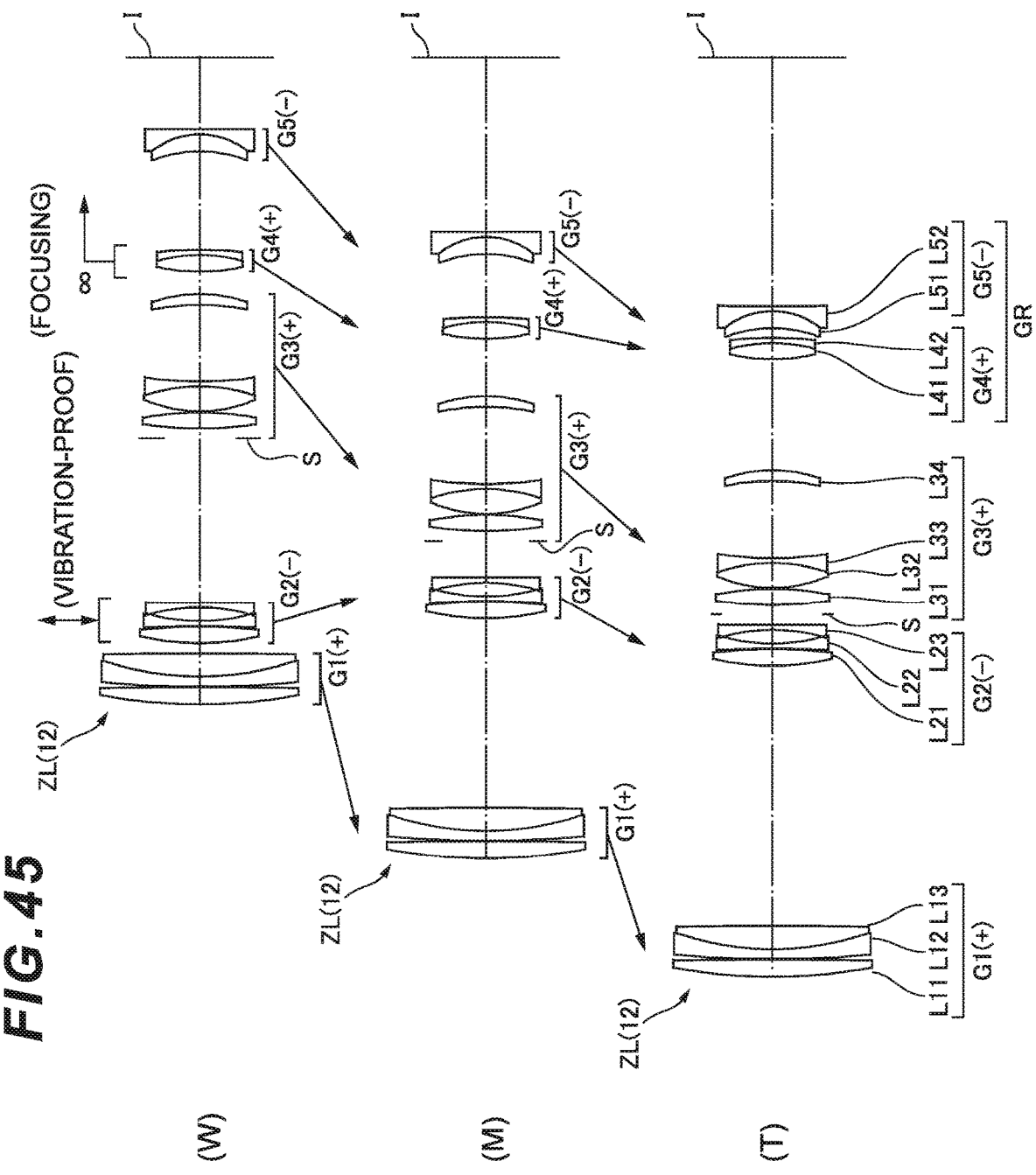

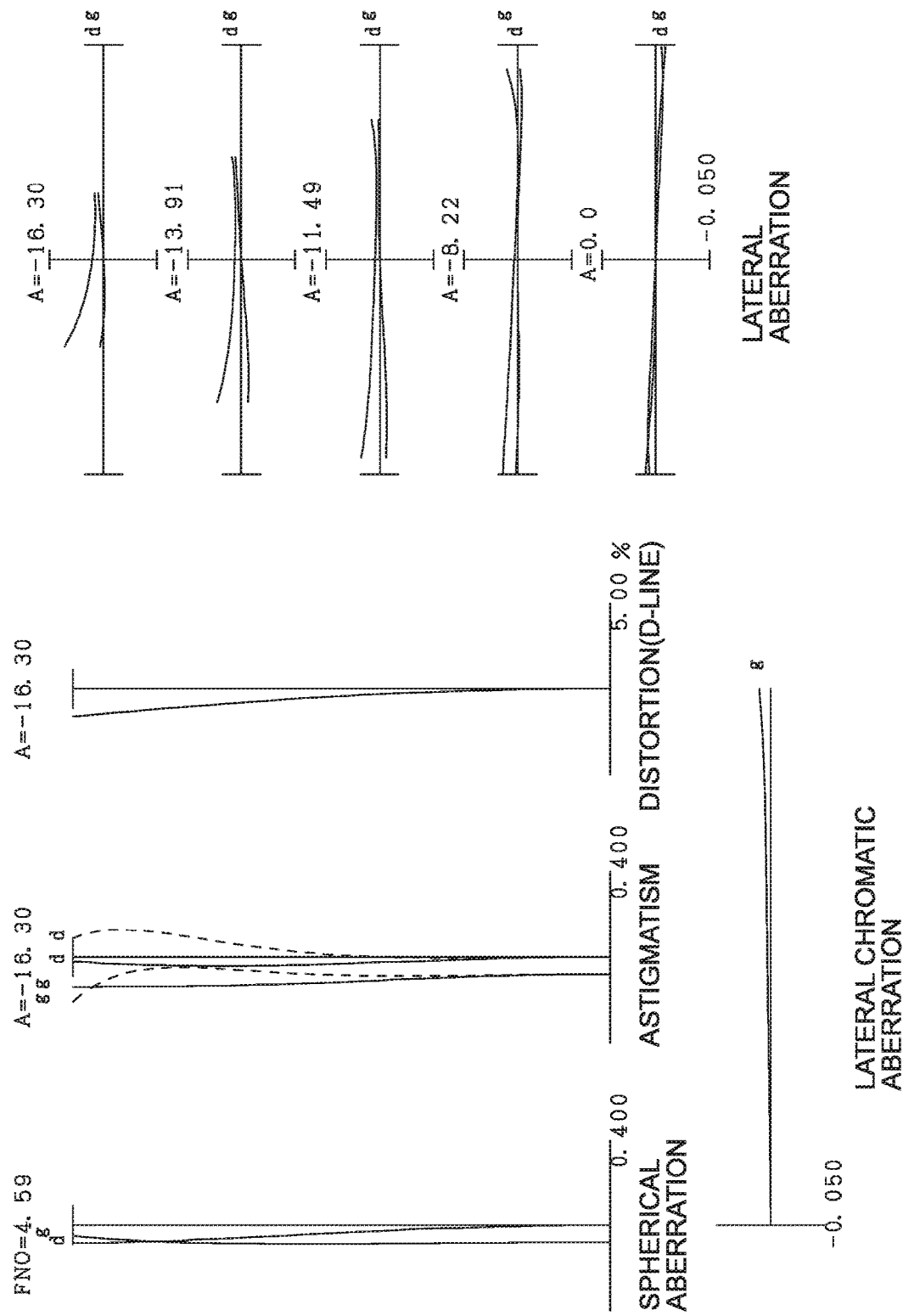

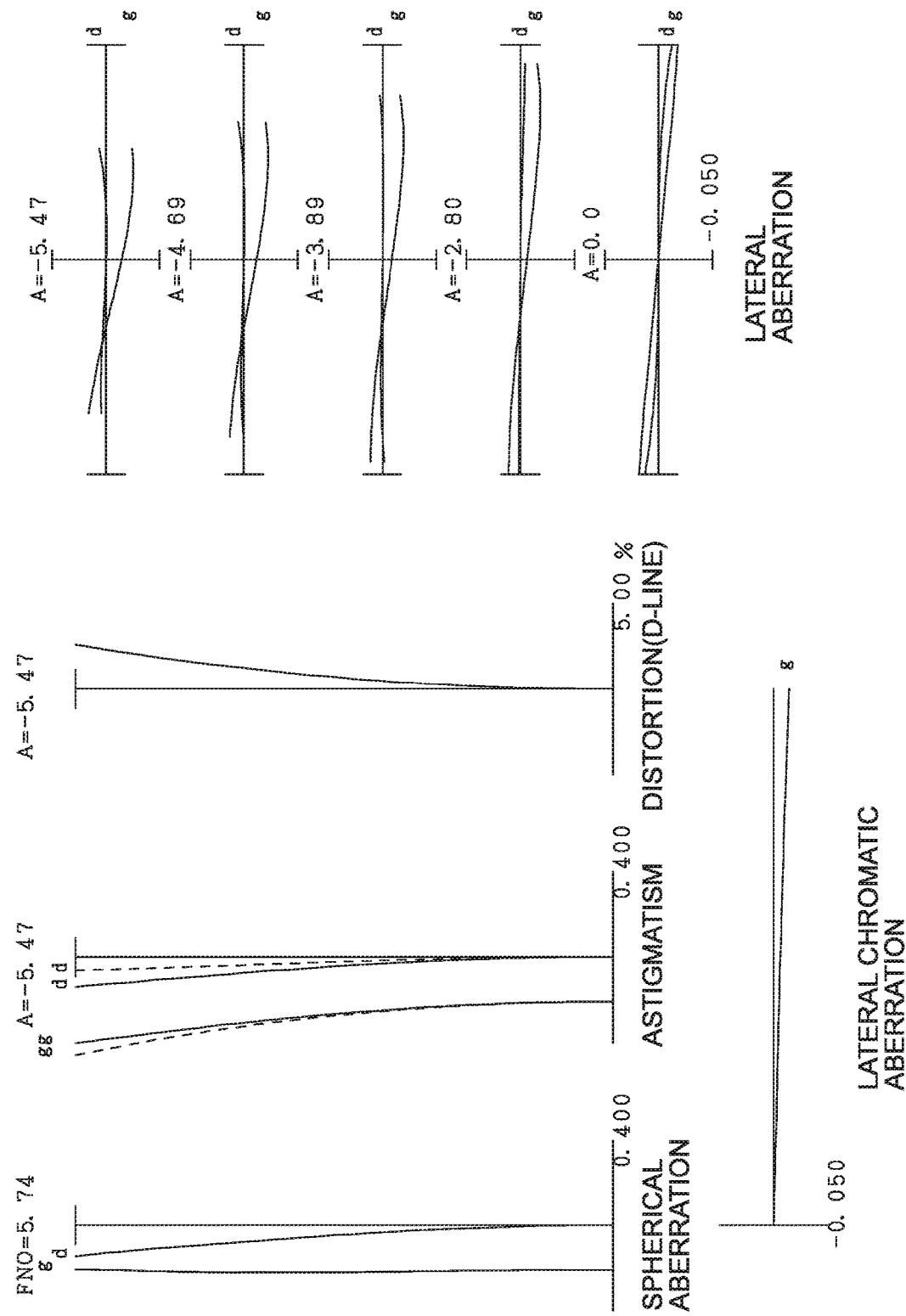

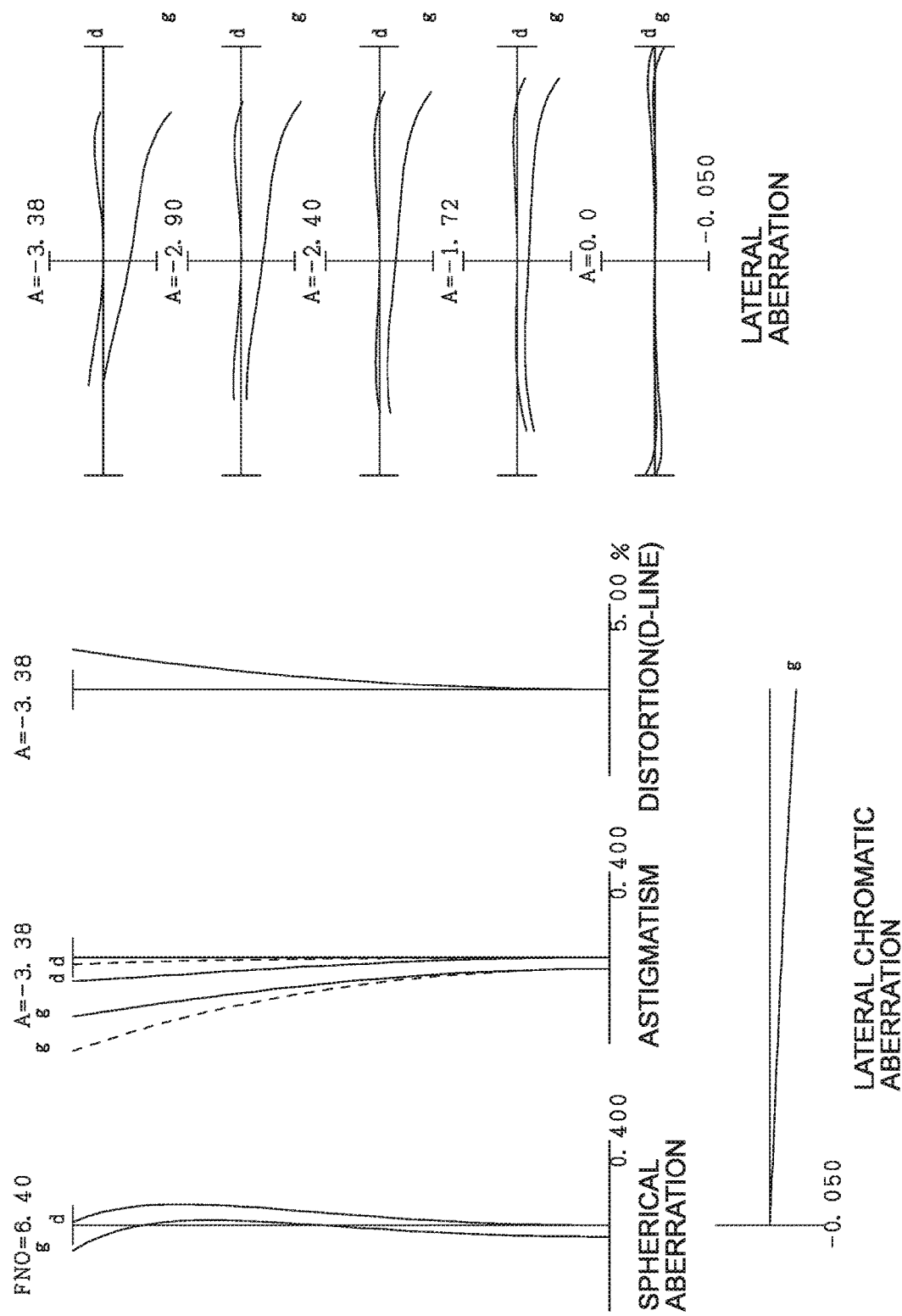

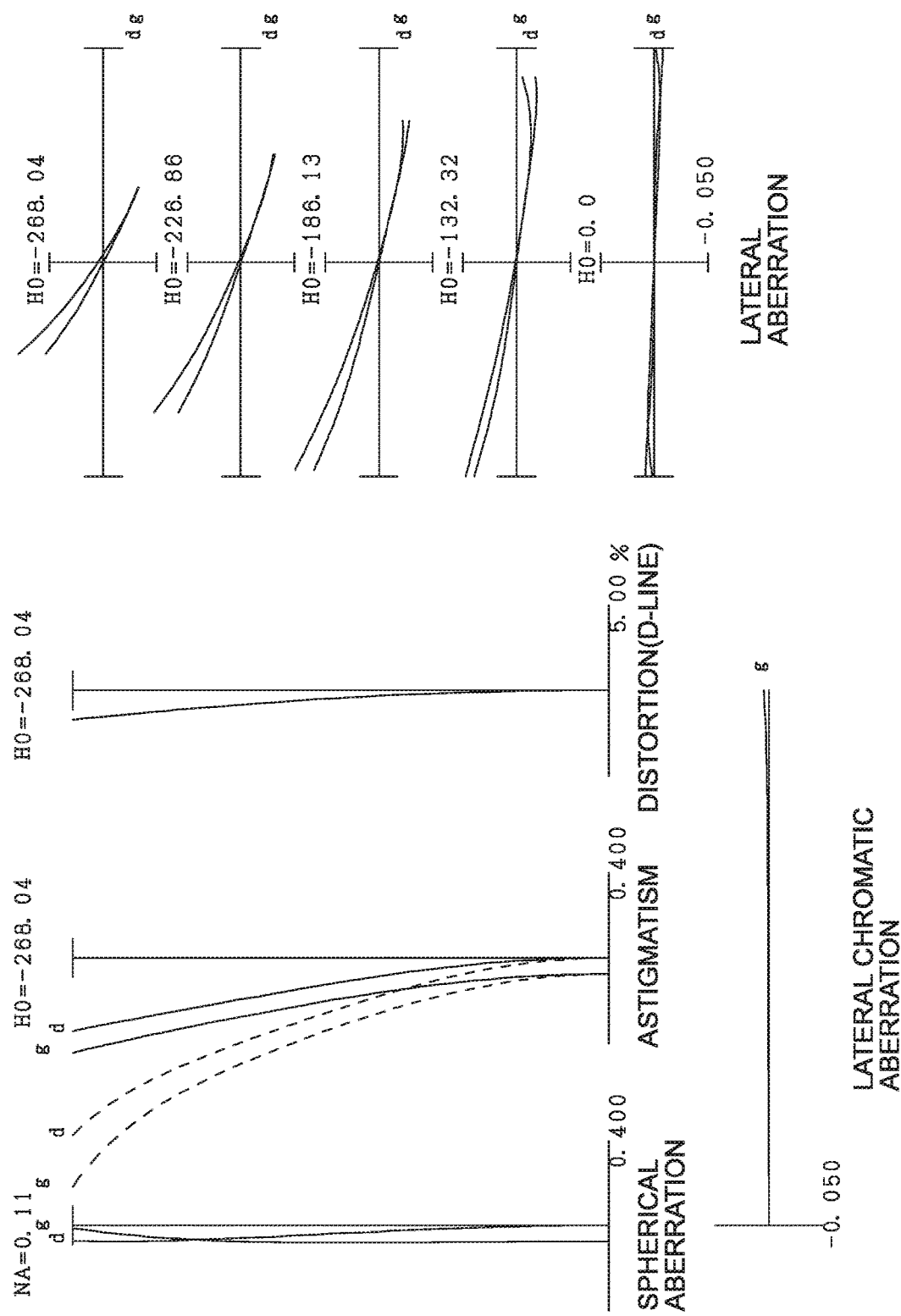

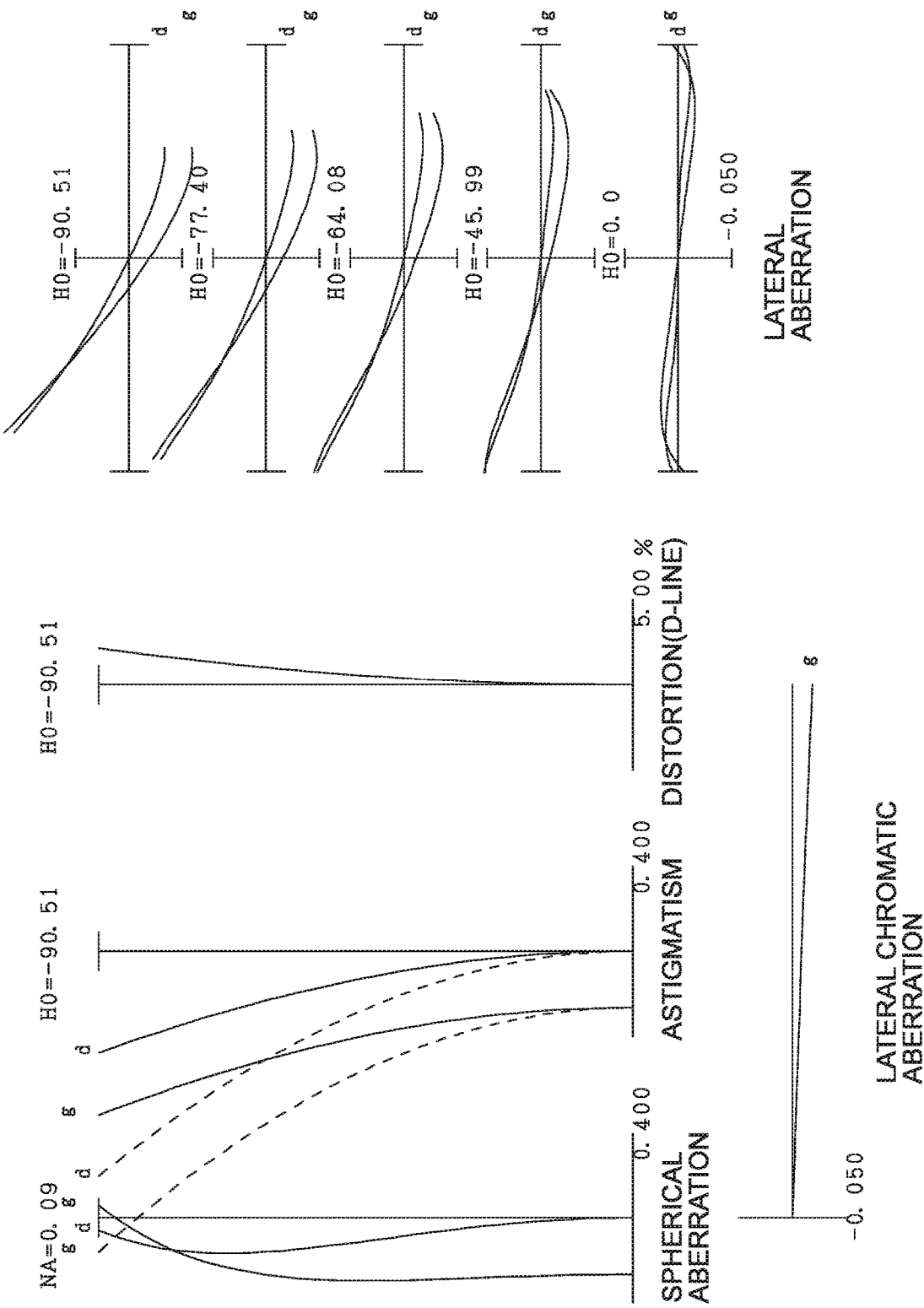

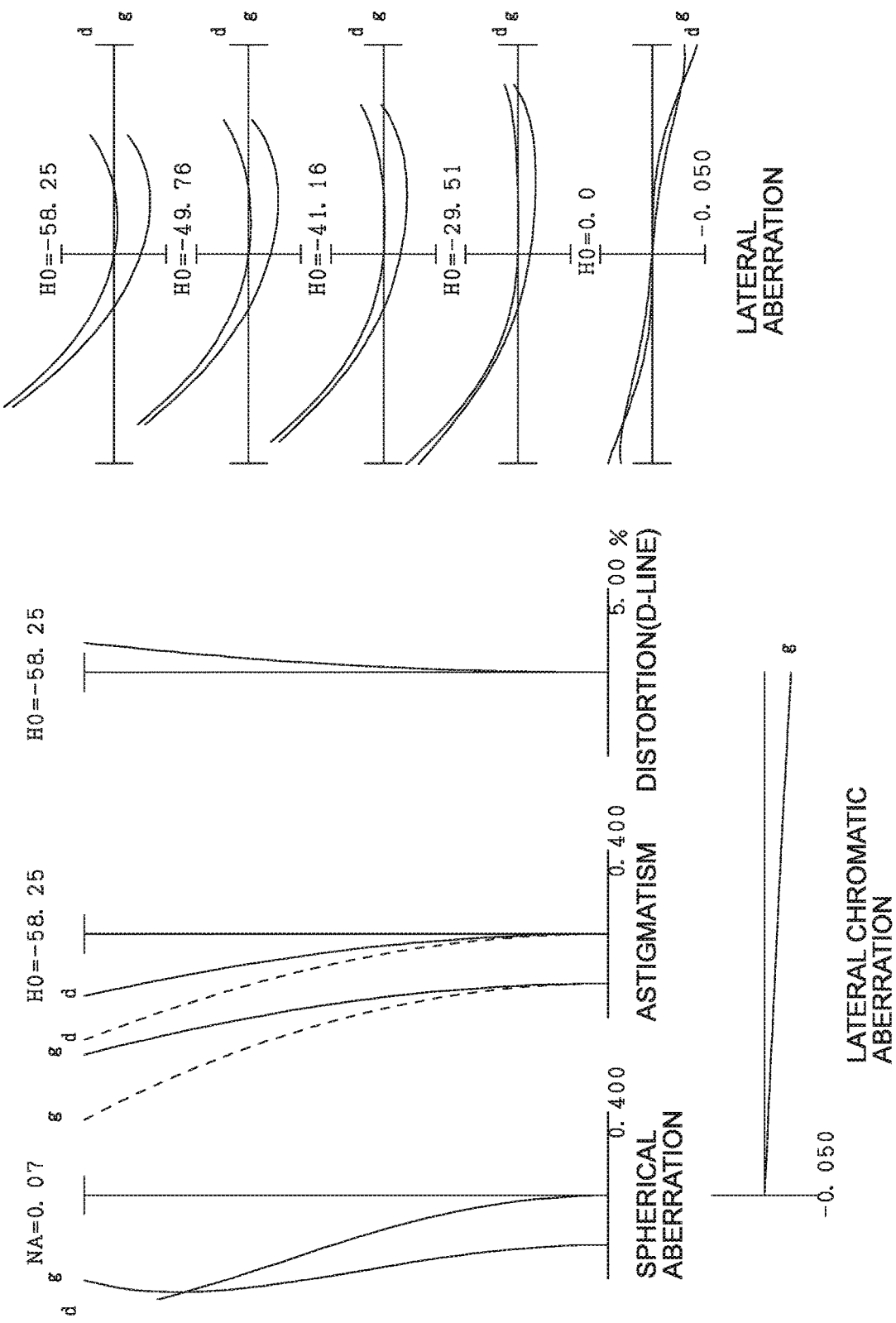

LATERAL ABERRATION

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, optical apparatus using the zoom optical system, and a method for manufacturing the zoom optical system.

TECHNICAL BACKGROUND

Conventionally, a zoom optical system equipped with a vibration proof group for correcting image blur has been proposed (see, for example, Patent Literature 1). However, in a zoom optical system equipped with a vibration proof group, a wider angle of view is required. Also, in a zoom optical system equipped with a vibration proof group, a higher zooming rate is required. Also, in a zoom optical system equipped with a vibration proof group, achieving a small size of the vibration proof group is required.

PRIOR ARTS LIST

Patent Document

Patent literature 1: Japanese Laid-Open Patent Publication No. 11-316342(A)

SUMMARY OF THE INVENTION

A zoom optical system according to a first aspect comprises: a first negative lens group having a negative refractive power; and a second negative lens group disposed closer to an image than the first negative lens group, and a distance between the first negative lens group and the second negative lens group changes during zooming, and the first negative lens group is movable so that at least a part thereof has a displacement component in a direction perpendicular to the optical axis. At least a part of the second negative lens group is movable along the optical axis during focusing. These lens groups satisfy the following conditional expressions, $$0.50 < fGb/fGa < 2.60$$

where,
fGa: a focal length of the first negative lens group and,
fGb: a focal length of the second negative lens group.

A zoom optical system according to a second aspect comprises: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, and a distance between the first lens group and the second lens group changes, a distance between the second lens group and the third lens group changes, a distance between the third lens group and the fourth lens group changes during zooming, the second lens group includes at least partly a vibration proof group movable so as to have a displacement component in a direction perpendicular to an optical axis, the fourth lens group includes a positive lens and a negative lens disposed in order from an object, an air distance is present between the positive lens and the negative lens, and the following conditional expressions, $$0.001 < Dpn/(-f4) < 0.400$$

$$0.93 < fVR/f2 < 2.50$$

are satisfied,
where
Dpn: an air distance between the positive lens and the negative lens in the fourth lens group,
f4: a focal length of the fourth lens group,
fVR: a focal length of the vibration proof group, and
f2: a focal length of the second lens group.

A zoom optical system according to a third aspect comprises: a first lens group having a positive refractive power, a second lens group disposed closer to an image than the first lens group and having a negative refractive power, a third lens group disposed closer to an image than the second lens group and having a positive refractive power, and a following group (or succeeding group) disposed closer to an image than the third lens group and consisting of at least one lens group, and a distance between the first lens group and the second lens group changes, a distance between the second lens group and the third lens group changes, a distance between the third lens group and the following group changes during zooming, any one of the first lens group, the second lens group, the third lens group, and the following group includes at least partly a vibration proof group movable so as to have a displacement component in a direction perpendicular to an optical axis, the vibration proof group consists of a positive lens, a first negative lens, and a second negative lens disposed in order from an object, an air distance is present between the positive lens and the first negative lens, and an air distance is present between the first negative lens and the second negative lens.

An optical apparatus according to a fourth aspect includes the zoom optical system mounted thereon.

A method for manufacturing a zoom optical system according to a fifth aspect is a method of manufacturing a zoom optical system comprising: a first negative lens group having a negative refractive power; and a second negative lens group disposed closer to an image than the first negative lens group, and a distance between the first negative lens group and the second negative lens group changes during zooming, the first negative lens group is movable at least partly so as to have a displacement component in a direction perpendicular to an optical axis, at least part of the second negative lens group is movable along the optical axis during focusing, and each lens is disposed within a lens barrel so as to satisfy the following conditional expression, $$0.50 < fGb/fGa < 2.60$$

where,
fGa: a focal length of the first negative lens group and,
fGb: a focal length of the second negative lens group.

A method for manufacturing a zoom optical system according to a sixth aspect is a method of manufacturing a zoom optical system comprising: a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, and a distance between the first lens group and the second lens group changes, a distance between the second lens group and the third lens group changes, a distance between the third lens group and the fourth lens group changes during zooming, the second lens group includes at least partly a vibration proof group movable so as to have a displacement component in a direction perpendicular to an optical axis, the fourth lens group includes a positive lens and a negative lens disposed in order from an object, an air distance is present between the positive lens and the negative lens, and each lens is disposed within a lens barrel so as to satisfy the following conditional expressions, $$0.001 < Dpn/(-f4) < 0.400$$

$$0.93 < fVR/f2 < 2.50$$

where

Dpn: an air distance between the positive lens and the negative lens in the fourth lens group, f4: a focal length of the fourth lens group, fVR: a focal length of the vibration proof group, and f2: a focal length of the second lens group.

A method for manufacturing a zoom optical system according to a seventh aspect is a method of manufacturing a zoom optical system comprising: a first lens group having a positive refractive power, a second lens group disposed closer to an image than the first lens group and having a negative refractive power, a third lens group disposed closer to an image than the second lens group and having a positive refractive power, and a following group disposed closer to an image than the third lens group and consisting of at least one lens group, and a distance between the first lens group and the second lens group changes, a distance between the second lens group and the third lens group changes, a distance between the third lens group and the following group changes during zooming, any one of the first lens group, the second lens group, the third lens group, and the following group includes at least partly a vibration proof group movable so as to have a displacement component in a direction perpendicular to an optical axis, the vibration proof group consists of a positive lens, a first negative lens, and a second negative lens disposed in order from an object, and each lens is disposed within a lens barrel so that an air distance is present between the positive lens and the first negative lens and an air distance is present between the first negative lens and the second negative lens.

BRIEF DESCRIPTION OF THE DRAWINGS

FIG. 1 is a drawing illustrating a lens configuration of a zoom optical system according to Example 1;

FIG. 2A, FIG. 2B and FIG. 2C are each an aberration graph illustrating aberrations upon focusing on infinity in a wide angle end state, in an intermediate focal length state, and in a telephoto end state of the zoom optical system according to Example 1;

FIG. 3A, FIG. 3B, and FIG. 3C are each an aberration graph illustrating aberrations upon focusing on a short distant object in the wide angle end state, in the intermediate focal length state, and in the telephoto end state of the zoom optical system according to Example 1;

FIG. 6A, FIG. 6B and FIG. 6C are each an aberration graph illustrating aberrations upon focusing on infinity in a wide angle end state, in an intermediate focal length state, and in a telephoto end state of the zoom optical system according to Example 2;

FIG. 7A, FIG. 7B, and FIG. 7C are each an aberration graph illustrating aberrations upon focusing on a short distant object in a wide angle end state, in an intermediate focal length state, and in a telephoto end state of the zoom optical system according to Example 2;

FIG. 9 is a drawing illustrating a lens configuration of a zoom optical system according to Example 3;

FIG. 10A, FIG. 10B, and FIG. 10C are each an aberration graph illustrating aberrations upon focusing on infinity in a wide angle end state, in an intermediate focal length state, and in a telephoto end state of the zoom optical system according to Example 3;

FIG. 11A, FIG. 11B and FIG. 11C are each an aberration graph illustrating aberrations upon focusing on a short distant object in a wide angle end state, in an intermediate focal length state, and in a telephoto end state of the zoom optical system according to Example 3;

FIG. 13 is a drawing illustrating a lens configuration of a zoom optical system according to Example 4;

FIG. 14A, FIG. 14B, and FIG. 14C are each an aberration graph illustrating aberrations upon focusing on infinity in a wide angle end state, in an intermediate focal length state, and in a telephoto end state of the zoom optical system according to Example 4;

FIG. 15A, FIG. 15B, and FIG. 15C are each an aberration graph illustrating aberrations upon focusing on a short distant object in a wide angle end state, in an intermediate focal length state, and in a telephoto end state of the zoom optical system according to Example 4;

FIG. 17 is a drawing illustrating a lens configuration of a zoom optical system according to Example 5;

FIG. 18A, FIG. 18B, and FIG. 18C are each an aberration graph illustrating aberrations upon focusing on infinity in a wide angle end state, in an intermediate focal length state, and in a telephoto end state of the zoom optical system according to Example 5;

FIG. 19A, FIG. 19B, and FIG. 19C are each an aberration graph illustrating aberrations upon focusing on a short distant object in a wide angle end state, in an intermediate focal length state, and in a telephoto end state of the zoom optical system according to Example 5;

FIG. 22A, FIG. 22B, and FIG. 22C are each an aberration graph illustrating aberrations upon focusing on infinity in a wide angle end state, in an intermediate focal length state, and in a telephoto end state of the zoom optical system according to Example 6;

FIG. 23A, FIG. 23B, and FIG. 23C are each an aberration graph illustrating aberrations upon focusing on a short distant object in a wide angle end state, in an intermediate focal length state, and in a telephoto end state of the zoom optical system according to Example 6;

FIG. 26A, FIG. 26B, and FIG. 26C are each an aberration graph illustrating aberrations upon focusing on infinity in a wide angle end state, in an intermediate focal length state, and in a telephoto end state of the zoom optical system according to Example 7;

FIG. 27A, FIG. 27B, and FIG. 27C are each an aberration graph illustrating aberrations upon focusing on a short distant object in a wide angle end state, in an intermediate focal length state, and in a telephoto end state of the zoom optical system according to Example 7;

FIG. 30A, FIG. 30B, and FIG. 30C are each an aberration graph illustrating aberrations upon focusing on infinity in a wide angle end state, in an intermediate focal length state, and in a telephoto end state of the zoom optical system according to Example 8;

FIG. 31A, FIG. 31B, and FIG. 31C are each an aberration graph illustrating aberrations upon focusing on a short distant object in a wide angle end state, in an intermediate focal length state, and in a telephoto end state of the zoom optical system according to Example 8;

FIG. 33 is a drawing illustrating a lens configuration of a zoom optical system according to Example 9;

FIG. 34A, FIG. 34B, and FIG. 34C are each an aberration graph illustrating aberrations upon focusing on infinity in a wide angle end state, in an intermediate focal length state, and in a telephoto end state of the zoom optical system according to Example 9;

FIG. 35A, FIG. 35B, and FIG. 35C are each an aberration graph illustrating aberrations upon focusing on a short distant object in a wide angle end state, in an intermediate focal length state, and in a telephoto end state of the zoom optical system according to Example 9;

FIG. 37 is a drawing illustrating a lens configuration of a zoom optical system according to Example 10;

FIG. 38A, FIG. 38B, and FIG. 38C are each an aberration graph illustrating aberrations upon focusing on infinity in a wide angle end state, in an intermediate focal length state, and in a telephoto end state of the zoom optical system according to Example 10;

FIG. 39A, FIG. 39B, and FIG. 39C are each an aberration graph illustrating aberrations upon focusing on a short distant object in a wide angle end state, in an intermediate focal length state, and in a telephoto end state of the zoom optical system according to Example 10;

FIG. 42A, FIG. 42B, and FIG. 42C are each an aberration graph illustrating aberrations upon focusing on infinity in a wide angle end state, in an intermediate focal length state, and in a telephoto end state of the zoom optical system according to Example 11;

FIG. 43A, FIG. 43B, and FIG. 43C are each an aberration graph illustrating aberrations upon focusing on a short distant object in a wide angle end state, in an intermediate focal length state, and in a telephoto end state of the zoom optical system according to Example 11;

FIG. 44A, FIG. 44B, and FIG. 44C are each a meridional lateral aberration graph when shake compensation is performed in the wide angle end state, in the intermediate focal length state, and in the telephoto end state of the zoom optical system according to Example 11;

FIG. 45 is a drawing illustrating a lens configuration of a zoom optical system according to Example 12;

FIG. 46A, FIG. 46B, and FIG. 46C are each an aberration graph illustrating aberrations upon focusing on infinity in a wide angle end state, in an intermediate focal length state, and in a telephoto end state of the zoom optical system according to Example 12;

FIG. 47A, FIG. 47B, and FIG. 47C are each an aberration graph illustrating aberrations upon focusing on a short distant object in a wide angle end state, in an intermediate focal length state, and in a telephoto end state of the zoom optical system according to Example 12;

DESCRIPTION OF THE EMBODIMENTS

First Embodiment

A zoom optical system and an optical apparatus according to the first embodiment will now be described with reference to the drawings. A zoom optical system ZL (1) as an example of the zoom optical system (zoom lens) ZL according to the first embodiment includes: as illustrated in FIG. 1, a first negative lens group (second lens group G2) having a negative refractive power, and a second negative lens group (fourth lens group G4) disposed closer to an image than the first negative lens group. During zooming, a distance between the first negative lens group and the second negative lens group changes. At least part of the first negative lens group is movable so as to have a displacement component in a direction perpendicular to an optical axis. At least part of the second negative lens group is movable along the optical axis during focusing.

Figure 5:
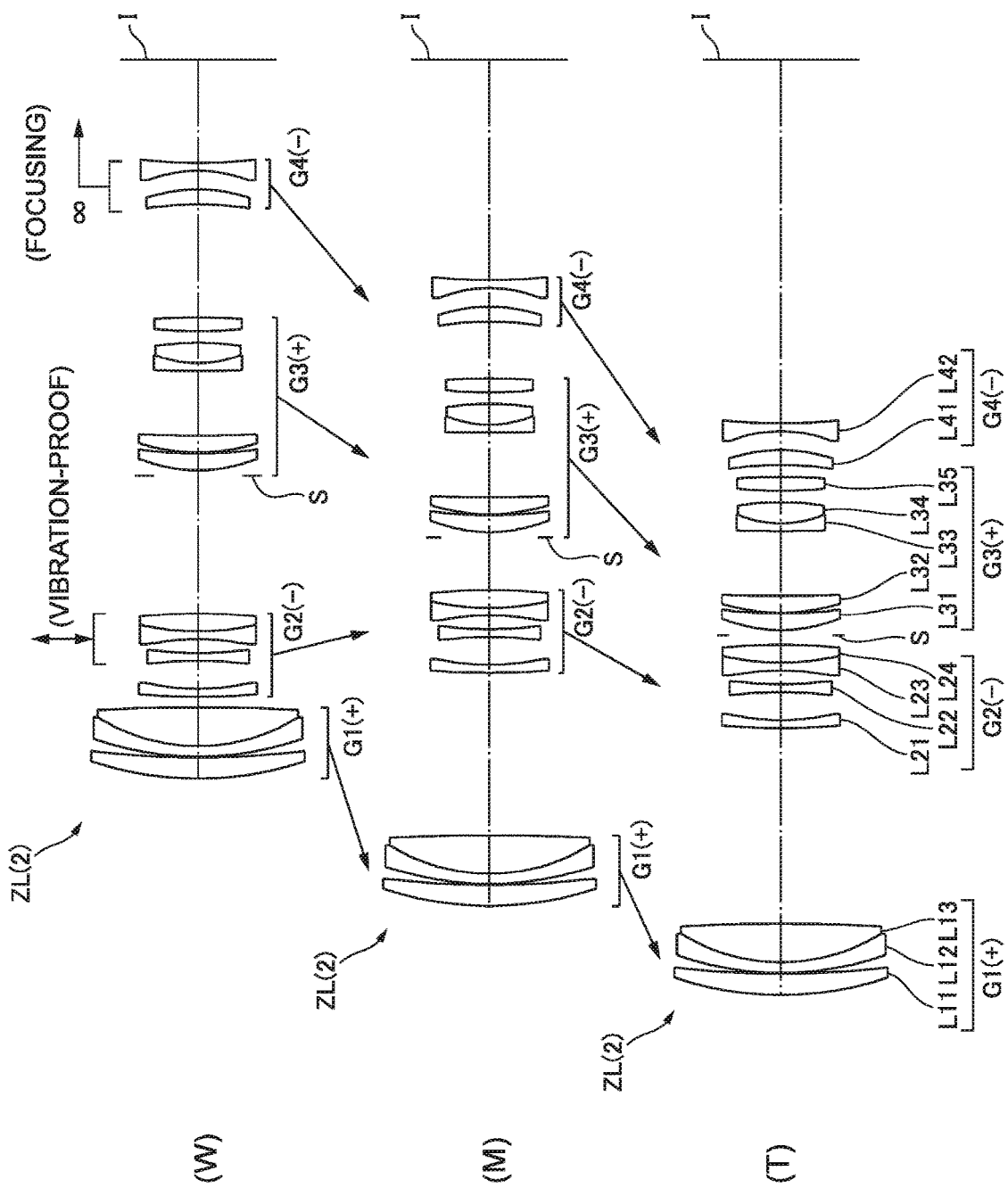
FIG. 5 is a drawing illustrating a lens configuration of a zoom optical system according to Example 2.
Figure 21:
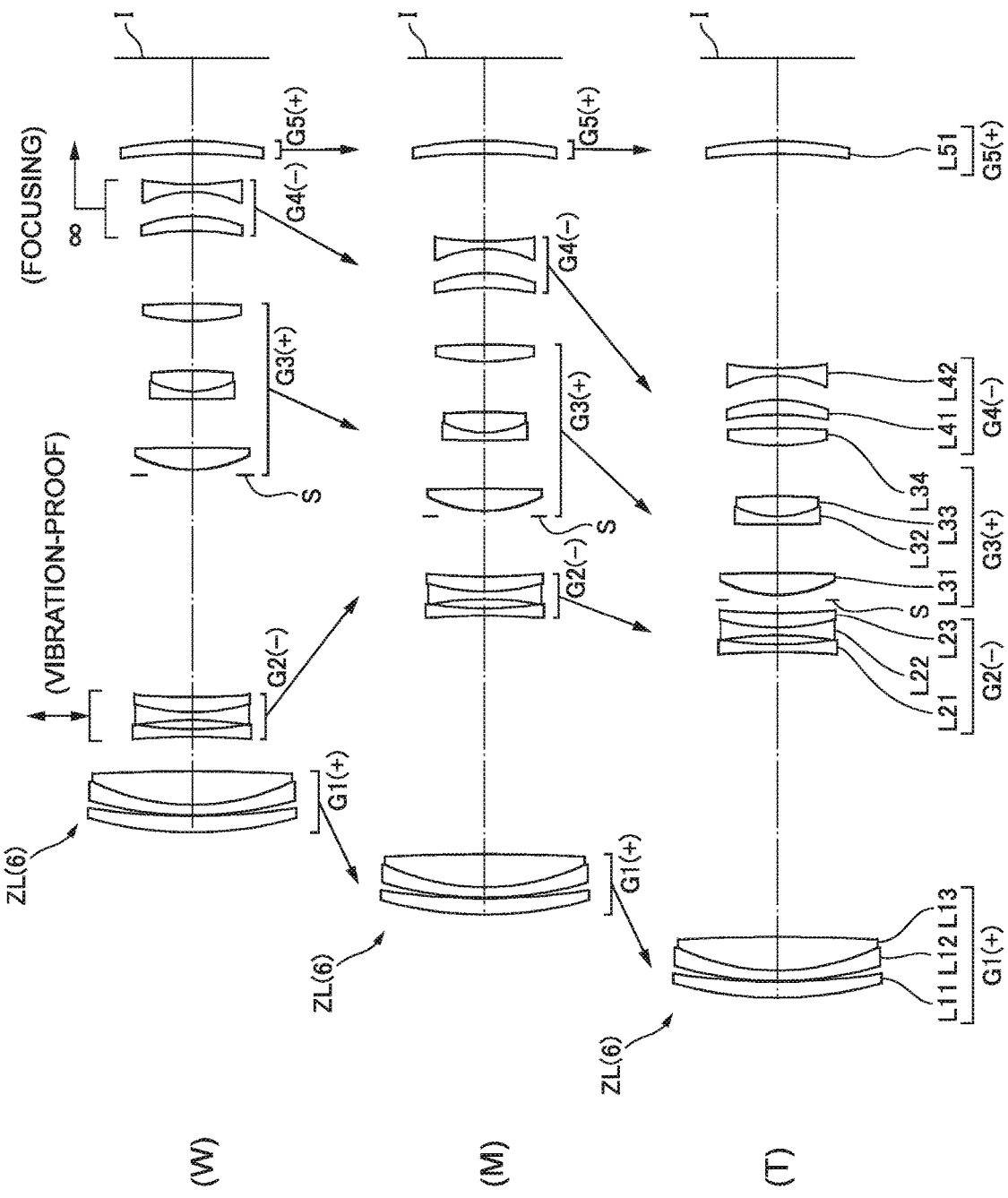
FIG. 21 is a drawing illustrating a lens configuration of a zoom optical system according to Example 6.

The zoom optical system ZL according to the first embodiment may be a zoom optical system ZL (2) illustrated in FIG. 5, may be a zoom optical system ZL (3) illustrated in FIG. 9; may be a zoom optical system ZL (4) illustrated in FIG. 13; may be a zoom optical system ZL (5) illustrated in FIG. 17; and may be a zoom optical system ZL (6) illustrated in FIG. 21. The zoom optical system ZL of the first embodiment may be a zoom optical system ZL (7) illustrated in FIG. 25; may be a zoom optical system ZL (8) illustrated in FIG. 29; may be a zoom optical system ZL (9) illustrated in FIG. 33; may be a zoom optical system ZL (10) illustrated in FIG. 37; and may be a zoom optical system ZL (11) illustrated in FIG. 41. It should be noted that groups from the zoom optical system ZL (2) to ZL (11) illustrated in FIG. 5 or other drawings are configured in the same manner as the zoom optical system ZL (1) illustrated in FIG. 1.

The zoom optical system ZL according to the first embodiment having the configuration described above satisfies the following conditional expression. Accordingly, an optical performance in a wide angle end state is improved, and thus a telephoto type zoom optical system having a wider angle of view is achieved. In addition, by adjusting the power of the second negative lens group while balancing the powers of the first negative lens group and the second negative lens group, a zoom optical system suitable for imaging a video is achieved.

$$0.50 < fGb/fGa < 2.60 \quad (1),$$

where, fGa: a focal length of the first negative lens group, and
fGb: a focal length of the second negative lens group.

The conditional expression (1) is a conditional expression for defining an adequate range for a ratio of focal lengths between the second negative lens group (fourth lens group G4) and the first negative lens group (second lens group G2). When a corresponding value of the conditional expression (1) exceeds an upper limit value, the power (refractive power) of the first negative lens group is too much stronger than the power of the second negative lens group, which makes it difficult to correct spherical aberration and coma aberration in the telephoto end state. In order to ensure the effect of this embodiment, the upper limit value of the conditional expression (1) is preferably set to 2.40, and more preferably to 2.10.

When the corresponding value of the conditional expression (1) undergoes a lower limit value, the power of the second negative lens group is too much stronger than the power of the first negative lens group, which makes it difficult to correct astigmatism in the wide angle end state and spherical aberration in the telephoto end state. In order to ensure the effect of this embodiment, the lower limit value of the conditional expression (1) is preferably set to 0.60, and more preferably to 0.70.

In the zoom optical system ZL according to the first embodiment, the first negative lens group (second lens group G2) preferably includes at least partly a vibration proof group movable so as to have a displacement component in a direction perpendicular to an optical axis, and satisfies the following conditional expression (2).

$$0.93 < fVR/fGa < 2.50 \quad (2),$$

where fVR: a focal length of the vibration proof group.

The conditional expression (2) is a conditional expression for defining an adequate range for a ratio of focal lengths between the vibration proof group and the first negative lens group (second lens group G2). By satisfying the conditional expression (2), correction of the eccentric coma aberration and the eccentric curvature of field when the shake compensation is performed may be successfully corrected. Also, the lateral chromatic aberration and the distortion in the wide angle end state may be successfully corrected. In addition, the power of the first negative lens group is secured without increasing the power of the vibration proof group too much so that a zooming rate may be gained. For example, a zooming rate of three times or more, preferably, a zooming rate of four times of more may be achieved.

When a corresponding value of the conditional expression (2) exceeds an upper limit value, the power of the first negative lens group is too much stronger than the power of the vibration proof group, which makes it difficult to correct lateral chromatic aberration and distortion in the wide angle end state. In order to ensure the effect of this embodiment, the upper limit value of the conditional expression (2) is preferably set to 2.10, and more preferably to 1.70.

When the corresponding value of the conditional expression (2) undergoes the lower limit value, the power of the vibration proof group is too much stronger than the power of the first negative lens group, which makes it difficult to correct the eccentric coma aberration and the eccentric curvature of field when shake compensation is performed. In order to ensure the effect of this embodiment, the lower limit value of the conditional expression (2) is preferably set to 1.00.

In the zoom optical system ZL according to the first embodiment, the second negative lens group (fourth lens group G4) preferably comprises a positive lens and a negative lens which are disposed in order from an object, and an air distance is present between the positive lens and the negative lens, and satisfies the following conditional expression (3).

$$0.001 < Dpn/(-fGb) < 0.400 \quad (3),$$

where

Dpn: an air distance between the positive lens and the negative lens in the second negative lens group.

The conditional expression (3) is a conditional expression for defining an adequate range for an air distance between the positive lens and the negative lens in the second negative lens group (fourth lens group G4). By satisfying the conditional expression (3), a successful aberration correction is achieved. In addition, since manufacture sensitivity of the second negative lens group is lowered, the zoom optical system ZL is easily manufactured.

When the corresponding value of the conditional expression (3) exceeds the upper limit value, the air distance between the positive lens and the negative lens in the second negative lens group increases, which makes it difficult to correct the astigmatism in the wide angle end state. In order to ensure the effect of this embodiment, the upper limit value of the conditional expression (3) is preferably set to 0.300, and more preferably to 0.200.

When the corresponding value of the conditional expression (3) undergoes the lower limit value, the air distance between the positive lens and the negative lens in the second negative lens group decreases, which makes it difficult to correct the coma aberration in the telephoto end state. In order to ensure the effect of this embodiment, the lower limit value of the conditional expression (3) is preferably set to 0.003, and more preferably to 0.005.

In the zoom optical system ZL according to the first embodiment, the first negative lens group (second lens group G2) may include at least partly a vibration proof group movable so as to have a displacement component in a direction perpendicular to an optical axis, the vibration proof group may consist of a positive lens, a first negative lens, and a second negative lens disposed in order from an object, an air distance may be present between the positive lens and the first negative lens, and an air distance may be present between the first negative lens and the second negative lens. Accordingly, the eccentric coma aberration and the eccentric curvature of field when the shake compensation is performed may be successfully corrected. Also, the lateral chromatic aberration and the distortion in the wide angle end state may be successfully corrected. Also, in the vibration proof group, a positive lens is disposed on an object side with respect to the first negative lens and the second negative lens, and thus reduction in diameter of the vibration proof group is enabled.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming. Accordingly, the distance between the first negative lens group and the intermediate lens group changes, and the distance between the intermediate lens group and the second negative lens group changes during zooming, and thus a high zooming rate is obtained.

Preferably, the zoom optical system ZL according to the first embodiment includes: an object side lens group (first lens group G1) disposed on the object side with respect to the first negative lens group (second lens group G2) and having a positive refractive power, and the distance between the object side lens group and the first negative lens group changes during zooming. Accordingly, the distance between the object side lens group and the first negative lens group changes during zooming, and thus a high zooming rate is achieved.

Preferably, the zoom optical system ZL according to the first embodiment includes: an image side lens group (fifth lens group G5) disposed closer to an image than the second negative lens group (fourth lens group G4), and the distance between the second negative lens group and the image side lens group changes during zooming. Accordingly, the distance between the second negative lens group and the image side lens group changes during zooming, and thus a high zooming rate is achieved.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and an aperture stop S is disposed between the first negative lens group and the intermediate lens group. Accordingly, the astigmatism, the coma aberration, and the lateral chromatic aberration may be successfully corrected.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and the intermediate lens group consists of the object side subgroup having a positive refractive power and the image side subgroup having a positive refractive power disposed in order from an object, and when a lens component including a negative lens is disposed at a position closest to the object in the image side subgroup (in each example of the following description, the object side subgroup and the image side subgroup in such a case are referred to as first object side subgroup and first image side subgroup), the following conditional expression (4) is satisfied.

$$0.06 < fa/fb < 1.20 \quad (4),$$

where
fa: a focal length of object side subgroup, and
fb: a focal length of image side subgroup.

The conditional expression (4) is a conditional expression for defining an adequate range for a ratio of focal lengths between the object side subgroup and the image side subgroup of the intermediate lens group (third lens group G3). By satisfying the conditional expression (4), the axial chromatic aberration and the spherical aberration are successfully corrected. It should be noted that, in each embodiment, the lens component indicates a single lens or a cemented lens.

When the corresponding value of the conditional expression (4) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (4) is preferably set to 1.00, and more preferably to 0.80.

When the corresponding value of the conditional expression (4) undergoes the lower limit value, the power of the object side subgroup is too much stronger than the power of the image side subgroup, which makes it difficult to correct the spherical aberration. In order to ensure the effect of this embodiment, the lower limit value of the conditional expression (4) is preferably set to 0.08, and more preferably to 0.10.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and the intermediate lens group consists of the object side subgroup having a positive refractive power and the image side subgroup having a positive refractive power disposed in order from an object, and when the air distance between the object side subgroup and the image side subgroup is the maximum air distance between the air distance between lenses in the intermediate lens group, (in each example of the following description, the object side subgroup and the image side subgroup in such a case are referred to as second object side subgroup and second image side subgroup), the following conditional expression (5) is satisfied.

$$0.06 < fa/f\beta < 2.60 \qquad (5),$$

where
fa: a focal length of object side subgroup, and
fβ: a focal length of image side subgroup.

The conditional expression (5) is a conditional expression for defining an adequate range for a ratio of focal lengths between the object side subgroup and the image side subgroup of the intermediate lens group (third lens group G3). By satisfying the conditional expression (5), the axial chromatic aberration and the spherical aberration are successfully corrected.

When the corresponding value of the conditional expression (5) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (5) is preferably set to 2.20, and more preferably to 1.80.

When the corresponding value of the conditional expression (5) undergoes the lower limit value, the power of the object side subgroup is too much stronger than the power of the image side subgroup, which makes it difficult to correct the spherical aberration. In order to ensure the effect of this embodiment, the lower limit value of the conditional expression (5) is preferably set to 0.08, and more preferably to 0.10.

In the zoom optical system ZL according to the first embodiment, the first negative lens group (second lens group G2) may include partly a vibration proof group movable so as to have a displacement component in a direction perpendicular to an optical axis, the first negative lens group may consist of a negative subgroup having a negative refractive power and the vibration proof group described above and having a negative refractive power disposed in order from an object, and a lens component including a positive lens may be disposed at a position closest to the image in the vibration proof group. Accordingly, the eccentric coma aberration and the eccentric curvature of field when the shake compensation is performed may be successfully corrected. Also, the lateral chromatic aberration and the distortion in the wide angle end state may be successfully corrected.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and the following conditional expression (6) is satisfied.

$$0.40 < fGc/(-fGa) < 2.60 \qquad (6),$$

where,
fGc: a focal length of an intermediate lens group.

The conditional expression (6) is a conditional expression for defining an adequate range for a ratio of focal lengths between the intermediate lens group (third lens group G3) and the first negative lens group (second lens group G2). When a corresponding value of the conditional expression (6) exceeds an upper limit value, the power of the first negative lens group is too much stronger than the power of the intermediate lens group, which makes it difficult to correct the astigmatism in the wide angle end state. In order to ensure the effect of this embodiment, the upper limit value of the conditional expression (6) is preferably set to 2.20, and more preferably to 1.80.

When a corresponding value of the conditional expression (6) undergoes a lower limit value, the power of the intermediate lens group is too much stronger than the power of the first negative lens group, which makes it difficult to correct the astigmatism in the telephoto end state. In order to ensure the effect of this embodiment, the lower limit value of the conditional expression (6) is preferably set to 0.55, and more preferably to 0.70.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and the following conditional expression (7) is satisfied.

$$0.20 < fGc/(-fGb) < 2.40 \qquad (7)$$

where,
fGc: a focal length of an intermediate lens group.

The conditional expression (7) is a conditional expression for defining an adequate range for a ratio of focal lengths between the intermediate lens group (third lens group G3) and the second negative lens group (fourth lens group G4). When a corresponding value of the conditional expression (7) exceeds an upper limit value, the power of the second negative lens group is too much stronger than the power of the intermediate lens group, which makes it difficult to correct the coma aberration in the wide angle end state. In order to ensure the effect of this embodiment, the upper limit value of the conditional expression (7) is preferably set to 2.00, and more preferably to 1.60.

When a corresponding value of the conditional expression (7) undergoes a lower limit value, the power of the intermediate lens group is too much stronger than the power of the second negative lens group, which makes it difficult to correct the astigmatism in the telephoto end state. In order to ensure the effect of this embodiment, the lower limit value of the conditional expression (7) is preferably set to 0.30, and more preferably to 0.40.

Preferably, the zoom optical system ZL according to the first embodiment includes: an object side lens group (first lens group G1) disposed on the object side with respect to the first negative lens group (second lens group G2) and having a positive refractive power, and the distance between the object side lens group and the first negative lens group changes during zooming, and the following conditional expression (8) is satisfied.

$$0.30 < |mda|/fw < 2.30 \qquad (8),$$

where
|mda|: an absolute value of the amount of change in distance from a lens surface closest to an image in the object side lens group to a lens surface closest to an object in the first negative lens group on the optical axis during zooming from the wide angle end state to the telephoto end state, and fw: a focal length of the zoom optical system ZL in the wide angle end state.

The conditional expression (8) is a conditional expression for defining an adequate range for variable magnification burden of the first negative lens group (second lens group G2). When the corresponding value of the conditional expression (8) exceeds the upper limit value, the amount of change (absolute value) in distance between the object side lens group (first lens group G1) and the first negative lens group (second lens group G2) increases. Therefore, the variable magnification burden of the first negative lens group increases, which makes it difficult to correct the coma aberration and the curvature of field. In order to ensure the effect of this embodiment, the upper limit value of the conditional expression (8) is preferably set to 1.90, and more preferably to 1.50.

When the corresponding value of the conditional expression (8) undergoes the lower limit value, the amount of change (absolute value) in distance between the object side lens group and the first negative lens group is too small to secure a high zooming rate. In order to secure a zooming rate in a state in which the corresponding value of the conditional expression (8) undergoes the lower limit value, the power of the first negative lens group needs to be stronger, which makes it difficult to correct the spherical aberration and the coma aberration. In order to ensure the effect of this embodiment, the lower limit value of the conditional expression (8) is preferably set to 0.40, and more preferably to 0.50.

Preferably, the zoom optical system ZL according to the first embodiment includes: an intermediate lens group (third lens group G3) disposed between the first negative lens group (second lens group G2) and the second negative lens group (fourth lens group G4), and the distance between the first negative lens group and the intermediate lens group changes, and the distance between the intermediate lens group and the second negative lens group changes during zooming, and the following conditional expression (9) is satisfied.

$$0.050<|mcb|/fw<0.750 \quad (9),$$

where

|mcb|: an absolute value of the amount of change in distance from a lens surface closest to an image in the intermediate lens group to a lens surface closest to an object in the second negative lens group on the optical axis during zooming from the wide angle end state to the telephoto end state, and fw: a focal length of the zoom optical system ZL in the wide angle end state.

The conditional expression (9) is a conditional expression for achieving both the variable magnification burden and the aberration correction effect of the second negative lens group (fourth lens group G4). When the corresponding value of the conditional expression (9) exceeds the upper limit value, the amount of change (absolute value) in distance between the intermediate lens group (third lens group G3) and the second negative lens group (fourth lens group G4) increases. Therefore, the variable magnification burden of the second negative lens group increases, which makes it difficult to correct spherical aberration in the telephoto end state and astigmatism in the wide angle end state. In order to ensure the effect of this embodiment, the upper limit value of the conditional expression (9) is preferably set to 0.650, and more preferably to 0.550.

When the lower limit value of the corresponding value of the conditional expression (9) undergoes the lower limit value, the amount of change (absolute value) in distance between the intermediate lens group and the second negative lens group decreases, and thus the aberration correction effect of change in distance between the intermediate lens group and the second negative lens group is less likely achieved. Therefore, achievement of both the aberration correction in the telephoto end state and the aberration correction in the wide angle end state is difficult, which makes it difficult to correct the spherical aberration and astigmatism in the wide angle end state. In order to ensure the effect of this embodiment, the lower limit value of the conditional expression (9) is preferably set to 0.065, and more preferably to 0.080.

Preferably, the zoom optical system ZL according to the first embodiment includes: an aperture stop S disposed between the first negative lens group (second lens group G2) and the second negative lens group (fourth lens group G4), and a lens group (third lens group G3) having a positive lens component disposed so as to oppose the image side of the aperture stop S, and a distance between the first negative lens group and a lens group having a positive lens component changes, a distance between the lens group having the positive lens component and the second negative lens group changes during zooming, and the following conditional expression (10) is satisfied.

$$0.40<fp/fGp<3.60 \quad (10),$$

where fp: a focal length of the positive lens component, and fGp: a focal length of the lens group having the positive lens component.

The conditional expression (10) is a conditional expression defining an adequate range of a focal length of the positive lens component disposed so as to oppose the image side of the aperture stop S. When the corresponding value of the conditional expression (10) exceeds the upper limit value, the power of the positive lens component decreases, which makes it difficult to correct the spherical aberration and the coma aberration. In order to ensure the effect of this embodiment, the upper limit value of the conditional expression (10) is preferably set to 3.00, and more preferably to 2.60.

When the corresponding value of the conditional expression (10) undergoes the lower limit value, the power of the positive lens component increases, and thus, which is advantageous for correction of various aberrations such as spherical aberration as a representative example. However, it is not preferable because deterioration of optical performance becomes prominent when the positive lens component is deviated due to assembly accuracy at the time of manufacture. In order to ensure the effect of this embodiment, the lower limit value of the conditional expression (10) is preferably set to 0.50, and more preferably to 0.60.

Preferably, the zoom optical system ZL according to the first embodiment includes: an aperture stop S disposed between the first negative lens group (second lens group G2) and the second negative lens group (fourth lens group G4), and a lens group (third lens group G3) having a positive lens component disposed so as to oppose the image side of the aperture stop S, and a distance between the first negative lens group and a lens group having a positive lens component changes, a distance between the lens group having the positive lens component and the second negative lens group changes during zooming, and the following conditional expression (11) is satisfied.

$$0.40<LS/LGp<0.90 \quad (11),$$

where

LS: a sum of air distances on the image side of the positive lens component in the lens group having the positive lens component, and LGp: a thickness of the lens group having the positive lens component on the optical axis.

The conditional expression (11) is a conditional expression defining an adequate range of the thickness of the lens group having the positive lens component on the optical axis. When the corresponding value of the conditional expression (11) exceeds the upper limit value, the power of the lens surface closer to an image than the positive lens component becomes stronger in the lens group having the positive lens component, which makes it difficult to correct the coma aberration in the telephoto end state and the astigmatism in the wide angle end state. In order to ensure the effect of this embodiment, the upper limit value of the conditional expression (11) is preferably set to 0.80, and more preferably to 0.70.

When the corresponding value of the conditional expression (11) undergoes the lower limit value, the power of the lens surface closer to an image than the positive lens component becomes weaker in the lens group having the positive lens component, which makes it difficult to correct the coma aberration in the telephoto end state and the astigmatism in the wide angle end state. In order to ensure the effect of this embodiment, the lower limit value of the conditional expression (11) is preferably set to 0.42, and more preferably to 0.435.

Preferably, the zoom optical system ZL according to the first embodiment includes: an aperture stop S disposed between the first negative lens group (second lens group G2) and the second negative lens group (fourth lens group G4), and a lens group (third lens group G3) having a positive lens component disposed so as to oppose the image side of the aperture stop S, and a distance between the first negative lens group and a lens group having a positive lens component changes, a distance between the lens group having the positive lens component and the second negative lens group changes during zooming, and at least one lens surface of the positive lens component has an aspherical surface, and the following conditional expression (12) is satisfied.

$$0.15 < 100 \times (\Delta/\varphi) < 1.30 \quad (12),$$

where $\varphi$: a maximum effective diameter of the lens surface on the object side of the positive lens component, and $\Delta$: an absolute value between a difference between the aspherical amount at a position corresponding to the maximum effective diameter of the lens surface on the object side in the positive lens component and the aspherical amount at a position corresponding to the maximum effective diameter of the lens surface on the image side in the positive lens component.

The conditional expression (12) is a conditional expression defining an adequate range of an aspherical amount (sag amount) of the positive lens component disposed so as to oppose the image side of the aperture stop S. It should be noted that the effective diameter of the lens surface on the object side in the positive lens component or the effective diameter of the lens surface on the image side becomes the maximum effective diameter upon focusing on infinity in the telephoto end state. However, the invention is not limited thereto. Also, the aspherical surface may be formed only on the lens surface on the object side of the positive lens component, may be formed only on the lens surface on the image side of the positive lens component, or may be formed on lens surfaces on both sides of the positive lens component. In other words, as described above, the aspherical surface needs only be formed on at least one of the lens surfaces of the positive lens component.

When the corresponding value of the conditional expression (12) exceeds the upper limit value, the aspherical amount of the positive lens component increases, and thus, which is advantageous for correction of various aberrations such as spherical aberration as a representative example. However, it is not preferable because deterioration of optical performance becomes prominent when the positive lens component is deviated due to assembly accuracy at the time of manufacture. In order to ensure the effect of this embodiment, the upper limit value of the conditional expression (12) is preferably set to 1.00, and more preferably to 0.80.

When the corresponding value of the conditional expression (12) undergoes the lower limit value, the aspherical amount of the positive lens component decreases, which makes it difficult to correct the spherical aberration and the coma aberration. In order to ensure the effect of this embodiment, the lower limit value of the conditional expression (12) is preferably set to 0.20, and more preferably to 0.25.

Figure 49:
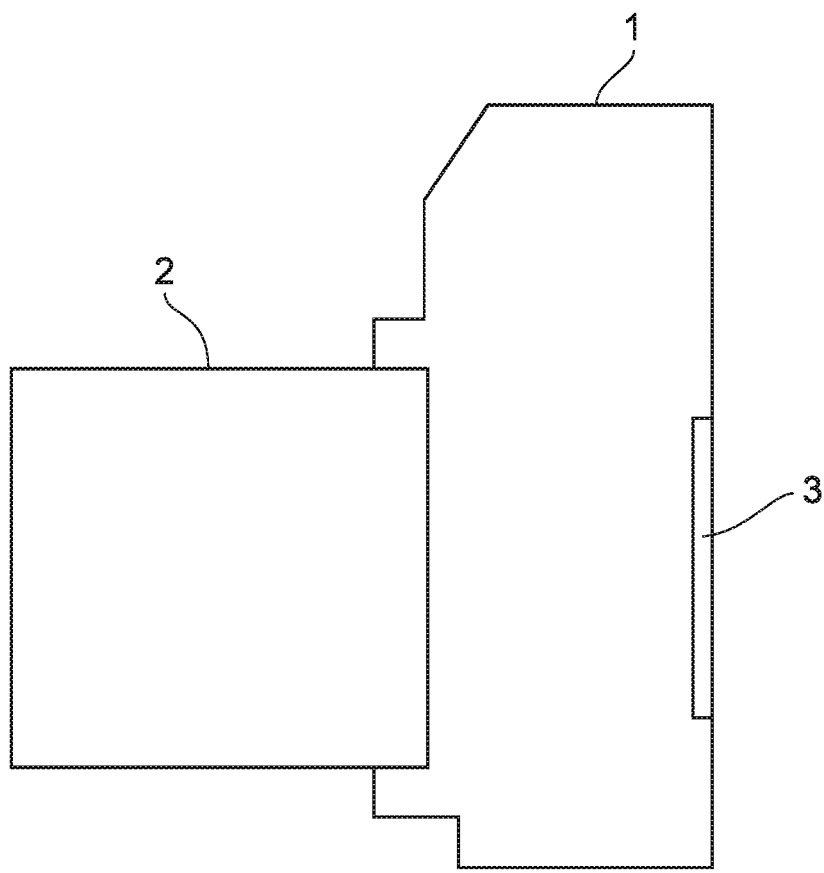
FIG. 49 is a drawing illustrating a configuration of a camera provided with the zoom optical system according to each embodiment.

An optical apparatus according to the first embodiment is configured with the zoom optical system having a configuration described above. As a specific example, a camera (optical apparatus) provided with the zoom optical system ZL according to the first embodiment will be described with reference to FIG. 49. The camera 1 is a digital camera provided with the zoom optical system according to the embodiment described above as an imaging lens 2 as illustrated in FIG. 49. In this camera 1, light from an object (subject) not illustrated is converged by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the first embodiment as the imaging lens, an optical apparatus having an improved optical performance in the wide angle end state and having a wider angle of view is achieved.

Figure 50:
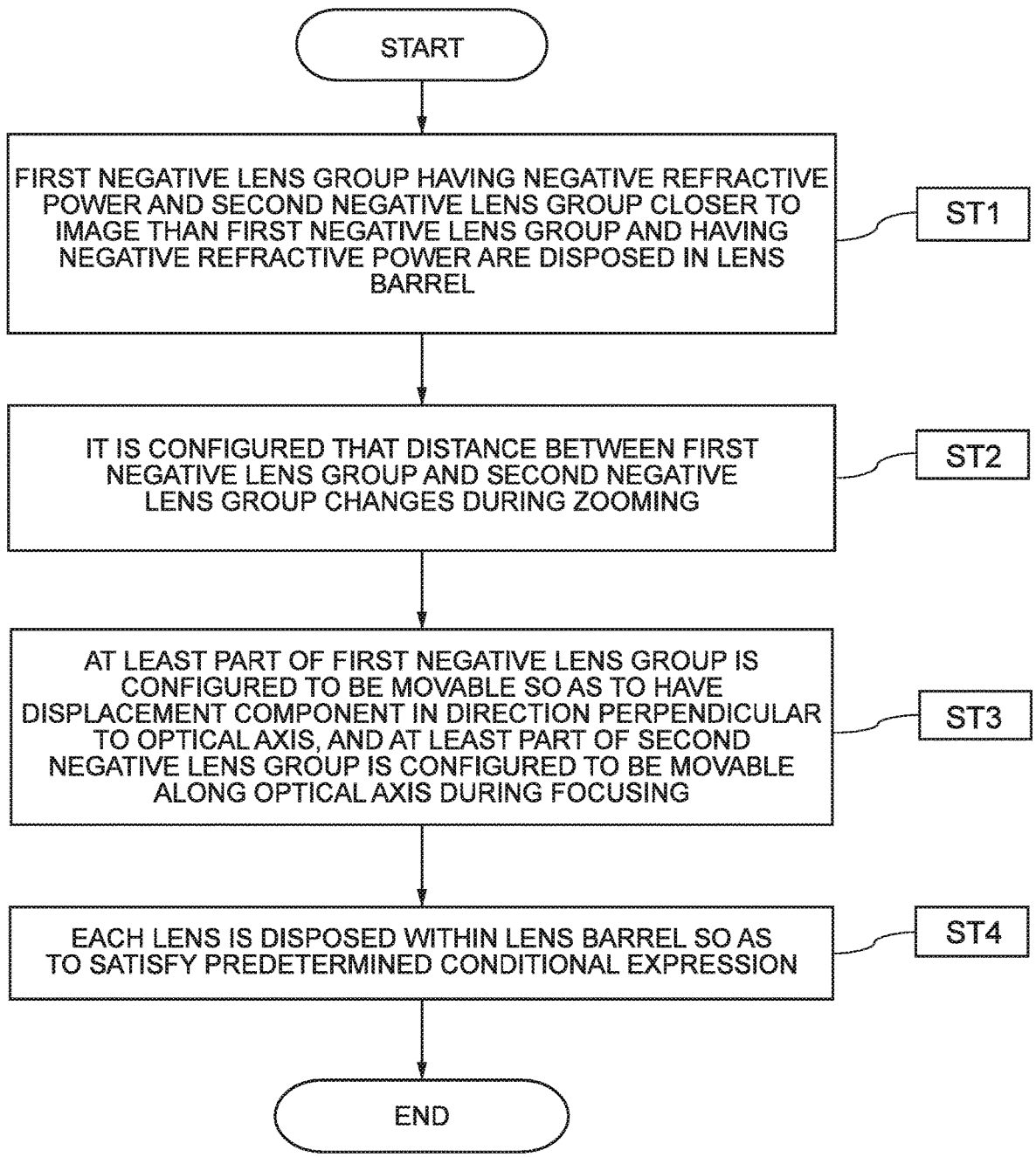
FIG. 50 is a flowchart illustrating a method for manufacturing a zoom optical system according to a first embodiment.

Subsequently, an outline of a method for manufacturing the zoom optical system ZL according to the first embodiment will be described with reference to FIG. 50. First, a first negative lens group (second lens group G2) having a negative refractive power and a second negative lens group (fourth lens group G4) closer to an image than the first negative lens group and having a negative refractive power are disposed in a lens barrel (Step ST1). It is configured that the distance between the first negative lens group and the second negative lens group is changed during zooming (Step ST2). At least part of the first negative lens group is configured to be movable so as to have a displacement component in a direction perpendicular to the optical axis, and at least part of the second negative lens group is configured to be movable along the optical axis during focusing (Step ST3). In addition, each lens is arranged within a lens barrel so as to satisfy at least the aforementioned conditional expression (1) (Step ST4). According to the manufacturing method as described above, the optical performance in a wide angle end state is improved, and thus a telephoto type zoom optical system having a wider angle of view may be manufactured.

Second Embodiment

Next, a zoom optical system and an optical apparatus according to a second embodiment will now be described with reference to the drawings. A zoom optical system ZL (1) as an example of the zoom optical system (zoom lens) ZL according to the second embodiment comprises: as illustrated in FIG. 1, a first lens group G1 having a positive refractive power, a second lens group G2 disposed closer to an image than the first lens group G1 and having a negative refractive power, a third lens group G3 disposed closer to an image than the second lens group G2 and having a positive refractive power, and a fourth lens group G4 disposed closer to an image than the third lens group G3 and having a negative refractive power. A distance between the first lens group G1 and the second lens croup G2 changes, a distance between the second lens group G2 and the third lens group G3 changes, and a distance between the third lens group G3 and the fourth lens group G4 changes during zooming. The second lens group G2 may be configured to include at least partly a vibration proof group movable so as to have a displacement component in a direction perpendicular to an optical axis. The fourth lens group G4 is configured to include a positive lens and a negative lens disposed in order from an object. It should be noted that an air distance is present between the positive lens and the negative lens.

The zoom optical system ZL according to the second embodiment may be a zoom optical system ZL (2) illustrated in FIG. 5, may be a zoom optical system ZL (3) illustrated in FIG. 9; may be a zoom optical system ZL (4) illustrated in FIG. 13; may be a zoom optical system ZL (5) illustrated in FIG. 17; and may be a zoom optical system ZL (6) illustrated in FIG. 21. Also, the zoom optical system ZL according to the second embodiment may be a zoom optical system ZL (7) illustrated in FIG. 25; may be a zoom optical system ZL (8) illustrated in FIG. 29; may be a zoom optical system ZL (9) illustrated in FIG. 33; may be a zoom optical system ZL (10) illustrated in FIG. 37; and may be a zoom optical system ZL (11) illustrated in FIG. 41. It should be noted that groups from the zoom optical system ZL (2) to ZL (11) illustrated in FIG. 5 or other drawings are configured in the same manner as the zoom optical system ZL (1) illustrated in FIG. 1.

The zoom optical system ZL according to the second embodiment having the configuration described above satisfies the following conditional expressions. Accordingly, a telephoto type zoom optical system having a higher zooming rate is achieved.

$$0.001 < Dpn/(-f4) < 0.400 \tag{13}$$

$$0.93 < fVR/f2 < 2.50 \tag{14}$$

where

Dpn: an air distance between the positive lens and the negative lens in the fourth lens group G4, f4: a focal length of the fourth lens group G4, fVR: a focal length of the vibration proof group, and f2: a focal length of the second lens group G2.

The conditional expression (13) is a conditional expression for defining an adequate range for an air distance between the positive lens and the negative lens in the fourth lens group G4. When the corresponding value of the conditional expression (13) exceeds the upper limit value, the air distance between the positive lens and the negative lens in the fourth lens group G4 increases, which makes it difficult to correct the astigmatism in the wide angle end state. In order to ensure the effect of this embodiment, the upper limit value of the conditional expression (13) is preferably set to 0.300, and more preferably to 0.200.

When the corresponding value of the conditional expression (13) undergoes the lower limit value, the air distance between the positive lens and the negative lens in the fourth lens group G4 decreases, which makes it difficult to correct the coma aberration in the telephoto end state. In order to ensure the effect of this embodiment, the lower limit value of the conditional expression (13) is preferably set to 0.003, and more preferably to 0.005.

The conditional expression (14) is a conditional expression for defining an adequate range for a ratio of focal lengths between the vibration proof group and the second lens group G2. By satisfying the conditional expression (14), the eccentric coma aberration and the eccentric curvature of field when the shake compensation is performed may be successfully corrected. Also, the lateral chromatic aberration and the distortion in the wide angle end state may be successfully corrected.

When a corresponding value of the conditional expression (14) exceeds an upper limit value, the power of the second lens group G2 is too much stronger than the power of the vibration proof group, which makes it difficult to correct lateral chromatic aberration and distortion in the wide angle end state. In order to ensure the effect of this embodiment, the upper limit value of the conditional expression (14) is preferably set to 2.10, and more preferably to 1.70.

When the corresponding value of the conditional expression (14) undergoes the lower limit value, the power of the vibration proof group is too much stronger than the power of the second lens group G2, which makes it difficult to correct the eccentric coma aberration and the eccentric curvature of field when shake compensation is performed. In order to ensure the effect of this embodiment, the lower limit value of the conditional expression (14) is preferably set to 1.00.

Preferably, in the zoom optical system ZL according to the second embodiment, during focusing, at least part of the lenses in the fourth lens group G4 move along the optical axis. Accordingly, variations in chromatic aberration and variation in spherical aberration during focusing may be successfully corrected.

Preferably, in the zoom optical system ZL according to the second embodiment, the following conditional expression (15) is satisfied.

$$0.40 < f4/f2 < 4.00 \tag{15}$$

where f4: a focal length of the fourth lens group G4, and f2: a focal length of the second lens group G2.

The conditional expression (15) is a conditional expression for defining an adequate range for a ratio of focal lengths between the fourth lens group G4 and the second lens group G2. When a corresponding value of the conditional expression (15) exceeds an upper limit value, the power (refractive power) of the second lens group G2 is too much stronger than the power of the fourth lens group G4, which makes it difficult to correct spherical aberration and coma aberration in the telephoto end state. In order to ensure the effect of this embodiment, the upper limit value of the conditional expression (15) is preferably set to 3.25, and more preferably to 2.50.

When the corresponding value of the conditional expression (15) undergoes a lower limit value, the power of the fourth lens group G4 is too much stronger than the power of the second lens group G2, which makes it difficult to correct astigmatism in the wide angle end state and spherical aberration in the telephoto end state. In order to ensure the effect of this embodiment, the lower limit value of the conditional expression (15) is preferably set to 0.55, and more preferably to 0.70.

Preferably, in the zoom optical system ZL according to the second embodiment, an aperture stop S is disposed between the second lens group G2 and the third lens group G3. Accordingly, the astigmatism, the coma aberration, and the lateral chromatic aberration may be successfully corrected.

Preferably, in the zoom optical system ZL according to the second embodiment, when the third lens group G3 consists of an object side subgroup having a positive refractive power and an image side subgroup having a positive refractive power disposed in order from an object, and a lens component including the negative lens is disposed at a position closest to the object in the image side subgroup, (in each example of the following description, the object side subgroup and the image side subgroup in such a case are referred to as first object side subgroup and first image side subgroup), the following conditional expression (16) is satisfied.

$$0.06 < f3a/f3b < 1.20 \tag{16}$$

where
f3a: a focal length of object side subgroup, and
f3b: a focal length of image side subgroup.

The conditional expression (16) is a conditional expression for defining an adequate range for a ratio of focal lengths between the object side subgroup and the image side subgroup in the third lens group G3. By satisfying the conditional expression (16), the axial chromatic aberration and the spherical aberration are successfully corrected.

When the corresponding value of the conditional expression (16) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (16) is preferably set to 1.00, and more preferably to 0.80.

When the corresponding value of the conditional expression (16) undergoes the lower limit value, the power of the object side subgroup is too much stronger than the power of the image side subgroup, which makes it difficult to correct the spherical aberration. In order to ensure the effect of this embodiment, the lower limit value of the conditional expression (16) is preferably set to 0.08, and more preferably to 0.10.

Preferably, in the zoom optical system ZL according to the second embodiment, the third lens group G3 consists of the object side subgroup having a positive refractive power and the image side subgroup having a positive refractive power disposed in order from an object, and when the air distance between the object side subgroup and the image side subgroup is the maximum air distance between the distance between lenses in the third lens group G3, (in each example of the following description, the object side subgroup and the image side subgroup in such a case are referred to as second object side subgroup and second image side subgroup), the following conditional expression (17) is satisfied.

$$0.06 < f3\alpha/f3\beta < 2.60 \tag{17}$$

where
f3α: a focal length of object side subgroup, and
f3β: a focal length of image side subgroup.

The conditional expression (17) is a conditional expression for defining an adequate range for a ratio of focal lengths between the object side subgroup and the image side subgroup in the third lens group G3. By satisfying the conditional expression (17), the axial chromatic aberration and the spherical aberration are successfully corrected.

When the corresponding value of the conditional expression (17) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (17) is preferably set to 2.20, and more preferably to 1.80.

When the corresponding value of the conditional expression (17) undergoes the lower limit value, the power of the object side subgroup is too much stronger than the power of the image side subgroup, which makes it difficult to correct the spherical aberration. In order to ensure the effect of this embodiment, the lower limit value of the conditional expression (17) is preferably set to 0.08, and more preferably to 0.10.

In the zoom optical system ZL according to the second embodiment, the second lens group G2 may consist of a negative subgroup having a negative refractive power and the vibration proof group described above and having a negative refractive power disposed in order from an object, and a lens component including a positive lens may be disposed at a position closest to the image in the vibration proof group. Accordingly, the eccentric coma aberration and the eccentric curvature of field when the shake compensation is performed may be successfully corrected. Also, the lateral chromatic aberration and the distortion in the wide angle end state may be successfully corrected.

In the zoom optical system ZL according to the second embodiment, the vibration proof group may consist of a positive lens, a first negative lens, and a second negative lens disposed in order from an object, an air distance may be present between the positive lens and the first negative lens, and an air distance may be present between the first negative lens and the second negative lens. Accordingly, the eccentric coma aberration and the eccentric curvature of field when the shake compensation is performed may be successfully corrected. Also, the lateral chromatic aberration and the distortion in the wide angle end state may be successfully corrected.

Preferably, in the zoom optical system ZL according to the second embodiment, the following conditional expression (18) is satisfied.

$$0.40 < f3/(-f2) < 2.60 \tag{18}$$

where,
f3: a focal length of the third lens group G3, and
f2: a focal length of the second lens group G2.

The conditional expression (18) is a conditional expression for defining an adequate range for a ratio of focal lengths between the third lens group G3 and the second lens group G2. When a corresponding value of the conditional expression (18) exceeds an upper limit value, the power of the second lens group G2 is too much stronger than the power of the third lens group G3, which makes it difficult to correct the astigmatism in the wide angle end state. In order to ensure the effect of this embodiment, the upper limit value of the conditional expression (18) is preferably set to 2.20, and more preferably to 1.80.

When a corresponding value of the conditional expression (18) undergoes a lower limit value, the power of the third lens group G3 is too much stronger than the power of the second lens group G2, which makes it difficult to correct the astigmatism in the telephoto end state. In order to ensure the effect of this embodiment, the lower limit value of the conditional expression (18) is preferably set to 0.55, and more preferably to 0.70.

Preferably, in the zoom optical system ZL according to the second embodiment, the following conditional expression (19) is satisfied.

$$0.20 < f3/(-f4) < 2.40 \quad (19),$$

where
f3: a focal length of the third lens group G3, and
f4: a focal length of the fourth lens group G4.

The conditional expression (19) is a conditional expression for defining an adequate range for a ratio of focal lengths between the third lens group G3 and the fourth lens group G4. When a corresponding value of the conditional expression (19) exceeds an upper limit value, the power of the fourth lens group G4 is too much stronger than the power of the third lens group G3, which makes it difficult to correct the coma aberration in the wide angle end state. In order to ensure the effect of this embodiment, the upper limit value of the conditional expression (19) is preferably set to 2.00, and more preferably to 1.60.

When a corresponding value of the conditional expression (19) undergoes a lower limit value, the power of the third lens group G3 is too much stronger than the power of the fourth lens group G4, which makes it difficult to correct the astigmatism in the telephoto end state. In order to ensure the effect of this embodiment, the lower limit value of the conditional expression (19) is preferably set to 0.30, and more preferably to 0.40.

Preferably, in the zoom optical system ZL according to the second embodiment, the following conditional expression (20) is satisfied.

$$0.30 < |m12|/fw < 2.30 \quad (20),$$

where,
$|m12|$: an absolute value of the amount of change in distance from a lens surface closest to an image in the first lens group G1 to a lens surface closest to an object in the second lens group G2 on the optical axis during zooming from the wide angle end state to the telephoto end state, and
fw: a focal length of the zoom optical system ZL in the wide angle end state.

The conditional expression (20) is a conditional expression for defining an adequate range for variable magnification burden of the second lens group G2. When the corresponding value of the conditional expression (20) exceeds the upper limit value, the amount of change (absolute value) in distance between the first lens group G1 and the second lens group G2 increases. Therefore, the variable magnification burden of the second lens group G2 increases, which makes it difficult to correct the coma aberration and the curvature of field. In order to ensure the effect of this embodiment, the upper limit value of the conditional expression (20) is preferably set to 1.90, and more preferably to 1.50.

When the corresponding value of the conditional expression (20) undergoes the lower limit value, the amount of change (absolute value) in distance between the first lens group G1 and the second lens group G2 is too small to secure a high zooming rate. In order to secure a zooming rate in a state in which the corresponding value of the conditional expression (20) undergoes the lower limit value, the power of the second lens group G2 needs to be stronger, which makes it difficult to correct the spherical aberration and the coma aberration. In order to ensure the effect of this embodiment, the lower limit value of the conditional expression (20) is preferably set to 0.40, and more preferably to 0.50.

Preferably, in the zoom optical system ZL according to the second embodiment, the following conditional expression (21) is satisfied.

$$0.050 < |m34|/fw < 0.750 \quad (21)$$

where
$|m34|$: an absolute value of the amount of change in distance from a lens surface closest to an image in the third lens group G3 to a lens surface closest to an object in the fourth lens group G4 on the optical axis during zooming from the wide angle end state to the telephoto end state, and
fw: a focal length of the zoom optical system ZL in the wide angle end state.

The conditional expression (21) is a conditional expression for achieving both the variable magnification burden and the aberration correction effect of the fourth lens group G4. When the corresponding value of the conditional expression (21) exceeds the upper limit value, the amount of change (absolute value) in distance between the third lens group G3 and the fourth lens group G4 increases. Therefore, the variable magnification burden of the fourth lens group G4 increases, which makes it difficult to correct spherical aberration in the telephoto end state and astigmatism in the wide angle end state. In order to ensure the effect of this embodiment, the upper limit value of the conditional expression (21) is preferably set to 0.650, and more preferably to 0.550.

When the lower limit value of the corresponding value of the conditional expression (21) undergoes the lower limit value, the amount of change (absolute value) in distance between the third lens group G3 and the fourth lens group G4 decreases, and thus the aberration correction effect of change in distance between the third lens group G3 and the fourth lens group G4 is less likely achieved. Therefore, achievement of both the aberration correction in the telephoto end state and the aberration correction in the wide angle end state is difficult, which makes it difficult to correct the spherical aberration and astigmatism in the wide angle end state. In order to ensure the effect of this embodiment, the lower limit value of the conditional expression (21) is preferably set to 0.065, and more preferably to 0.080.

An optical apparatus according to the second embodiment is configured with the zoom optical system having a configuration described above. As a specific example, a camera (optical apparatus) provided with the zoom optical system ZL according to the second embodiment will be described with reference to FIG. 49. The camera 1 is a digital camera provided with the zoom optical system according to the embodiment described above as an imaging lens 2 as illustrated in FIG. 49. In this camera 1, light from an object (subject) not illustrated is converged by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the second embodiment as the imaging lens, an optical apparatus having a higher zooming rate is achieved.

Figure 51:
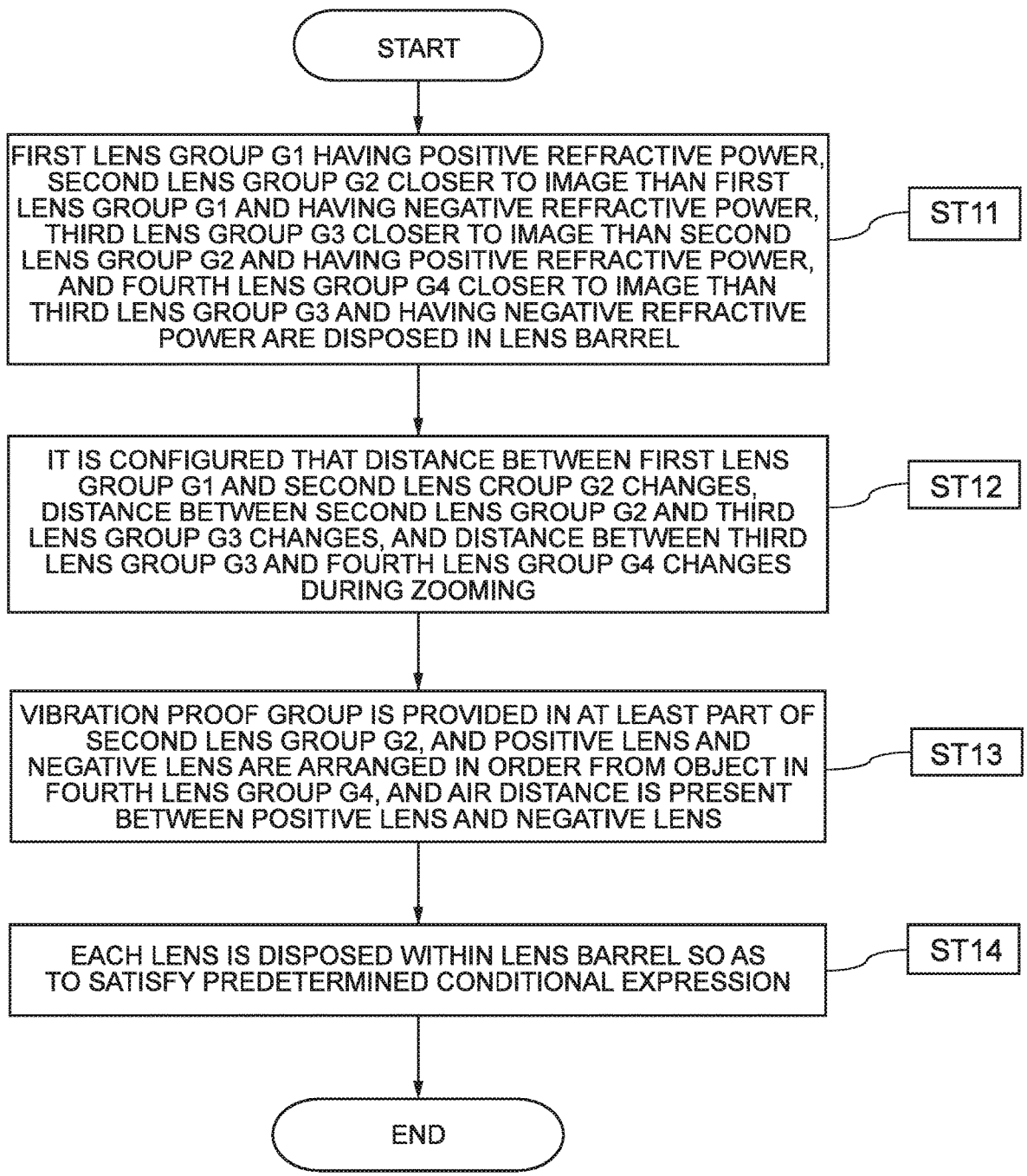
FIG. 51 is a flowchart illustrating a method for manufacturing a zoom optical system according to a second embodiment.

Subsequently, an outline of a method for manufacturing the zoom optical system ZL according to the second embodiment will be described with reference to FIG. 51. First, in a lens barrel, the first lens group G1 having a positive refractive power, the second lens group G2 closer to an image than the first lens group G1 and having a negative refractive power, the third lens group G3 closer to an image than the second lens group G2 and having a positive refractive power, and the fourth lens group G4 closer to an image than the third lens group G3 and having a negative refractive power are arranged (Step ST11). Then, it is configured that a distance between the first lens group G1 and the second lens group G2 changes, a distance between the second lens group G2 and the third lens group G3 changes, and the distance between the third lens group G3 and the fourth lens group G4 changes during zooming (Step ST12). Also, a vibration proof group movable so as to have a displacement component in a direction perpendicular to an optical axis is provided on at least part of the second lens group G2. Further, in the fourth lens group G4, a positive lens and a negative lens are arranged in order from an object and an air distance is present between the positive lens and the negative lens (Step ST13). In addition, each lens is arranged within a lens barrel so as to satisfy at least the aforementioned conditional expression (13) and the conditional expression (14) (Step ST14). With such a manufacturing method, a telephoto type zoom optical system having a higher zooming rate is manufactured.

Third Embodiment

Next, a zoom optical system and an optical apparatus according to a third embodiment will now be described with reference to the drawings. A zoom optical system ZL (9) as an example of the zoom optical system (zoom lens) ZL according to the third embodiment comprises: as illustrated in FIG. 33, a first lens group G1 having a positive refractive power, a second lens group G2 disposed closer to an image than the first lens group G1 and having a negative refractive power, a third lens group G3 disposed closer to an image than the second lens group G2 and having a positive refractive power, and a following group GR disposed closer to an image than the third lens group G3 and consisting of at least one lens group (fourth lens group G4 and fifth lens group G5). A distance between the first lens group G1 and the second lens group G2 changes, a distance between the second lens group G2 and the third lens group G3 changes, and a distance between the third lens group G3 and the following group GR changes during zooming.

Any one of the first lens group G1, the second lens group G2, the third lens group G3, and the following group GR is configured to include a vibration proof group movable so as to have a displacement component in a direction perpendicular to an optical axis. The vibration proof group consists of a positive lens, a first negative lens, and a second negative lens disposed in order from an object. It should be noted that an air distance is present between the positive lens and the first negative lens, and an air distance is present between the first negative lens and the second negative lens. Accordingly, a telephoto type zoom optical system having a small-sized vibration proof group is achieved.

Figure 41:
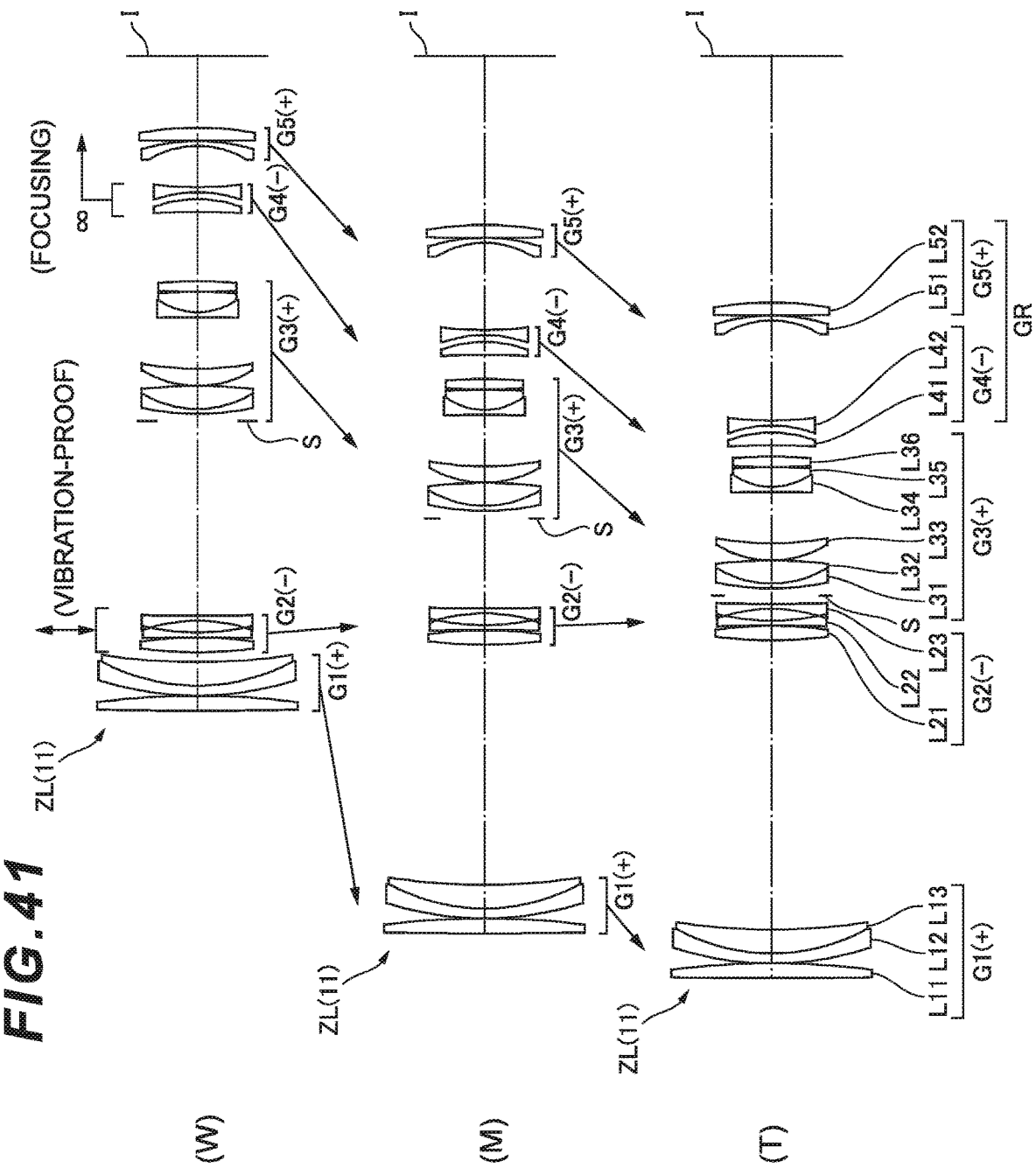
FIG. 41 is a drawing illustrating a lens configuration of a zoom optical system according to an Example 11.

The zoom optical system ZL according to the third embodiment may be a zoom optical system ZL (10) illustrated in FIG. 37; may be a zoom optical system ZL (11) illustrated in FIG. 41; and may be a zoom optical system ZL (12) illustrated in FIG. 45. It should be noted that groups from the zoom optical system ZL (10) to ZL (12) illustrated in FIG. 37 or other drawings are configured in the same manner as the zoom optical system ZL (9) illustrated in FIG. 33.

Preferably, in the zoom optical system ZL according to the third embodiment, the second lens group G2 consists of the aforementioned vibration proof group. Accordingly, the eccentric coma aberration and the eccentric curvature of field when the shake compensation is performed may be successfully corrected. Also, the lateral chromatic aberration and the distortion in the wide angle end state may be successfully corrected.

Preferably, in the zoom optical system ZL according to the third embodiment, the following group GR includes a fourth lens group G4 disposed closer to an image than the third lens group G3, and at least part of lenses in the fourth lens group G4 moves along the optical axis during focusing. Accordingly, variations in chromatic aberration and variation in spherical aberration during focusing may be successfully corrected.

Preferably, in the zoom optical system ZL according to the third embodiment, the following group GR includes a fourth lens group G4 disposed closer to an image than the third lens group G3, and the following conditional expression (22) is satisfied.

$$0.40 < |f4|/(-f2) < 4.00 \qquad (22),$$

where, f4: a focal length of the fourth lens group G4, and f2: a focal length of the second lens group G2.

The conditional expression (22) is a conditional expression for defining an adequate range for a ratio of focal lengths between the fourth lens group G4 and the second lens group G2. When a corresponding value of the conditional expression (22) exceeds an upper limit value, the power (refractive power) of the second lens group G2 is too much stronger than the power of the fourth lens group G4, which makes it difficult to correct spherical aberration and coma aberration in the telephoto end state. In order to ensure the effect of this embodiment, the upper limit value of the conditional expression (22) is preferably set to 3.30, and more preferably to 2.70.

When the corresponding value of the conditional expression (22) undergoes a lower limit value, the power of the fourth lens group G4 is too much stronger than the power of the second lens group G2, which makes it difficult to correct astigmatism in the wide angle end state and spherical aberration in the telephoto end state. In order to ensure the effect of this embodiment, the lower limit value of the conditional expression (22) is preferably set to 0.60, and more preferably to 0.80.

Preferably, in the zoom optical system ZL according to the third embodiment, an aperture stop S is disposed between the second lens group G2 and the third lens group G3. Accordingly, the astigmatism, the coma aberration, and the lateral chromatic aberration may be successfully corrected.

Preferably, in the zoom optical system ZL according to the third embodiment, the third lens group G3 consists of the object side subgroup having a positive refractive power and the image side subgroup having a positive refractive power disposed in order from an object, and when a lens component including a negative lens is disposed at a position closest to the object in the image side subgroup, (in each example of the following description, the object side subgroup and the image side subgroup in such a case are referred to as first object side subgroup and first image side subgroup), the following conditional expression (23) is satisfied.

$$0.08 < f3a/f3b < 1.20 \tag{23}$$

where,
f3a: a focal length of object side subgroup, and
f3b: a focal length of image side subgroup.

The conditional expression (23) is a conditional expression for defining an adequate range for a ratio of focal lengths between the object side subgroup and the image side subgroup in the third lens group G3. By satisfying the conditional expression (23), the axial chromatic aberration and the spherical aberration are successfully corrected. In this embodiment, the lens component indicates a single lens or a cemented lens.

When the corresponding value of the conditional expression (23) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (23) is preferably set to 1.00, and more preferably to 0.80.

When the corresponding value of the conditional expression (23) undergoes the lower limit value, the power of the object side subgroup is too much stronger than the power of the image side subgroup, which makes it difficult to correct the spherical aberration. In order to ensure the effect of this embodiment, the lower limit value of the conditional expression (23) is preferably set to 0.09, and more preferably to 0.10.

Preferably, in the zoom optical system ZL according to the third embodiment, the third lens group G3 consists of the object side subgroup having a positive refractive power and the image side subgroup having a positive refractive power disposed in order from an object, and when the air distance between the object side subgroup and the image side subgroup is the maximum air distance between the air distance between lenses in the third lens group G3, (in each example of the following description, the object side subgroup and the image side subgroup in such a case are referred to as second object side subgroup and second image side subgroup), the following conditional expression (24) is satisfied.

$$0.04 < f3\alpha/f3\beta < 1.40 \tag{24}$$

where,
f3α: a focal length of object side subgroup, and
f3β: a focal length of image side subgroup.

The conditional expression (24) is a conditional expression for defining an adequate range for a ratio of focal lengths between the object side subgroup and the image side subgroup in the third lens group G3. By satisfying the conditional expression (24), the axial chromatic aberration and the spherical aberration are successfully corrected.

When the corresponding value of the conditional expression (24) exceeds the upper limit value, the power of the image side subgroup is too much stronger than the power of the object side subgroup, which makes it difficult to correct the axial chromatic aberration. In order to ensure the effect of this embodiment, the upper limit value of the conditional expression (24) is preferably set to 1.15, and more preferably to 0.90.

When the corresponding value of the conditional expression (24) undergoes the lower limit value, the power of the object side subgroup is too much stronger than the power of the image side subgroup, which makes it difficult to correct the spherical aberration. In order to ensure the effect of this embodiment, the lower limit value of the conditional expression (24) is preferably set to 0.05, and more preferably to 0.06.

Preferably, in the zoom optical system ZL according to the third embodiment, the following group GR includes a fourth lens group G4 disposed closer to an image than the third lens group G3, and the fourth lens group G4 includes a positive lens and a negative lens disposed in order from an object, and an air distance is present between the positive lens and the negative lens. Accordingly, variations in chromatic aberration and variation in spherical aberration during focusing may be successfully corrected.

Preferably, in the zoom optical system ZL according to the third embodiment, the following conditional expression (25) is satisfied.

$$0.40 < f3/(-f2) < 2.60 \tag{25}$$

where,
f3: a focal length of the third lens group G3, and
f2: a focal length of the second lens group G2.

The conditional expression (25) is a conditional expression for defining an adequate range for a ratio of focal lengths between the third lens group G3 and the second lens group G2. When a corresponding value of the conditional expression (25) exceeds an upper limit value, the power of the second lens group G2 is too much stronger than the power of the third lens group G3, which makes it difficult to correct the astigmatism in the wide angle end state. In order to ensure the effect of this embodiment, the upper limit value of the conditional expression (25) is preferably set to 2.20, and more preferably to 1.80.

When a corresponding value of the conditional expression (25) undergoes a lower limit value, the power of the third lens group G3 is too much stronger than the power of the second lens group G2, which makes it difficult to correct the astigmatism in the telephoto end state. In order to ensure the effect of this embodiment, the lower limit value of the conditional expression (25) is preferably set to 0.55, and more preferably to 0.70.

Preferably, in the zoom optical system ZL according to the third embodiment, the following group GR includes a fourth lens group G4 disposed closer to an image than the third lens group G3, and the following conditional expression (26) is satisfied.

0.10 < f3/1f41 < 1.50 . . . (26), where,
f3: a focal length of the third lens group G3, and
f4: a focal length of the fourth lens group G4.

The conditional expression (26) is a conditional expression for defining an adequate range for a ratio of focal lengths between the third lens group G3 and the fourth lens group G4. When a corresponding value of the conditional expression (26) exceeds an upper limit value, the power of the fourth lens group G4 is too much stronger than the power of the third lens group G3, which makes it difficult to correct the coma aberration in the wide angle end state. In order to ensure the effect of this embodiment, the upper limit value of the conditional expression (26) is preferably set to 1.25, and more preferably to 1.00.

When a corresponding value of the conditional expression (26) undergoes a lower limit value, the power of the third lens group G3 is too much stronger than the power of the fourth lens group G4, which makes it difficult to correct the astigmatism in the telephoto end state. In order to ensure the effect of this embodiment, the lower limit value of the conditional expression (26) is preferably set to 0.20, and more preferably to 0.30.

Preferably, in the zoom optical system ZL according to the third embodiment, the following conditional expression (27) is satisfied.

$$0.30 < |m12|/fw < 2.30 \quad (27),$$

where,

|m12|: an absolute value of the amount of change in distance from a lens surface closest to an image in the first lens group G1 to a lens surface closest to an object in the second lens group G2 on the optical axis during zooming from the wide angle end state to the telephoto end state, and fw: a focal length of the zoom optical system ZL in the wide angle end state.

The conditional expression (27) is a conditional expression for defining an adequate range for variable magnification burden of the second lens group G2. When the corresponding value of the conditional expression (27) exceeds the upper limit value, the amount of change (absolute value) in distance between the first lens group G1 and the second lens group G2 increases. Therefore, the variable magnification burden of the second lens group G2 increases, which makes it difficult to correct the coma aberration and the curvature of field. In order to ensure the effect of this embodiment, the upper limit value of the conditional expression (27) is preferably set to 1.90, and more preferably to 1.50.

When the corresponding value of the conditional expression (27) undergoes the lower limit value, the amount of change (absolute value) in distance between the first lens group G1 and the second lens group G2 is too small to secure a high zooming rate. In order to secure a zooming rate in a state in which the corresponding value of the conditional expression (27) undergoes the lower limit value, the power of the second lens group G2 needs to be stronger, which makes it difficult to correct the spherical aberration and the coma aberration. In order to ensure the effect of this embodiment, the lower limit value of the conditional expression (27) is preferably set to 0.50, and more preferably to 0.70.

Preferably, in the zoom optical system ZL according to the third embodiment, the following group GR includes a fourth lens group G4 disposed closer to an image than the third lens group G3, and the following conditional expression (28) is satisfied.

$$0.080 < |m34|/fw < 0.800 \quad (28),$$

where,

|m34|: an absolute value of the amount of change in distance from a lens surface closest to an image in the third lens group G3 to a lens surface closest to an object in the fourth lens group G4 on the optical axis during zooming from the wide angle end state to the telephoto end state, and fw: a focal length of the zoom optical system ZL in the wide angle end state.

The conditional expression (28) is a conditional expression for achieving both the variable magnification burden and the aberration correction effect of the fourth lens group G4. When the corresponding value of the conditional expression (28) exceeds the upper limit value, the amount of change (absolute value) in distance between the third lens group G3 and the fourth lens group G4 increases. Therefore, the variable magnification burden of the fourth lens group G4 increases, which makes it difficult to correct spherical aberration in the telephoto end state and astigmatism in the wide angle end state. In order to ensure the effect of this embodiment, the upper limit value of the conditional expression (28) is preferably set to 0.650, and more preferably to 0.500.

When the lower limit value of the corresponding value of the conditional expression (28) undergoes the lower limit value, the amount of change (absolute value) in distance between the third lens group G3 and the fourth lens group G4 decreases, and thus the aberration correction effect of change in distance between the third lens group G3 and the fourth lens group G4 is less likely achieved. Therefore, achievement of both the aberration correction in the telephoto end state and the aberration correction in the wide angle end state is difficult, which makes it difficult to correct the spherical aberration and astigmatism in the wide angle end state. In order to ensure the effect of this embodiment, the lower limit value of the conditional expression (28) is preferably set to 0.130, and more preferably to 0.180.

An optical apparatus according to the third embodiment is configured with the zoom optical system having a configuration described above. As a specific example, a camera (optical apparatus) provided with the zoom optical system ZL according to the third embodiment will be described with reference to FIG. 49. The camera 1 is a digital camera provided with the zoom optical system according to the embodiment described above as an imaging lens 2 as illustrated in FIG. 49. In this camera 1, light from an object (subject) not illustrated is converged by the imaging lens 2, and reaches an image pickup device 3. Accordingly, light from the subject is imaged by the image pickup device 3, and is recorded in a memory, not illustrated, as a subject image. A photographer is allowed to photograph the subject by the camera 1 in this manner. It should be noted that the camera may be a mirror-less camera, or may be a single lens reflex type camera having a quick return mirror. In this configuration, by mounting the zoom optical system ZL according to the third embodiment as the imaging lens, a small-sized optical apparatus including a small-sized vibration proof group is achieved.

Figure 52:
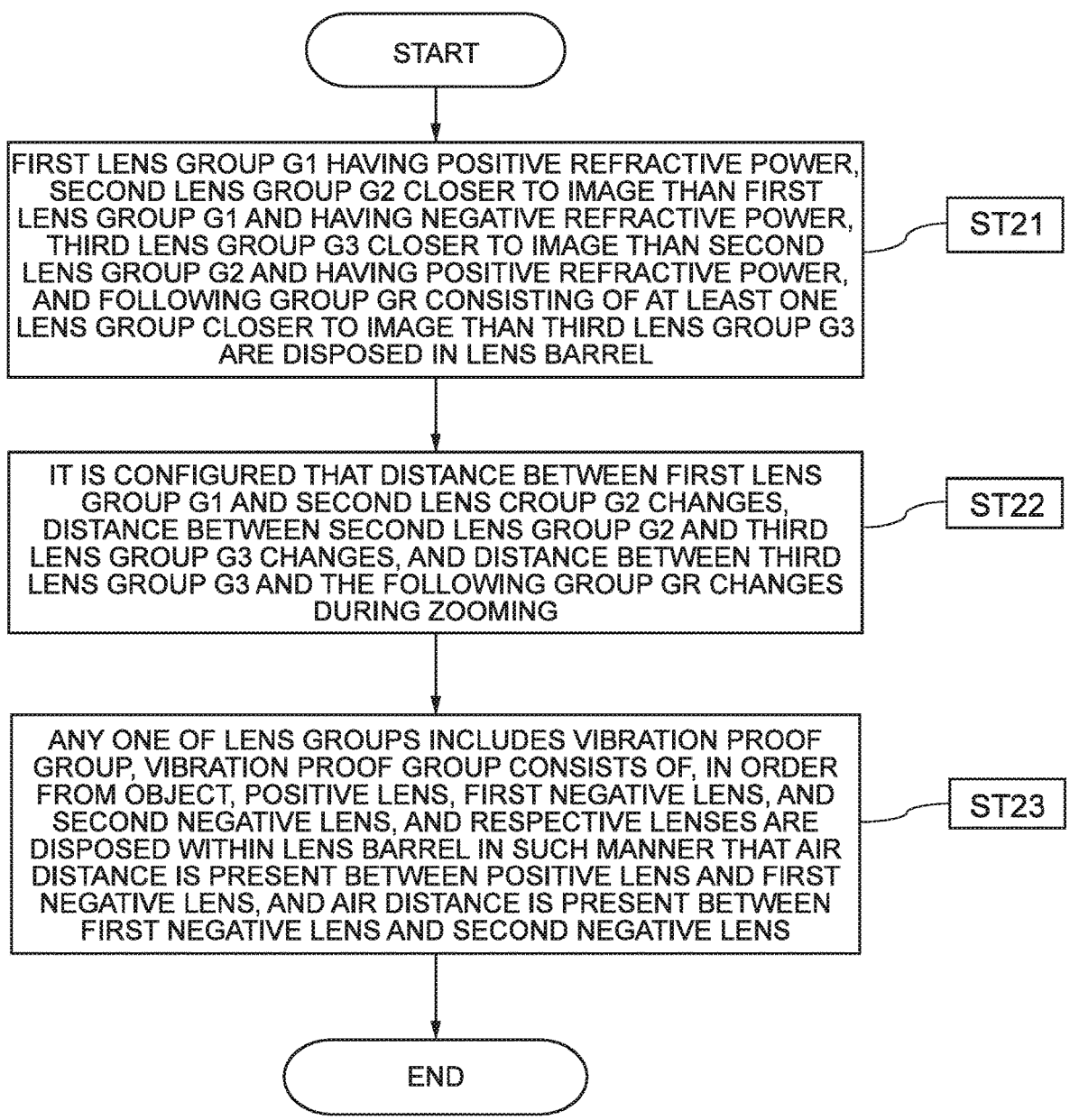
FIG. 52 is a flowchart illustrating a method for manufacturing a zoom optical system according to a third embodiment.

Subsequently, an outline of a method for manufacturing the zoom optical system ZL according to the third embodiment will be described with reference to FIG. 52. First, the first lens group G1 having a positive refractive power, the second lens group G2 closer to an image than the first lens group G1 and having a negative refractive power, the third lens group G3 closer to an image than the second lens group G2 and having a positive refractive power, and the following group GR consisting of at least one lens group closer to an image than the third lens group G3 are disposed in a lens barrel (Step ST21). Then, it is configured that a distance between the first lens group G1 and the second lens group G2 changes, a distance between the second lens group G2 and the third lens group G3 changes, and a distance between the third lens group G3 and the following group GR changes during zooming (Step ST22). Also, any one of the first lens group G1, the second lens group G2, the third lens group G3, and the following group GR includes a vibration proof group movable so as to have a displacement component in a direction perpendicular to an optical axis, the vibration proof group may consist of a positive lens, a first negative lens, and a second negative lens disposed in order from an object, and each lens is disposed within a lens barrel so that an air distance is present between the positive lens and the first negative lens and an air distance is present between the first negative lens and the second negative lens. (Step ST23). With such a manufacturing method, a telephoto type zoom optical system having a small-sized vibration proof group is manufactured.

EXAMPLES

Hereinafter, the zoom optical system (telephoto type zoom lens) ZL according to examples in each embodiment will be described with reference to the drawings. It should be noted that examples corresponding to the first embodiment and the second embodiment are Examples 1 to 11, and examples corresponding to the third embodiment are Examples 9 to 12. FIG. 1, FIG. 5, FIG. 9, FIG. 13, FIG. 17, FIG. 21, FIG. 25, FIG. 29, FIG. 33, FIG. 37, FIG. 41, and FIG. 45 are cross-sectional views illustrating configurations and distributions of refractive power of the zoom optical system ZL {ZL (1) to ZL (12)} according to Examples 1 to 12. Each cross-sectional view illustrate positions of the respective lens groups when zooming from the wide angle end state (W) via the intermediate focal length state (M) to the telephoto end state (T) is performed. Arrows in the middle parts of these drawings indicate directions of movement of the first to fourth lens groups G1 to G4 (or the fifth lens group G5) when zooming (zooming operation) from the wide angle end state through the intermediate focal length state to the telephoto end state is performed. In addition, a direction of movement of the fourth lens group G4 for focusing from an infinity to a short distant object as a zooming group is indicated by an arrow associated with a term "FOCUSING". A direction of movement of at least part of the second lens group G2 for correcting an image blur as a vibration proof group is indicated by an arrow associated with a term "VIBRATION PROOF".

In these drawings (FIG. 1, FIG. 5, FIG. 9, FIG. 13, FIG. 17, FIG. 21, FIG. 25, FIG. 29, FIG. 33, FIG. 37, FIG. 41, and FIG. 45), each lens group is indicated by a combination of a sign G and a number, and each lens is indicated by a combination of a sign L and a number. In this case, in order to avoid complication by increases of type and number of the signs and the numbers, the lens groups are indicated by using combinations of the sign and the number independently from example to example. Therefore, even when the combination of the same sign and the number are used in examples, it does not mean that they have the same configuration.

Tables 1 to 12 are shown below. Among these tables, Table 1 shows data of Example 1, Table 2 shows data of Example 2, Table 3 shows data of Example 3, Table 4 shows data of Example 4, Table 5 shows data of Example 5, Table 6 shows data of Example 6, Table 7 shows data of Example 7, Table 8 shows data of Example 8, Table 9 shows data of Example 9, Table 10 shows data of Example 10, Table 11 shows data of Example 11, and Table 12 shows data of Example 12. In each example, a d-line (wavelength $\lambda$=587.6 nm) and a g-line (wavelength $\lambda$=435.8 nm) are selected as objects of calculation of an aberration feature.

In tables of [General Data], f represents a focal length of a whole lens system, FNO represents F number, $2\omega$ represents the angle of view (unit is degree (°) and $\omega$ is a half angle of view), and Y represents the maximum image height. TL represents a distance obtained by adding BF to a distance from a lens forefront surface to a lens last surface on an optical axis upon focusing on infinity, and BF indicates an air equivalent distance (back focus) from the lens last surface to an image surface I on the optical axis upon focusing on infinity. It should be noted that these values are indicated for the respective zooming states, that is, the wide angle end (W), the intermediate focal length (M) and the telephoto end (T). In the tables [General Data], $\varphi$ represents a maximum effective diameter of a lens surface on the object side in a positive lens component of the third lens group disposed so as to oppose the image side of the aperture stop, $\Delta$ represents an absolute value of a difference between an aspherical amount at a position corresponding to the maximum effective diameter of the lens surface on the object side in the positive lens component and an aspherical amount at a position corresponding to the maximum effective diameter of the lens surface on the image side in the positive lens component.

In the table of [Lens Data], the surface numbers indicate the orders of the optical surfaces from the object side along the direction of the traveling of the rays, the sign R indicates a radius of curvature of each optical surface (a positive value is allocated to the surface where the center of curvature is located on the image side), and the sign D represents a distance to the next lens surface, which corresponds to the distance from each optical surface to the next optical surface (or an image surface) on the optical axis, the sign nd indicates the refractive index of a material of the optical member for d-line, and the sign vd indicates an abbe number with reference to the d-line of the material of the optical member. The sign "$\infty$" of the radius of curvature indicates a flat surface or an opening, and (Aperture) S indicates an aperture stop S, respectively. Notation of the refractive index of air "nd=1.00000" is omitted. When the lens surface is an aspherical surface, the surface number is asterisked, and a paraxial radius of curvature is shown in a column of the radius of curvature R.

In the tables of [Aspherical Data], the shapes of the aspherical surfaces listed in [Lens Data] are expressed by the following expression (a). In the following expression (a), X(y) represents a distance (sag amount) along the direction of the optical axis from a tangent surface at a vertex of the aspherical surface to a position on the aspherical surface at a height y, R represents a radius of curvature (paraxial radius of curvature) of a reference spherical surface, K represents a conical coefficient, and Ai represents an $i^{th}$ order aspherical coefficient. "E-n" represents "$\times 10^{-n}$". For example, 1.234E-05=$1.234\times10^{-5}$. It should be noted that the 2nd order aspherical coefficient A2 is 0, and notation of which is omitted.

$$X(y)=(y^2/R)/\{1+(1-Ky^2/R^2)^{1/2}\}+A4\times y^4+A6\times y^6+A8\times y^8+A10\times y^{10} \quad (a)$$

In the tables of [Lens Group Data], starting surfaces (the surface closest to the object) and the focal lengths of the first to fourth lens groups G1 to G4 (or the fifth lens group G5) are shown.

In the tables of [Variable Distance Data], distances to the next lens surface of surface numbers which are indicated as "variable" in terms of distance to the next lens surface in the tables of [Lens Data]. Shown here are distances to the next lens surface in the respective zooming states, that is, in the wide angle end (W), the intermediate focal length (M), and the telephoto end (T) when in focus to infinity and short distance, respectively.

In the tables of [Conditional Expression Corresponding Value], values corresponding to the aforementioned conditional expressions (1) to (28) are shown.

In the following description, the unit "mm" is generally used for the focal length f, the radius of curvature R, the distance to the next lens surface D, and other lengths in all data values. However, the optical system is not limited thereto because the optical system achieves an equivalent optical performance even when the optical system is proportionally enlarged or proportionally contracted.

The description given thus far about the tables are common to all the examples, and the overlapped description will be omitted in the following description.

Example 1

Example 1 will be described with reference to FIG. 1 to FIG. 4 and Table 1. FIG. 1 is a drawing illustrating a lens configuration of a zoom optical system according to Example 1. The zoom optical system ZL (1) according to Example 1 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 1. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. Sign (+) or (−) accompanied with each lens group indicate the refractive power of each lens group, which applies to all other examples described below.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a meniscus shaped first negative lens L21 having a convex surface facing the object, a second negative lens L22 having a biconcave shape, and a cemented lens consisting of a third negative lens L23 having a biconcave shape and a positive lens L24 having a biconvex shape. In this example, the first negative lens L21 constitutes the negative subgroup, and the second negative lens L22, a third negative lens L23, and the positive lens L24 constitute the vibration proof group.

The third lens group G3 consists of, in order from an object, a first positive lens L31 having a flat-convex shape having a convex surface facing the object, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41. An image surface I is disposed on the image side of the fourth lens group G4.

In the zoom optical system ZL (1) according to Example 1, focusing from the infinity to the short distant object is achieved by moving all the lenses in the fourth lens group G4 to the image side along the optical axis. Also, in the zoom optical system ZL (1) according to Example 1, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 1, the vibration proof coefficient is −1.16, the focal length is 51.50 mm. Therefore, the amount of movement of the vibration-proof lens group for correcting the rotational blur of 0.38° is −0.29 mm. In the intermediate focal length state of Example 1, the vibration proof coefficient is −2.13, the focal length is 146.99 mm. Therefore, the amount of movement of the vibration-proof lens group for correcting the rotational blur of 0.30° is −0.36 mm. In the telephoto end state of Example 1, the vibration proof coefficient is −3.07, the focal length is 242.50 mm. Therefore, the amount of movement of the vibration-proof lens group for correcting the rotational blur of 0.30° is −0.41 mm.

In Table 1 shown below, data values of the zoom optical system according to Example 1 will be shown.

TABLE 1

[General Data]
zooming rate 4.71
φ 20.3200
Δ 0.0952

|  | W | M | T |
|---|---|---|---|
| f | 51.50 | 146.99 | 242.50 |
| FNO | 4.49 | 5.35 | 6.35 |
| 2ω | 32.0 | 11.0 | 6.8 |
| Y | 14.75 | 14.75 | 14.75 |
| TL | 137.496 | 160.260 | 176.460 |
| BF | 19.642 | 42.682 | 69.906 |

TABLE 1-continued

[Lens Data]

| Surface Number | R | D | nd | vd | |
|---|---|---|---|---|---|
| 1 | 62.65940 | 3.856 | 1.51680 | 63.9 | |
| 2 | 154.73019 | 0.150 | | | |
| 3 | 60.57662 | 2.000 | 1.89190 | 37.1 | |
| 4 | 35.51015 | 7.425 | 1.49782 | 82.6 | |
| 5 | −265.34719 | D5(variable) | | | |
| 6 | 101.41493 | 1.500 | 1.49782 | 82.6 | |
| 7 | 42.78933 | 2.880 | | | |
| 8 | −95.81122 | 1.500 | 1.75500 | 52.3 | |
| 9 | 95.81122 | 2.600 | | | |
| 10 | −57.21453 | 1.500 | 1.77250 | 49.6 | |
| 11 | 45.10341 | 3.196 | 1.80809 | 22.7 | |
| 12 | −332.69479 | D12(variable) | | | |
| 13 | ∞ | 1.000 | | | (Aperture S) |
| 14* | 25.99484 | 3.973 | 1.59201 | 67.0 | |
| 15 | ∞ | 14.392 | | | |
| 16 | 125.51396 | 1.500 | 2.00069 | 25.5 | |
| 17 | 23.07932 | 3.872 | 1.49782 | 82.6 | |
| 18 | −67.48646 | 2.834 | | | |
| 19 | 98.90402 | 2.608 | 1.80194 | 26.4 | |
| 20 | −98.90402 | D20(variable) | | | |
| 21 | −66.56598 | 2.765 | 1.85895 | 22.7 | |
| 22 | −32.47980 | 4.143 | | | |
| 23 | −26.59956 | 1.500 | 1.77250 | 49.6 | |
| 24 | 105.53899 | BF | | | |

[Aspherical Data]

Fourteenth Surface $\kappa$ = 1.00000E+00
A4 = −8.52477E−06, A6 = −4.03131E−09, A8 = 1.30869E−11, A10 = −1.23416E−13

[Lens Group Data]

| Group | Starting Surface | Focal Length |
|---|---|---|
| G1 | 1 | 95.53 |
| G2 | 6 | −29.71 |
| G3 | 14 | 37.42 |
| G4 | 21 | −47.67 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.50 | — | — | — |
| Magnification | — | — | — | −0.0548 | −0.1467 | −0.2554 |
| D0 | ∞ | ∞ | ∞ | 862.00 | 839.18 | 823.00 |
| D5 | 2.500 | 30.824 | 37.428 | 2.500 | 30.824 | 37.428 |
| D12 | 28.894 | 10.857 | 1.750 | 28.894 | 10.857 | 1.750 |
| D20 | 21.267 | 10.703 | 2.182 | 24.716 | 21.048 | 16.950 |
| BF | 19.642 | 42.682 | 69.906 | 16.193 | 32.337 | 55.138 |

[Conditional Expression Corresponding Value]

Conditional Expression (1) fGb/fGa = 1.6045
Conditional Expression (2) fVR/fGa = 1.2759
Conditional Expression (3) Dpn/(−fGb) = 0.0869
Conditional Expression (4) fa/fb = 0.4765
Conditional Expression (5) f$\alpha$/f$\beta$ = 0.4765
Conditional Expression (6) fGc/(−fGa) = 1.2597
Conditional Expression (7) fGc/(−fGb) = 0.7851
Conditional Expression (8) |mda|/fw = 0.6782
Conditional Expression (9) |mcb|/fw = 0.3706
Conditional Expression (10) fp/fGp = 1.1733
Conditional Expression (11) LS/LGp = 0.5904
Conditional Expression (12) 100 × ($\Delta$/$\varphi$) = 0.4685
Conditional Expression (13) Dpn/(−f4) = 0.0869
Conditional Expression (14) fVR/f2 = 1.2759
Conditional Expression (15) f4/f2 = 1.6045
Conditional Expression (16) f3a/f3b = 0.4765
Conditional Expression (17) f3$\alpha$/f3$\beta$ = 0.4765

TABLE 1-continued

Conditional Expression (18) f3/(−f2) = 1.2597
Conditional Expression (19) f3/(−f4) = 0.7851
Conditional Expression (20) |m12|/fw = 0.6782
Conditional Expression (21) |m34|/fw = 0.3706

Figure 4A:
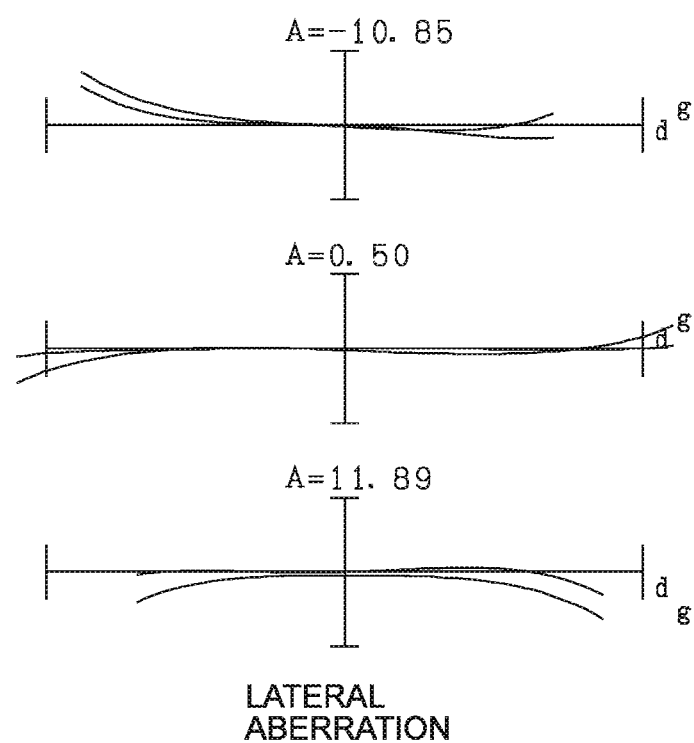
FIG. 4A, FIG. 4B, and FIG. 4C are each a meridional lateral (or transverse) aberration graph when shake compensation is performed in the wide angle end state, in the intermediate focal length state, and in the telephoto end state of the zoom optical system according to Example 1.
Figure 4B:
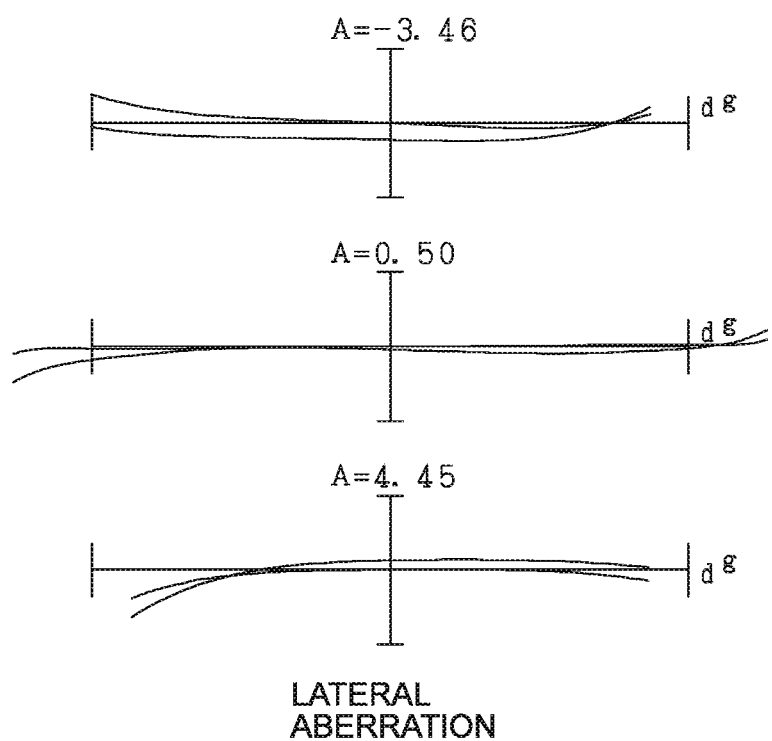
Figure 4C:
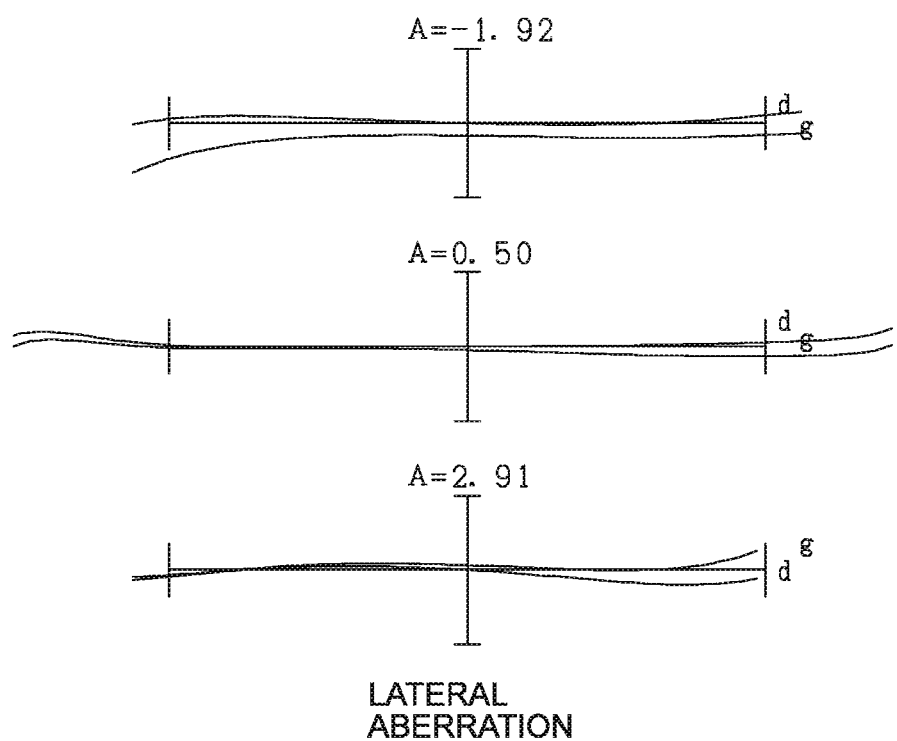

FIG. 2A, FIG. 2B and FIG. 2C are each an aberration graph illustrating aberrations upon focusing on infinity in a wide angle end state, in an intermediate focal length state, and in a telephoto end state of the zoom optical system having a vibration proof function according to Example 1. FIG. 3A, FIG. 3B and FIG. 3C are each an aberration graph illustrating aberrations upon focusing on short distance (close range) in a wide angle end state, in an intermediate focal length state, and in a telephoto end state of the zoom optical system having a vibration proof function according to Example 1. FIG. 4A, FIG. 4B, and FIG. 4C are each a meridional lateral aberration graph when shake compensation is performed in the wide angle end state, in the intermediate focal length state, and in the telephoto end state of the zoom optical system having a vibration proof function according to Example 1.

In each aberration graph in FIG. 2A to FIG. 2C, FNO indicates an F number, and A indicates a half angle of view. It should be noted that the values of the F number corresponding to the maximum aperture are shown in the spherical aberration graphs, and the maximum values of the half angle of view are shown respectively in the astigmatism graphs and in the distortion graphs, and the values of the respective half angle of views are shown in the lateral aberration graphs. In each aberration graph in FIG. 3A to FIG. 3C, NA indicates a numerical aperture, and HO indicates the object height. It should be noted that the values of the numerical aperture corresponding to the maximum aperture are shown in the spherical aberration graphs, and the maximum values of the object height are shown respectively in the astigmatism graphs and in the distortion graphs, and the values of the respective object height are shown in the lateral aberration graphs. In each aberration graph in FIG. 4A to FIG. 4C, A indicates a half angle of view. It should be noted that, in the lateral aberration graph, the values of the half angle of view are shown. In each aberration graph, d indicates a d-line (wavelength λ=587.6 nm), and g indicates a g-line (wavelength λ=435.8 nm). In the astigmatism graphs, solid lines indicate a sagittal image surface, and broken lines indicate a meridional image surface, respectively. It should be noted that the same reference signs as this example are used in the following aberration graphs of the respective examples described below as well, and overlapped description will be omitted.

It is apparent from respective aberration graphs that the zoom optical system according to Example 1 has an excellent image forming performance capable of correcting various aberrations successfully from the wide angle end state to the telephoto end state, and also has an excellent image forming performance also upon focusing on a short distant object.

Example 2

Example 2 will be described with reference to FIG. 5 to FIG. 8 and Table 2. FIG. 5 is a drawing illustrating a lens configuration of a zoom optical system according to Example 2. The zoom optical system ZL (2) according to Example 2 consists of, in order from an object, a first lens group G1 having a positive refractive power; a second lens group G2 having a negative refractive power; an aperture stop S; a third lens group G3 having a positive refractive power; and a fourth lens group G4 having a negative refractive power. For zooming from the wide angle end state (W) to the telephoto end state (T), the first to fourth lens groups G1 to G4 move in the directions indicated by the arrows shown in FIG. 5. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. In Example 2, the first lens group G1, the second lens group G2 and the fourth lens group G4 have the same configuration as in Example 1, so that the same signs as those in Example 1 are allocated, and detailed descriptions of these lenses will be omitted.

The third lens group G3 consists of, in order from an object, a meniscus shaped first positive lens L31 having a convex surface facing the object, the second positive lens L32 meniscus shaped facing a convex surface thereof to the object side, a cemented lens consisting of a meniscus shaped negative lens L33 having a convex surface facing the object and a third lens L34 having a biconvex shape, and a fourth positive lens L35 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 and the second positive lens L32 constitute the first object side subgroup, and the negative lens L33, the third lens L34, and the fourth positive lens L35 constitute the first image side subgroup. In the same manner, the first positive lens L31 and the second positive lens L32 constitute the second object side subgroup, and the negative lens L33, the third lens L34, and the fourth positive lens L35 constitute the second image side subgroup.

In the zoom optical system ZL (2) according to Example 2, focusing from the infinity to the short distant object is achieved by moving all the lenses in the fourth lens group G4 to the image side along the optical axis. Also, in the zoom optical system ZL (2) according to Example 2, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 2, the vibration proof coefficient is −1.21, the focal length is 51.50 mm. Therefore, the amount of movement of the vibration-proof lens group for correcting the rotational blur of 0.38° is −0.28 mm. In the intermediate focal length state of Example 2, the vibration proof coefficient is −2.18, the focal length is 147.00 mm. Therefore, the amount of movement of the vibration-proof lens group for correcting the rotational blur of 0.30° is −0.35 mm. In the telephoto end state of Example 2, the vibration proof coefficient is −3.12, the focal length is 242.51 mm. Therefore, the amount of movement of the vibration-proof lens group for correcting the rotational blur of 0.30° is −0.41 mm.

In Table 2 shown below, data values of the zoom optical system according to Example 2 will be shown.

TABLE 2

[General Data]
zooming rate 4.71
φ 20.0640
Δ 0.0763

|   | W | M | T |
|---|---|---|---|
| f | 51.50 | 147.00 | 242.51 |
| FNO | 4.49 | 5.33 | 6.35 |
| 2ω | 32.0 | 11.0 | 6.8 |
| Y | 14.75 | 14.75 | 14.75 |
| TL | 135.610 | 159.663 | 176.402 |
| BF | 19.521 | 41.599 | 68.637 |

[Lens Data]

| Surface Number | R | D | nd | vd |   |
|---|---|---|---|---|---|
| 1 | 63.13584 | 4.009 | 1.51680 | 63.9 |   |
| 2 | 169.41882 | 0.150 |   |   |   |
| 3 | 58.78287 | 2.000 | 1.90004 | 36.3 |   |
| 4 | 35.74722 | 7.264 | 1.49782 | 82.6 |   |
| 5 | −369.04726 | D5(variable) |   |   |   |
| 6 | 129.61183 | 1.500 | 1.48749 | 70.3 |   |
| 7 | 44.54195 | 5.235 |   |   |   |
| 8 | −87.39254 | 1.500 | 1.82128 | 39.3 |   |
| 9 | 72.63040 | 2.572 |   |   |   |
| 10 | −48.97929 | 1.500 | 1.75500 | 52.3 |   |
| 11 | 47.83568 | 3.376 | 1.80809 | 22.7 |   |
| 12 | −113.72334 | D12(variable) |   |   |   |
| 13 | ∞ | 1.000 |   |   | (Aperture S) |
| 14* | 28.00000 | 3.189 | 1.59201 | 67.0 |   |
| 15 | 83.02809 | 0.150 |   |   |   |
| 16 | 36.24963 | 3.196 | 1.49289 | 69.9 |   |
| 17 | 264.57441 | 12.166 |   |   |   |
| 18 | 232.65896 | 1.500 | 2.00100 | 29.1 |   |
| 19 | 21.43772 | 3.929 | 1.49782 | 82.6 |   |
| 20 | −55.47598 | 2.145 |   |   |   |
| 21 | 75.79063 | 2.613 | 1.83238 | 31.6 |   |
| 22 | −129.42011 | D22(variable) |   |   |   |
| 23 | −64.66082 | 2.812 | 1.80809 | 22.7 |   |
| 24 | −30.79887 | 3.516 |   |   |   |
| 25 | −26.32863 | 1.500 | 1.76127 | 51.3 |   |
| 26 | 100.00000 | BF |   |   |   |

[Aspherical Data]

Fourteenth Surface

κ = 1.00000E+00
A4 = −7.36136E−06, A6 = −2.03409E−09, A8 = 1.41855E−11, A10 = −1.07528E−13

[Lens Group Data]

| Group | Starting Surface | Focal Length |
|---|---|---|
| G1 | 1 | 94.01 |
| G2 | 6 | −27.89 |
| G3 | 14 | 35.97 |
| G4 | 23 | −47.07 |

TABLE 2-continued

[Variable Distance Data]

|   | W Infinity | M Infinity | T Infinity | W Short Distance | M Short Distance | T Short Distance |
|---|---|---|---|---|---|---|
| f | 51.50 | 147.00 | 242.51 | — | — | — |
| Magnification | — | — | — | −0.0552 | −0.1470 | −0.2564 |
| D0 | ∞ | ∞ | ∞ | 857.82 | 833.68 | 816.97 |
| D5 | 2.003 | 30.544 | 36.912 | 2.003 | 30.544 | 36.912 |
| D12 | 26.003 | 9.906 | 1.750 | 26.003 | 9.906 | 1.750 |
| D22 | 21.260 | 10.791 | 2.282 | 24.584 | 21.180 | 16.994 |
| BF | 19.521 | 41.599 | 68.637 | 16.212 | 31.316 | 54.243 |

[Conditional Expression Corresponding Value]

Conditional Expression (1) fGb/fGa = 1.6877
Conditional Expression (2) fVR/fGa = 1.2947
Conditional Expression (3) Dpn/(−fGb) = 0.0747
Conditional Expression (4) fa/fb = 0.3462
Conditional Expression (5) fα/fβ = 0.3462
Conditional Expression (6) fGc/(−fGa) = 1.2896
Conditional Expression (7) fGc/(−fGb) = 0.7641
Conditional Expression (8) |mda|/fw = 0.6778
Conditional Expression (9) |mcb|/fw = 0.3685
Conditional Expression (10) fp/fGp = 1.9423
Conditional Expression (11) LS/LGp = 0.5006
Conditional Expression (12) 100 × (Δ/φ) = 0.3803
Conditional Expression (13) Dpn/(−f4) = 0.0747
Conditional Expression (14) fVR/f2 = 1.2947
Conditional Expression (15) f4/f2 = 1.6877
Conditional Expression (16) f3a/f3b = 0.3462
Conditional Expression (17) f3α/f3β = 0.3462
Conditional Expression (18) f3/(−f2) = 1.2896
Conditional Expression (19) f3/(−f4) = 0.7641
Conditional Expression (20) |m12|/fw = 0.6778
Conditional Expression (21) |m34|/fw = 0.3685

Figure 8A:
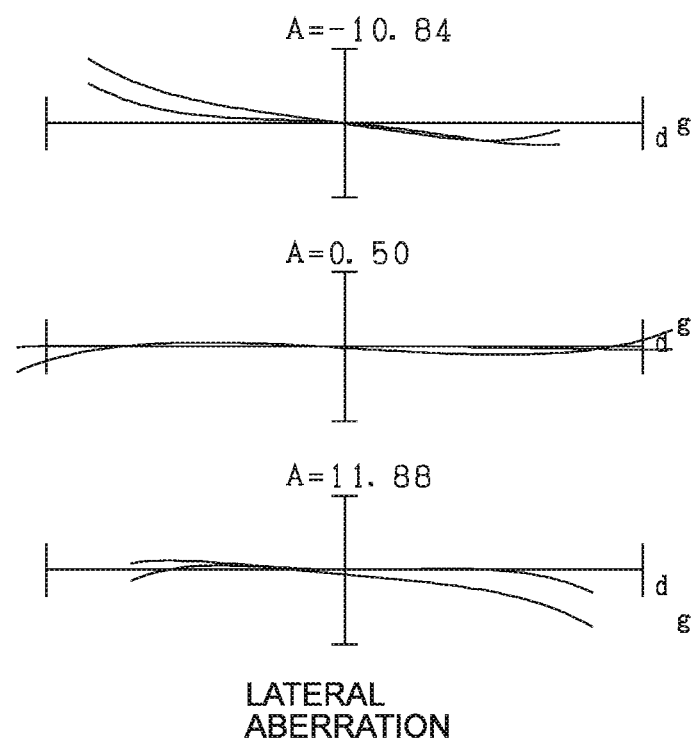
FIG. 8A, FIG. 8B, and FIG. 8C are each a meridional lateral aberration graph when shake compensation is performed in the wide angle end state, in the intermediate focal length state, and in the telephoto end state of the zoom optical system according to Example 2.
Figure 8B:
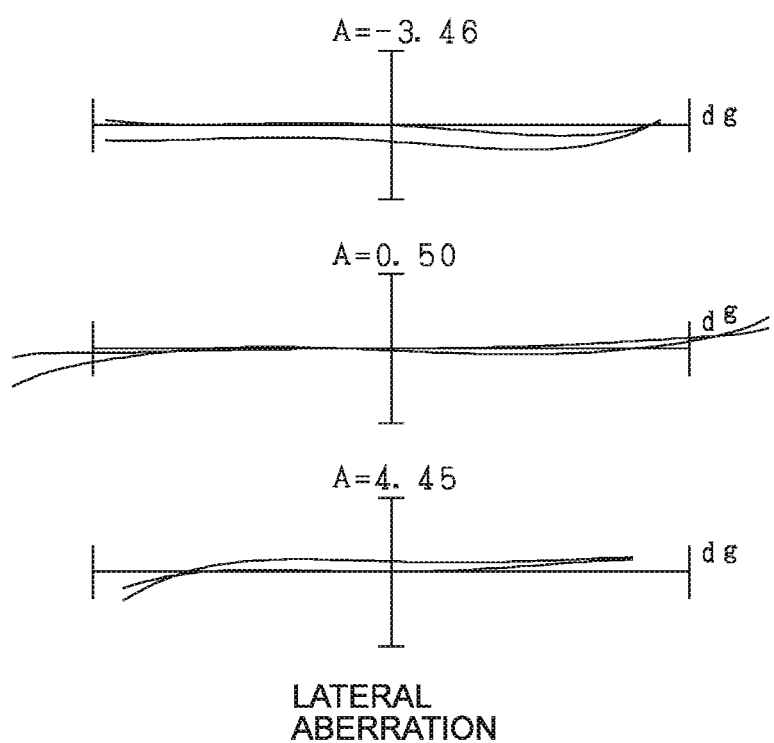
Figure 8C:
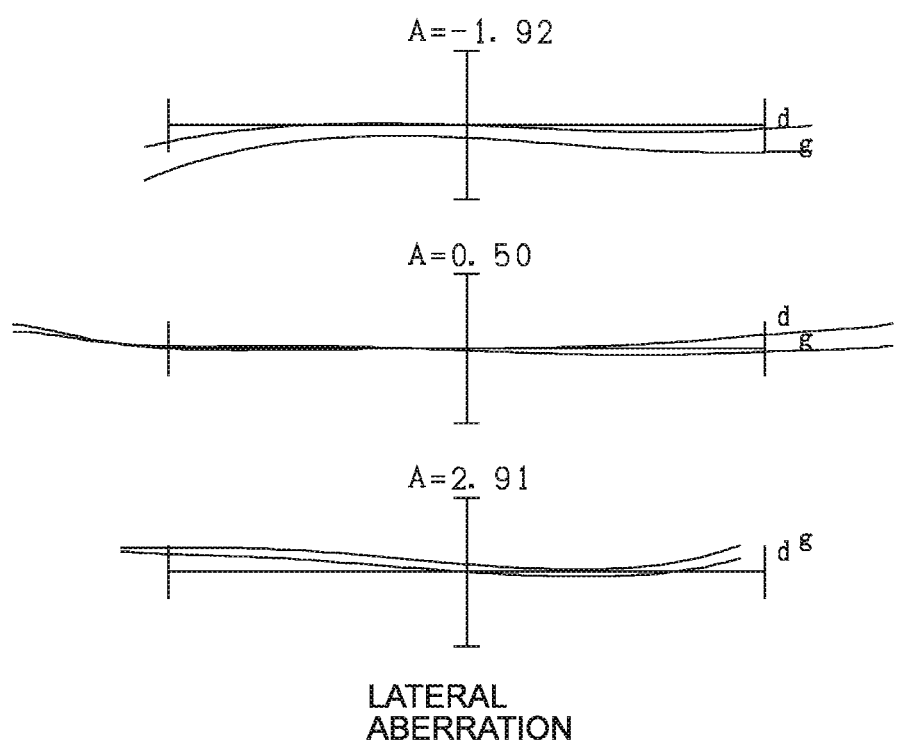

FIG. 6A, FIG. 6B and FIG. 6C are each an aberration graph illustrating aberrations upon focusing on infinity in a wide angle end state, in an intermediate focal length state, and in a telephoto end state of the zoom optical system having a vibration proof function according to Example 2. FIG. 7A, FIG. 7B and FIG. 7C are each an aberration graph illustrating aberrations upon focusing on short distance (close range) in a wide angle end state, in an intermediate focal length state, and in a telephoto end state of the zoom optical system having a vibration proof function according to Example 2. FIG. 8A, FIG. 8B, and FIG. 8C are each a meridional lateral aberration graph when shake compensation is performed in the wide angle end state, in the intermediate focal length state, and in the telephoto end state of the zoom optical system having a vibration proof function according to Example 2. It is apparent from respective aberration graphs that the zoom optical system according to Example 2 has an excellent image forming performance capable of correcting various aberrations successfully from the wide angle end state to the telephoto end state, and also has an excellent image forming performance also upon focusing on a short distant object.

Example 3

Example 3 will be described with reference to FIG. 9 to FIG. 12 and Table 3. FIG. 9 is a drawing illustrating a lens configuration of a zoom optical system according to Example 3. The zoom optical system ZL (3) according to Example 3 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 9. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. In Example 3, the first lens group G1, the second lens group G2 and the fourth lens group G4 have the same configuration as in Example 1, so that the same signs as those in Example 1 are allocated, and detailed descriptions of these lenses will be omitted.

The third lens group G3 consists of, in order from an object, a cemented lens consisting of a first positive lens L31 having a biconvex shape and a first negative lens L32 having a biconcave shape, a cemented lens consisting of a meniscus shaped second negative lens L33 having a convex surface facing the object, and a second positive lens L34 having a biconvex shape, and a third positive lens L35 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 and the first negative lens L32 constitute the first object side subgroup, and the second negative lens L33, the second positive lens L34, and the third positive lens L35 constitute the first image side subgroup. In the same manner, the first positive lens L31 and the first negative lens L32 constitute the second object side subgroup, and the second negative lens L33, the second positive lens L34, and the third positive lens L35 constitute the second image side subgroup.

In the zoom optical system ZL (3) according to Example 3, focusing from the infinity to the short distant object is achieved by moving all the lenses in the fourth lens group G4 to the image side along the optical axis. Also, in the zoom optical system ZL (3) according to Example 3, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 3, the vibration proof coefficient is −1.14, the focal length is 51.49 mm. Therefore, the amount of movement of the vibration-proof lens group for correcting the rotational blur of 0.38° is −0.30 mm. In the intermediate focal length state of Example 3, the vibration proof coefficient is −2.09, the focal length is 146.98 mm. Therefore, the amount of movement of the vibration-proof lens group for correcting the rotational blur of 0.30° is −0.37 mm. In the telephoto end state of Example 3, the vibration proof coefficient is −3.01, the focal length is 242.46 mm. Therefore, the amount of movement of the vibration-proof lens group for correcting the rotational blur of 0.30° is −0.42 mm.

In Table 3 shown below, data values of the zoom optical system according to Example 3 will be shown.

TABLE 3

| [General Data] zooming rate 4.71 φ 20.4220 Δ 0.0884 | | | |
|---|---|---|---|
| | W | M | T |
| f | 51.49 | 146.98 | 242.46 |
| FNO | 4.49 | 5.35 | 6.35 |
| 2ω | 32.0 | 11.0 | 6.8 |
| Y | 14.75 | 14.75 | 14.75 |
| TL | 137.501 | 160.239 | 176.433 |
| BF | 19.721 | 43.125 | 70.648 |

| [Lens Data] | | | | |
|---|---|---|---|---|
| Surface Number | R | D | nd | vd |
| 1 | 62.50796 | 3.877 | 1.51680 | 63.9 |
| 2 | 160.82600 | 0.150 | | |
| 3 | 60.93270 | 2.000 | 1.89190 | 37.1 |
| 4 | 35.47039 | 7.429 | 1.49782 | 82.6 |
| 5 | −263.78226 | D5(variable) | | |
| 6 | 143.24691 | 1.500 | 1.49782 | 82.6 |
| 7 | 45.94533 | 2.613 | | |
| 8 | −93.19985 | 1.500 | 1.75500 | 52.3 |
| 9 | 98.93609 | 2.600 | | |
| 10 | −59.00326 | 1.500 | 1.75500 | 52.3 |
| 11 | 49.53829 | 3.099 | 1.80809 | 22.7 |
| 12 | −395.65819 | D12(variable) | | |
| 13 | ∞ | 1.000 | | (Aperture S) |
| 14* | 26.40000 | 4.435 | 1.61557 | 64.2 |
| 15 | −108.15758 | 1.500 | 1.65055 | 33.0 |
| 16 | 1060.50670 | 14.393 | | |
| 17 | 131.84354 | 1.500 | 2.00100 | 29.1 |
| 18 | 23.34947 | 3.867 | 1.49782 | 82.6 |
| 19 | −62.51733 | 0.405 | | |
| 20 | 73.98240 | 2.633 | 1.76320 | 29.5 |
| 21 | −140.65166 | D21(variable) | | |
| 22 | −69.02433 | 2.770 | 1.85895 | 22.7 |
| 23 | −32.89941 | 4.169 | | |
| 24 | −26.76944 | 1.500 | 1.77250 | 49.6 |
| 25 | 105.64282 | BF | | |

[Aspherical Data]

Fourteenth Surface

κ = 1.00000E+00
A4 = −7.74297E−06, A6 = −3.79343E−09, A8 = 1.13866E−11, A10 = −1.06621E−13

TABLE 3-continued

[Lens Group Data]

| Group | Starting Surface | Focal Length |
|---|---|---|
| G1 | 1 | 95.01 |
| G2 | 6 | −29.65 |
| G3 | 14 | 37.08 |
| G4 | 22 | −48.44 |

[Variable Distance Data]

|  | W Infinity | M Infinity | T Infinity | W Short Distance | M Short Distance | T Short Distance |
|---|---|---|---|---|---|---|
| f | 51.49 | 146.98 | 242.46 | — | — | — |
| Magnification | — | — | — | −0.0551 | −0.1485 | −0.2603 |
| D0 | ∞ | ∞ | ∞ | 856.43 | 833.62 | 817.43 |
| D5 | 2.623 | 30.816 | 37.312 | 2.623 | 30.816 | 37.312 |
| D12 | 29.110 | 11.057 | 1.750 | 29.110 | 11.057 | 1.750 |
| D21 | 21.608 | 10.801 | 2.284 | 25.143 | 21.325 | 17.367 |
| BF | 19.721 | 43.125 | 70.648 | 16.202 | 32.708 | 55.893 |

[Conditional Expression Corresponding Value]

Conditional Expression (1) fGb/fGa = 1.6339
Conditional Expression (2) fVR/fGa = 1.3095
Conditional Expression (3) Dpn/(−fGb) = 0.0861
Conditional Expression (4) fa/fb = 0.4711
Conditional Expression (5) fα/fβ = 0.4711
Conditional Expression (6) fGc/(−fGa) = 1.2507
Conditional Expression (7) fGc/(−fGb) = 0.7655
Conditional Expression (8) |mda|/fw = 0.6737
Conditional Expression (9) |mcb|/fw = 0.3753
Conditional Expression (10) fp/fGp = 1.2010
Conditional Expression (11) LS/LGp = 0.5150
Conditional Expression (12) 100 × (Δ/φ) = 0.4329
Conditional Expression (13) Dpn/(−f4) = 0.0861
Conditional Expression (14) fVR/f2 = 1.3095
Conditional Expression (15) f4/f2 = 1.6339
Conditional Expression (16) f3a/f3b = 0.4711
Conditional Expression (17) f3α/f3β = 0.4711
Conditional Expression (18) f3/(−f2) = 1.2507
Conditional Expression (19) f3/(−f4) = 0.7655
Conditional Expression (20) |m12|/fw = 0.6737
Conditional Expression (21) |m34|/fw = 0.3753

Figure 11A:
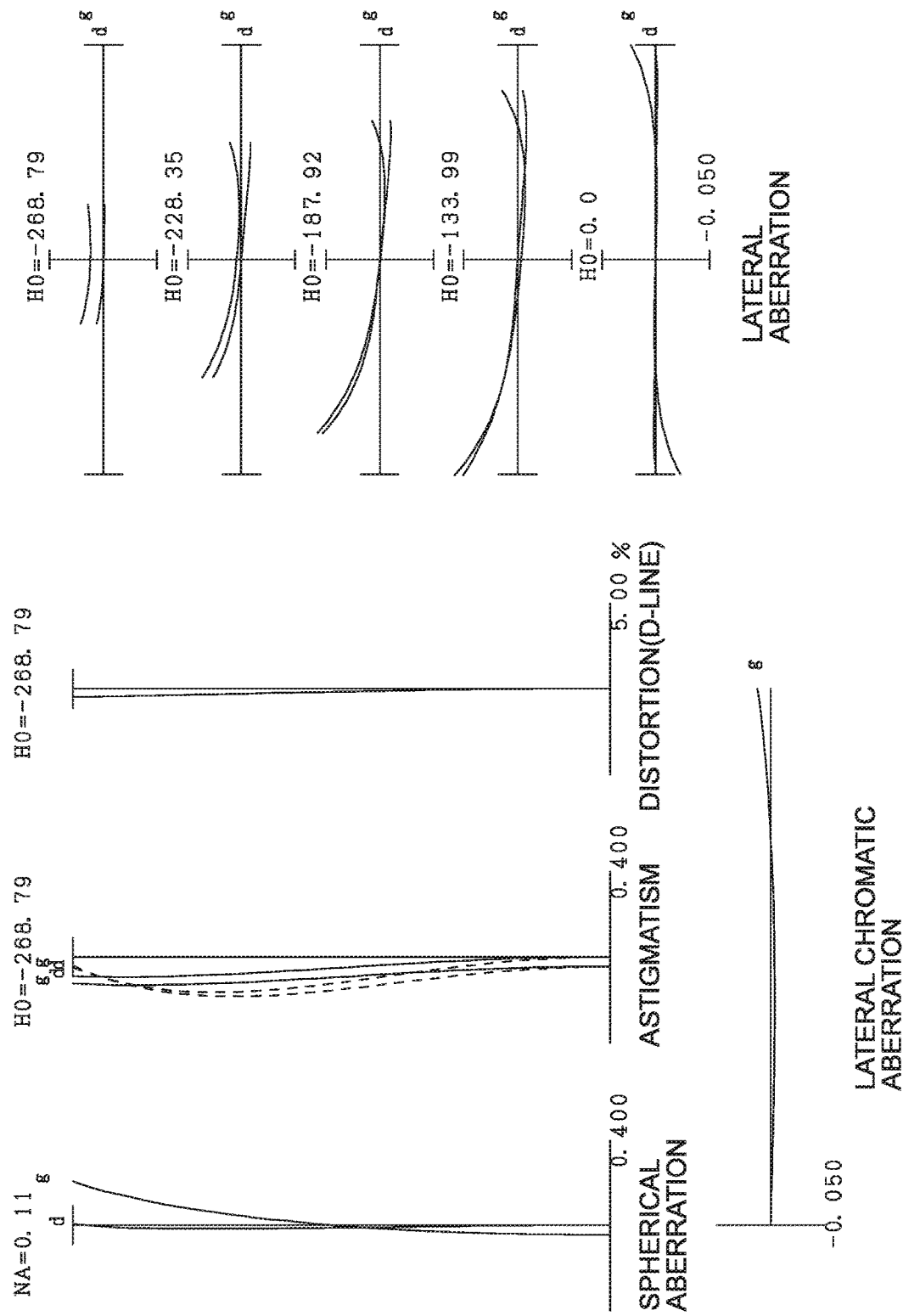
Figure 11C:
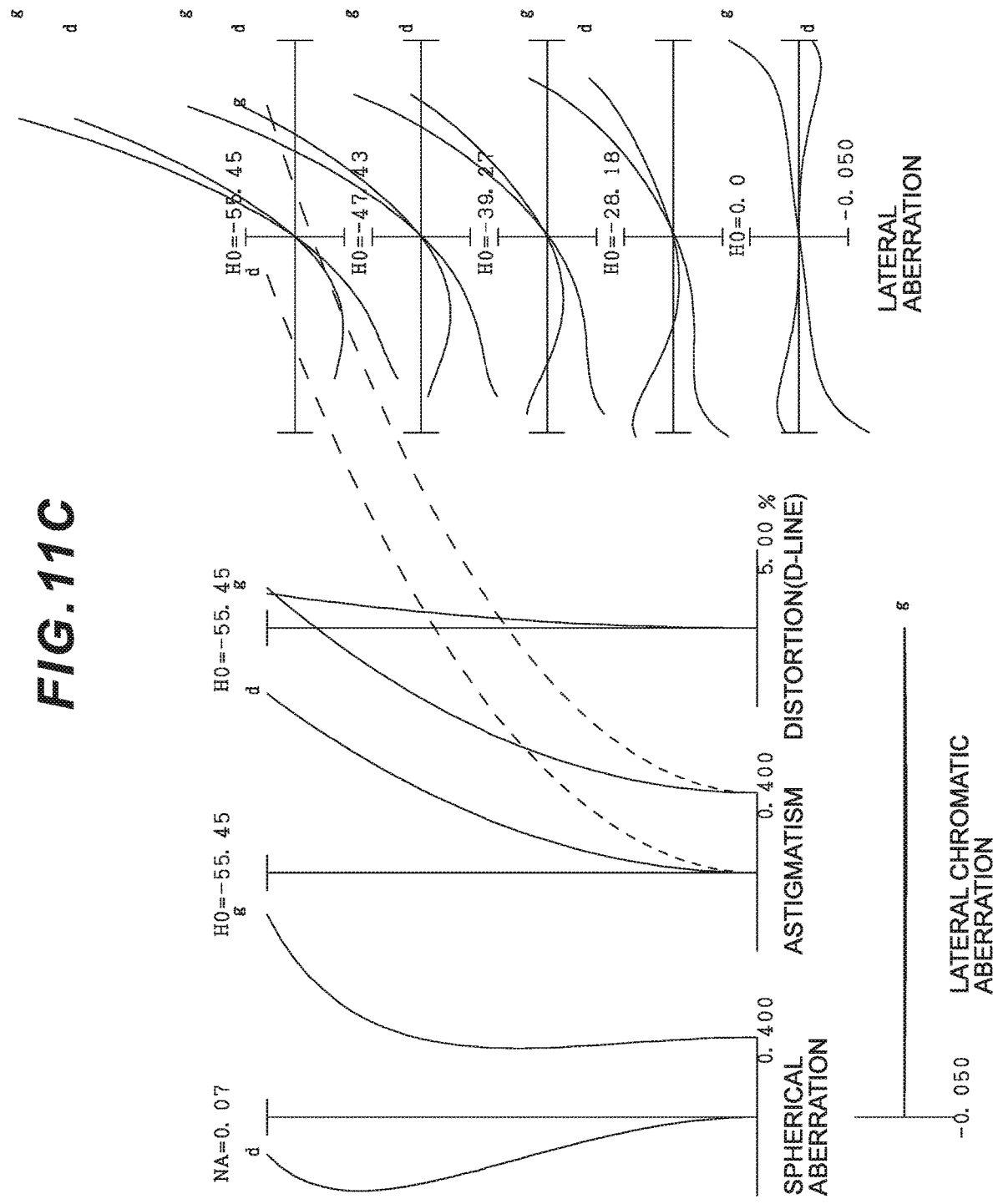
Figure 12A:
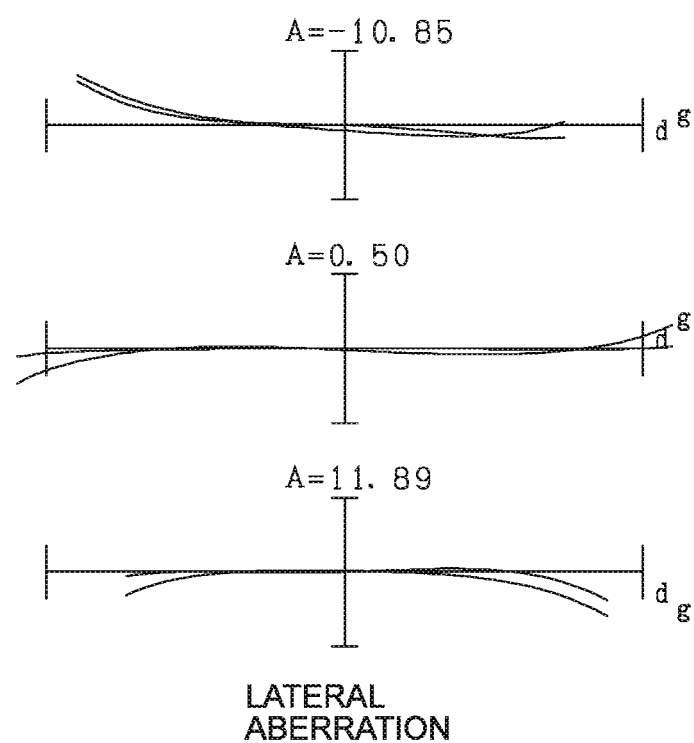
FIG. 12A, FIG. 12B, and FIG. 12C are each a meridional lateral aberration graph when shake compensation is performed in the wide angle end state, in the intermediate focal length state, and in the telephoto end state of the zoom optical system according to Example 3.
Figure 12B:
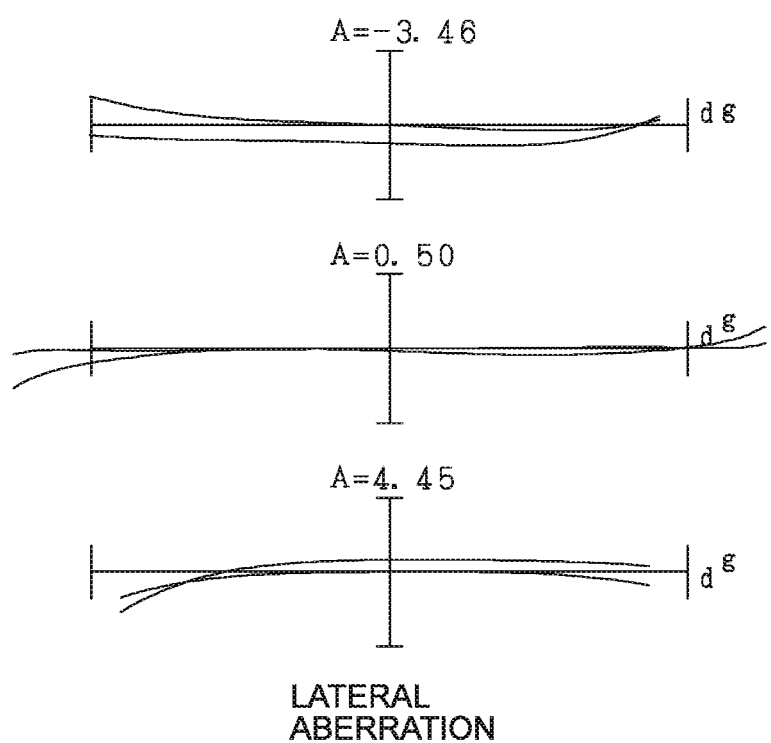
Figure 12C:
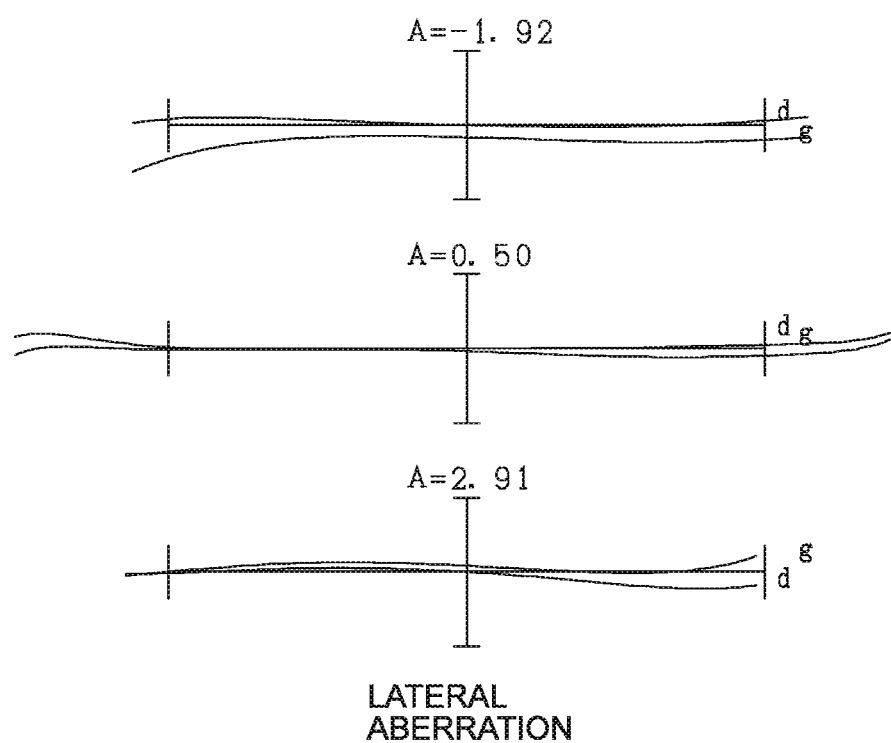

FIG. 10A, FIG. 10B and FIG. 10C are each an aberration graph illustrating aberrations upon focusing on infinity in a wide angle end state, in an intermediate focal length state, and in a telephoto end state of the zoom optical system having a vibration proof function according to Example 3. FIG. 11A, FIG. 11B and FIG. 11C are each an aberration graph illustrating aberrations upon focusing on short distance (close range) in a wide angle end state, in an intermediate focal length state, and in a telephoto end state of the zoom optical system having a vibration proof function according to Example 3. FIG. 12A, FIG. 12B, and FIG. 12C are each a meridional lateral aberration graph when shake compensation is performed in the wide angle end state, in the intermediate focal length state, and in the telephoto end state of the zoom optical system having a vibration proof function according to Example 3. It is apparent from respective aberration graphs that the zoom optical system according to Example 3 has an excellent image forming performance capable of correcting various aberrations successfully from the wide angle end state to the telephoto end state, and also has an excellent image forming performance also upon focusing on a short distant object.

Example 4

Example 4 will be described with reference to FIG. 13 to FIG. 16 and Table 4. FIG. 13 is a drawing illustrating a lens configuration of a zoom optical system according to Example 4. The zoom optical system ZL (4) according to Example 4 consists of, in order from an object, a first lens group G1 having a positive refractive power, a second lens group G2 having a negative refractive power, an aperture stop S, a third lens group G3 having a positive refractive power, and a fourth lens group G4 having a negative refractive power. For zooming from the wide angle end state (W) to the telephoto end state (T), the first to fourth lens groups G1 to G4 move in the directions indicated by the arrows shown in FIG. 13. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. In Example 4, the first lens group G1 and the fourth lens group G4 have the same configuration as in the first embodiment, so that the same reference signs as those in Example 1 are allocated, and detailed descriptions of these lenses will be omitted.

The second lens group G2 consists of, in order from an object, a meniscus shaped first negative lens L21 having a convex surface facing the object, the second negative lens L22 having a biconcave shape, and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a meniscus shaped first positive lens L31 having a convex surface facing the object, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

In the zoom optical system ZL (4) according to Example 4, focusing from the infinity to the short distant object is achieved by moving all the lenses in the fourth lens group G4 to the image side. Also, in the zoom optical system ZL (4) according to Example 4, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 4, the vibration proof coefficient is −1.11, the focal length is 51.50 mm. Therefore, the amount of movement of the vibration-proof lens group for correcting the rotational blur of 0.38° is −0.30 mm. In the intermediate focal length state of Example 4, the vibration proof coefficient is −2.06, the focal length is 146.99 mm. Therefore, the amount of movement of the vibration-proof lens group for correcting the rotational blur of 0.30° is −0.37 mm. In the telephoto end state of Example 4, the vibration proof coefficient is −3.00, the focal length is 242.48 mm. Therefore, the amount of movement of the vibration-proof lens group for correcting the rotational blur of 0.30° is −0.42 mm.

In Table 4 shown below, data values of the zoom optical system according to Example 4 will be shown.

TABLE 4

[General Data]
zooming rate 4.71
φ 21.2780
Δ 0.0828

|  | W | M | T |
|---|---|---|---|
| f | 51.50 | 146.99 | 242.48 |
| FNO | 4.49 | 5.19 | 6.35 |
| 2ω | 32.6 | 11.2 | 6.8 |
| Y | 14.75 | 14.75 | 14.75 |
| TL | 144.334 | 161.305 | 179.008 |
| BF | 20.073 | 36.479 | 65.178 |

[Lens Data]

| Surface Number | R | D | nd | vd | |
|---|---|---|---|---|---|
| 1 | 78.55125 | 2.800 | 1.48749 | 70.3 | |
| 2 | 111.14411 | 0.150 | | | |
| 3 | 63.92316 | 2.000 | 1.91082 | 35.2 | |
| 4 | 42.96816 | 7.327 | 1.49782 | 82.6 | |
| 5 | −291.62059 | D5(variable) | | | |
| 6 | 1504.08930 | 1.500 | 1.71476 | 54.4 | |
| 7 | 66.05775 | 2.065 | | | |
| 8 | −53.66495 | 1.500 | 1.61800 | 63.3 | |
| 9 | 40.89287 | 0.277 | | | |
| 10 | 42.28895 | 2.955 | 1.80809 | 22.7 | |
| 11 | 141.93243 | D11(variable) | | | |
| 12 | ∞ | 1.000 | | | (Aperture S) |
| 13* | 25.82873 | 4.154 | 1.61881 | 63.9 | |
| 14 | 958.79702 | 9.656 | | | |
| 15 | 116.29028 | 1.500 | 2.00100 | 29.1 | |
| 16 | 21.19932 | 4.178 | 1.49782 | 82.6 | |
| 17 | −79.19840 | 7.501 | | | |
| 18 | 86.66199 | 2.649 | 1.78408 | 26.5 | |
| 19 | −168.51191 | D19(variable) | | | |
| 20 | −79.67614 | 2.749 | 1.80809 | 22.7 | |
| 21 | −33.68051 | 4.721 | | | |
| 22 | −26.62702 | 1.500 | 1.83481 | 42.7 | |
| 23 | 109.98588 | BF | | | |

TABLE 4-continued

[Aspherical Data]

Thirteenth Surface

κ = 1.00000E+00
A4 = −5.91135E−06, A6 = −4.94128E−09 , A8 = 1.13438E−11, A10 = −9.44997E−14

[Lens Group Data]

| Group | Starting Surface | Focal Length |
|---|---|---|
| G1 | 1 | 121.71 |
| G2 | 6 | −41.86 |
| G3 | 13 | 41.24 |
| G4 | 20 | −43.85 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.48 | — | — | — |
| Magnification | — | — | — | −0.0557 | −0.1430 | −0.2573 |
| D0 | ∞ | ∞ | ∞ | 849.10 | 832.12 | 814.43 |
| D5 | 1.668 | 40.693 | 48.933 | 1.668 | 40.693 | 48.933 |
| D11 | 44.006 | 12.587 | 2.432 | 44.006 | 12.587 | 2.432 |
| D19 | 18.405 | 11.365 | 2.283 | 21.531 | 23.518 | 17.138 |
| BF | 20.073 | 36.479 | 65.178 | 16.962 | 24.425 | 50.643 |

[Conditional Expression Corresponding Value]

Conditional Expression (1) fGb/fGa = 1.0476
Conditional Expression (2) fVR/fGa = 1.0000
Conditional Expression (3) Dpn/(−fGb) = 0.1077
Conditional Expression (4) fa/fb = 0.2816
Conditional Expression (5) fα/fβ = 0.2816
Conditional Expression (6) fGc/(−fGa) = 0.9852
Conditional Expression (7) fGc/(−fGb) = 0.9404
Conditional Expression (8) |mda|/fw = 0.9178
Conditional Expression (9) |mcb|/fw = 0.3130
Conditional Expression (10) fp/fGp = 1.0384
Conditional Expression (11) LS/LGp = 0.5789
Conditional Expression (12) 100 × (Δ/φ) = 0.3891
Conditional Expression (13) Dpn/(−f4) = 0.1077
Conditional Expression (14) fVR/f2 = 1.0000
Conditional Expression (15) f4/f2 = 1.0476
Conditional Expression (16) f3a/f3b = 0.2816
Conditional Expression (17) f3α/f3β = 0.2816
Conditional Expression (18) f3/(−f2) = 0.9852
Conditional Expression (19) f3/(−f4) = 0.9404
Conditional Expression (20) |m12|/fw = 0.9178
Conditional Expression (21) |m34|/fw = 0.3130

Figure 15A:
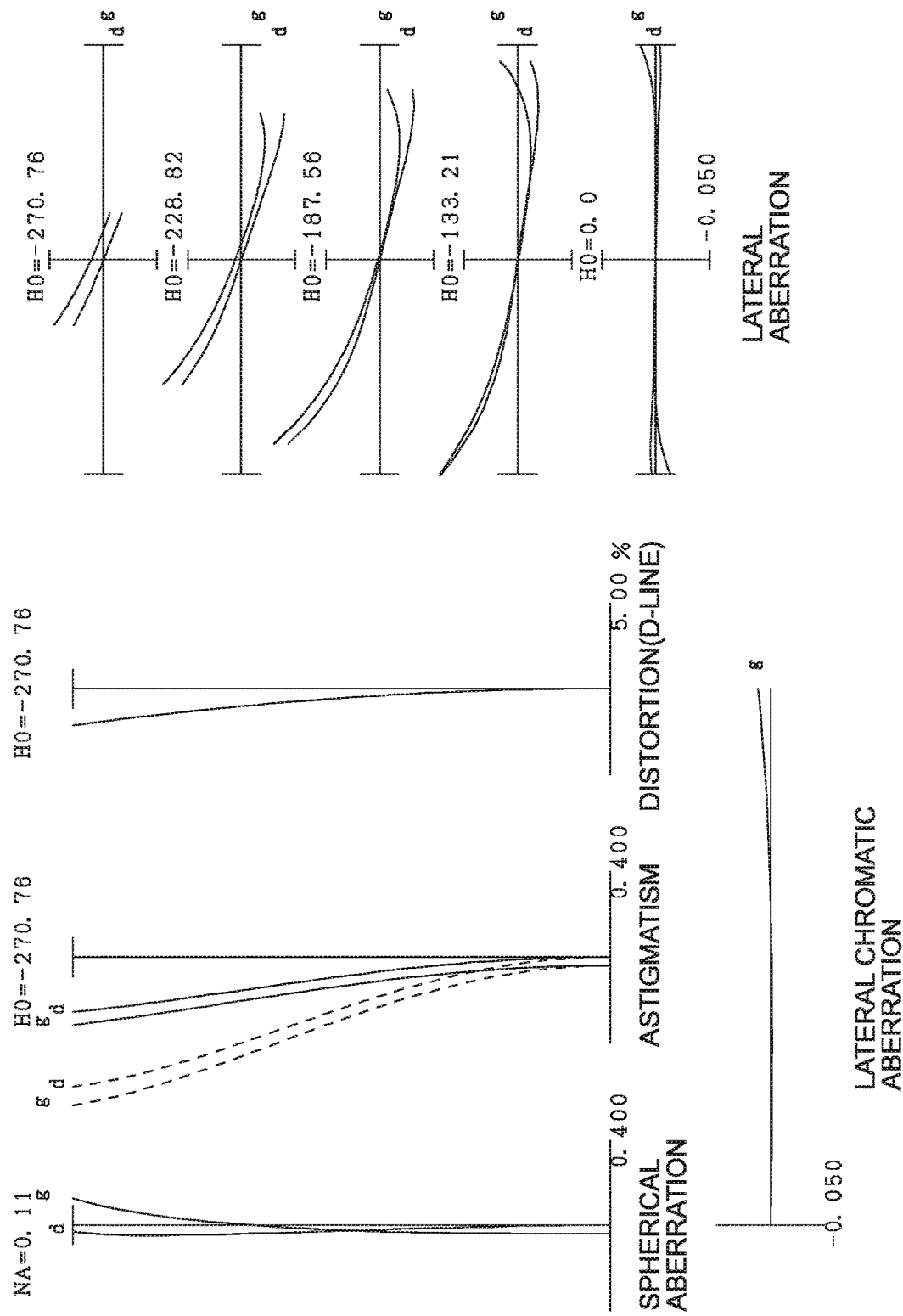
Figure 16A:
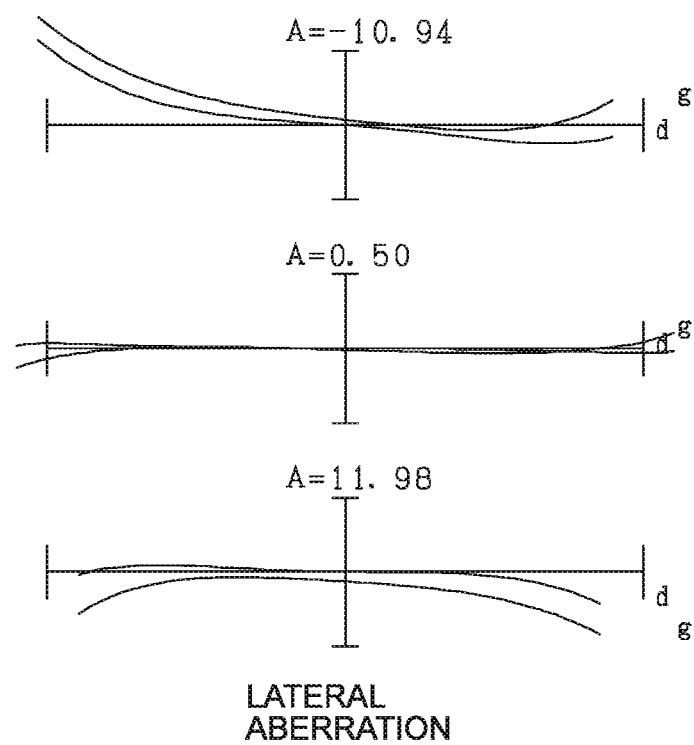
FIG. 16A, FIG. 16B, and FIG. 16C are each a meridional lateral aberration graph when shake compensation is performed in the wide angle end state, in the intermediate focal length state, and in the telephoto end state of the zoom optical system according to Example 4.
Figure 16B:
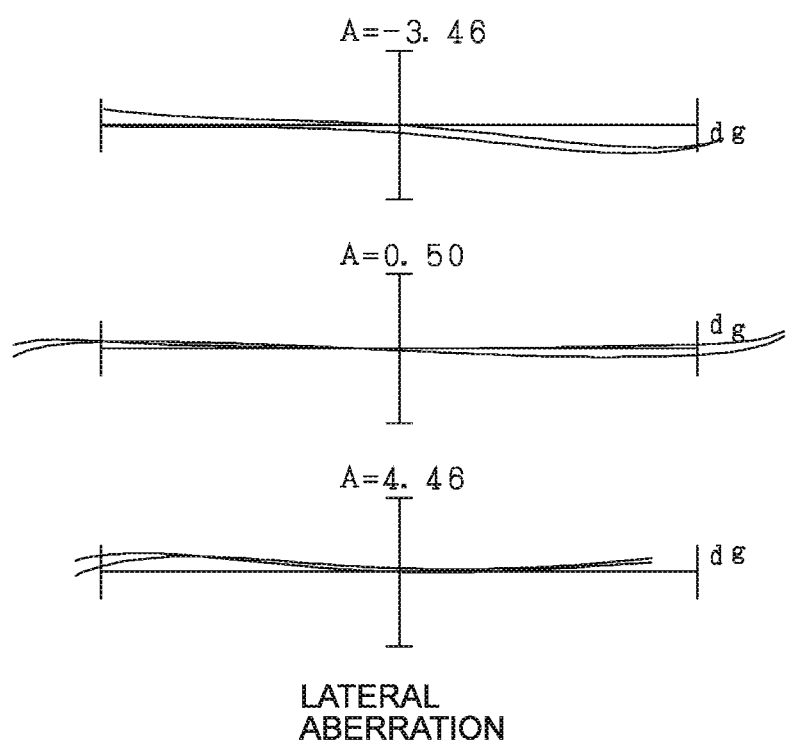
Figure 16C:
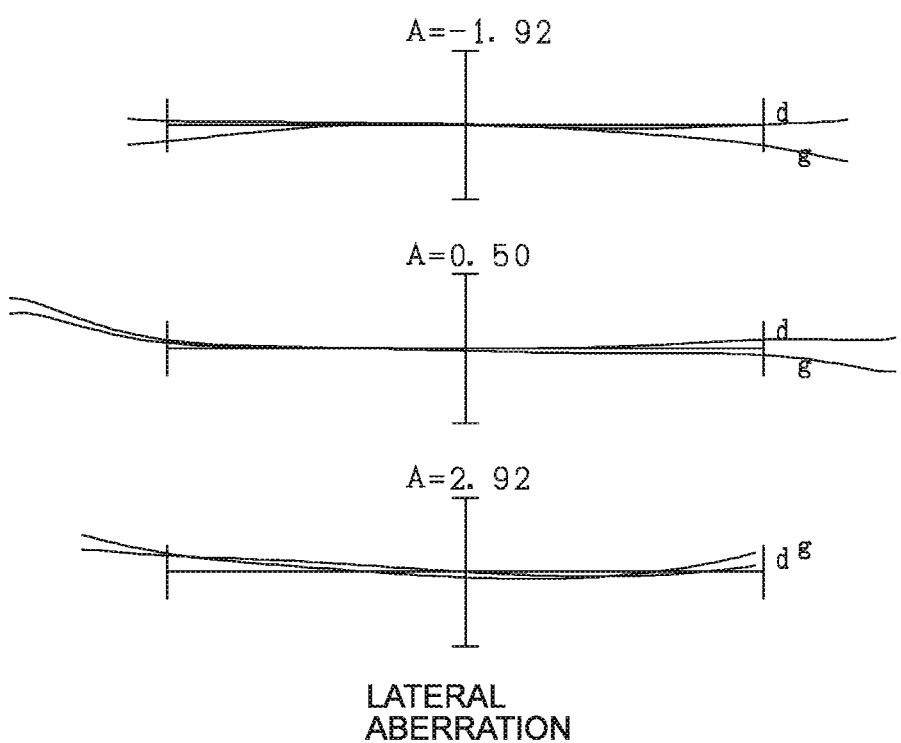

FIG. 14A, FIG. 14B and FIG. 14C are each an aberration graph illustrating aberrations upon focusing on infinity in a wide angle end state, in an intermediate focal length state, and in a telephoto end state of the zoom optical system having a vibration proof function according to Example 4. FIG. 15A, FIG. 15B and FIG. 15C are each an aberration graph illustrating aberrations upon focusing on short distance (close range) in a wide angle end state, in an intermediate focal length state, and in a telephoto end state of the zoom optical system having a vibration proof function according to Example 4. FIG. 16A, FIG. 16B, and FIG. 16C are each a meridional lateral aberration graph when shake compensation is performed in the wide angle end state, in the intermediate focal length state, and in the telephoto end state of the zoom optical system having a vibration proof function according to Example 4. It is apparent from respective aberration graphs that the zoom optical system according to Example 4 has an excellent image forming performance capable of correcting various aberrations successfully from the wide angle end state to the telephoto end state, and also has an excellent image forming performance also upon focusing on a short distant object.

Example 5

Example 5 will be described with reference to FIG. 17 to FIG. 20 and Table 5. FIG. 17 is a drawing illustrating a lens configuration of a zoom optical system according to Example 5. The zoom optical system ZL (5) according to Example 5 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a negative refractive power. For zooming from the wide angle end state (W) to the telephoto end state (T), the first to fourth lens groups G1 to G4 move in the directions indicated by the arrows shown in FIG. 17, and the fifth lens group G5 is secured. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a meniscus shaped first negative lens L21 having a convex surface facing the object, a second negative lens L22 having a biconcave shape, and a cemented lens consisting of a third negative lens L23 having a biconcave shape and a positive lens L24 having a biconvex shape. In this example, the first negative lens L21 constitutes the negative subgroup, and the second negative lens L22, a third negative lens L23, and the positive lens L24 constitute the vibration proof group.

The third lens group G3 consists of, in order from an object, a first positive lens L31 having a biconvex shape, a cemented lens consisting of a negative lens L32 having a biconcave shape and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a negative lens L51 meniscus shaped with a convex surface facing the image side. An image surface I is disposed on the image side of the fifth lens group G5.

In the zoom optical system ZL (5) according to Example 5, focusing from the infinity to the short distant object is achieved by moving all the lenses in the fourth lens group G4 to the image side along the optical axis. Also, in the zoom optical system ZL (5) according to Example 5, the second negative lens L22 in the second lens group G2, the third negative lens L23, and the positive lens L24 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 5, the vibration proof coefficient is −1.21, the focal length is 51.50 mm. Therefore, the amount of movement of the vibration-proof lens group for correcting the rotational blur of 0.38° is −0.28 mm. In the intermediate focal length state of Example 5, the vibration proof coefficient is −2.14, the focal length is 146.99 mm. Therefore, the amount of movement of the vibration-proof lens group for correcting the rotational blur of 0.30° is −0.36 mm. In the telephoto end state of Example 5, the vibration proof coefficient is −3.08, the focal length is 242.48 mm. Therefore, the amount of movement of the vibration-proof lens group for correcting the rotational blur of 0.30° is −0.41 mm.

In Table 5 shown below, data values of the zoom optical system according to Example 5 will be shown.

TABLE 5

| [General Data] | | | |
|---|---|---|---|
| zooming rate 4.71 | | | |
| φ 18.5740 | | | |
| Δ 0.0609 | | | |
| | W | M | T |
| f | 51.50 | 146.99 | 242.48 |
| FNO | 4.49 | 5.22 | 6.35 |
| 2ω | 32.2 | 11.0 | 6.8 |
| Y | 14.75 | 14.75 | 14.75 |
| TL | 139.517 | 159.237 | 175.122 |
| BF | 12.228 | 12.167 | 12.232 |

| [Lens Data] | | | | |
|---|---|---|---|---|
| Surface Number | R | D | nd | vd |
| 1 | 59.18642 | 3.866 | 1.62299 | 58.1 |
| 2 | 106.62157 | 0.150 | | |
| 3 | 59.10574 | 2.000 | 1.90275 | 36.3 |
| 4 | 36.52221 | 7.578 | 1.49782 | 82.6 |
| 5 | −659.38914 | D5(variable) | | |
| 6 | 29.79653 | 1.500 | 1.72916 | 54.6 |

TABLE 5-continued

| | | | | | |
|---|---|---|---|---|---|
| 7 | 25.16699 | 7.180 | | | |
| 8 | −88.47901 | 1.500 | 1.81600 | 46.6 | |
| 9 | 55.88999 | 1.662 | | | |
| 10 | −43.86910 | 1.500 | 1.65160 | 58.6 | |
| 11 | 68.86771 | 2.985 | 1.80809 | 22.7 | |
| 12 | −109.96417 | D12(variable) | | | |
| 13 | ∞ | 1.000 | | | (Aperture S) |
| 14* | 25.79838 | 3.809 | 1.59201 | 67.0 | |
| 15 | −279.37355 | 17.406 | | | |
| 16 | −247.49695 | 1.500 | 2.00069 | 25.5 | |
| 17 | 21.01070 | 3.365 | 1.49782 | 82.6 | |
| 18 | −72.37303 | 2.817 | | | |
| 19 | 51.64620 | 3.167 | 1.79504 | 28.7 | |
| 20 | −54.87648 | D20(variable) | | | |
| 21 | −383.32468 | 3.902 | 1.73537 | 27.7 | |
| 22 | −22.63165 | 0.334 | | | |
| 23 | −22.44228 | 1.500 | 1.81600 | 46.6 | |
| 24 | 52.43184 | D24(variable) | | | |
| 25 | −66.76465 | 1.500 | 1.51680 | 63.9 | |
| 26 | −190.01529 | BF | | | |

[Aspherical Data]

Fourteenth Surface $\kappa = 1.00000E+00$
$A4 = -7.86750E-06$, $A6 = -2.82414E-09$, $A8 = -5.58002E-12$, $A10 = -5.40323E-14$

[Lens Group Data]

| Group | Starting Surface | Focal Length |
|---|---|---|
| G1 | 1 | 101.81 |
| G2 | 6 | −30.57 |
| G3 | 14 | 37.64 |
| G4 | 21 | −47.69 |
| G5 | 25 | −200.00 |

[Variable Distance Data]

| | W Infinity | M Infinity | T Infinity | W Short Distance | M Short Distance | T Short Distance |
|---|---|---|---|---|---|---|
| f | 51.50 | 146.99 | 242.48 | — | — | — |
| Magnification | — | — | — | −0.0550 | −0.1399 | −0.2441 |
| D0 | ∞ | ∞ | ∞ | 854.43 | 834.65 | 818.83 |
| D5 | 1.200 | 32.757 | 39.155 | 1.200 | 32.757 | 39.155 |
| D12 | 29.679 | 9.845 | 1.514 | 29.679 | 9.845 | 1.514 |
| D20 | 20.216 | 10.855 | 1.386 | 23.206 | 21.666 | 15.248 |
| D24 | 5.973 | 23.393 | 50.613 | 2.983 | 12.581 | 36.751 |
| BF | 12.228 | 12.167 | 12.232 | 12.243 | 12.262 | 12.521 |

[Conditional Expression Corresponding Value]

Conditional Expression (1) fGb/fGa = 1.5600
Conditional Expression (2) fVR/fGa = 1.1429
Conditional Expression (3) Dpn/(−fGb) = 0.0070
Conditional Expression (4) fa/fb = 0.5198
Conditional Expression (5) fα/fβ = 0.5198
Conditional Expression (6) fGc/(−fGa) = 1.2313
Conditional Expression (7) fGc/(−fGb) = 0.7893
Conditional Expression (8) |mda|/fw = 0.7370
Conditional Expression (9) |mcb|/fw = 0.3656
Conditional Expression (10) fp/fGp = 1.0647
Conditional Expression (11) LS/LGp = 0.6307
Conditional Expression (12) 100 × (Δ/φ) = 0.3279
Conditional Expression (13) Dpn/(−f4) = 0.0070
Conditional Expression (14) fVR/f2 = 1.1429
Conditional Expression (15) f4/f2 = 1.5600
Conditional Expression (16) f3a/f3b = 0.5198
Conditional Expression (17) f3α/f3β = 0.5198
Conditional Expression (18) f3/(−f2) = 1.2313
Conditional Expression (19) f3/(−f4) = 0.7893
Conditional Expression (20) |m12|/fw = 0.7370
Conditional Expression (21) |m34|/fw = 0.3656

Figure 19A:
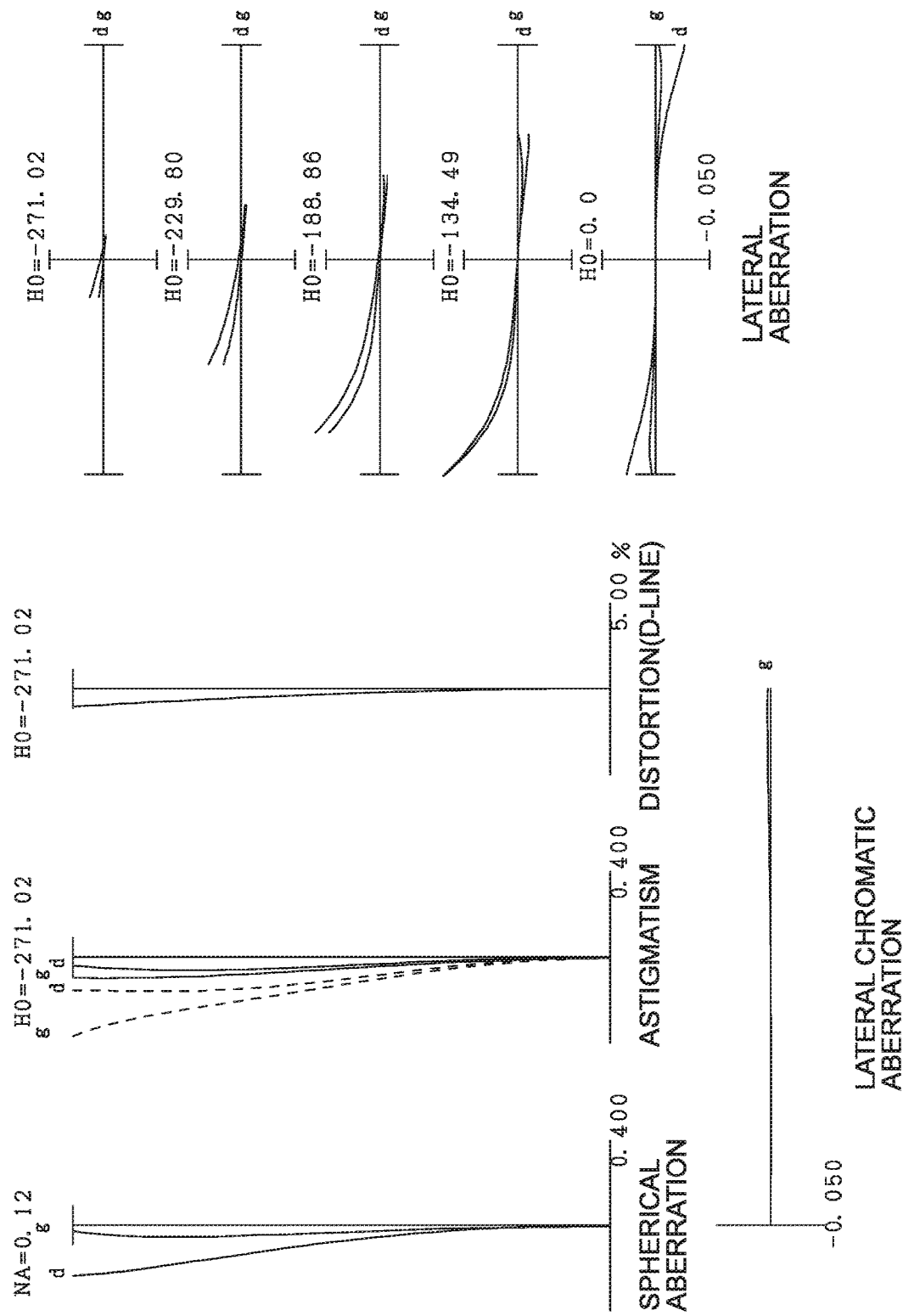
Figure 20A:
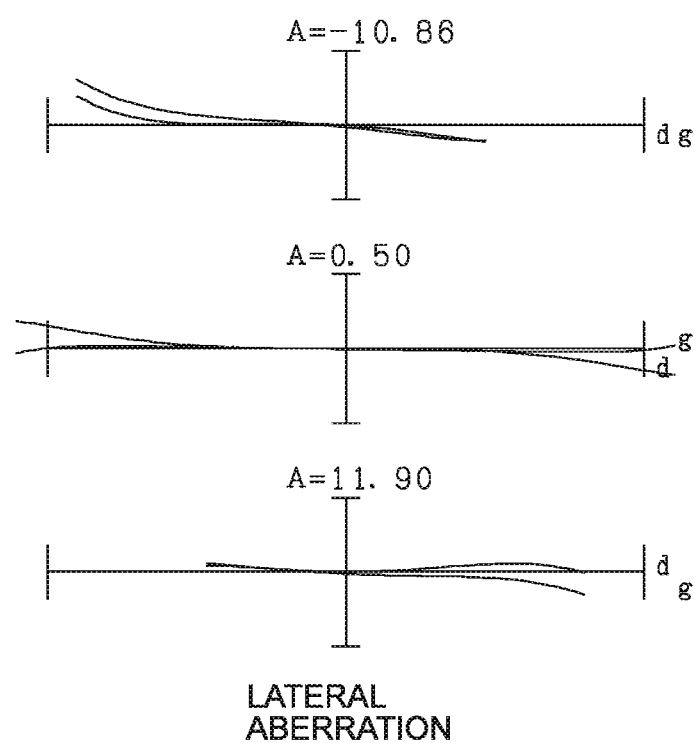
FIG. 20A, FIG. 20B, and FIG. 20C are each a meridional lateral aberration graph when shake compensation is performed in the wide angle end state, in the intermediate focal length state, and in the telephoto end state of the zoom optical system according to Example 5.
Figure 20B:
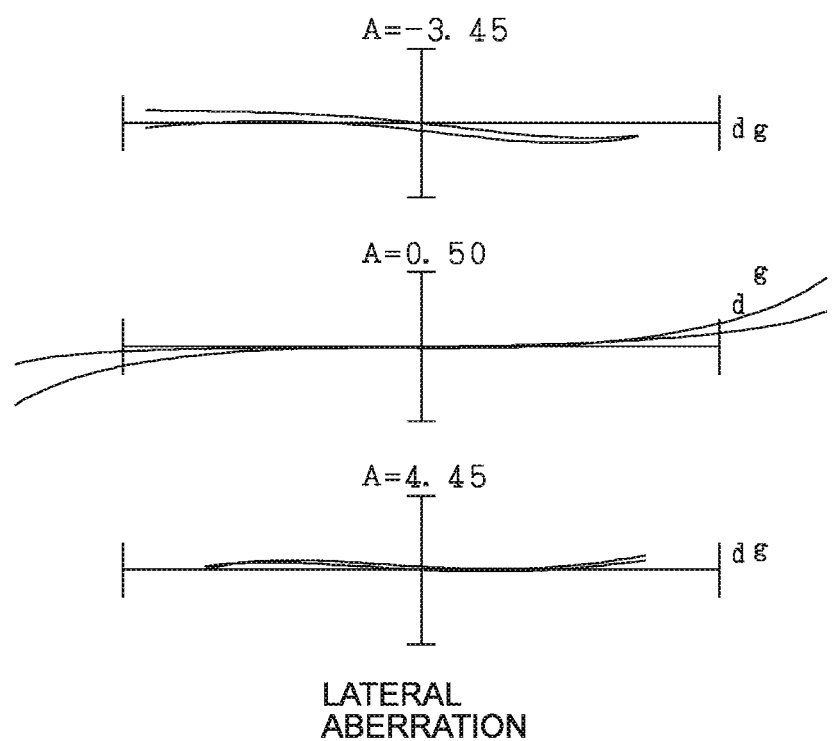
Figure 20C:
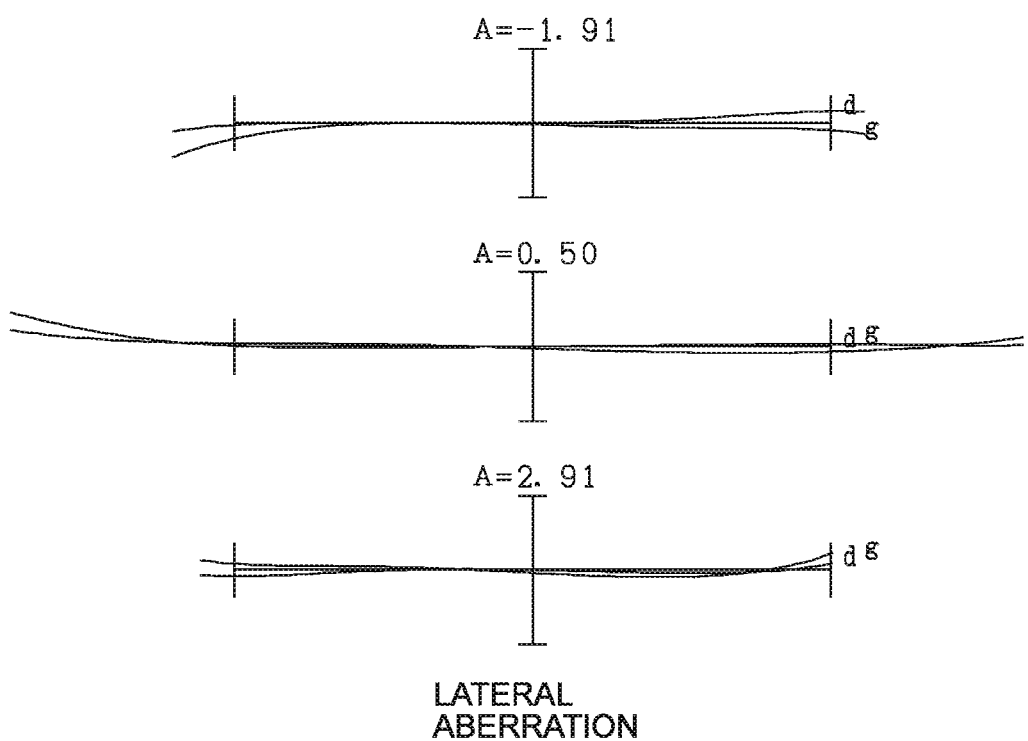

FIG. 18A, FIG. 18B and FIG. 18C are each an aberration graph illustrating aberrations upon focusing on infinity in a wide angle end state, in an intermediate focal length state, and in a telephoto end state of the zoom optical system having a vibration proof function according to Example 5. FIG. 19A, FIG. 19B and FIG. 19C are each an aberration graph illustrating aberrations upon focusing on short distance (close range) in a wide angle end state, in an intermediate focal length state, and in a telephoto end state of the zoom optical system having a vibration proof function according to Example 5. FIG. 20A, FIG. 20B, and FIG. 20C are each a meridional lateral aberration graph when shake compensation is performed in the wide angle end state, in the intermediate focal length state, and in the telephoto end state of the zoom optical system having a vibration proof function according to Example 5. It is apparent from respective aberration graphs that the zoom optical system according to Example 5 has an excellent image forming performance capable of correcting various aberrations successfully from the wide angle end state to the telephoto end state, and also has an excellent image forming performance also upon focusing on a short distant object.

Example 6

Example 6 will be described with reference to FIG. 21 to FIG. 24 and Table 6. FIG. 21 is a drawing illustrating a lens configuration of a zoom optical system according to Example 6. The zoom optical system ZL (6) according to Example 6 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 21, and the fifth lens group G5 is secured. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment.

The first lens group G1 consists of, in order from an object, a meniscus shaped first positive lens L11 having a convex surface facing the object and a cemented lens consisting of a meniscus shaped negative lens L12 having a convex surface facing the object and a second positive lens L13 having a biconvex shape.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a meniscus shaped negative lens L32 having a convex surface facing the object and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In contrast, the first positive lens L31, the negative lens L32, and the second positive lens L33 constitute the second object side subgroup, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (6) according to Example 6, focusing from the infinity to the short distant object is achieved by moving all the lenses in the fourth lens group G4 to the image side along the optical axis. Also, in the zoom optical system ZL (6) according to Example 6, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 6, the vibration proof coefficient is −1.18, the focal length is 51.50 mm. Therefore, the amount of movement of the vibration-proof lens group for correcting the rotational blur of 0.38° is −0.29 mm. In the intermediate focal length state of Example 6, the vibration proof coefficient is −2.12, the focal length is 147.00 mm. Therefore, the amount of movement of the vibration-proof lens group for correcting the rotational blur of 0.30° is −0.36 mm. In the telephoto end state of Example 6, the vibration proof coefficient is −3.02, the focal length is 242.50 mm. Therefore, the amount of movement of the vibration-proof lens group for correcting the rotational blur of 0.30° is −0.42 mm.

In Table 6 shown below, data values of the zoom optical system according to Example 6 will be shown.

TABLE 6

[General Data]
zooming rate 4.71
φ 19.6040
Δ 0.0756

|  | W | M | T |
|---|---|---|---|
| f | 51.50 | 147.00 | 242.50 |
| FNO | 4.49 | 5.12 | 6.35 |
| 2ω | 33.0 | 11.2 | 6.8 |
| Y | 14.75 | 14.75 | 14.75 |
| TL | 149.546 | 165.522 | 181.571 |
| BF | 16.057 | 16.033 | 16.082 |

[Lens Data]

| Surface Number | R | D | nd | νd |  |
|---|---|---|---|---|---|
| 1 | 73.23242 | 3.136 | 1.48749 | 70.3 |  |
| 2 | 128.12637 | 0.150 |  |  |  |
| 3 | 70.00768 | 2.000 | 1.89190 | 37.1 |  |
| 4 | 44.09599 | 6.484 | 1.49782 | 82.6 |  |
| 5 | −346.69704 | D5(variable) |  |  |  |
| 6 | −144.15859 | 1.500 | 1.61800 | 63.3 |  |
| 7 | 69.26357 | 1.742 |  |  |  |
| 8 | −59.86879 | 1.500 | 1.61800 | 63.3 |  |
| 9 | 39.22000 | 2.890 | 1.80809 | 22.8 |  |
| 10 | 116.35585 | D10(variable) |  |  |  |
| 11 | ∞ | 1.000 |  |  | (Aperture S) |
| 12* | 22.82058 | 4.270 | 1.58313 | 59.4 |  |
| 13 | −352.54253 | 9.345 |  |  |  |
| 14 | 341.42758 | 1.500 | 1.95375 | 32.3 |  |
| 15 | 17.61559 | 3.948 | 1.49782 | 82.6 |  |
| 16 | −89.90153 | 9.738 |  |  |  |
| 17 | 40.00424 | 3.341 | 1.62004 | 36.4 |  |
| 18 | −124.57218 | D18(variable) |  |  |  |
| 19 | −48.94477 | 2.849 | 1.64769 | 33.7 |  |
| 20 | −25.84032 | 4.651 |  |  |  |
| 21 | −21.32560 | 1.500 | 1.61800 | 63.3 |  |
| 22 | 65.03472 | D22(variable) |  |  |  |
| 23 | −102.08397 | 2.443 | 1.48749 | 70.3 |  |
| 24 | −69.00838 | BF |  |  |  |

[Aspherical Data]

Twelfth Surface

κ = 1.00000E+00
A4 = −7.37913E−06, A6 = −5.05231E−09, A8 = −5.01437E−11, A10 = 1.59136E−13

[Lens Group Data]

| Group | Starting Surface | Focal Length |
|---|---|---|
| G1 | 1 | 122.71 |
| G2 | 6 | −38.09 |
| G3 | 12 | 40.11 |
| G4 | 19 | −40.20 |
| G5 | 23 | 426.58 |

[Variable Distance Data]

|  | W Infinity | M Infinity | T Infinity | W Short Distance | M Short Distance | T Short Distance |
|---|---|---|---|---|---|---|
| f | 51.50 | 147.00 | 242.50 | — | — | — |
| Magnification | — | — | — | −0.0562 | −0.1393 | −0.2428 |
| D0 | ∞ | ∞ | ∞ | 844.43 | 828.43 | 812.43 |
| D5 | 6.640 | 45.984 | 55.000 | 6.640 | 45.984 | 55.000 |
| D10 | 42.959 | 11.661 | 2.493 | 42.959 | 11.661 | 2.493 |
| D18 | 14.018 | 10.921 | 2.595 | 16.211 | 22.316 | 17.610 |
| D22 | 5.885 | 16.936 | 41.414 | 3.692 | 5.542 | 26.399 |
| BF | 16.057 | 16.033 | 16.082 | 16.073 | 16.127 | 16.367 |

TABLE 6-continued

[Conditional Expression Corresponding Value]

Conditional Expression (1) fGb/fGa = 1.0556
Conditional Expression (2) fVR/fGa = 1.0000
Conditional Expression (3) Dpn/(−fGb) = 0.1157
Conditional Expression (4) fa/fb = 0.2920
Conditional Expression (5) fα/fβ = 1.3131
Conditional Expression (6) fGc/(−fGa) = 1.0532
Conditional Expression (7) fGc/(−fGb) = 0.9978
Conditional Expression (8) |mda|/fw = 0.9390
Conditional Expression (9) |mcb|/fw = 0.2218
Conditional Expression (10) fp/fGp = 0.9202
Conditional Expression (11) LS/LGp = 0.5937
Conditional Expression (12) 100 × (Δ/φ) = 0.3856
Conditional Expression (13) Dpn/(−f4) = 0.1157
Conditional Expression (14) fVR/f2 = 1.0000
Conditional Expression (15) f4/f2 = 1.0556
Conditional Expression (16) f3a/f3b = 0.2920
Conditional Expression (17) f3α/f3β = 1.3131
Conditional Expression (18) f3/(−f2) = 1.0532
Conditional Expression (19) f3/(−f4) = 0.9978
Conditional Expression (20) |m12|/fw = 0.9390
Conditional Expression (21) |m34|/fw = 0.2218

Figure 22A:
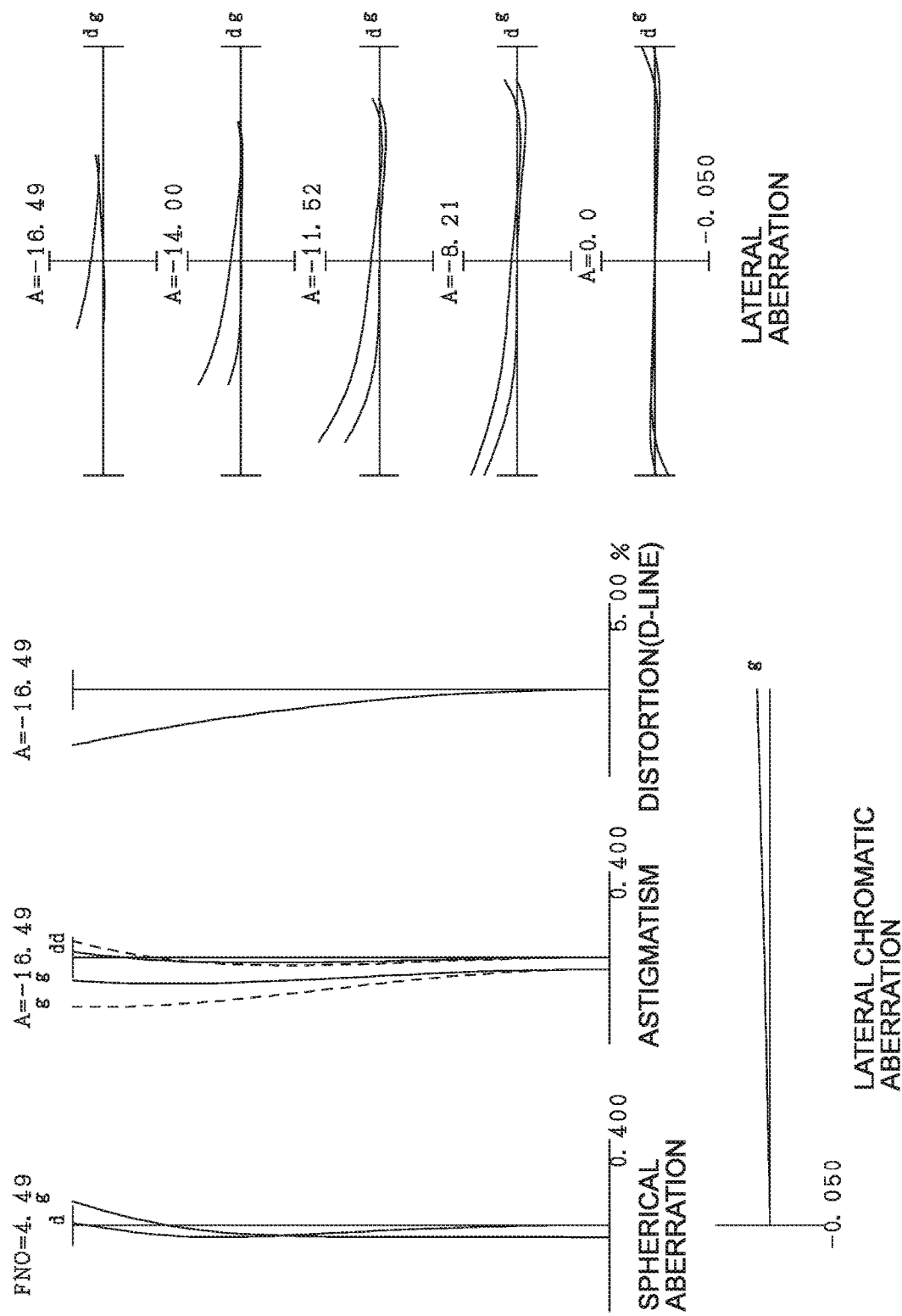
Figure 22C:
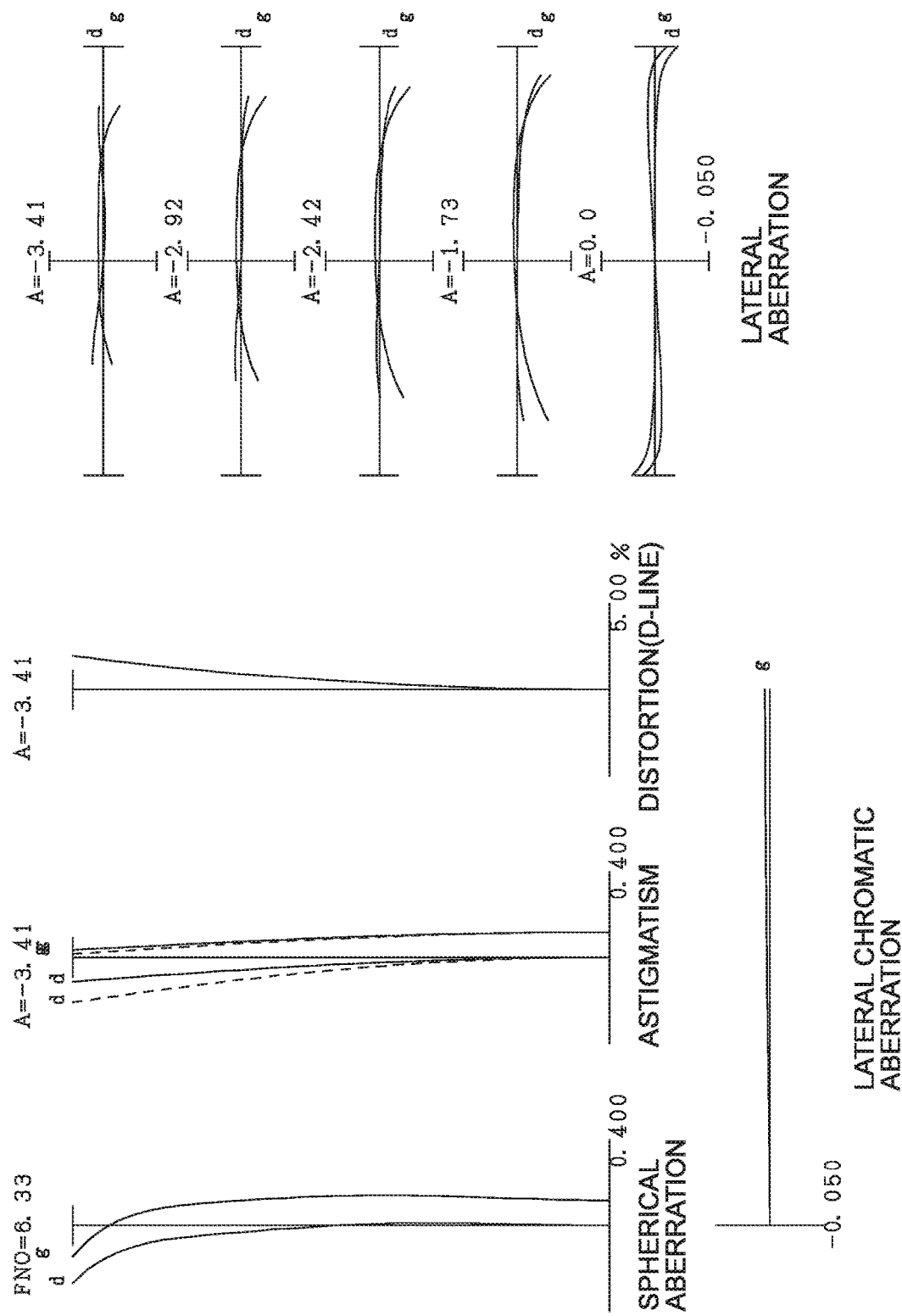
Figure 23A:
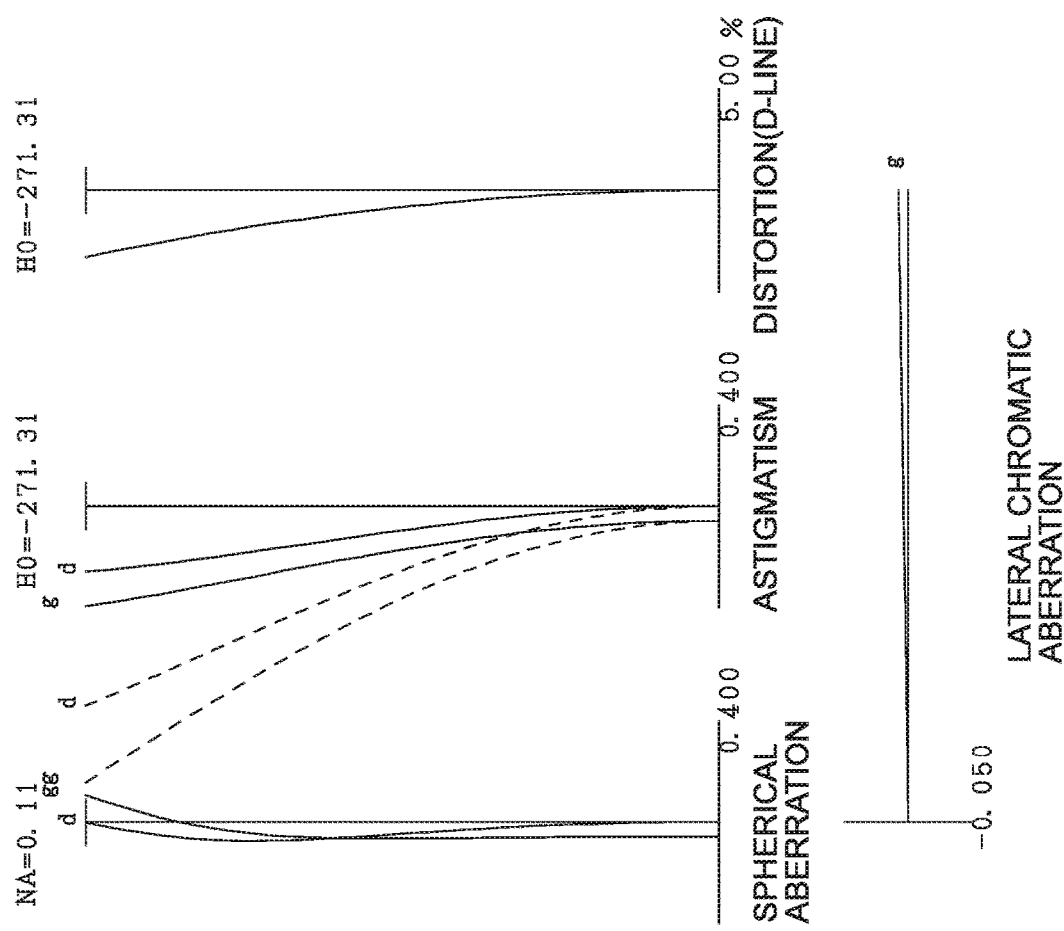
Figure 24A:
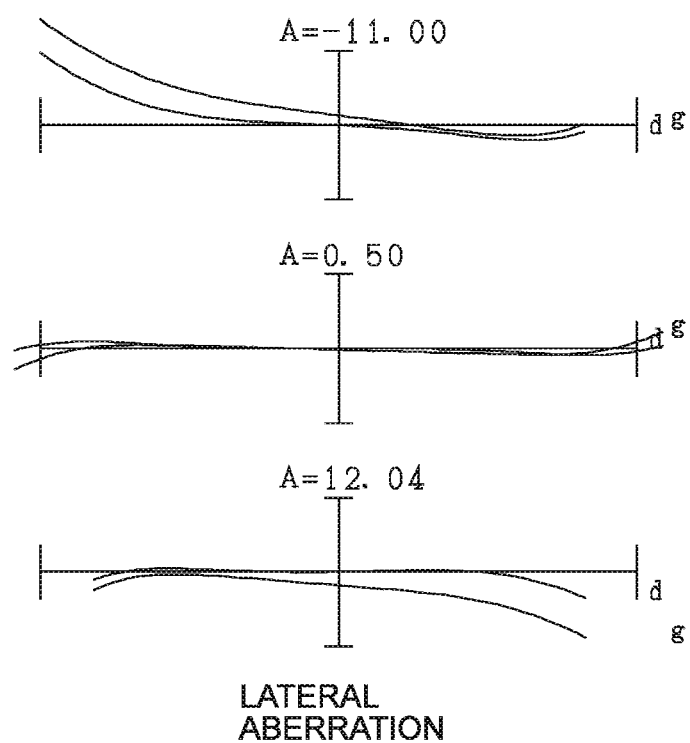
FIG. 24A, FIG. 24B, and FIG. 24C are each a meridional lateral aberration graph when shake compensation is performed in the wide angle end state, in the intermediate focal length state, and in the telephoto end state of the zoom optical system according to Example 6.
Figure 24B:
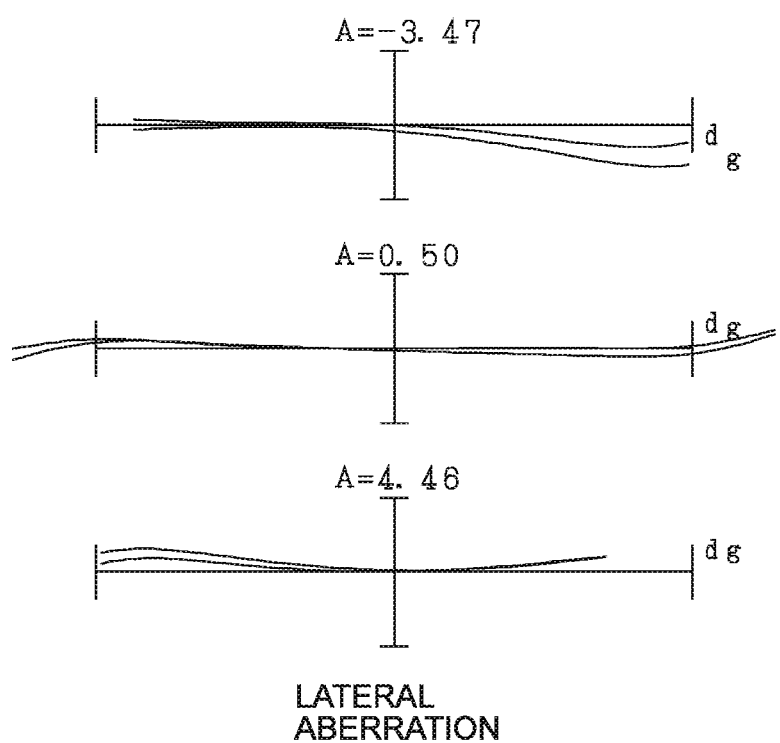
Figure 24C:
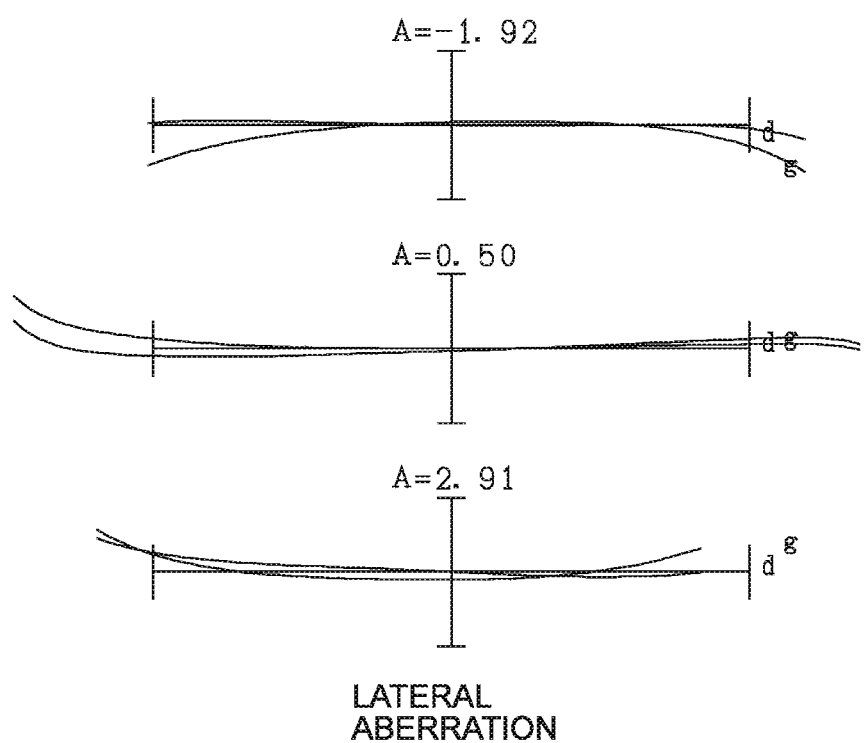

FIG. 22A, FIG. 22B and FIG. 22C are each an aberration graph illustrating aberrations upon focusing on infinity in a wide angle end state, in an intermediate focal length state, and in a telephoto end state of the zoom optical system having a vibration proof function according to Example 6. FIG. 23A, FIG. 23B and FIG. 23C are each an aberration graph illustrating aberrations upon focusing on short distance (close range) in a wide angle end state, in an intermediate focal length state, and in a telephoto end state of the zoom optical system having a vibration proof function according to Example 6. FIG. 24A, FIG. 24B, and FIG. 24C are each a meridional lateral aberration graph when shake compensation is performed in the wide angle end state, in the intermediate focal length state, and in the telephoto end state of the zoom optical system having a vibration proof function according to Example 6. It is apparent from respective aberration graphs that the zoom optical system according to Example 6 has an excellent image forming performance capable of correcting various aberrations successfully from the wide angle end state to the telephoto end state, and also has an excellent image forming performance also upon focusing on a short distant object.

Example 7

Figure 25:
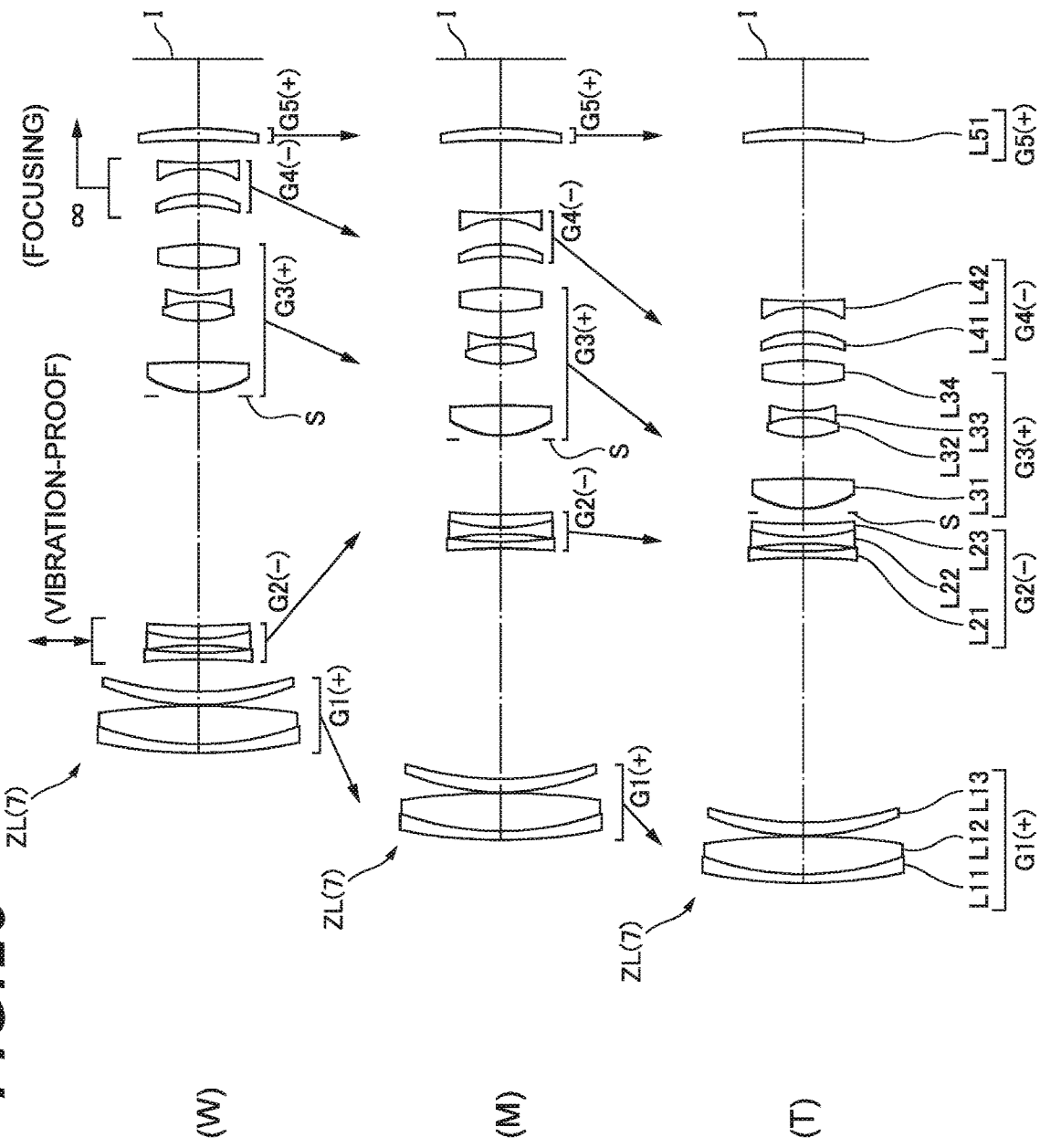
FIG. 25 is a drawing illustrating a lens configuration of a zoom optical system according to Example 7.

Example 7 will be described with reference to FIG. 25 to FIG. 28 and Table 7. FIG. 25 is a drawing illustrating a lens configuration of a zoom optical system according to Example 7. The zoom optical system ZL (7) according to Example 7 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 25, and the fifth lens group G5 is secured. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment.

The first lens group G1 consists of, in order from an object, a cemented lens consisting of a negative lens L11 meniscus shaped with a convex surface thereof facing the object side and a first positive lens L12 having a biconvex shape, and a meniscus shaped second positive lens L13 having a convex surface facing the object.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a second positive lens L32 having a biconvex shape and a negative lens L33 having a biconcave shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the second positive lens L32, the negative lens L33, and the third positive lens L34 constitute the first image side subgroup. In the same manner, the first positive lens L31 constitutes the second object side subgroup, and the second positive lens L32, the negative lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (7) according to Example 7, focusing from the infinity to the short distant object is achieved by moving all the lenses in the fourth lens group G4 to the image side along the optical axis. Also, in the zoom optical system ZL (7) according to Example 7, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 7, the vibration proof coefficient is −1.04, the focal length is 51.50 mm. Therefore, the amount of movement of the vibration-proof lens group for correcting the rotational blur of 0.38° is −0.33 mm. In the intermediate focal length state of Example 7, the vibration proof coefficient is −1.92, the focal length is 146.99 mm. Therefore, the amount of movement of the vibration-proof lens group for correcting the rotational blur of 0.30° is −0.40 mm. In the telephoto end state of Example 7, the vibration proof coefficient is −2.87, the focal length is 242.46 mm. Therefore, the amount of movement of the vibration-proof lens group for correcting the rotational blur of 0.30° is −0.44 mm.

In Table 7 shown below, data values of the zoom optical system according to Example 7 will be shown.

TABLE 7

| [General Data] | | | |
|---|---|---|---|
| zooming rate 4.71 | | | |
| φ 21.7420 | | | |
| Δ 0.0812 | | | |

| | W | M | T |
|---|---|---|---|
| f | 51.50 | 146.99 | 242.46 |
| FNO | 4.45 | 5.16 | 6.35 |
| 2ω | 32.6 | 11.0 | 6.8 |
| Y | 14.75 | 14.75 | 14.75 |
| TL | 159.487 | 179.476 | 189.442 |
| BF | 15.998 | 15.987 | 15.953 |

[Lens Data]

| Surface Number | R | D | nd | νd | |
|---|---|---|---|---|---|
| 1 | 116.77666 | 2.000 | 1.89190 | 37.1 | |
| 2 | 66.26478 | 8.804 | 1.49782 | 82.6 | |
| 3 | −157.07732 | 0.150 | | | |
| 4 | 56.71957 | 3.051 | 1.48749 | 70.3 | |
| 5 | 72.61791 | D5(variable) | | | |
| 6 | −136.32692 | 1.500 | 1.61800 | 63.3 | |
| 7 | 90.78344 | 1.745 | | | |
| 8 | −67.46030 | 1.500 | 1.61800 | 63.3 | |
| 9 | 43.53314 | 2.942 | 1.84666 | 23.8 | |
| 10 | 121.70198 | D10(variable) | | | |
| 11 | ∞ | 1.000 | | | (Aperture S) |
| 12* | 21.27766 | 6.876 | 1.55332 | 71.7 | |
| 13 | −187.46379 | 9.566 | | | |
| 14 | 22.50666 | 4.454 | 1.49782 | 82.6 | |
| 15 | −22.13521 | 1.500 | 1.95375 | 32.3 | |
| 16 | 21.56753 | 6.178 | | | |
| 17 | 40.28651 | 5.404 | 1.69895 | 30.1 | |
| 18 | −39.80095 | D18(variable) | | | |
| 19 | −31.69688 | 2.781 | 1.62004 | 36.4 | |
| 20 | −20.94278 | 5.719 | | | |
| 21 | −17.59612 | 1.500 | 1.61800 | 63.3 | |
| 22 | 128.08217 | D22(variable) | | | |
| 23 | −151.04365 | 2.691 | 1.48749 | 70.3 | |
| 24 | −69.67045 | BF | | | |

[Aspherical Data]

Twelfth Surface

κ = 1.00000E+00
A4 = −5.26085E−06, A6 = −1.54081E−09, A8 = −2.64260E−11, A10 = 0.00000E+00

[Lens Group Data]

| Group | Starting Surface | Focal Length |
|---|---|---|
| G1 | 1 | 145.38 |
| G2 | 6 | −44.06 |

TABLE 7-continued

| | | | | | |
|---|---|---|---|---|---|
| G3 | | 12 | | 41.20 | |
| G4 | | 19 | | −35.93 | |
| G5 | | 23 | | 262.44 | |

[Variable Distance Data]

| | W<br>Infinity | M<br>Infinity | T<br>Infinity | W<br>Short<br>Distance | M<br>Short<br>Distance | T<br>Short<br>Distance |
|---|---|---|---|---|---|---|
| f | 51.50 | 146.99 | 242.46 | — | — | — |
| Magnification | — | — | — | −0.0566 | −0.1414 | −0.2440 |
| D0 | ∞ | ∞ | ∞ | 834.43 | 814.43 | 804.43 |
| D5 | 7.439 | 53.047 | 60.838 | 7.439 | 53.047 | 60.838 |
| D10 | 52.750 | 17.177 | 2.577 | 52.750 | 17.177 | 2.577 |
| D18 | 8.810 | 7.217 | 3.780 | 10.787 | 17.018 | 18.785 |
| D22 | 5.129 | 16.686 | 36.933 | 3.151 | 6.885 | 21.928 |
| BF | 15.998 | 15.987 | 15.953 | 16.014 | 16.084 | 16.242 |

[Conditional Expression Corresponding Value]

Conditional Expression (1) fGb/fGa = 0.8156
Conditional Expression (2) fVR/fGa = 1.0000
Conditional Expression (3) Dpn/(−fGb) = 0.1592
Conditional Expression (4) fa/fb = 0.1214
Conditional Expression (5) fα/fβ = 0.1214
Conditional Expression (6) fGc/(−fGa) = 0.9352
Conditional Expression (7) fGc/(−fGb) = 1.1466
Conditional Expression (8) |mda|/fw = 1.0369
Conditional Expression (9) |mcb|/fw = 0.0977
Conditional Expression (10) fp/fGp = 0.8481
Conditional Expression (11) LS/LGp = 0.4634
Conditional Expression (12) 100 × (Δ/φ) = 0.3735
Conditional Expression (13) Dpn/(−f4) = 0.1592
Conditional Expression (14) fVR/f2 = 1.0000
Conditional Expression (15) f4/f2 = 0.8156
Conditional Expression (16) f3a/f3b = 0.1214
Conditional Expression (17) f3α/f3β = 0.1214
Conditional Expression (18) f3/(−f2) = 0.9352
Conditional Expression (19) f3/(−f4) = 1.1466
Conditional Expression (20) |m12|/fw = 1.0369
Conditional Expression (21) |m34|/fw = 0.0977

Figure 26A:
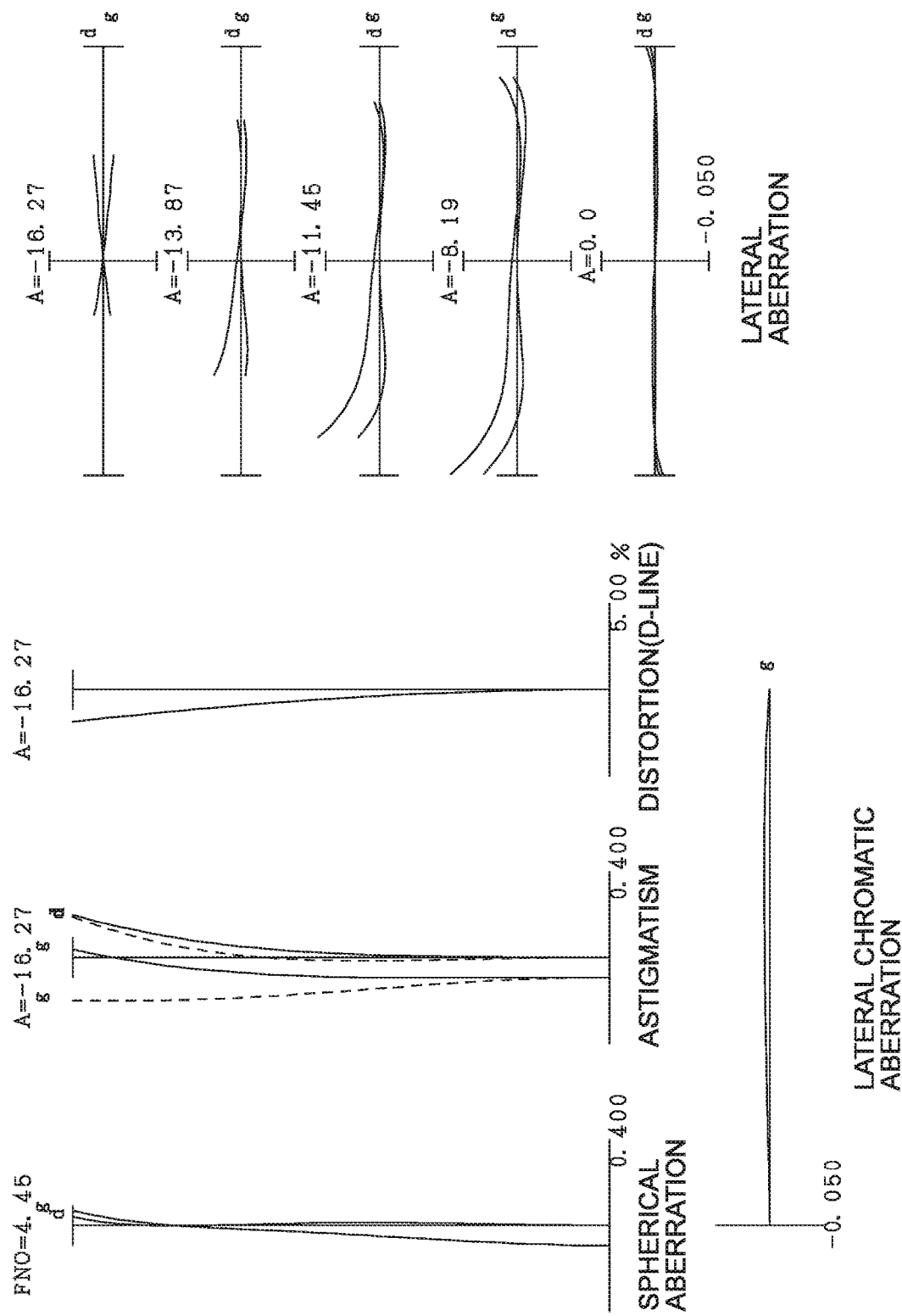
Figure 28A:
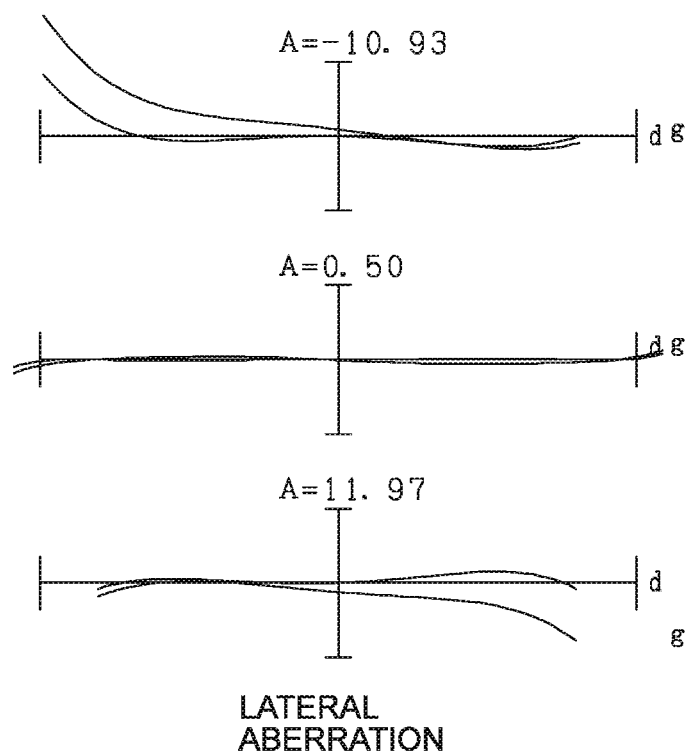
FIG. 28A, FIG. 28B, and FIG. 28C are each a meridional lateral aberration graph when shake compensation is performed in the wide angle end state, in the intermediate focal length state, and in the telephoto end state of the zoom optical system according to Example 7.
Figure 28B:
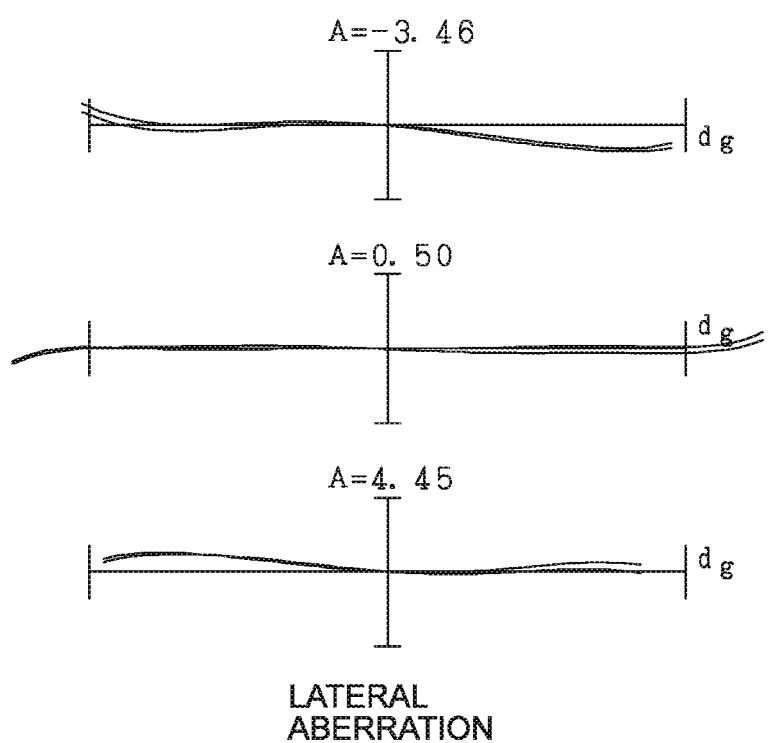
Figure 28C:
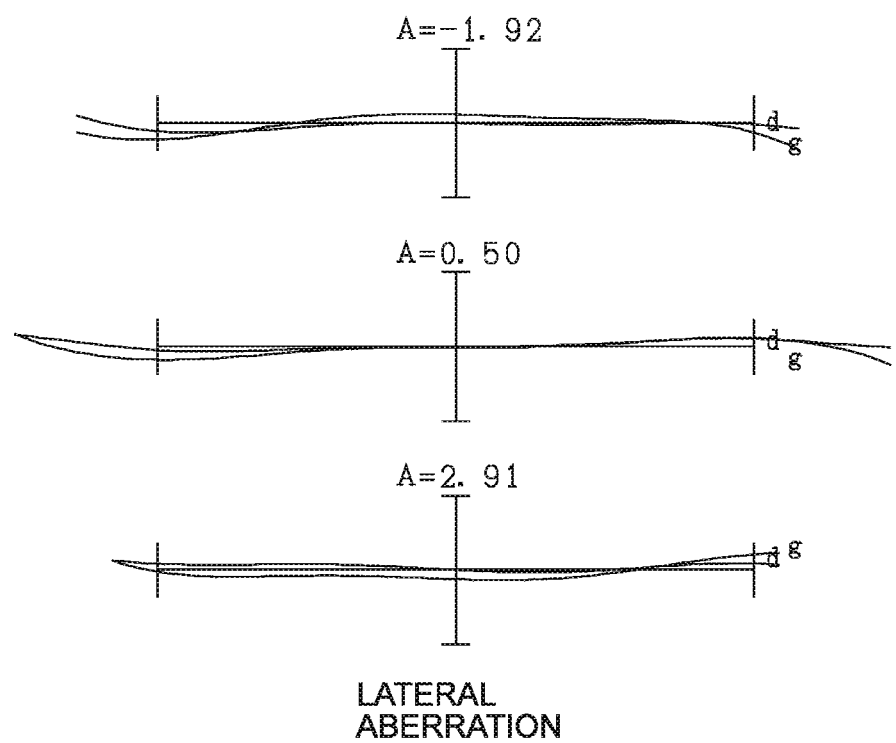

FIG. 26A, FIG. 26B and FIG. 26C are each an aberration graph illustrating aberrations upon focusing on infinity in a wide angle end state, in an intermediate focal length state, and in a telephoto end state of the zoom optical system having a vibration proof function according to Example 7. FIG. 27A, FIG. 27B and FIG. 27C are each an aberration graph illustrating aberrations upon focusing on short distance (close range) in a wide angle end state, in an intermediate focal length state, and in a telephoto end state of the zoom optical system having a vibration proof function according to Example 7. FIG. 28A, FIG. 28B, and FIG. 28C are each a meridional lateral aberration graph when shake compensation is performed in the wide angle end state, in the intermediate focal length state, and in the telephoto end state of the zoom optical system having a vibration proof function according to Example 7. It is apparent from respective aberration graphs that the zoom optical system according to Example 7 has an excellent image forming performance capable of correcting various aberrations successfully from the wide angle end state to the telephoto end state, and also has an excellent image forming performance also upon focusing on a short distant object.

Example 8

Figure 29:
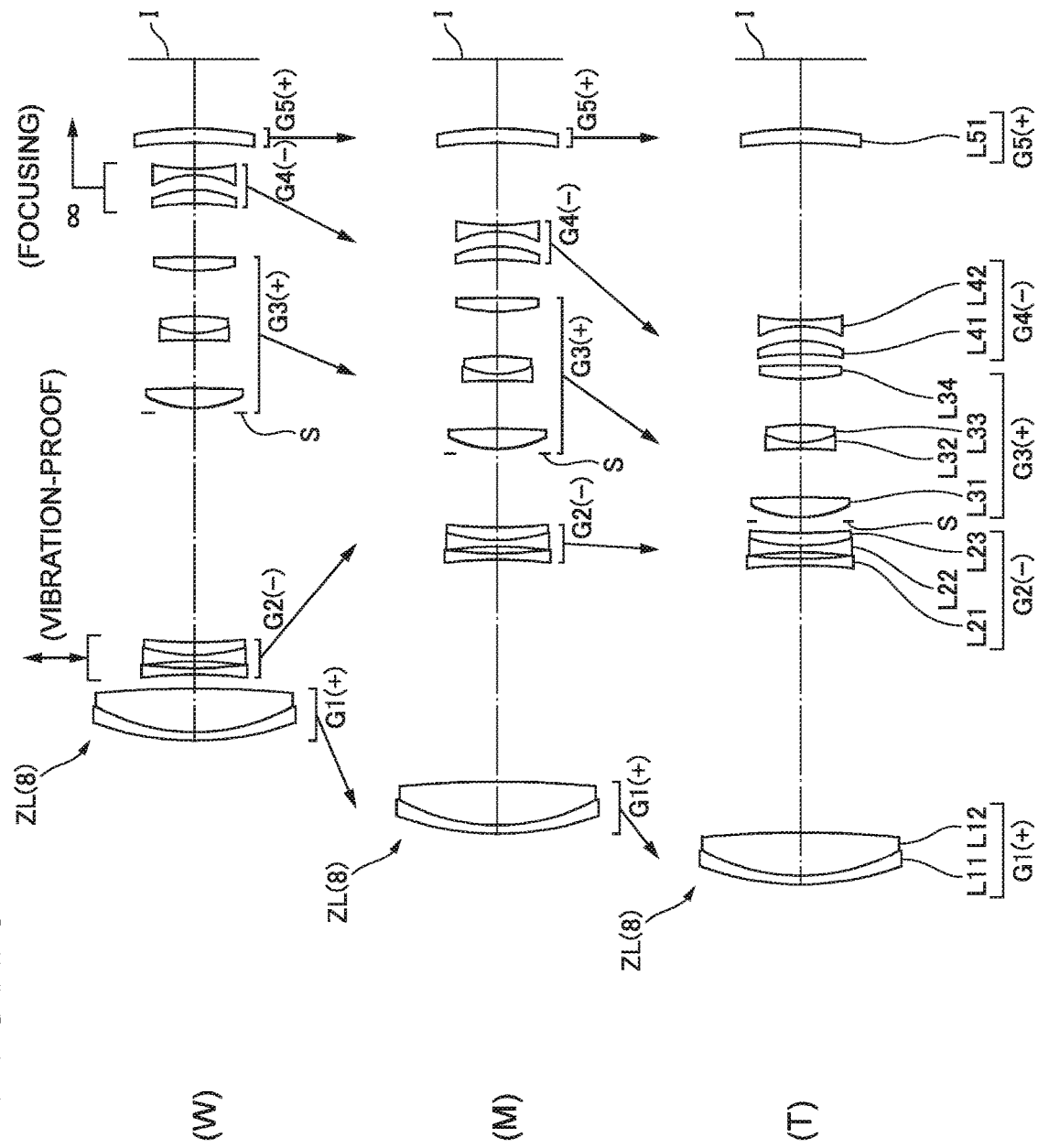
FIG. 29 is a drawing illustrating a lens configuration of a zoom optical system according to an Example 8.

Example 8 will be described with reference to FIG. 29 to FIG. 32 and Table 8. FIG. 29 is a drawing illustrating a lens configuration of a zoom optical system according to Example 8. The zoom optical system ZL (8) according to Example 8 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fourth lens groups G1 to G4 move in the directions indicated by the arrows shown in FIG. 29, and the fifth lens group G5 is secured. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment.

The first lens group G1 consists of, in order from an object, a cemented lens consisting of a meniscus shaped negative lens L11 having a convex surface facing the object, and a first positive lens L12 having a biconvex shape.

The second lens group G2 consists of, in order from an object, a first negative lens L21 having a biconcave shape and a cemented lens consisting of a second negative lens L22 having a biconcave shape and a meniscus shaped positive lens L23 having a convex surface facing the object. In this example, the first negative lens L21, the second negative lens L22, and the positive lens L23 (that is, all the lenses in the second lens group G2) constitute the vibration proof group.

The third lens group G3 consists of, in order from an object, a first positive lens L31 having a biconvex shape, a cemented lens consisting of a negative lens L32 having a biconcave shape and a second positive lens L33 having a biconvex shape, and a third positive lens L34 having a biconvex shape. The aperture stop S is provided near the object side of the third lens group G3, and moves integrally with the third lens group G3 during zooming. A lens surface on the object side of the first positive lens L31 has an aspherical surface, and is disposed on the image side of the aperture stop S so as to face the aperture stop S. In this example, the first positive lens L31 constitutes the first object side subgroup, and the negative lens L32, the second positive lens L33, and the third positive lens L34 constitute the first image side subgroup. In the same manner, the first positive lens L31 constitutes the second object side subgroup, and the negative lens L32, the second positive lens L33, and the third positive lens L34 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of a positive lens L51 meniscus shaped with a convex surface facing the image side. An image surface I is disposed on the image side of the fifth lens group G5.

In the zoom optical system ZL (8) according to Example 8, focusing from the infinity to the short distant object is achieved by moving all the lenses in the fourth lens group G4 to the image side along the optical axis. Also, in the zoom optical system ZL (8) according to Example 8, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 8, the vibration proof coefficient is −1.02, the focal length is 51.50 mm. Therefore, the amount of movement of the vibration-proof lens group for correcting the rotational blur of 0.38° is −0.33 mm. In the intermediate focal length state of Example 8, the vibration proof coefficient is −1.86, the focal length is 147.00 mm. Therefore, the amount of movement of the vibration-proof lens group for correcting the rotational blur of 0.30° is −0.41 mm. In the telephoto end state of Example 8, the vibration proof coefficient is −2.68, the focal length is 242.50 mm. Therefore, the amount of movement of the vibration-proof lens group for correcting the rotational blur of 0.30° is −0.47 mm.

In Table 8 shown below, data values of the zoom optical system according to Example 8 will be shown.

TABLE 8

| [General Data] | | |
|---|---|---|
| zooming rate 4.71 | | |
| φ 20.8580 | | |
| Δ 0.0803 | | |

|  | W | M | T |
|---|---|---|---|
| f | 51.50 | 147.00 | 242.50 |
| FNO | 4.49 | 5.23 | 6.35 |
| 2ω | 33.0 | 11.2 | 6.8 |
| Y | 14.75 | 14.75 | 14.75 |
| TL | 156.512 | 177.844 | 189.541 |
| BF | 15.987 | 16.005 | 16.052 |

[Lens Data]

| Surface Number | R | D | nd | νd | |
|---|---|---|---|---|---|
| 1 | 66.20579 | 2.000 | 1.89190 | 37.1 | |
| 2 | 46.51466 | 9.965 | 1.49782 | 82.6 | |
| 3 | −253.04363 | D3(variable) | | | |
| 4 | −113.59911 | 1.500 | 1.61800 | 63.3 | |
| 5 | 96.53848 | 1.543 | | | |
| 6 | −75.73354 | 1.500 | 1.58913 | 61.2 | |
| 7 | 42.43845 | 2.891 | 1.84666 | 23.8 | |
| 8 | 109.64148 | D8(variable) | | | |
| 9 | ∞ | 1.000 | | | (Aperture S) |
| 10* | 23.81391 | 4.594 | 1.61881 | 63.9 | |
| 11 | −192.35661 | 11.074 | | | |
| 12 | −109.32160 | 1.500 | 1.95375 | 32.3 | |
| 13 | 18.85959 | 3.991 | 1.49782 | 82.6 | |
| 14 | −49.11786 | 10.482 | | | |
| 15 | 42.16349 | 3.131 | 1.69895 | 30.1 | |
| 16 | −192.85659 | D16(variable) | | | |
| 17 | −58.00910 | 3.101 | 1.62004 | 36.4 | |
| 18 | −24.00528 | 3.399 | | | |
| 19 | −20.05219 | 1.500 | 1.61800 | 63.3 | |
| 20 | 56.15912 | D20(variable) | | | |

TABLE 8-continued

| 21 | −99.07327 | 3.231 | 1.48749 | 70.3 |
| 22 | −69.36557 | BF | | |

[Aspherical Data]

Tenth Surface

κ = 1.00000E+00
A4 = −6.04393E−06, A6 = −5.13093E−09 , A8 = −1.58013E−11 , A10 = 0.00000E+00

[Lens Group Data]

| Group | Starting Surface | Focal Length |
|---|---|---|
| G1 | 1 | 143.01 |
| G2 | 4 | −46.04 |
| G3 | 10 | 43.15 |
| G4 | 17 | −40.12 |
| G5 | 21 | 458.20 |

[Variable Distance Data]

| | W Infinity | M Infinity | T Infinity | W Short Distance | M Short Distance | T Short Distance |
|---|---|---|---|---|---|---|
| f | 51.50 | 147.00 | 242.50 | — | — | — |
| Magnification | — | — | — | −0.0568 | −0.1420 | −0.2429 |
| D0 | ∞ | ∞ | ∞ | 837.39 | 816.08 | 804.43 |
| D3 | 3.189 | 50.971 | 61.368 | 3.189 | 50.971 | 61.368 |
| D8 | 52.750 | 16.964 | 2.613 | 52.750 | 16.964 | 2.613 |
| D16 | 12.220 | 8.654 | 2.561 | 14.352 | 18.721 | 17.566 |
| D20 | 5.964 | 18.848 | 40.545 | 3.833 | 8.781 | 25.540 |
| BF | 15.987 | 16.005 | 16.052 | 16.003 | 16.103 | 16.338 |

[Conditional Expression Corresponding Value]

Conditional Expression (1) fGb/fGa = 0.8714
Conditional Expression (2) fVR/fGa = 1.0000
Conditional Expression (3) Dpn/(−fGb) = 0.0847
Conditional Expression (4) fα/fβ = 0.1658
Conditional Expression (5) fα/fβ = 0.1658
Conditional Expression (6) fGc/(−fGa) = 0.9373
Conditional Expression (7) fGc/(−fGb) = 1.0757
Conditional Expression (8) |mda|/fw = 1.1297
Conditional Expression (9) |mcb|/fw = 0.1876
Conditional Expression (10) fp/fGp = 0.8001
Conditional Expression (11) LS/LGp = 0.6199
Conditional Expression (12) 100 × (Δ/φ) = 0.3850
Conditional Expression (13) Dpn/(−f4) = 0.0847
Conditional Expression (14) fVR/f2 = 1.0000
Conditional Expression (15) f4/f2 = 0.8714
Conditional Expression (16) f3a/f3b = 0.1658
Conditional Expression (17) f3α/f3β = 0.1658
Conditional Expression (18) f3/(−f2) = 0.9373
Conditional Expression (19) f3/(−f4) = 1.0757
Conditional Expression (20) |m12|/fw = 1.1297
Conditional Expression (21) |m34|/fw = 0.1876

Figure 32A:
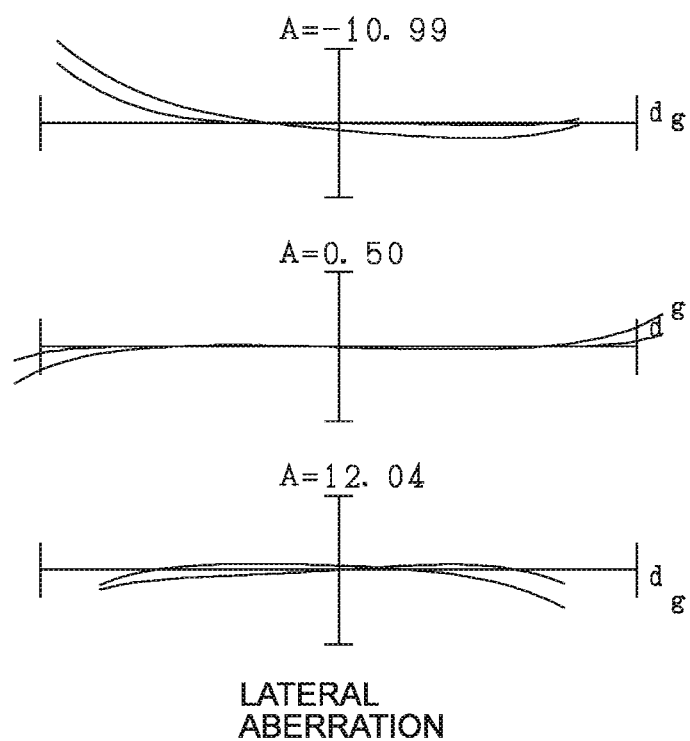
FIG. 32A, FIG. 32B, and FIG. 32C are each a meridional lateral aberration graph when shake compensation is performed in the wide angle end state, in the intermediate focal length state, and in the telephoto end state of the zoom optical system according to Example 8.
Figure 32B:
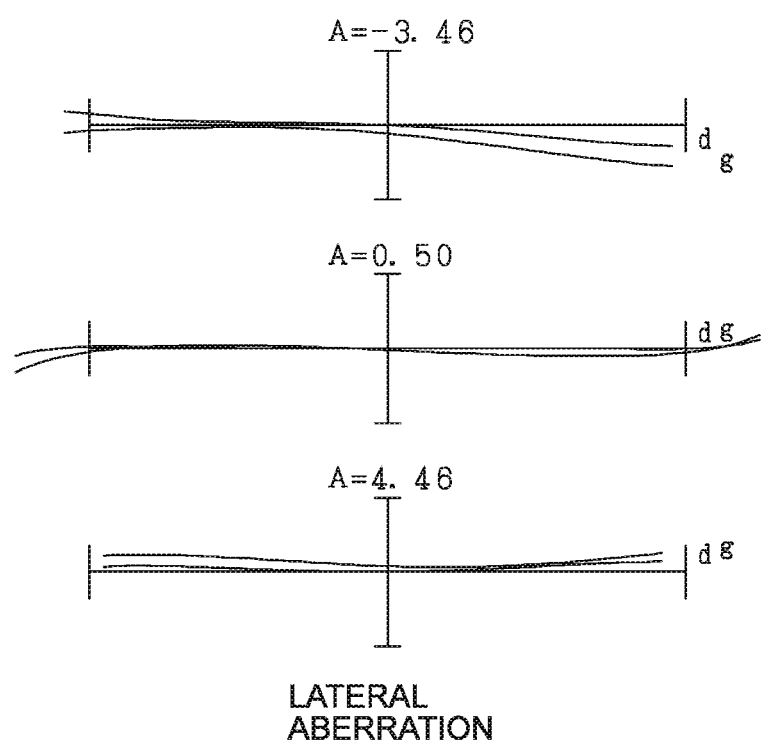
Figure 32C:
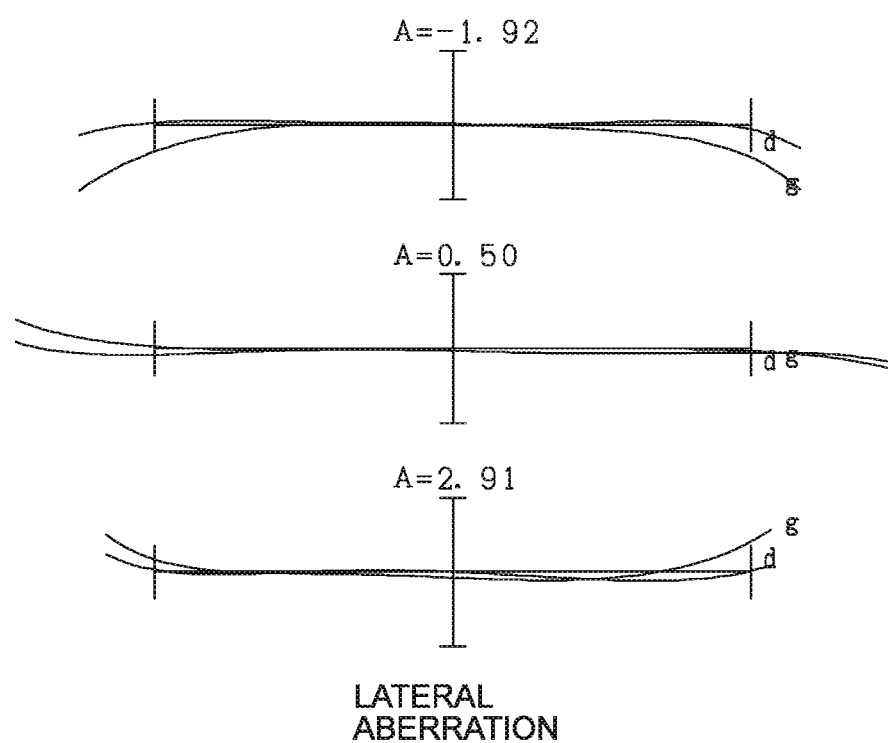

FIG. 30A, FIG. 30B and FIG. 30C are each an aberration graph illustrating aberrations upon focusing on infinity in a wide angle end state, in an intermediate focal length state, and in a telephoto end state of the zoom optical system having a vibration proof function according to Example 8. FIG. 31A, FIG. 31B and FIG. 31C are each an aberration graph illustrating aberrations upon focusing on short distance (close range) in a wide angle end state, in an intermediate focal length state, and in a telephoto end state of the zoom optical system having a vibration proof function according to Example 8. FIG. 32A, FIG. 32B, and FIG. 32C are each a meridional lateral aberration graph when shake compensation is performed in the wide angle end state, in the intermediate focal length state, and in the telephoto end state of the zoom optical system having a vibration proof function according to Example 8. It is apparent from respective aberration graphs that the zoom optical system according to Example 8 has an excellent image forming performance capable of correcting various aberrations successfully from the wide angle end state to the telephoto end state, and also has an excellent image forming performance also upon focusing on a short distant object.

Example 9

Example 9 will be described with reference to FIG. 33 to FIG. 36 and Table 9. FIG. 33 is a drawing illustrating a lens configuration of a zoom optical system according to Example 9. The zoom optical system ZL (9) according to Example 9 consists of, in order from an object, a first lens group G1 having a positive refractive power; a second lens group G2 having a negative refractive power; an aperture stop S; a third lens group G3 having a positive refractive power; a fourth lens group G4 having a negative refractive power, and a fifth lens group G5 having a negative refractive power. For zooming from the wide angle end state (W) to the telephoto end state (T), the first to fifth lens groups G1 to G5 move in the directions indicated by the arrows shown in FIG. 33. Also, for zooming from the wide angle end state (W) to the telephoto end state (T), the third lens group G3 and the fifth lens group G5 move synchronously. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment. Also, the fourth lens group G4 and the fifth lens group G5 constitute the following group GR in the third embodiment.

The first lens group G1 consists of, in order from an object, a first positive lens L11 having a biconvex shape, and a cemented lens consisting of a meniscus shaped negative lens L12 having a convex surface facing the object and a meniscus shaped second positive lens L13 having a convex surface facing the object.

The second lens group G2 consists of, in order from an object, a positive lens L21 having a biconvex shape, first negative lens L22 having a biconcave shape disposed at an air distance from the positive lens L21, and a second negative lens L23 having a biconcave shape disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a cemented lens consisting of a first positive lens L31 having a biconvex shape and a first negative lens L32 meniscus shaped with a convex surface facing the image side, a meniscus shaped second positive lens L33 having a convex surface facing the object, a cemented lens consisting of a meniscus shaped second negative lens L34 having a convex surface facing the object and a third positive lens L35 having a biconvex shape, and a fourth positive lens L36 having a biconvex shape. The aperture stop S is provided near the object side of the third lens group G3, and moves integrally with the third lens group G3 during zooming. In this example, the first positive lens L31, the first negative lens L32, and the second positive lens L33 constitute the first object side subgroup, and the second negative lens L34, the third positive lens L35, and the fourth positive lens L36 constitute the first image side subgroup. In the same manner, the first positive lens L31, the first negative lens L32, and the second positive lens L33 constitute the second object side subgroup, and the second negative lens L34, the third positive lens L35, and the fourth positive lens L36 constitute the second image side subgroup.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of, in order from an object, a negative lens L51 meniscus shaped with a convex surface facing the image side, and a positive lens L52 meniscus shaped with a convex surface facing the image side. An image surface I is disposed on the image side of the fifth lens group G5.

In the zoom optical system ZL (9) according to Example 9, focusing from the infinity to the short distant object is achieved by moving all the lenses in the fourth lens group G4 to the image side along the optical axis. Also, in the zoom optical system ZL (9) according to Example 9, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 9, the vibration proof coefficient is −1.14, the focal length is 51.25 mm. Therefore, the amount of movement of the vibration-proof lens group for correcting the rotational blur of 0.38° is −0.29 mm. In the intermediate focal length state of Example 9, the vibration proof coefficient is −2.14, the focal length is 150.00 mm. Therefore, the amount of movement of the vibration-proof lens group for correcting the rotational blur of 0.30° is −0.37 mm. In the telephoto end state of Example 9, the vibration proof coefficient is −3.00, the focal length is 243.75 mm. Therefore, the amount of movement of the vibration-proof lens group for correcting the rotational blur of 0.30° is −0.42 mm.

In Table 9 shown below, data values of the zoom optical system according to Example 9 will be shown.

TABLE 9

[General Data]
zooming rate 4.76
φ 19.3516
Δ 0.0000

|  | W | M | T |
| --- | --- | --- | --- |
| f | 51.25 | 150.00 | 243.75 |
| FNO | 4.60 | 5.72 | 6.40 |
| 2ω | 30.8 | 10.4 | 6.4 |
| Y | 14.00 | 14.00 | 14.00 |
| TL | 130.819 | 173.736 | 184.319 |
| BF | 14.319 | 34.524 | 50.036 |

TABLE 9-continued

[Lens Data]

| Surface Number | R | D | nd | vd |
|---|---|---|---|---|
| 1 | 1416.79120 | 2.989 | 1.58913 | 61.2 |
| 2 | −147.91784 | 0.000 | | |
| 3 | 61.00249 | 2.000 | 1.67270 | 32.2 |
| 4 | 38.22260 | 4.859 | 1.51680 | 63.9 |
| 5 | 119.14290 | D5(variable) | | |
| 6 | 102.36977 | 2.902 | 1.84666 | 23.8 |
| 7 | −68.94932 | 0.000 | | |
| 8 | −390.03851 | 1.000 | 1.83481 | 42.7 |
| 9 | 50.57712 | 2.261 | | |
| 10 | −32.76989 | 1.000 | 1.83481 | 42.7 |
| 11 | 327.50948 | D11(variable) | | |
| 12 | ∞ | 1.500 | | (Aperture S) |
| 13 | 63.22768 | 4.290 | 1.61800 | 63.3 |
| 14 | −25.88397 | 1.000 | 1.85026 | 32.4 |
| 15 | −67.95813 | 0.000 | | |
| 16 | 23.41092 | 2.701 | 1.83481 | 42.7 |
| 17 | 39.30737 | 9.905 | | |
| 18 | 5597.30300 | 1.000 | 1.83481 | 42.7 |
| 19 | 16.12840 | 3.916 | 1.49782 | 82.6 |
| 20 | −55.01811 | 0.000 | | |
| 21 | 93.69151 | 2.031 | 1.85026 | 32.4 |
| 22 | −181.95197 | D22(variable) | | |
| 23 | −55.96543 | 2.264 | 1.71736 | 29.6 |
| 24 | −23.93891 | 1.325 | | |
| 25 | −26.15067 | 1.000 | 1.83481 | 42.7 |
| 26 | 157.23705 | D26(variable) | | |
| 27 | −17.83804 | 1.000 | 1.49782 | 82.6 |
| 28 | −36.29943 | 0.000 | | |
| 29 | −389.26337 | 2.560 | 1.85000 | 27.0 |
| 30 | −56.49544 | BF | | |

[Lens Group Data]

| Group | Starting Surface | Focal Length |
|---|---|---|
| G1 | 1 | 136.65 |
| G2 | 6 | −39.80 |
| G3 | 13 | 34.62 |
| G4 | 23 | −51.61 |
| G5 | 27 | −1999.99 |

[Variable Distance Data]

| | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0554 | −0.1564 | −0.2667 |
| D0 | ∞ | ∞ | ∞ | 869.18 | 826.26 | 815.68 |
| D5 | 2.000 | 45.577 | 56.263 | 2.000 | 45.577 | 56.263 |
| D11 | 38.113 | 17.247 | 1.633 | 38.113 | 17.247 | 1.633 |
| D22 | 16.656 | 6.548 | 2.584 | 19.137 | 14.288 | 17.571 |
| D26 | 8.227 | 18.336 | 22.300 | 5.747 | 10.596 | 7.313 |
| BF | 14.319 | 34.524 | 50.036 | 14.319 | 34.524 | 50.036 |

[Conditional Expression Corresponding Value]

Conditional Expression (1) fGb/fGa = 1.2967
Conditional Expression (2) fVR/fGa = 1.0000
Conditional Expression (3) Dpn/(−fGb) = 0.0257
Conditional Expression (4) fa/fb = 0.1146
Conditional Expression (5) fα/fβ = 0.1146
Conditional Expression (6) fGc/(−fGa) = 0.8698
Conditional Expression (7) fGc/(−fGb) = 0.6708
Conditional Expression (8) |mda|/fw = 1.0588
Conditional Expression (9) |mcb|/fw = 0.2746
Conditional Expression (13) Dpn/(−f4) = 0.0257
Conditional Expression (14) fVR/f2 = 1.0000
Conditional Expression (15) f4/f2 = 1.2967
Conditional Expression (16) f3a/f3b = 0.1146
Conditional Expression (17) f3α/f3β = 0.1146
Conditional Expression (18) f3/(−f2) = 0.8698
Conditional Expression (19) f3/(−f4) = 0.6708

TABLE 9-continued

Conditional Expression (20) |m12|/fw = 1.0588
Conditional Expression (21) |m34|/fw = 0.2746
Conditional Expression (22) |f4|/(−f2) = 1.2967
Conditional Expression (23) f3a/f3b = 0.1146
Conditional Expression (24) f3α/f3β = 0.1146
Conditional Expression (25) f3/(−f2) = 0.8698
Conditional Expression (26) f3/|f4| = 0.6708
Conditional Expression (27) |m12|/fw = 1.0588
Conditional Expression (28) |m34|/fw = 0.2746

Figure 35C:
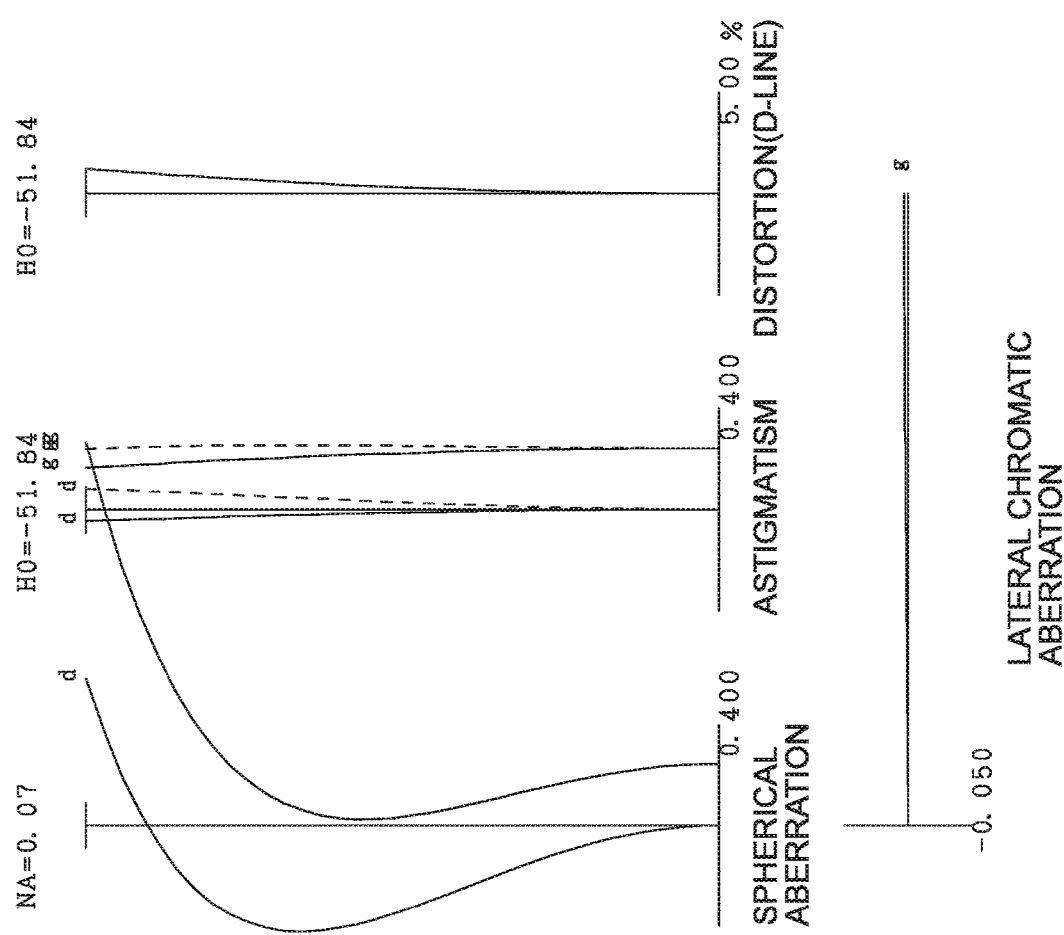
Figure 36A:
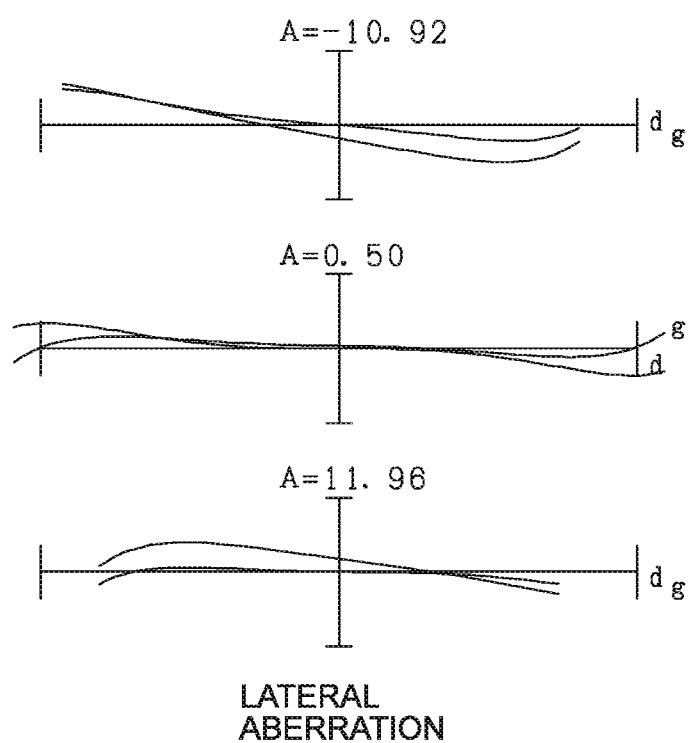
FIG. 36A, FIG. 36B, and FIG. 36C are each a meridional lateral aberration graph when shake compensation is performed in the wide angle end state, in the intermediate focal length state, and in the telephoto end state of the zoom optical system according to Example 9.
Figure 36B:
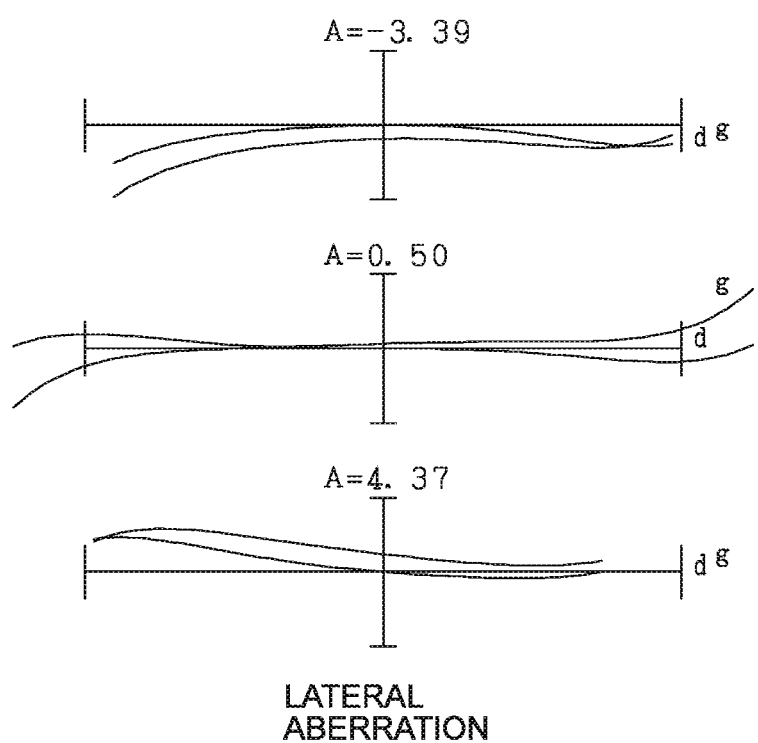
Figure 36C:
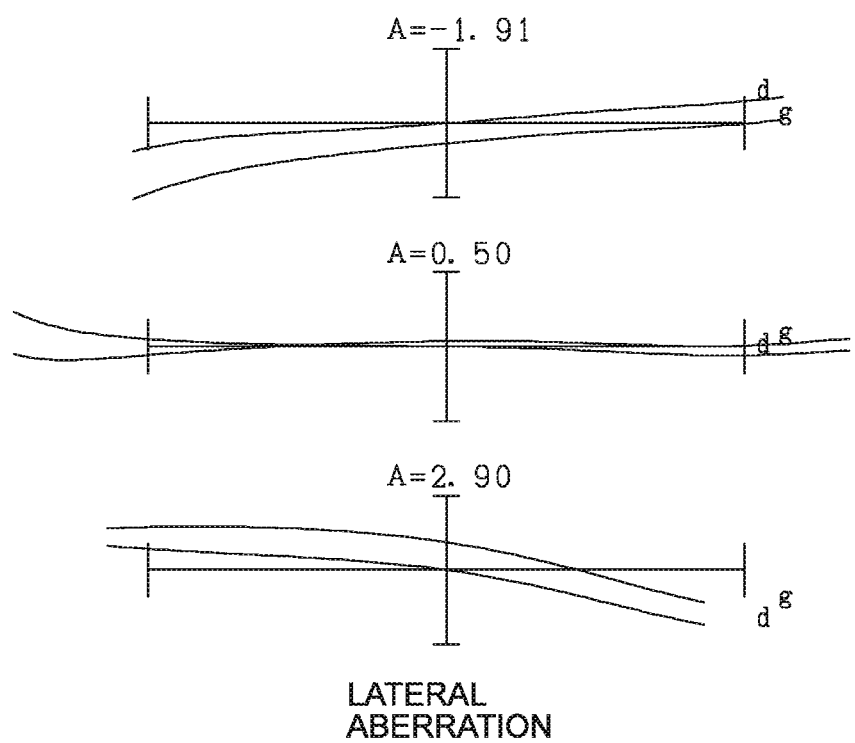

FIG. 34A, FIG. 34B and FIG. 34C are each an aberration graph illustrating aberrations upon focusing on infinity in a wide angle end state, in an intermediate focal length state, and in a telephoto end state of the zoom optical system having a vibration proof function according to Example 9. FIG. 35A, FIG. 35B and FIG. 35C are each an aberration graph illustrating aberrations upon focusing on short distance (close range) in a wide angle end state, in an intermediate focal length state, and in a telephoto end state of the zoom optical system having a vibration proof function according to Example 9. FIG. 36A, FIG. 36B, and FIG. 36C are each a meridional lateral aberration graph when shake compensation is performed in the wide angle end state, in the intermediate focal length state, and in the telephoto end state of the zoom optical system having a vibration proof function according to Example 9. It is apparent from respective aberration graphs that the zoom optical system according to Example 9 has an excellent image forming performance capable of correcting various aberrations successfully from the wide angle end state to the telephoto end state, and also has an excellent image forming performance also upon focusing on a short distant object.

Example 10

Example 10 will be described with reference to FIG. 37 to FIG. 40 and Table 10. FIG. 37 is a drawing illustrating a lens configuration of a zoom optical system according to Example 10. The zoom optical system ZL (10) according to Example 10 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a negative refractive power. For zooming from the wide angle end state (W) to the telephoto end state (T), the first to fifth lens groups G1 to G5 move in the directions indicated by the arrows shown in FIG. 37. Also, for zooming from the wide angle end state (W) to the telephoto end state (T), the third lens group G3 and the fifth lens group G5 move synchronously. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment. Also, the fourth lens group G4 and the fifth lens group G5 constitute the following group GR in the third embodiment.

The first lens group G1 consists of, in order from an object, a cemented lens consisting of a meniscus shaped negative lens L11 having a convex surface facing the object and the meniscus shaped first positive lens L12 having a convex surface facing the object, and a second positive lens L13 having a biconvex shape.

The second lens group G2 consists of, in order from an object, a positive lens L21 having a biconvex shape, first negative lens L22 having a biconcave shape disposed at an air distance from the positive lens L21, and a second negative lens L23 having a flat-concave shape with a concave surface facing the object side and disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a cemented lens consisting of a first positive lens L31 having a biconvex shape and a first negative lens L32 meniscus shaped with a convex surface facing the image side, a meniscus shaped second positive lens L33 having a convex surface facing the object, a cemented lens consisting of a meniscus shaped second negative lens L34 having a convex surface facing the object and a third positive lens L35 having a biconvex shape, and a fourth positive lens L36 having a biconvex shape. The aperture stop S is provided near the object side of the third lens group G3, and moves integrally with the third lens group G3 during zooming. In this example, the first positive lens L31, the first negative lens L32, and the second positive lens L33 constitute the first object side subgroup, and the second negative lens L34, the third positive lens L35, and the fourth positive lens L36 constitute the first image side subgroup. In the same manner, the first positive lens L31, the first negative lens L32, and the second positive lens L33 constitute the second object side subgroup, and the second negative lens L34, the third positive lens L35, and the fourth positive lens L36 constitute the second image side subgroup.

The fourth lens group G4 consists of, in order from an object, a positive lens L41 having a biconvex shape, and a negative lens L42 having a biconcave shape disposed at an air distance from the positive lens L41.

The fifth lens group G5 consists of, in order from an object, a negative lens L51 meniscus shaped with a convex surface facing the image side, and a positive lens L52 having a biconvex shape. An image surface I is disposed on the image side of the fifth lens group G5.

In the zoom optical system ZL (10) according to Example 10, focusing from the infinity to the short distant object is achieved by moving all the lenses in the fourth lens group G4 to the image side along the optical axis. Also, in the zoom optical system ZL (10) according to Example 10, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 10, the vibration proof coefficient is −1.15, the focal length is 51.25 mm. Therefore, the amount of movement of the vibration-proof lens group for correcting the rotational blur of 0.38° is −0.29 mm. In the intermediate focal length state of Example 10, the vibration proof coefficient is −2.17, the focal length is 150.00 mm. Therefore, the amount of movement of the vibration-proof lens group for correcting the rotational blur of 0.30° is −0.36 mm. In the telephoto end state of Example 10, the vibration proof coefficient is −3.00, the focal length is 243.75 mm. Therefore, the amount of movement of the vibration-proof lens group for correcting the rotational blur of 0.30° is −0.42 mm.

In Table 10 shown below, data values of the zoom optical system according to Example 10 will be shown.

TABLE 10

[General Data]
zooming rate 4.76
φ 19.1495
Δ 0.0000

| | W | M | T |
|---|---|---|---|
| f | 51.25 | 150.00 | 243.75 |
| FNO | 4.60 | 5.44 | 6.40 |
| 2ω | 32.4 | 11.0 | 6.8 |
| Y | 14.75 | 14.75 | 14.75 |
| TL | 130.819 | 167.081 | 182.443 |
| BF | 14.319 | 30.464 | 45.827 |

[Lens Data]

| Surface Number | R | D | nd | vd |
|---|---|---|---|---|
| 1 | 146.12588 | 2.000 | 1.67270 | 32.2 |
| 2 | 54.86660 | 4.428 | 1.51680 | 63.9 |
| 3 | 312.17775 | 0.000 | | |
| 4 | 101.16252 | 3.952 | 1.58913 | 61.2 |
| 5 | −323.20365 | D5(variable) | | |
| 6 | 43.38347 | 3.058 | 1.84666 | 23.8 |
| 7 | −138.79221 | 0.687 | | |
| 8 | −376.50943 | 1.000 | 1.80610 | 41.0 |
| 9 | 28.98442 | 2.791 | | |
| 10 | −34.24602 | 1.000 | 1.80610 | 41.0 |
| 11 | ∞ | D11(variable) | | |
| 12 | ∞ | 1.500 | | (Aperture S) |
| 13 | 91.93396 | 4.597 | 1.61800 | 63.3 |
| 14 | −20.70690 | 1.000 | 1.85026 | 32.4 |
| 15 | −85.24875 | 0.000 | | |
| 16 | 26.52497 | 2.766 | 1.83481 | 42.7 |
| 17 | 53.58887 | 9.298 | | |
| 18 | 1031.02320 | 1.000 | 1.83481 | 42.7 |
| 19 | 19.27465 | 4.338 | 1.49782 | 82.6 |
| 20 | −49.99316 | 0.000 | | |
| 21 | 71.99304 | 2.412 | 1.79504 | 28.7 |
| 22 | −115.55384 | D22(variable) | | |
| 23 | 169183.09000 | 2.296 | 1.72825 | 28.4 |
| 24 | −37.98446 | 0.527 | | |
| 25 | −42.61955 | 1.000 | 1.83481 | 42.7 |
| 26 | 61.50123 | D26(variable) | | |
| 27 | −19.99185 | 1.000 | 1.83481 | 42.7 |
| 28 | −44.54325 | 0.000 | | |
| 29 | 106.57684 | 2.315 | 1.84666 | 23.8 |
| 30 | −279.81339 | BF | | |

[Lens Group Data]

| Group | Starting Surface | Focal Length |
|---|---|---|
| G1 | 1 | 130.24 |
| G2 | 6 | −40.13 |
| G3 | 13 | 34.55 |
| G4 | 23 | −73.25 |
| G5 | 27 | −88.38 |

TABLE 10-continued

[Variable Distance Data]

|  | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0550 | −0.1542 | −0.2580 |
| D0 | ∞ | ∞ | ∞ | 869.21 | 832.89 | 817.52 |
| D5 | 1.500 | 42.947 | 53.964 | 1.500 | 42.947 | 53.964 |
| D11 | 33.847 | 12.518 | 1.500 | 33.847 | 12.518 | 1.500 |
| D22 | 20.245 | 9.019 | 2.000 | 23.641 | 18.765 | 16.987 |
| D26 | 7.944 | 19.170 | 26.189 | 4.548 | 9.423 | 11.201 |
| BF | 14.319 | 30.464 | 45.827 | 14.319 | 30.464 | 45.827 |

[Conditional Expression Corresponding Value]

Conditional Expression (1) fGb/fGa = 1.8255
Conditional Expression (2) fVR/fGa = 1.0000
Conditional Expression (3) Dpn/(−fGb) = 0.0072
Conditional Expression (4) fa/fb = 0.5679
Conditional Expression (5) fα/fβ = 0.5679
Conditional Expression (6) fGc/(−fGa) = 0.8610
Conditional Expression (7) fGc/(−fGb) = 0.4716
Conditional Expression (8) |mda|/fw = 1.0237
Conditional Expression (9) |mcb|/fw = 0.3560
Conditional Expression (13) Dpn/(−f4) = 0.0072
Conditional Expression (14) fVR/f2 = 1.0000
Conditional Expression (15) f4/f2 = 1.8255
Conditional Expression (16) f3a/f3b = 0.5679
Conditional Expression (17) f3α/f3β = 0.5679
Conditional Expression (18) f3/(−f2) = 0.8610
Conditional Expression (19) f3/(−f4) = 0.4716
Conditional Expression (20) |m12|/fw = 1.0237
Conditional Expression (21) |m34|/fw = 0.3560
Conditional Expression (22) |f4|/(−f2) = 1.8255
Conditional Expression (23) f3a/f3b = 0.5679
Conditional Expression (24) f3α/f3β = 0.5679
Conditional Expression (25) f3/(−f2) = 0.8610
Conditional Expression (26) f3/|f4| = 0.4716
Conditional Expression (27) |m12|/fw = 1.0237
Conditional Expression (28) |m34|/fw = 0.3560

Figure 38A:
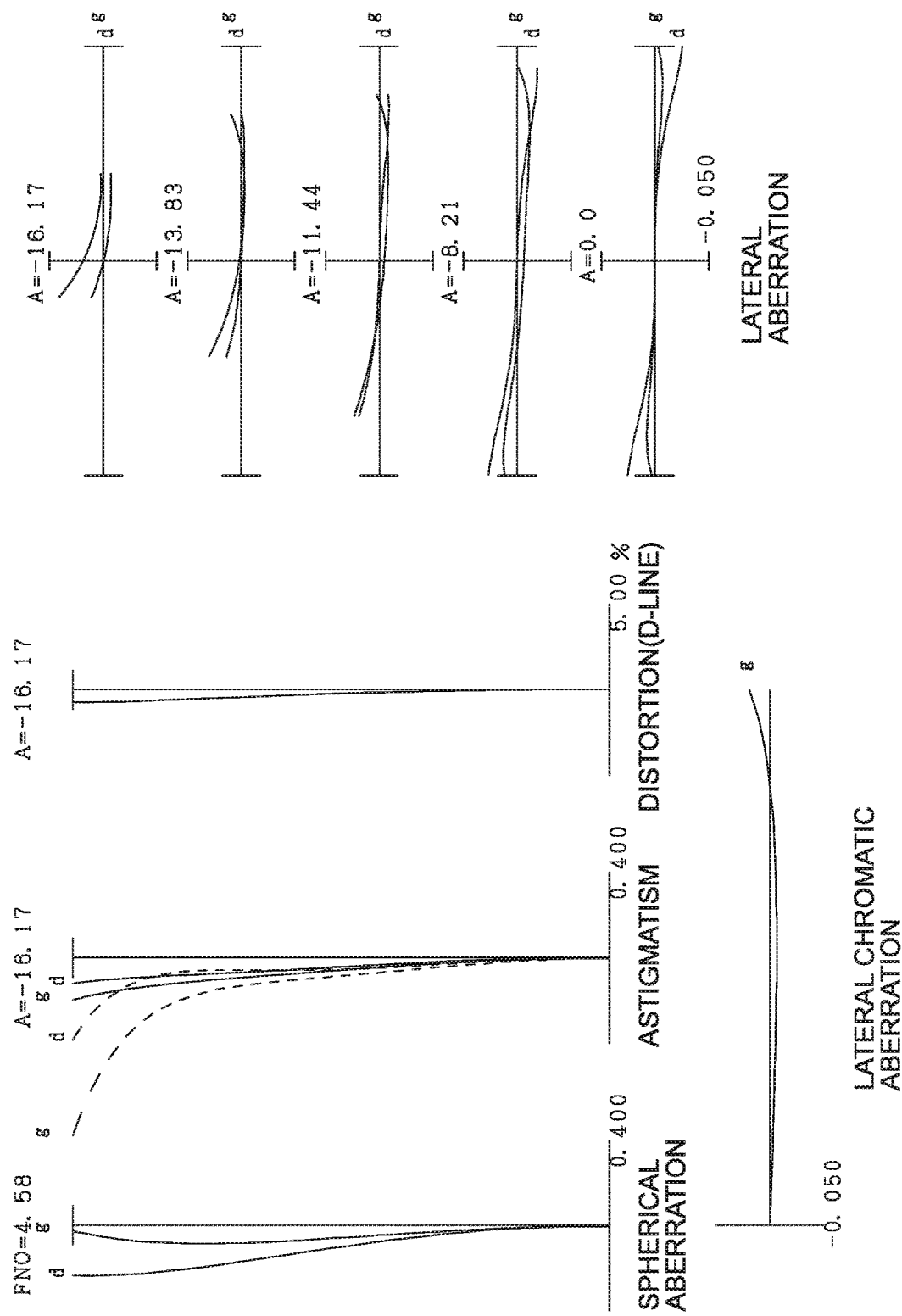
Figure 38C:
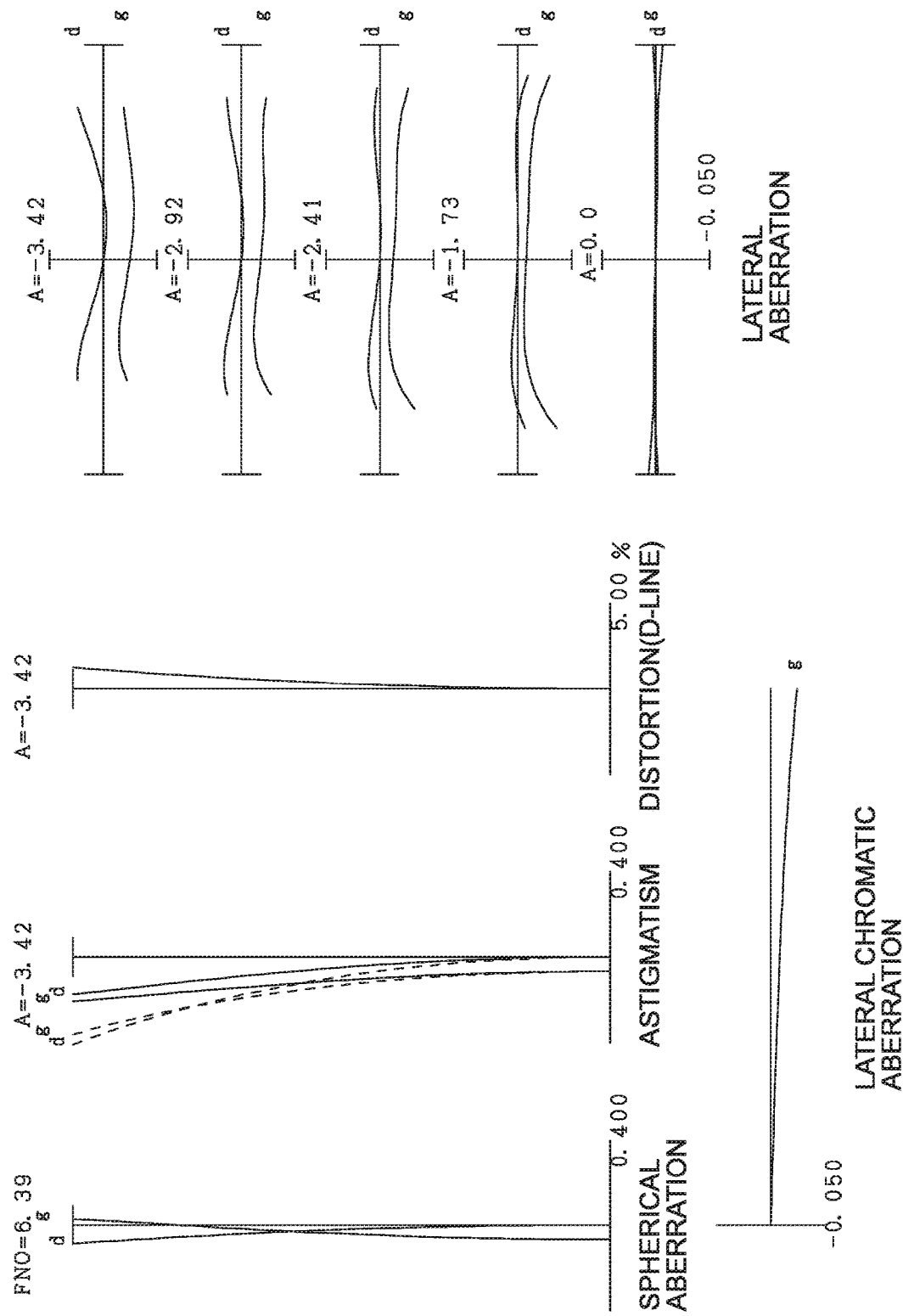
Figure 39A:
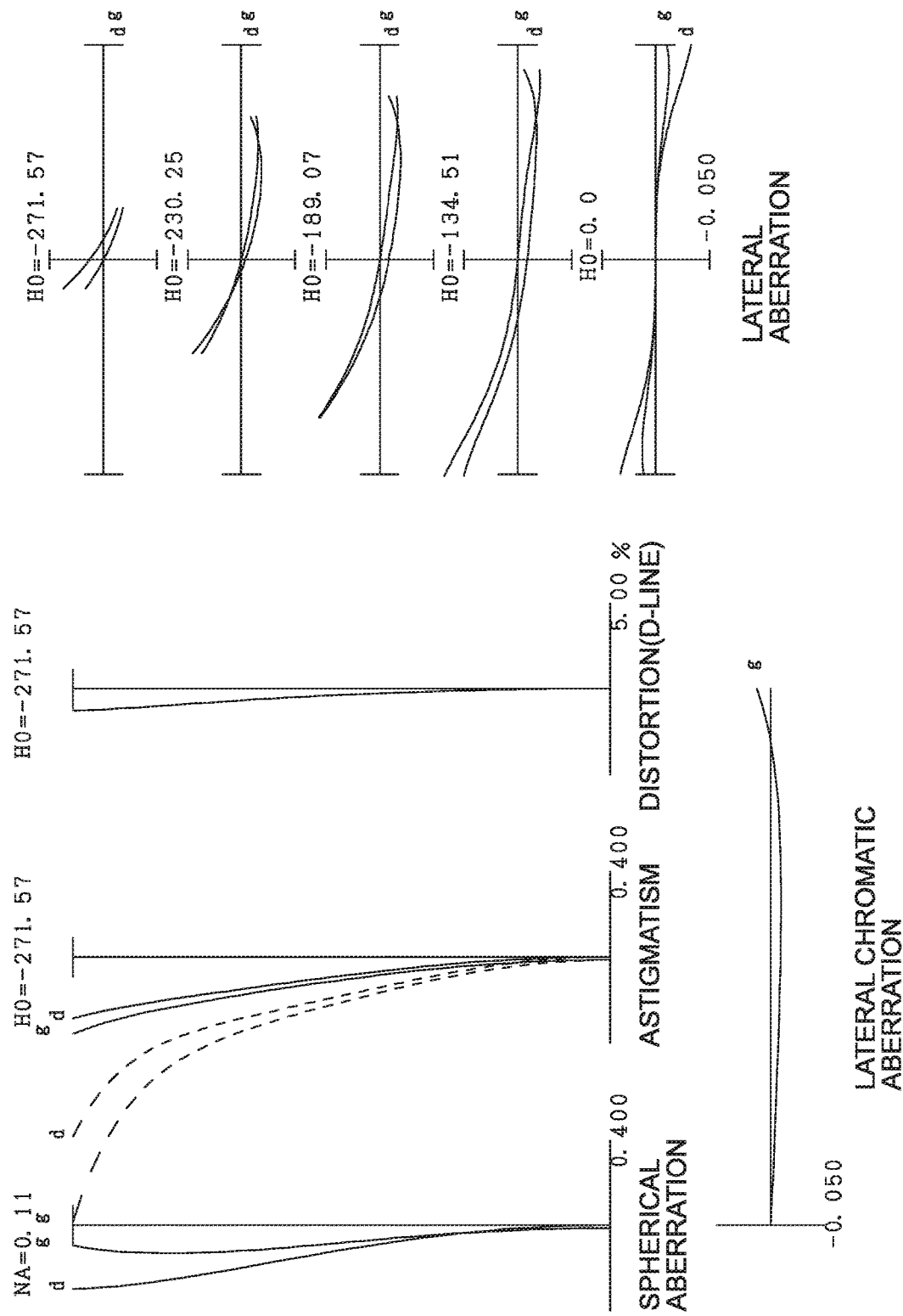
Figure 40A:
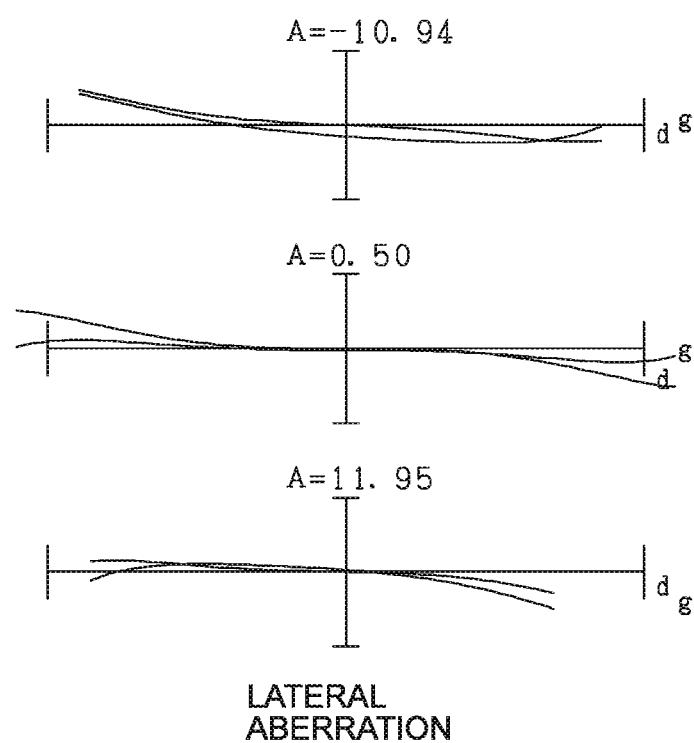
FIG. 40A, FIG. 40B, and FIG. 40C are each a meridional lateral aberration graph when shake compensation is performed in the wide angle end state, in the intermediate focal length state, and in the telephoto end state of the zoom optical system according to Example 10.
Figure 40B:
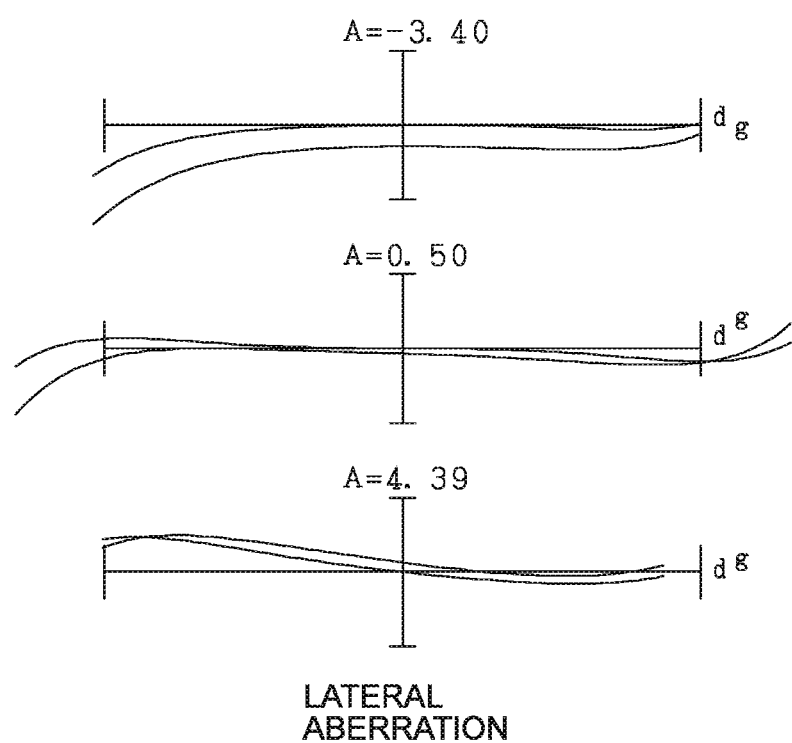
Figure 40C:
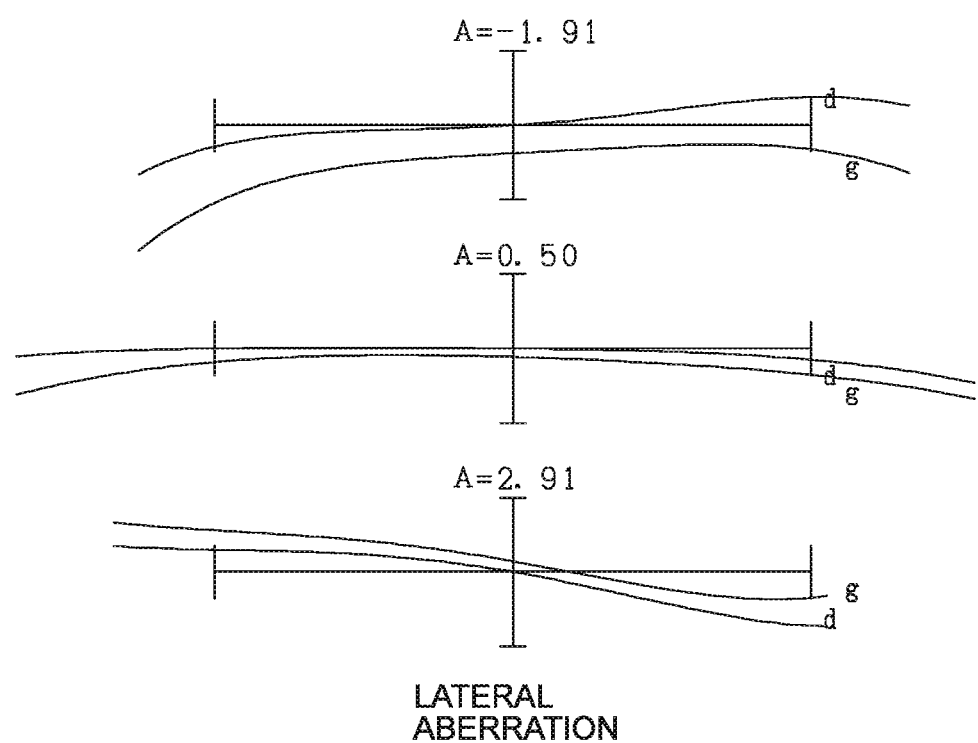

FIG. 38A, FIG. 38B and FIG. 38C are each an aberration graph illustrating aberrations upon focusing on infinity in a wide angle end state, in an intermediate focal length state, and in a telephoto end state of the zoom optical system having a vibration proof function according to Example 10. FIG. 39A, FIG. 39B and FIG. 39C are each an aberration graph illustrating aberrations upon focusing on short distance (close range) in a wide angle end state, in an intermediate focal length state, and in a telephoto end state of the zoom optical system having a vibration proof function according to Example 10. FIG. 40A, FIG. 40B, and FIG. 40C are each a meridional lateral aberration graph when shake compensation is performed in the wide angle end state, in the intermediate focal length state, and in the telephoto end state of the zoom optical system having a vibration proof function according to Example 10. It is apparent from respective aberration graphs that the zoom optical system according to Example 10 has an excellent image forming performance capable of correcting various aberrations successfully from the wide angle end state to the telephoto end state, and also has an excellent image forming performance also upon focusing on a short distant object.

Example 11

Example 11 will be described with reference to FIG. 41 to FIG. 44 and Table 11. FIG. 41 is a drawing illustrating a lens configuration of a zoom optical system according to Example 11. The zoom optical system ZL (11) according to Example 11 consists of, in order from an object, a first lens group G1 having a positive refractive power, a second lens group G2 having a negative refractive power, an aperture stop S, a third lens group G3 having a positive refractive power, a fourth lens group G4 having a negative refractive power, and a fifth lens group G5 having a positive refractive power. For zooming from the wide angle end state (W) to the telephoto end state (T), the first to fifth lens groups G1 to G5 move in the directions indicated by the arrows shown in FIG. 41. Also, for zooming from the wide angle end state (W) to the telephoto end state (T), the third lens group G3 and the fifth lens group G5 move synchronously. The first lens group G1 corresponds to the object side lens group in the first embodiment. The second lens group G2 corresponds to the first negative lens group in the first embodiment. The third lens group G3 corresponds to the intermediate lens group in the first embodiment. The fourth lens group G4 corresponds to the second negative lens group in the first embodiment. The fifth lens group G5 corresponds to the image side lens group in the first embodiment. Also, the fourth lens group G4 and the fifth lens group G5 constitute the following group GR in the third embodiment.

The first lens group G1 consists of, in order from an object, a first positive lens L11 having a biconvex shape, and a cemented lens consisting of a meniscus shaped negative lens L12 having a convex surface facing the object and a meniscus shaped second positive lens L13 having a convex surface facing the object.

The second lens group G2 consists of, in order from an object, a positive lens L21 having a biconvex shape, first negative lens L22 having a biconcave shape disposed at an air distance from the positive lens L21, and a second negative lens L23 having a biconcave shape disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a cemented lens consisting of a meniscus shaped first negative lens L31 having a convex surface facing the object and a first positive lens L32 having a biconvex shape, a meniscus shaped second positive lens L33 having a convex surface facing the object, a cemented lens consisting of a second negative lens L34 having a biconcave shape and a third positive lens L35 having a biconvex shape, and a fourth positive lens L36 having a biconvex shape. The aperture stop S is provided near the object side of the third lens group G3, and moves integrally with the third lens group G3 during zooming.

The fourth lens group G4 consists of, in order from an object, a positive lens L41 meniscus shaped with a convex surface facing the image side, and a negative lens L42 having a biconcave shape disposed at an air distance from the positive lens L41.

The fifth lens group G5 consists of, in order from an object, a negative lens L51 meniscus shaped with a convex surface facing the image side, and a positive lens L52 having a biconvex shape. An image surface I is disposed on the image side of the fifth lens group G5.

In the zoom optical system ZL (11) according to Example 11, focusing from the infinity to the short distant object is achieved by moving all the lenses in the fourth lens group G4 to the image side along the optical axis. Also, in the zoom optical system ZL (11) according to Example 11, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle θ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan θ)/K. In the wide angle end state of Example 11, the vibration proof coefficient is −1.13, the focal length is 51.25 mm. Therefore, the amount of movement of the vibration-proof lens group for correcting the rotational blur of 0.38° is −0.30 mm. In the intermediate focal length state of Example 11, the vibration proof coefficient is −2.10, the focal length is 150.00 mm. Therefore, the amount of movement of the vibration-proof lens group for correcting the rotational blur of 0.30° is −0.37 mm. In the telephoto end state of Example 11, the vibration proof coefficient is −3.00, the focal length is 243.75 mm. Therefore, the amount of movement of the vibration-proof lens group for correcting the rotational blur of 0.30° is −0.42 mm.

In Table 11 shown below, data values of the zoom optical system according to Example 11 will be shown.

TABLE 11

[General Data]
zooming rate 4.76
φ 19.8572
Δ 0.0000

|  | W | M | T |
|---|---|---|---|
| f | 51.25 | 150.00 | 243.75 |
| FNO | 4.60 | 5.77 | 6.40 |
| 2ω | 30.6 | 10.4 | 6.4 |
| Y | 14.00 | 14.00 | 14.00 |
| TL | 130.819 | 175.365 | 184.319 |
| BF | 14.319 | 33.784 | 49.264 |

[Lens Data]

| Surface Number | R | D | nd | νd |
|---|---|---|---|---|
| 1 | 1032.24740 | 2.969 | 1.58913 | 61.2 |
| 2 | −156.17760 | 0.000 | | |
| 3 | 64.61812 | 2.000 | 1.67270 | 32.2 |
| 4 | 40.08476 | 4.704 | 1.51680 | 63.9 |
| 5 | 125.32467 | D5(variable) | | |
| 6 | 90.27158 | 2.911 | 1.84666 | 23.8 |
| 7 | −75.17892 | 0.000 | | |
| 8 | −499.82852 | 1.000 | 1.83481 | 42.7 |
| 9 | 47.06042 | 2.350 | | |
| 10 | −33.14276 | 1.000 | 1.83481 | 42.7 |
| 11 | 486.54218 | D11(variable) | | |
| 12 | ∞ | 1.500 | | (Aperture S) |
| 13 | 52.69281 | 1.000 | 1.85026 | 32.4 |
| 14 | 21.65400 | 4.586 | 1.49782 | 82.6 |
| 15 | −93.23274 | 0.000 | | |
| 16 | 21.05951 | 3.410 | 1.83481 | 42.7 |
| 17 | 63.83400 | 10.263 | | |
| 18 | −535.10746 | 1.000 | 1.83481 | 42.7 |
| 19 | 13.46117 | 4.050 | 1.51823 | 58.8 |
| 20 | −111.14681 | 0.000 | | |

TABLE 11-continued

| | | | | |
|---|---|---|---|---|
| 21 | 144.45604 | 2.121 | 1.83481 | 42.7 |
| 22 | −79.68661 | D22(variable) | | |
| 23 | −148.47250 | 2.554 | 1.64769 | 33.7 |
| 24 | −24.78590 | 1.393 | | |
| 25 | −25.52643 | 1.000 | 1.83481 | 42.7 |
| 26 | 72.13865 | D26(variable) | | |
| 27 | −18.41673 | 1.000 | 1.49782 | 82.6 |
| 28 | −37.67511 | 0.000 | | |
| 29 | 947.69909 | 2.594 | 1.85000 | 27.0 |
| 30 | 66.87297 | BF | | |

[Lens Group Data]

| Group | Starting Surface | Focal Length |
|---|---|---|
| G1 | 1 | 142.56 |
| G2 | 6 | −40.62 |
| G3 | 13 | 34.44 |
| G4 | 23 | −46.86 |
| G5 | 27 | 2000.01 |

[Variable Distance Data]

| | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0553 | −0.1558 | −0.2664 |
| D0 | ∞ | ∞ | ∞ | 869.18 | 824.63 | 815.68 |
| D5 | 2.000 | 48.023 | 57.852 | 2.000 | 48.023 | 57.852 |
| D11 | 38.890 | 17.949 | 1.593 | 38.890 | 17.949 | 1.593 |
| D22 | 13.958 | 4.815 | 2.222 | 16.318 | 12.359 | 17.209 |
| D26 | 8.247 | 17.389 | 19.982 | 5.886 | 9.845 | 4.996 |
| BF | 14.319 | 33.784 | 49.264 | 14.319 | 33.784 | 49.264 |

[Conditional Expression Corresponding Value]

Conditional Expression (1) fGb/fGa = 1.1538
Conditional Expression (2) fVR/fGa = 1.0000
Conditional Expression (3) Dpn/(−fGb) = 0.0297
Conditional Expression (6) fGc/(−fGa) = 0.8480
Conditional Expression (7) fGc/(−fGb) = 0.7350
Conditional Expression (8) |mda|/fw = 1.0898
Conditional Expression (9) |mcb|/fw = 0.2290
Conditional Expression (13) Dpn/(−f4) = 0.0297
Conditional Expression (14) fVR/f2 = 1.0000
Conditional Expression (15) f4/f2 = 1.1538
Conditional Expression (18) f3/(−f2) = 0.8480
Conditional Expression (19) f3/(−f4) = 0.7350
Conditional Expression (20) |m12|/fw = 1.0898
Conditional Expression (21) |m34|/fw = 0.2290
Conditional Expression (22) |f4|/(−f2) = 1.1538
Conditional Expression (25) f3/(−f2) = 0.8480
Conditional Expression (26) f3/|f4| = 0.7350
Conditional Expression (27) |m12|/fw = 1.0898
Conditional Expression (28) |m34|/fw = 0.2290

Figure 42B:
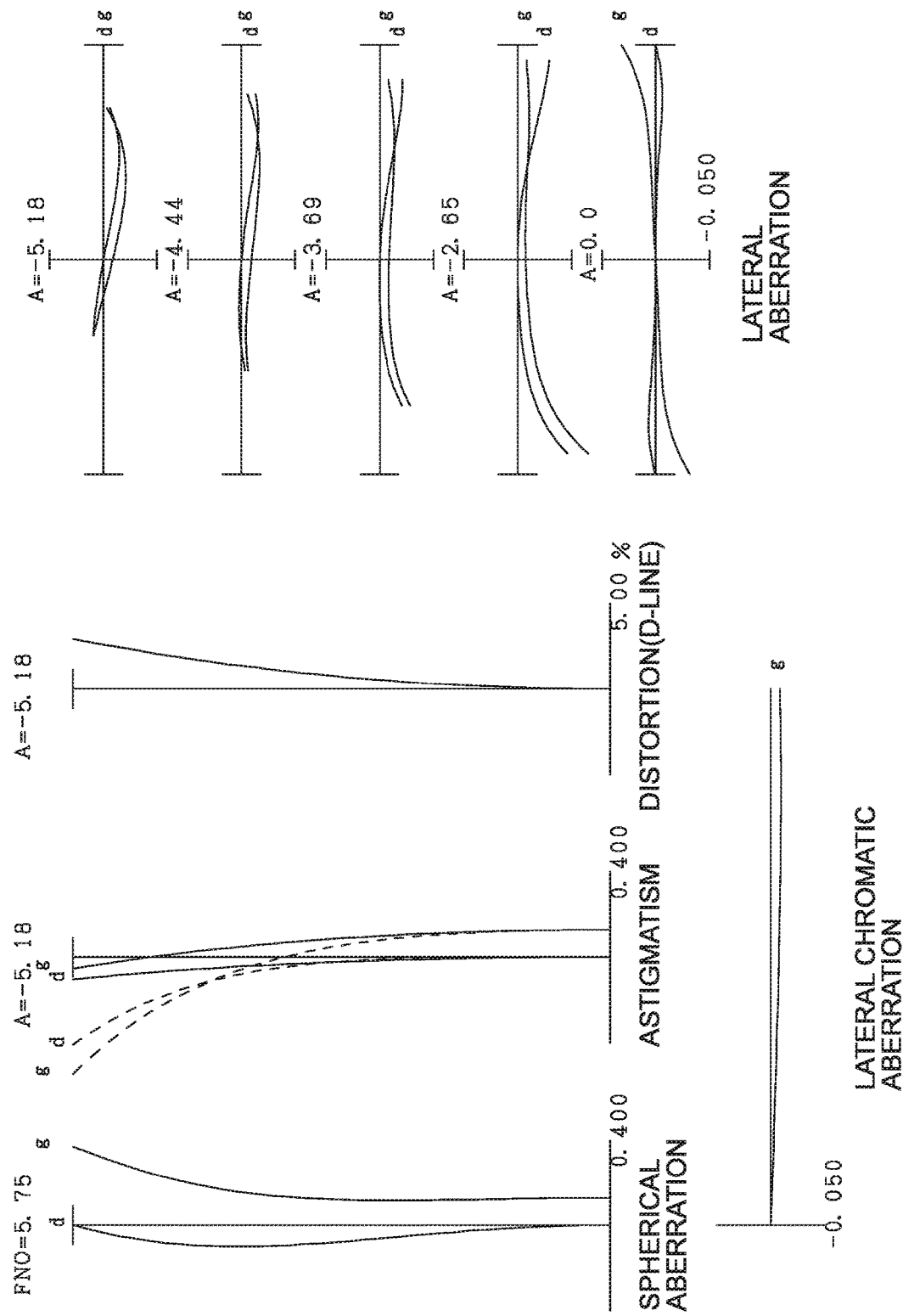
Figure 44B:
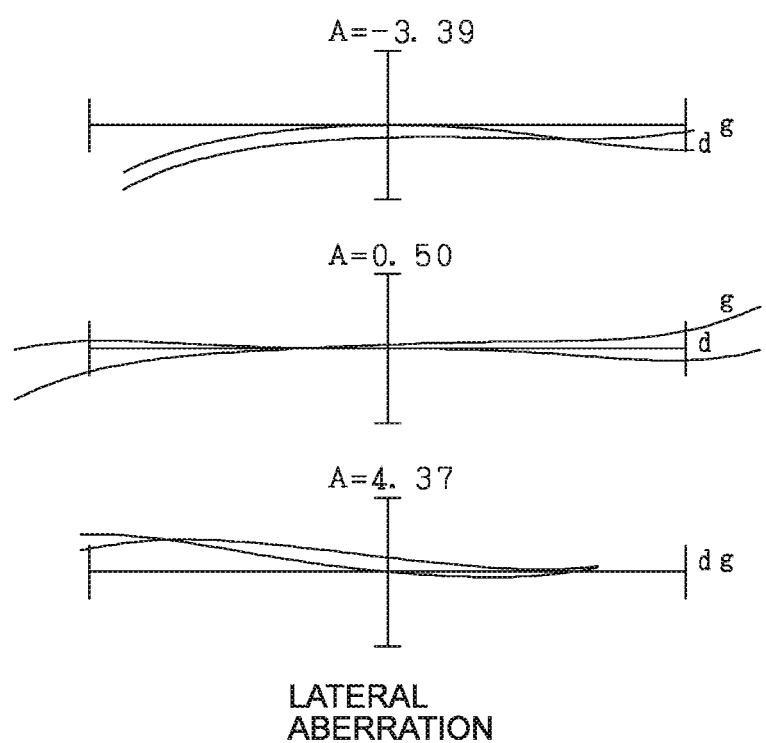
Figure 44C:
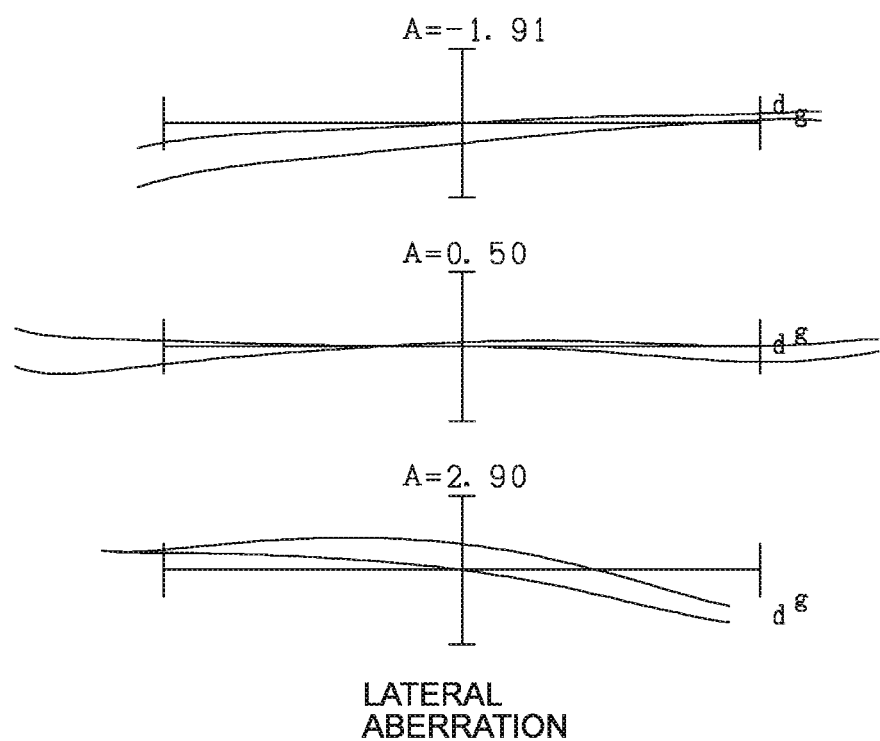

FIG. 42A, FIG. 42B and FIG. 42C are each an aberration graph illustrating aberrations upon focusing on infinity in a wide angle end state, in an intermediate focal length state, and in a telephoto end state of the zoom optical system having a vibration proof function according to Example 11. FIG. 43A, FIG. 43B and FIG. 43C are each an aberration graph illustrating aberrations upon focusing on short distance (close range) in a wide angle end state, in an intermediate focal length state, and in a telephoto end state of the zoom optical system having a vibration proof function according to Example 11. FIG. 44A, FIG. 44B, and FIG. 44C are each a meridional lateral aberration graph when shake compensation is performed in the wide angle end state, in the intermediate focal length state, and in the telephoto end state of the zoom optical system having a vibration proof function according to Example 11. It is apparent from respective aberration graphs that the zoom optical system according to Example 11 has an excellent image forming performance capable of correcting various aberrations successfully from the wide angle end state to the telephoto end state, and also has an excellent image forming performance also upon focusing on a short distant object.

Example 12

Example 12 will be described with reference to FIG. 45 to FIG. 48 and Table 12. FIG. 45 is a drawing illustrating a lens configuration of a zoom optical system according to Example 12. The zoom optical system ZL (12) according to Example 12 consists of, in order from an object, a first lens group G1 having a positive refractive power, a second lens group G2 having a negative refractive power, an aperture stop S, a third lens group G3 having a positive refractive power, a fourth lens group G4 having a positive refractive power, and a fifth lens group G5 having a negative refractive power. For zooming from the wide angle end state (W) to the telephoto end state (T), the first to fifth lens groups G1 to G5 move in the directions indicated by the arrows shown in FIG. 45. Also, for zooming from the wide angle end state (W) to the telephoto end state (T), the third lens group G3 and the fifth lens group G5 move synchronously. The fourth lens group G4 and the fifth lens group G5 constitute the following group GR in the third embodiment.

The first lens group G1 consists of, in order from an object, a first positive lens L11 having a biconvex shape, and a cemented lens consisting of a meniscus shaped negative lens L12 having a convex surface facing the object and a second positive lens L13 having a biconvex shape.

The second lens group G2 consists of, in order from an object, a positive lens L21 having a biconvex shape, first negative lens L22 having a biconcave shape disposed at an air distance from the positive lens L21, and a second negative lens L23 having a biconcave shape disposed at an air distance from the first negative lens L22. In this example, the positive lens L21, the first negative lens L22, and the second negative lens L23 (that is, all the lenses in the second lens group G2) constitute the vibration proof group.

The third lens group G3 consists of, in order from an object, a first positive lens L31 having a biconvex shape, a cemented lens consisting of a second positive lens L32 having a biconvex shape and a negative lens L33 having a biconcave shape, and a third positive lens L34 meniscus shaped with a convex surface facing the image side. The aperture stop S is provided near the object side of the third lens group G3, and moves integrally with the third lens group G3 during zooming. In this example, the first positive lens L31 constitutes the first object side subgroup, and the second positive lens L32, the negative lens L33, and the third positive lens L34 constitute the first image side subgroup. In contrast, the first positive lens L31, the second positive lens L32, and the negative lens L33 constitute the second object side subgroup, and the third positive lens L34 constitute the second image side subgroup.

The fourth lens group G4 consists of, in order from an object, a cemented lens consisting of a positive lens L41 having a biconvex shape and a negative lens L42 meniscus shaped with a convex surface facing the image side.

The fifth lens group G5 consists of, in order from an object, a cemented lens consisting of a positive lens L51 meniscus shaped with a convex surface facing the image side and a negative lens L52 having a biconcave shape. An image surface I is disposed on the image side of the fifth lens group G5.

In the zoom optical system ZL (12) according to Example 12, focusing from the infinity to the short distant object is achieved by moving all the lenses in the fourth lens group G4 to the image side along the optical axis. Also, in the zoom optical system ZL (12) according to Example 12, all the lenses in the second lens group G2 constitute the vibration proof group movable in the direction perpendicular to the optical axis, and corrects a displacement of an imaging position due to camera shake or the like (image blur on the image surface I).

It should be noted that, in order to correct a rotational blur at an angle $\theta$ with a lens having, in the whole system, a focal length f and a vibration proof coefficient (ratio of the amount of movement of the image on the imaging surface with respect to the amount of movement of the moving lens group in the shake compensation) K, the moving lens group for shake compensation may simply move in a direction perpendicular to the optical axis by (f·tan $\theta$)/K. In the wide angle end state of Example 12, the vibration proof coefficient is −1.04, the focal length is 51.25 mm. Therefore, the amount of movement of the vibration-proof lens group for correcting the rotational blur of 0.38° is −0.32 mm. In the intermediate focal length state of Example 12, the vibration proof coefficient is −2.19, the focal length is 150.00 mm. Therefore, the amount of movement of the vibration-proof lens group for correcting the rotational blur of 0.30° is −0.36 mm. In the telephoto end state of Example 12, the vibration proof coefficient is −3.00, the focal length is 243.75 mm. Therefore, the amount of movement of the vibration-proof lens group for correcting the rotational blur of 0.30° is −0.42 mm.

In Table 12 shown below, data values of the zoom optical system according to Example 12 will be shown.

TABLE 12

| [General Data] zooming rate 4.76 φ 21.3468 Δ 0.0000 | | | |
|---|---|---|---|
| | W | M | T |
| f | 51.25 | 150.00 | 243.75 |
| FNO | 4.60 | 5.75 | 6.40 |
| 2ω | 32.6 | 11.0 | 6.8 |
| Y | 14.75 | 14.75 | 14.75 |
| TL | 130.719 | 161.801 | 185.719 |
| BF | 14.639 | 35.312 | 50.247 |

| [Lens Data] | | | | |
|---|---|---|---|---|
| Surface Number | R | D | nd | vd |
| 1 | 108.21439 | 3.473 | 1.58913 | 61.2 |
| 2 | −1179.14060 | 0.100 | | |
| 3 | 222.26301 | 2.000 | 1.67270 | 32.2 |
| 4 | 60.36065 | 4.687 | 1.51680 | 63.9 |
| 5 | −909.25899 | D5(variable) | | |
| 6 | 53.20676 | 3.338 | 1.84666 | 23.8 |
| 7 | −102.10478 | 0.100 | | |
| 8 | −204.74251 | 1.000 | 1.83500 | 43.0 |

TABLE 12-continued

| | | | | |
|---|---|---|---|---|
| 9 | 38.40297 | 2.777 | | |
| 10 | −37.01261 | 1.000 | 1.83500 | 43.0 |
| 11 | 2769.92270 | D11(variable) | | |
| 12 | ∞ | 2.000 | | (Aperture S) |
| 13 | 81.39320 | 3.210 | 1.58913 | 61.2 |
| 14 | −59.40915 | 0.200 | | |
| 15 | 27.88318 | 5.036 | 1.49700 | 81.7 |
| 16 | −33.99594 | 1.000 | 1.83400 | 37.2 |
| 17 | 77.23226 | 15.525 | | |
| 18 | −48.29093 | 2.187 | 1.75520 | 27.6 |
| 19 | −29.43837 | D19(variable) | | |
| 20 | 40.77306 | 3.352 | 1.49700 | 81.7 |
| 21 | −31.47364 | 1.000 | 1.83500 | 43.0 |
| 22 | −93.41414 | D22(variable) | | |
| 23 | −26.11628 | 3.423 | 1.84666 | 23.8 |
| 24 | −15.43819 | 1.000 | 1.83500 | 43.0 |
| 25 | 1918.42480 | BF | | |

[Lens Group Data]

| Group | Starting Surface | Focal Length |
|---|---|---|
| G1 | 1 | 143.94 |
| G2 | 6 | −43.92 |
| G3 | 13 | 44.60 |
| G4 | 20 | 95.88 |
| G5 | 23 | −31.17 |

[Variable Distance Data]

| | W Infinity | M Infinity | T Infinity | W Short Distance | M Short Distance | T Short Distance |
|---|---|---|---|---|---|---|
| f | 51.25 | 150.00 | 243.75 | — | — | — |
| Magnification | — | — | — | −0.0560 | −0.1595 | −0.2488 |
| D0 | ∞ | ∞ | ∞ | 869.28 | 838.20 | 814.28 |
| D5 | 2.100 | 38.221 | 52.544 | 2.100 | 38.221 | 52.544 |
| D11 | 33.170 | 7.458 | 2.118 | 33.170 | 7.458 | 2.118 |
| D19 | 4.527 | 11.690 | 22.401 | 2.501 | 3.757 | 7.406 |
| D22 | 19.874 | 12.712 | 2.000 | 21.900 | 20.644 | 16.996 |
| BF | 14.639 | 35.312 | 50.247 | 14.639 | 35.312 | 50.247 |

[Conditional Expression Corresponding Value]

Figure 48A:
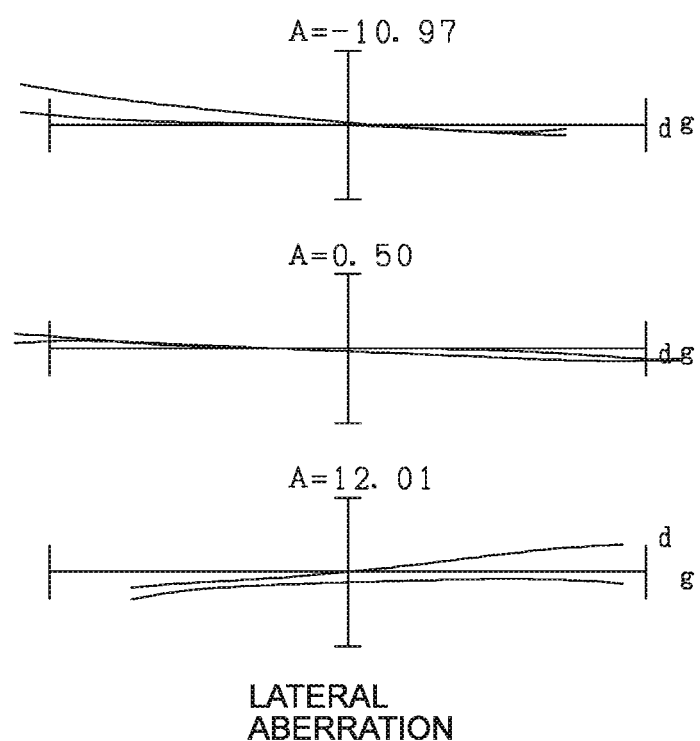
FIG. 48A, FIG. 48B, and FIG. 48C are each a meridional lateral aberration graph when shake compensation is performed in the wide angle end state, in the intermediate focal length state, and in the telephoto end state of the zoom optical system according to Example 12.
Figure 48B:
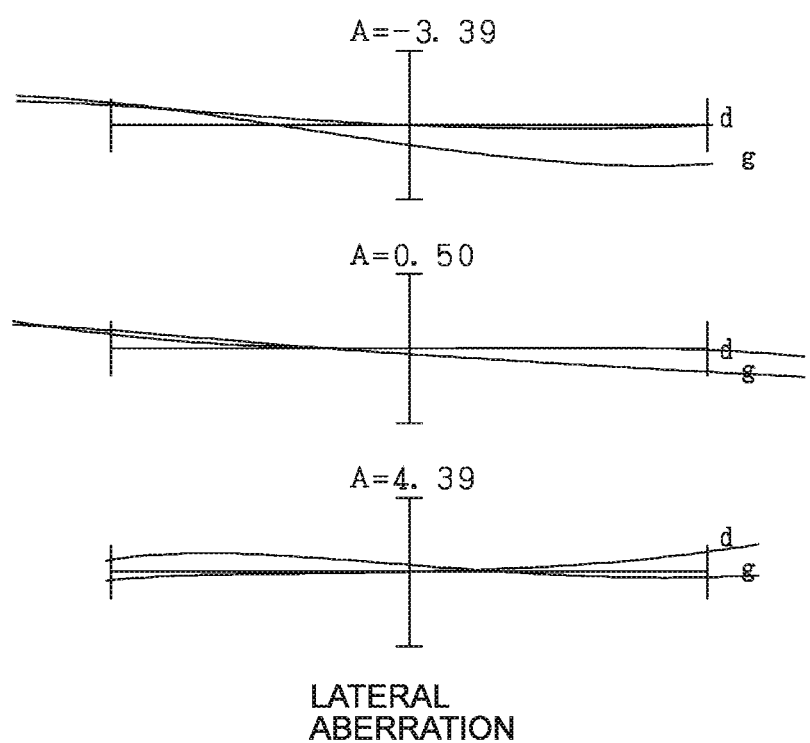
Figure 48C:
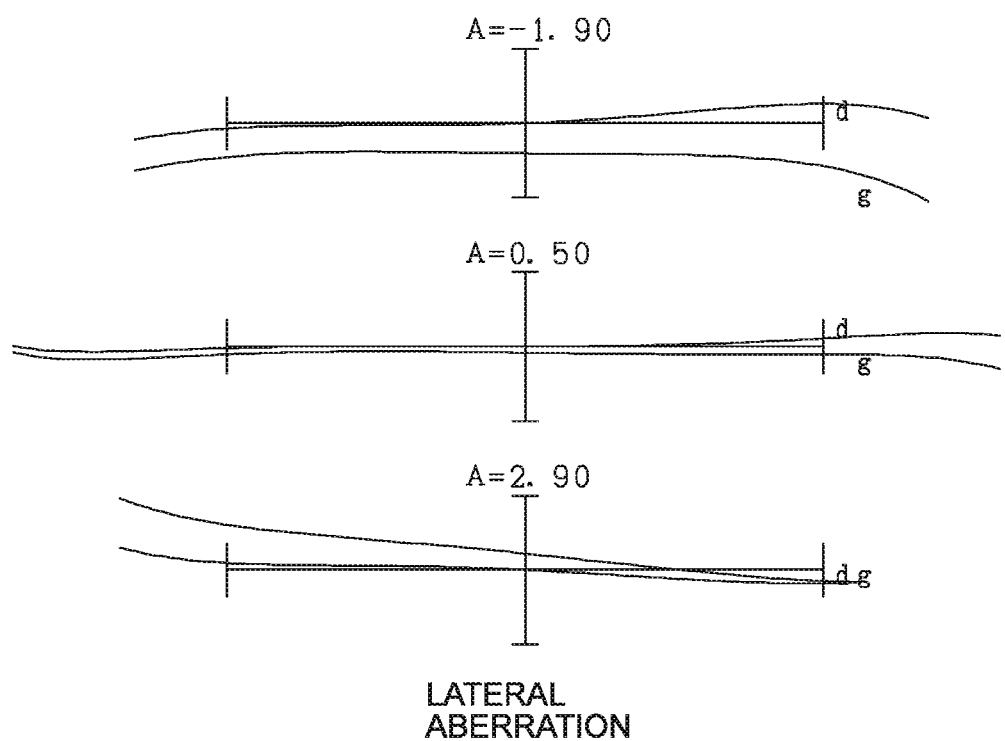

Conditional Expression (22) $|f4|/(-f2) = 2.1830$
Conditional Expression (23) $f3a/f3b = 0.5028$
Conditional Expression (24) $f3\alpha/f3\beta = 0.6284$
Conditional Expression (25) $f3/(-f2) = 1.0155$
Conditional Expression (26) $f3/|f4| = 0.4652$
Conditional Expression (27) $|m12|/fw = 0.9843$
Conditional Expression (28) $|m34|/fw = 0.3488$ FIG. 46A, FIG. 46B and FIG. 46C are each an aberration graph illustrating aberrations upon focusing on infinity in a wide angle end state, in an intermediate focal length state, and in a telephoto end state of the zoom optical system having a vibration proof function according to Example 12. FIG. 47A, FIG. 47B and FIG. 47C are each an aberration graph illustrating aberrations upon focusing on short distance (close range) in a wide angle end state, in an intermediate focal length state, and in a telephoto end state of the zoom optical system having a vibration proof function according to Example 12. FIG. 48A, FIG. 48B, and FIG. 48C are each a meridional lateral aberration graph when shake compensation is performed in the wide angle end state, in the intermediate focal length state, and in the telephoto end state of the zoom optical system having a vibration proof function according to Example 12. It is apparent from respective aberration graphs that the zoom optical system according to Example 12 has an excellent image forming performance capable of correcting various aberrations successfully from the wide angle end state to the telephoto end state, and also has an excellent image forming performance also upon focusing on a short distant object.

According to Examples 1 to 11, the optical performance in the wide angle end state is improved, and thus a telephoto type zoom optical system having a wider angle of view is achieved. According to Examples 1 to 11, a telephoto type zoom optical system having a higher zooming rate is achieved. According to the Examples 9 to 12, a telephoto type zoom optical system having a small-sized vibration proof group is achieved.

In this specification, each example described above shows a specific example of each embodiment, and the embodiments are not limited thereto.

It should be noted that the following contents can be suitably employed within the range in which optical performance of the optical system of each embodiment is not impaired.

Although a 4-groups configuration and a 5-groups configuration are described as examples of the numerical values of the zoom optical system in each embodiment. However, the present application is not limited thereto, and the zoom optical systems with other number of groups (for example, 6 groups) configuration are also applicable. Specifically, there may be provided a configuration in which 2 or more lens groups having positive or negative refractive power are disposed between the first negative lens group and the second negative lens group. Also, there may be provided a configuration in which 2 or more lens groups having positive or negative refractive power are disposed on the object side with respect to the first negative lens group. Also, a configuration in which two or more lens groups having positive or negative refractive power disposed closer to an image than the second negative lens group is also applicable. Further, it is possible to add a lens or a lens group to a position closest to the object or a position closest to the image surface of the zoom optical system of each embodiment. It should be noted that the lens group means a portion having at least one lens separated at an air distance that varies during zooming of the lens group.

In the zoom optical system of each embodiment, the focusing lens group may be configured to focus from an infinite distant object to a short distant object by moving a single or a plurality of lens groups or a partial lens group in the optical axis direction instead of the at least part of lenses in the second negative lens group. The focusing lens group may be applied to autofocusing, and is also suitable to the motor driving for autofocusing (using a stepping motor or the like). The amount of change of the image surface at the time of focusing during imaging a movie may be suppressed by reducing an image surface movement coefficient by specifying the focal length of the second negative lens group to an adequate range.

The lens surface may be formed of a spherical surface or a flat surface, or even of an aspherical surface. In particular, aberration correction by using an aspherical surface for a positive lens component arranged so as to oppose the image side of the aperture stop enables reduction of the number of lenses of the lens group including the aperture stop (or the lens group disposed so as to oppose the image side of the aperture stop in the case where the aperture stop moves solely during zooming). In addition, adjustment of aberration correction and manufacture sensitivity is enabled by using the aspherical surface for the positive lens component disposed so as to oppose the image side of the aperture stop and also by using an air distance in the lens group including the aperture stop (or the lens group disposed so as to oppose the image side of the aperture stop in the case where the aperture stop moves solely during zooming). When the lens surface is a spherical surface or a flat surface, machining and assembly adjustment are easy. It is therefore preferable because deterioration of optical performance due to errors in machining and assembly adjustment is prevented. In addition, it is preferable because deterioration of descriptive performance is not much even when the image surface is displaced.

When the lens surface is an aspherical surface, the aspherical surface may be any of an aspherical surface formed by grinding, a glass mold aspherical surface formed of glass into an aspherical shape by a mold, and a composite type aspherical surface fabricated by forming a resin into an aspherical surface shape on a surface of glass. The lens surface may be a diffraction surface, and the lenses may be gradient index lenses (GRIN lenses) or plastic lenses.

The aperture stop is preferably disposed between the second lens group and the third lens group, but may be disposed in the third lens group or on the image side of the third lens group. Alternatively, a member as the aperture stop may not be provided and a lens frame may be used instead to perform the role of the aperture stop.

Each lens surface may be coated with an antireflection film having a high transmittance in a wide wavelength region for reducing flare and ghost and achieving a high contrast optical performance. Accordingly, the flare and the ghost may be reduced, and a high optical performance with a high contrast is achieved.

EXPLANATION OF NUMERALS AND CHARACTERS

G1 first lens group (object side lens group)
G2 second lens group (first negative lens group)
G3 third lens group (intermediate lens group)
G4 fourth lens group (second negative lens group)
G5 fifth lens group (image side lens group)
I image surface
S aperture stop

The invention claimed is:
1. A zoom optical system comprising:
a first negative lens group having a negative refractive power;
a second negative lens group having a negative refractive power and disposed closer to an image than the first negative lens group; and
an intermediate lens group disposed between the first negative lens group and the second negative lens group, and
wherein a distance between the first negative lens group and the second negative lens group, a distance between the first negative lens group and the intermediate lens group, and a distance between the intermediate lens group and the second negative lens group change during zooming,
at least part of the first negative lens group is movable so as to have a displacement component in a direction perpendicular to an optical axis,
at least part of the second negative lens group is movable along the optical axis during focusing, and
the following conditional expressions are satisfied:

$$0.50 < fGb/fGa < 2.60$$

$$0.40 < fGc/(-fGa) < 2.60$$

where
fGa: a focal length of the first negative lens group,
fGb: a focal length of the second negative lens group, and
fGc: a focal length of the intermediate lens group.
2. The zoom optical system according to claim 1, wherein the first negative lens group includes at least partly a vibration proof group movable so as to have a displacement component in a direction perpendicular to the optical axis, and
the following conditional expression is satisfied:

$$0.93 < fVR/fGa < 2.50$$

where
fVR a focal length of the vibration proof group.
3. The zoom optical system according to claim 1, wherein the second negative lens group comprises a positive lens and a negative lens disposed in order from an object,
an air distance is present between the positive lens and the negative lens, and
the following conditional expression is satisfied:

$$0.001 < Dpn/(-fGb) < 0.400$$

where
- Dpn an air distance between the positive lens and the negative lens in the second negative lens group.

4. The zoom optical system according to claim 1, wherein
the first negative lens group comprises at least partly a vibration proof group movable so as to have a displacement component in a direction perpendicular to h optical axis, and
the vibration proof group consists of a positive lens, a first negative lens, and a second negative lens disposed in order from an object,
an air distance is present between the positive lens and the first negative lens, and
an air distance is present between the first negative lens and the second negative lens.

5. The zoom optical system according to claim 1, comprising
an object side lens group disposed on the object side with respect to the first negative lens group and having a positive refractive power, wherein
a distance between the object side lens group and the first negative lens group changes during zooming.

6. The zoom optical system according to claim 5, wherein a lens component disposed closest to an object in the object side lens group consists of a single positive lens.

7. The zoom optical system according to claim 1, comprising
an image side lens group disposed closer to an image than the second negative lens group, wherein
during zooming, a distance between the second negative lens group and the image side lens group changes.

8. The zoom optical system according to claim 1, wherein an aperture stop is disposed between the first negative lens group and the intermediate lens group.

9. The zoom optical system according to claim 1, wherein
the intermediate lens group consists of an object side subgroup having a positive refractive power and an image side subgroup having a positive refractive power disposed in order from an object, and
a lens component including a negative lens is disposed at a position closest to the object in the image side subgroup, and
the following conditional expression is satisfied:

$$0.06 < fa/fb < 1.20$$

where
- fa: a focal length of the object side subgroup, and
- fb: a focal length of the image side subgroup.

10. The zoom optical system according to claim 1, wherein
the intermediate lens group consists of an object side subgroup having a positive refractive power and an image side subgroup having a positive refractive power disposed in order from an object,
an air distance between the object side subgroup and the image side subgroup is the maximum air distance between lenses in the intermediate lens group, and
the following conditional expression is satisfied:

$$0.06 < f\alpha/f\beta < 2.60$$

where
- fα: a focal length of the object side subgroup, and
- fβ: a focal length of the image side subgroup.

11. The zoom optical system according to claim 1, wherein
the first negative lens group consists of a negative subgroup having a negative refractive power and a vibration proof group having a negative refractive power disposed in order from an object, the vibration proof group being movable so as to have a displacement component in a direction perpendicular to the optical axis, and
a lens component including a positive lens is disposed at a position closest to the image in the vibration proof group.

12. The zoom optical system according to claim 1, wherein
the following conditional expression is satisfied:

$$0.20 < fGc/(-fGb) < 2.40$$

where
- fGc a focal length of the intermediate lens group.

13. The zoom optical system according to claim 1, comprising
an object side lens group disposed on the object side with respect to the first negative lens group and having a positive refractive power,
wherein a distance between the object side lens group and the first negative lens group changes during zooming, and
the following conditional expression is satisfied:

$$0.30 < |mda|/fw < 2.30$$

where
- |mda|: an absolute value of the amount of change in distance from a lens surface closest to the image in the object side lens group to a lens surface closest to an object in the first negative lens group on the optical axis during zooming from the wide angle end state to the telephoto end state, and
- fw: a focal length of the zoom optical system in the wide angle end state.

14. The zoom optical system according to claim 1, wherein
the following conditional expression is satisfied:

$$0.050 < |mcb|/fw < 0.750$$

where
- |mcb|: an absolute value of the amount of change in distance from a lens surface closest to the image in the intermediate lens group to a lens surface closest to an object in the second negative lens group on the optical axis during zooming from the wide angle end state to the telephoto end state, and
- fw: a focal length of the zoom optical system in the wide angle end state.

15. The zoom optical system according to claim 1, comprising
an aperture stop disposed between the first negative lens group and the second negative lens group, and
a lens group having a positive lens component disposed so as to oppose the image side of the aperture stop,
wherein a distance between the first negative lens group and the lens group having the positive lens component, and a distance between the lens group having the positive lens component and the second negative lens group change during zooming, and
the following conditional expression is satisfied:

$$0.40 < fp/fGp < 3.60$$

where
- fp: a focal length of the positive lens component, and
- fGp: a focal length of the lens group having the positive lens component.

16. The zoom optical system according to claim 1, comprising
an aperture stop disposed between the first negative lens group and the second negative lens group, and
a lens group having a positive lens component disposed so as to oppose the image side of the aperture stop,
wherein a distance between the first negative lens group and the lens group having the positive lens component, and a distance between the lens group having the positive lens component and the second negative lens group change during zooming, and
the following conditional expression is satisfied:

$$0.40 < LS/LGp < 0.90$$

where
LS: a sum of air distances on the image side of the positive lens component in the lens group having the positive lens component, and
LGp: a thickness of the lens group having the positive lens component on the optical axis.

17. The zoom optical system according to claim 1, comprising
an aperture stop disposed between the first negative lens group and the second negative lens group, and
a lens group having a positive lens component disposed so as to oppose the image side of the aperture stop,
wherein a distance between the first negative lens group and the lens group having the positive lens component, and a distance between the lens group having the positive lens component and the second negative lens group change during zooming,
at least one lens surface of the positive lens component has an aspherical surface, and
the following conditional expression is satisfied:

$$0.15 < 100 \times (\Delta/\varphi) < 1.30$$

where
$\varphi$: a maximum effective diameter of the lens surface on the object side of the positive lens component, and
$\Delta$: an absolute value between a difference between the aspherical amount at a position corresponding to the maximum effective diameter of the lens surface on the object side of the positive lens component and the aspherical amount at a position corresponding to the maximum effective diameter of the lens surface on the image side of the positive lens component.

18. An optical apparatus comprising the zoom optical system according to claim 1.

19. The zoom optical system according to claim 1, further comprising a third negative lens group having a negative refractive power, which is disposed closer to an image than the second negative lens group, and
the third negative lens group being fixed in its position on the optical axis during zooming.

20. The zoom optical system according to claim 1, further comprising a positive lens group having a positive refractive power, which is disposed between the first negative lens group and the second negative lens group, and
a distance between the first negative lens group and the positive lens group and a distance between the positive lens group and the second negative lens group being changed during zooming.

21. The zoom optical system according to claim 1, wherein the second negative lens group consists of a cemented lens of a positive lens and a negative lens.

22. The zoom optical system according to claim 1, further comprising a first positive lens group having a positive refractive power, which is disposed closest to an object, and
the first positive lens group consists of, in order from an object side, a positive lens, a negative lens and a positive lens.

23. The zoom optical system according to claim 1, wherein a lens component disposed closest to the image consists of a single negative lens.

24. A zoom optical system comprising:
a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power,
wherein a distance between the first lens group and the second lens group, a distance between the second lens group and the third lens group, and a distance between the third lens group and the fourth lens group change during zooming,
the second lens group includes at least partly a vibration proof group movable so as to have a displacement component in a direction perpendicular to an optical axis,
the fourth lens group includes a positive lens and a negative lens disposed in order from an object,
an air distance is present between the positive lens and the negative lens, and
the following conditional expressions are satisfied:

$$0.001 < Dpn/(-f4) < 0.400$$

$$0.93 < fVR/f2 < 2.50$$

where
Dpn: an air distance between the positive lens and the negative lens in the fourth lens group,
f4: a focal length of the fourth lens group,
fVR: a focal length of the vibration proof group, and
f2: a focal length of the second lens group.

25. A zoom optical system comprising:
a first lens group having a positive refractive power, a second lens group disposed closer to an image than the first lens group and having a negative refractive power, a third lens group disposed closer to the image than the second lens group and having a positive refractive power, and a following group disposed closer to the image than the third lens group and consisting of at least one lens group,
wherein a distance between the first lens group and the second lens group, a distance between the second lens group and the third lens group, and a distance between the third lens group and the following group change during zooming,
any one of the first lens group, the second lens group, the third lens group, and the following group includes at least partly a vibration proof group movable so as to have a displacement component in a direction perpendicular to an optical axis,
the vibration proof group consists of a positive lens, a first negative lens, and a second negative lens disposed in order from an object,
an air distance is present between the positive lens and the first negative lens, an air distance is present between the first negative lens and the second negative lens, the following group includes a fourth lens group disposed closer to the image than the third lens group, and the following conditional expression is satisfied:

$$0.40<|f4|/(-f2)<4.00$$

where f4: a focal length of the fourth lens group, and f2: a focal length of the second lens group.

26. The zoom optical system according to claim 25, wherein the third lens group consists of an object side subgroup having a positive refractive power and an image side subgroup having a positive refractive power disposed in order from the object, a lens component including a negative lens is disposed at a position closest to the object in the image side subgroup, and the following conditional expression is satisfied:

$$0.08<f3a/f3b<1.20$$

where f3a: a focal length of the object side subgroup, and f3b: a focal length of the image side subgroup.

27. A method for manufacturing a zoom optical system comprising a first negative lens group having a negative refractive power, a second negative lens group having a negative refractive power and disposed closer to an image than the first negative lens group, and an intermediate lens group disposed between the first negative lens group and the second negative lens group, the method comprising:

disposing respective lenses within a lens barrel in such a manner that a distance between the first negative lens group and the second negative lens group, a distance between the first negative lens group and the intermediate lens group, and a distance between the intermediate lens group and the second negative lens group change during zooming, at least part of the first negative lens group is movable so as to have a displacement component in a direction perpendicular to an optical axis, and at least part of the second negative lens group is movable along the optical axis during focusing; and satisfying the following conditional expressions:

$$0.50<fGb/fGa<2.60$$

$$0.40<fGc/(-fGa)<2.60$$

where fGa: a focal length of the first negative lens group, fGb: a focal length of the second negative lens group, and fGc: a focal length of the intermediate lens group.

28. A method for manufacturing a zoom optical system comprising a first lens group having a positive refractive power, a second lens group disposed closer to an image than the first lens group and having a negative refractive power, a third lens group disposed closer to an image than the second lens group and having a positive refractive power, and a fourth lens group disposed closer to an image than the third lens group and having a negative refractive power, the method comprising:

disposing respective lenses within a lens barrel in such a manner that a distance between the first lens group and the second lens group, a distance between the second lens group and the third lens group, and a distance between the third lens group and the fourth lens group change during zooming, the second lens group includes at least partly a vibration proof group movable so as to have a displacement component in a direction perpendicular to an optical axis, the fourth lens group includes a positive lens and a negative lens disposed in order from an object, an air distance is present between the positive lens and the negative lens, and the following conditional expressions are satisfied:

$$0.001<Dpn/(-f4)<0.400$$

$$0.93<fVR/f2<2.50$$

where

Dpn: an air distance between the positive lens and the negative lens in the fourth lens group, f4: a focal length of the fourth lens group, fVR: a focal length of the vibration proof group, and f2: a focal length of the second lens group.

29. A method for manufacturing a zoom optical system comprising a first lens group having a positive refractive power, a second lens group disposed closer to an image than the first lens group and having a negative refractive power, a third lens group disposed closer to the image than the second lens group and having a positive refractive power, and a following group disposed closer to the image than the third lens group and consisting of at least one lens group, the method comprising:

disposing respective lenses within a lens barrel in such a manner that a distance between the first lens group and the second lens group, a distance between the second lens group and the third lens group, and a distance between the third lens group and the following group change during zooming, any one of the first lens group, the second lens group, the third lens group, and the following group includes at least partly a vibration proof group movable so as to have a displacement component in a direction perpendicular to an optical axis, the vibration proof group consists of a positive lens, a first negative lens, and a second negative lens disposed in order from an object, an air distance is present between the positive lens and the first negative lens, an air distance is present between the first negative lens and the second negative lens the following group includes a fourth lens group disposed closer to the image than the third lens group, and the following conditional expression is satisfied:

$$0.40<|f4|/(-f2)<4.00$$

where f4: a focal length of the fourth lens group, and f2: a focal length of the second lens group.

30. A zoom optical system comprising:

a first negative lens group having a negative refractive power; and a second negative lens group having a negative refractive power and disposed closer to an image than the first negative lens group, and wherein a distance between the first negative lens group and the second negative lens group changes during zooming, at least part of the first negative lens group is movable so as to have a displacement component in a direction perpendicular to an optical axis, at least part of the second negative lens group is movable along the optical axis during focusing, the first negative lens group includes at least partly a vibration proof group movable so as to have a displacement component in a direction perpendicular to an optical axis, and the following conditional expressions are satisfied:

$$0.50 < fGb/fGa < 2.60$$

$$0.93 < fVR/fGa < 2.50$$

where fGa: a focal length of the first negative lens group, fGb: a focal length of the second negative lens group and fVR: a focal length of the vibration proof group.

31. The zoom optical system according to claim 30, comprising an intermediate lens group disposed between the first negative lens group and the second negative lens group, wherein a distance between the first negative lens group and the intermediate lens group, and a distance between the intermediate lens group and the second negative lens group change during zooming.

32. The zoom optical system according to claim 30, comprising an object side lens group disposed on the object side with respect to the first negative lens group and having a positive refractive power, wherein a distance between the object side lens group and the first negative lens group changes during zooming.

33. The zoom optical system according to claim 30, comprising an image side lens group disposed closer to an image than the second negative lens group, wherein during zooming, a distance between the second negative lens group and the image side lens group changes.

34. The zoom optical system according to claim 30, comprising an intermediate lens group disposed between the first negative lens group and the second negative lens group, wherein a distance between the first negative lens group and the intermediate lens group, and a distance between the intermediate lens group and the second negative lens group change during zooming, and an aperture stop is disposed between the first negative lens group and the intermediate lens group.

35. The zoom optical system according to claim 30, wherein the first negative lens group consists of a negative subgroup having a negative refractive power and the vibration proof group having a negative refractive power disposed in order from an object, and a lens component including a positive lens is disposed at a position closest to the image in the vibration proof group.

36. An optical apparatus comprising the zoom optical system according to claim 30.

37. The zoom optical system according to claim 30, further comprising a positive lens group having a positive refractive power, which is disposed between the first negative lens group and the second negative lens group, and a distance between the first negative lens group and the positive lens group and a distance between the positive lens group and the second negative lens group being changed during zooming.

38. The zoom optical system according to claim 30, further comprising a first positive lens group having a positive refractive power, which is disposed closest to an object, and wherein the first positive lens group consists of, in order from an object side, a positive lens, a negative lens and a positive lens.

39. A zoom optical system comprising:

a first negative lens group having a negative refractive power;

a second negative lens group having a negative refractive power and disposed closer to an image than the first negative lens group; and an intermediate lens group disposed between the first negative lens group and the second negative lens group, and wherein a distance between the first negative lens group and the second negative lens group, a distance between the first negative lens group and the intermediate lens group, and a distance between the intermediate lens group and the second negative lens group change during zooming, at least part of the first negative lens group is movable so as to have a displacement component in a direction perpendicular to an optical axis, at least part of the second negative lens group is movable along the optical axis during focusing, and the following conditional expressions are satisfied:

$$0.50 < fGb/fGa < 2.60$$

$$0.20 < fGc/(-fGb) < 2.40$$

where fGa: a focal length of the first negative lens group, fGb: a focal length of the second negative lens group, and fGc: a focal length of the intermediate lens group.

40. The zoom optical system according to claim 39, comprising an object side lens group disposed on the object side with respect to the first negative lens group and having a positive refractive power, wherein a distance between the object side lens group and the first negative lens group changes during zooming.

41. The zoom optical system according to claim 39, comprising an image side lens group disposed closer to an image than the second negative lens group, wherein during zooming, a distance between the second negative lens group and the image side lens group changes.

42. The zoom optical system according to claim 39, wherein an aperture stop is disposed between the first negative lens group and the intermediate lens group.

43. The zoom optical system according to claim 39, wherein the first negative lens group consists of a negative subgroup having a negative refractive power and a vibration proof group having a negative refractive power disposed in order from an object, the vibration proof group being movable so as to have a displacement component in a direction perpendicular to an optical axis, and a lens component including a positive lens is disposed at a position closest to the image in the vibration proof group.

44. An optical apparatus comprising the zoom optical system according to claim 39.

45. The zoom optical system according to claim 39, further comprising a positive lens group having a positive refractive power, which is disposed between the first negative lens group and the second negative lens group, and a distance between the first negative lens group and the positive lens group and a distance between the positive lens group and the second negative lens group being changed during zooming.

46. The zoom optical system according to claim 39, further comprising a first positive lens group having a positive refractive power, which is disposed closest to an object, and the first positive lens group consists of, in order from an object side, a positive lens, a negative lens and a positive lens.

\* \* \* \* \*